(12) United States Patent
Crimm et al.

(10) Patent No.: US 12,325,589 B2
(45) Date of Patent: Jun. 10, 2025

(54) METHODS, APPARATUSES AND COMPUTER PROGRAM PRODUCTS FOR MOVEMENT OF RECTANGULAR PRISMS THROUGH A MULTI-DIMENSIONAL SPACE

(71) Applicant: Honeywell International Inc., Charlotte, NC (US)

(72) Inventors: Paul E. Crimm, Fort Mill, SC (US); Lori A. Pike, Murrysville, PA (US); Francisco Tejada, Katy, TX (US); Muhammad Samer Abbas, Rosenberg, TX (US); Karel Chaloupka, Houston, TX (US); Kevin Hellman, Katy, TX (US); Reza Katebi, Decatur, GA (US); Mohammad Lotfollahi Sohi, Houston, TX (US); Zachary Nicholas Antosko, Missouri City, TX (US); Gunjan Goswami, Cumming, GA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/796,132

(22) Filed: Aug. 6, 2024

(65) Prior Publication Data
US 2024/0391692 A1 Nov. 28, 2024

Related U.S. Application Data

(63) Continuation of application No. PCT/US2023/012328, filed on Feb. 3, 2023.
(Continued)

(51) Int. Cl.
*B65G 1/04* (2006.01)
*B65G 1/10* (2006.01)
(Continued)

(52) U.S. Cl.
CPC ............. *B65G 1/0478* (2013.01); *B65G 1/10* (2013.01); *B65G 1/12* (2013.01); *B65G 1/137* (2013.01); *B65G 1/1373* (2013.01)

(58) Field of Classification Search
CPC .... B65G 1/0478; B65G 1/137; B65G 1/1373; B65G 1/10; B65G 1/12
See application file for complete search history.

(56) References Cited

U.S. PATENT DOCUMENTS 3,860,130 A 1/1975 Frangos
9,796,527 B1 10/2017 Kaukl et al.
(Continued)

FOREIGN PATENT DOCUMENTS

CA 3097226 A1 10/2019
FR 3097852 A1 1/2021
(Continued)

OTHER PUBLICATIONS

IPEA/409—International Preliminary Report on Patentability Mailed on Aug. 22, 2024 for WO Application No. PCT/US23/012328, 14 page(s).
(Continued)

*Primary Examiner* — Jacob S. Scott
*Assistant Examiner* — Erin Morris
(74) *Attorney, Agent, or Firm* — Alston & Bird LLP

(57) ABSTRACT

Methods, apparatuses and computer program products for movement of rectangular prisms in a multi-dimensional space are provided.

20 Claims, 64 Drawing Sheets

Related U.S. Application Data

(60) Provisional application No. 63/267,629, filed on Feb. 7, 2022.

(51) Int. Cl.
    *B65G 1/12*     (2006.01)
    *B65G 1/137*     (2006.01)

(56) References Cited

U.S. PATENT DOCUMENTS

| | | |
|---|---|---|
| 10,850,959 B2 | 12/2020 | Goetz |
| 2008/0211358 A1 | 9/2008 | Borgwarth et al. |
| 2021/0130094 A1 | 5/2021 | Ingram-Tedd et al. |
| 2022/0242668 A1 | 8/2022 | Perez et al. |
| 2022/0397404 A1 | 12/2022 | Franey et al. |
| 2023/0084906 A1 | 3/2023 | Karri et al. |
| 2023/0264897 A1 | 8/2023 | Stadie et al. |

FOREIGN PATENT DOCUMENTS

| | | | | |
|---|---|---|---|---|
| FR | 3139809 A1 * | 3/2024 | ............ | B65G 1/0478 |
| KR | 20210126830 A * | 10/2021 | | |
| MY | 200203 | 12/2023 | | |
| WO | 2010/118412 A1 | 10/2010 | | |
| WO | 2015/185628 A2 | 12/2015 | | |
| WO | 2017/186825 A1 | 11/2017 | | |
| WO | 2019/068775 A1 | 4/2019 | | |
| WO | 2019/232651 A1 | 12/2019 | | |
| WO | 2020/260639 A1 | 12/2020 | | |
| WO | 2021/099474 A1 | 5/2021 | | |
| WO | 2021/197941 A1 | 10/2021 | | |
| WO | 2022/013365 A1 | 1/2022 | | |
| WO | WO-2022049101 A1 * | 3/2022 | ............... | B65G 1/04 |

OTHER PUBLICATIONS

Non-Final Rejection Mailed on Nov. 14, 2024 for U.S. Appl. No. 18/898,557, 12 page(s).
Non-Final Rejection Mailed on Dec. 12, 2024 for U.S. Appl. No. 18/898,566, 21 page(s).
Non-Final Rejection Mailed on Nov. 19, 2024 for U.S. Appl. No. 18/898,563, 26 page(s).
Non-Final Rejection Mailed on Nov. 26, 2024 for U.S. Appl. No. 18/898,248, 25 page(s).
Outgoing—ISA/210—International Search Report Mailed on Feb. 27, 2024 for WO Application No. PCT/US23/030875, 24 page(s).
Outgoing—ISA/210—International Search Report Mailed on Jul. 23, 2023 for WO Application No. PCT/US23/012328, 6 page(s).
Outgoing Written Opinion of the ISA Mailed on Feb. 29, 2024 for WO Application No. PCT/US23/030,875, 11 page(s).
Outgoing Written Opinion of the ISA Mailed on Jul. 23, 2023 for WO Application No. PCT/US23/012328, 12 page(s).
Non-Final Rejection Mailed on Dec. 26, 2024 for U.S. Appl. No. 18/898,569, 9 page(s).
Non-Final Rejection Mailed on Jan. 22, 2025 for U.S. Appl. No. 18/898,577, 16 page(s).
IPEA/409—International Preliminary Report on Patentability Mailed on Mar. 6, 2025 for WO Application No. PCT/US23/030,875, 13 page(s).
Examiner Interview Summary Record (PTOL—413) Mailed on Apr. 2, 2025 for U.S. Appl. No. 18/898,248, 1 page(s).
Final Rejection Mailed on Apr 17, 2025 for U.S. Appl. No. 18/898,566, 19 page(s).
Final Rejection Mailed on Mar 21, 2025 for U.S. Appl. No. 18/898,557, 15 page(s).
Final Rejection Mailed on Mar 24, 2025 for U.S. Appl. No. 18/898,563, 19 page(s).
Notice of Allowance and Fees Due (PTOL-85) Mailed on Apr. 2, 2025 for U.S. Appl. No. 18/898,248, 13 page(s).
Notice of Allowance and Fees Due (PTOL-85) Mailed on Apr 23, 2025 for U.S. Appl. No. 18/898,569, 10 page(s).
Notice of Allowance and Fees Due (PTOL-85) Mailed on Apr 24, 2025 for U.S. Appl. No. 18/898,248, 2 page(s).
Office Action Appendix Mailed on Apr 2, 2025 for U.S. Appl. No. 18/898,248, 6 page(s).

\* cited by examiner

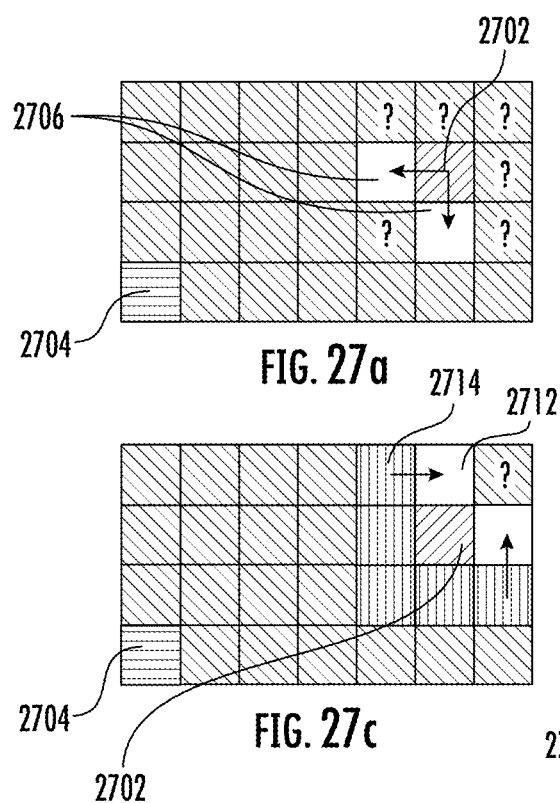
FIG. 27a
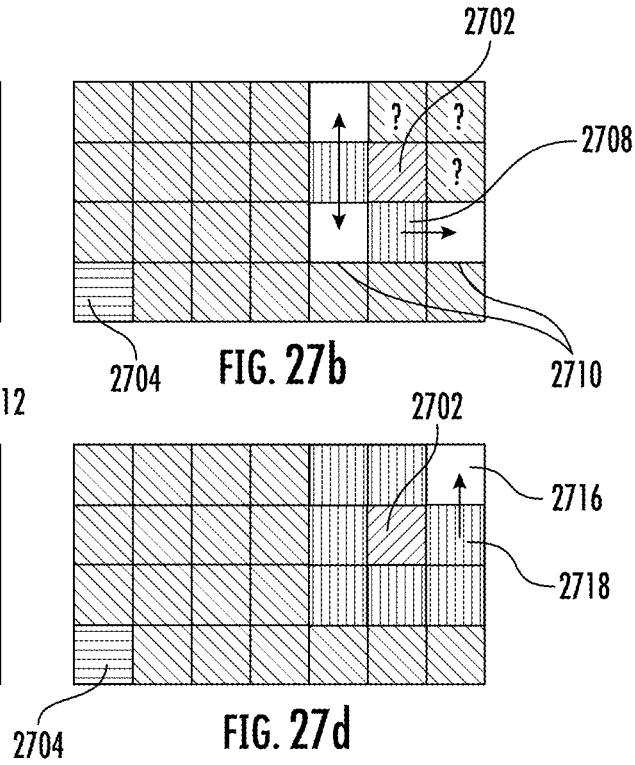
FIG. 27b
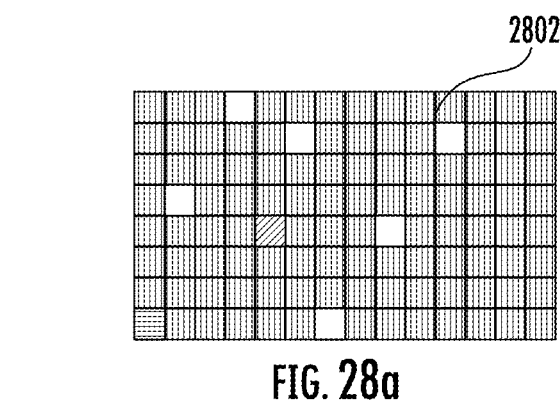
FIG. 27c
FIG. 27d
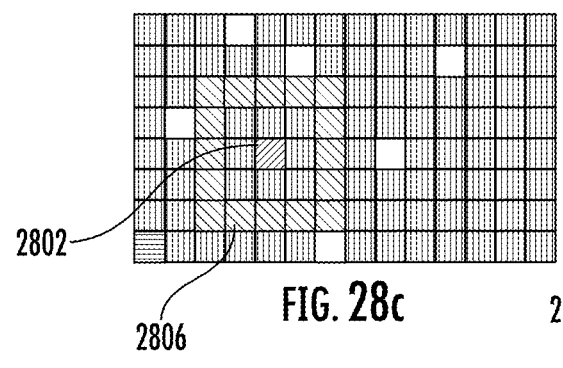
FIG. 28a
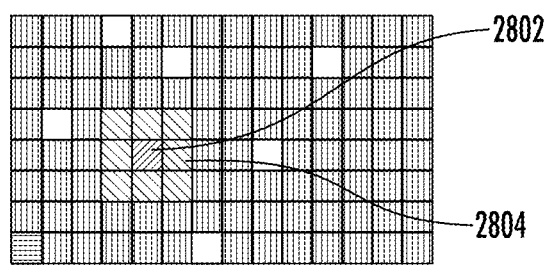
FIG. 28b
FIG. 28c
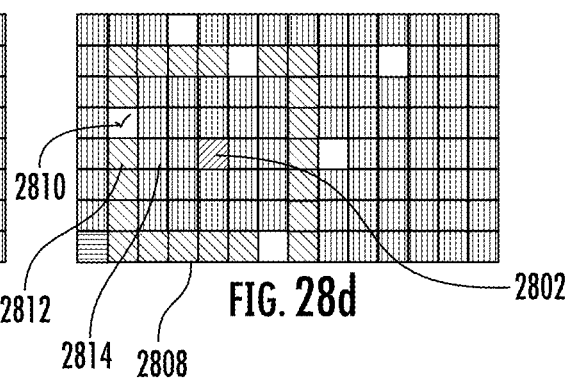
FIG. 28d

1

METHODS, APPARATUSES AND COMPUTER PROGRAM PRODUCTS FOR MOVEMENT OF RECTANGULAR PRISMS THROUGH A MULTI-DIMENSIONAL SPACE

CROSS-REFERENCE TO RELATED APPLICATIONS

The present application is a continuation application of PCT Application No. PCT/US2023/012328, filed Feb. 3, 2023, which claims priority to and benefit of U.S. Provisional Patent Application No. 63/267,629, filed Feb. 7, 2022, the contents of each of which is incorporated by reference in its entirety.

FIELD OF THE INVENTION

Example embodiments of the present disclosure relate generally to movement of rectangular prisms in a multi-dimensional space and, more particularly, to methods, apparatuses and computer program products for mechanics, communications and control, power, and/or related algorithms for movement of rectangular prisms in a multi-dimensional modular superstructure that is built using a plurality of smart racks.

BACKGROUND

Applicant has identified many technical challenges and difficulties associated with current solutions for storage and retrieval. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and computer program products for the movement of movement of rectangular prisms in a multi-dimensional space.

In accordance with various embodiments of the present disclosure, a smart rack for transporting a rectangular prism is provided. In some embodiments, the smart rack comprises a rack frame comprising a plurality of rack plates, and at least one rack actuator secured to at least an inner surface of at least one of the plurality of rack plates. In some embodiments, the at least one rack actuator comprises: a slider movably disposed on a lead screw; and an arm connected to the slider. In some embodiments, the arm is configured to operate in an engaged mode or a disengaged mode relative to the rectangular prism.

In some embodiments, when the arm operates in the engaged mode, the arm is in contact with an outer surface of the rectangular prism.

In some embodiments, when the arm operates in the disengaged mode, the arm is not in contact with an outer surface of the rectangular prism.

In some embodiments, the smart rack further comprises a swing plate moveable between a distal end of a swing bar and a proximal end of the swing bar. In some embodiments, the swing plate is connected to the lead screw. In some embodiments, when the swing plate is at the distal end of the swing bar, the arm is in the disengaged mode. In some embodiments, when the swing plate is at the proximal end of the swing bar, the arm is in the engaged mode.

2

In some embodiments, the smart rack comprises a linear motor configured to exert a linear motion; and a hinge plate defining a first groove and a second groove. In some embodiments, the linear motor comprises an actuator pin moveable along the first groove. In some embodiments, the swing plate is connected to a connector pin moveable along the second groove.

In some embodiments, the first groove and the second groove are at a 90-degree angle with one another, such that the hinge plate transfers the linear motion exerted by the linear motor to movements of the swing plate between the distal end and the proximal end.

In some embodiments, the smart rack further comprises a rotary motor. In some embodiments, the rotary motor is configured to cause a rotational motion of the arm relative to the slider.

In accordance with various embodiments of the present disclosure, a method for transmitting a tote plan to a plurality of smart racks in a modular superstructure is provided. In some embodiments, the method comprises receiving, by a processing circuitry of a smart rack, the tote plan from a superstructure controller; determine, by the processing circuitry, whether a smart rack identifier of the tote plan matches a rack coordination set of the smart rack; and in response to determining that the smart rack identifier of the tote plan does not match the rack coordination set of the smart rack, transmitting, by the processing circuitry, the tote plan to at least one peer smart rack of the smart rack.

In some embodiments, the at least one peer smart rack comprises at least one of a top peer smart rack, a bottom peer smart rack, a front peer smart rack, a back peer smart rack, a left peer smart rack, or a right peer smart rack.

In some embodiments, the method further comprises, in response to determining that the smart rack identifier of the tote plan matches the rack coordination set of the smart rack, executing at least one movement instruction of the tote plan.

In some embodiments, executing the at least one movement instruction further comprises: transmitting, by the processing circuitry, a MoveReady message to a right peer smart rack of the smart rack; receiving, by the processing circuitry, a RequestedMoveReady message from the right peer smart rack; and in response to receiving the RequestedMoveReady message, transmitting a MoveRequest message to the right peer smart rack.

In accordance with various embodiments of the present disclosure, a smart rack for selectively conveying power in a modular superstructure is provided. In some embodiments, the smart rack comprises a rack actuator circuit connected to a smart rack power access point of the smart rack; and at least one smart rack switch circuit connected to the smart rack power access point. In some embodiments, the rack actuator circuit is configured to provide power to at least one motor of the smart rack. In some embodiments, each of the at least one smart rack switch circuit is connected to at least one peer smart rack power access point of at least one peer smart rack.

In some embodiments, the smart rack power access point receives power from outside the smart rack.

In some embodiments, the at least one smart rack switch circuit comprises at least one an x dimension smart rack switch circuit, a y dimension smart rack switch circuit, and a z dimension smart rack switch circuit.

In some embodiments, the x dimension smart rack switch circuit is configured to control a flow of electricity from the smart rack to a peer smart rack that is positioned adjacent to the smart rack in an x axis dimension.

In some embodiments, the y dimension smart rack switch circuit is configured to control a flow of electricity from the smart rack to a peer smart rack that is positioned adjacent to the smart rack in a y axis dimension.

In some embodiments, the z dimension smart rack switch circuit is configured to control a flow of electricity from the smart rack to a peer smart rack that is positioned adjacent to the smart rack in a z axis dimension.

In accordance with various embodiments of the present disclosure, a method for generating a tote plan is provided. In some embodiments, the method comprises determining a closest perpendicular peer smart rack to a current smart rack having a target rectangular prism; generating movement instructions related to the current smart rack having a target rectangular prism in the tote plan to cause the target rectangular prism in the current smart rack to be moved to the closest perpendicular peer smart rack in an instance in which the closest perpendicular peer smart rack has state information that is set to open; and generating one or more other movement instructions in the tote plan in an instance in which the closest perpendicular peer smart rack has state information that is set to occupied.

In some embodiments, the method further comprises identifying the target rectangular prism, the current smart rack, and an egress point.

In some embodiments, determining the closest perpendicular peer smart rack comprises determining a perpendicular smart rack that is closest to the egress point.

In some embodiments, the method further comprises determining state information for one or more peer smart racks. In some embodiments, the state information comprises at least one of open or occupied.

In some embodiments, the method further comprises updating the location of the target rectangular prism and setting the closest perpendicular peer smart rack as the current smart rack in an instance in which the current smart rack is moved to the closest perpendicular peer smart rack.

In some embodiments, generating one or more other movement instructions in a tote plan in an instance in which the closest perpendicular peer smart rack has state information that is set to occupied further comprises: determining whether at least one peer smart rack has state information set to open; and causing a rectangular prism in the closest perpendicular peer smart rack to be moved to a peer smart rack of the at least one peer smart rack that has state information set to open.

In some embodiments, generating one or more other movement instructions in a tote plan in an instance in which the closest perpendicular peer smart rack has state information that is set to occupied further comprises: determining whether at least one peer smart rack at a distance n has state information set to open; and determining one or more movements to position at least one peer smart rack at a distance n has state information set to open closer to the current smart rack.

In accordance with various embodiments of the present disclosure, a computer-implemented method is provided. In some embodiments, the computer-implemented method comprises identifying a data graph matrix representation of a modular superstructure comprising a plurality of smart racks, the data graph matrix representation comprising a plurality of nodes representing the plurality of smart racks and a plurality of edges that each connect nodes representing peers of the plurality of smart racks; receiving at least one tote query, the at least one tote query representing a request to relocate at least one tote via the modular superstructure from at least one tote starting position to at least one tote ending position; computing, utilizing a sliding A* algorithm and the data graph matrix, at least one tote movement path to relocate the at least one tote, wherein the at least one tote movement path represents a set of rack operations for relocating the at least one tote in accordance with the at least one tote query; generating a tote plan based at least in part on the at least one tote movement path; and outputting the tote plan.

In some embodiments, the at least one tote comprises a first tote associated with a current position corresponding to a current node of the plurality of nodes and that begins movement from a first tote starting position corresponding to a first node of the plurality of nodes. In some embodiments, computing the at least one tote movement path to relocate the at least one tote comprises: while the current position is determined to not equivalent to any of the at least one tote ending position: executing a first A* pathfinder algorithm to compute a lowest resistance peer node associated with the current node, wherein the lowest resistance peer node comprises a second node of the plurality of nodes that is (1) connected to the current node by at least a first edge of the plurality of edges, and (2) determined to be along a lowest resistance tote movement path from the current position to any of the at least one ending position; determining the lowest resistance peer node is empty; and generating data representing a swap of the first tote to an updated position corresponding to the lowest resistance peer node.

In some embodiments, the at least one tote comprises a first tote associated with a current position corresponding to a current node of the plurality of nodes and that begins movement from a first tote starting position corresponding to a first node of the plurality of nodes. In some embodiments, computing the at least one tote movement path to relocate the at least one tote comprises: while the current position is determined to not equivalent to any of the at least one tote ending position: executing a first A* pathfinder algorithm to compute a lowest resistance peer node associated with the current node, wherein the lowest resistance peer node comprises a second node of the plurality of nodes that is (1) connected to the current node by at least a first edge of the plurality of edges, and (2) determined to be along a lowest resistance tote movement path from the current position to any of the at least one ending position; determining the lowest resistance peer node is filled; executing a second A* pathfinder algorithm to identify a closest empty node connected to the lowest resistance peer node and a second tote movement path that clears the lowest resistance peer node using the second tote movement path; and generating data representing a swap of the first tote to an updated position corresponding to the lowest resistance peer node after clearing the lowest resistance peer node.

In some embodiments, generating the tote plan based at least in part on the at least one tote movement path comprises: configuring the tote plan to serially execute each tote movement plan of the at least one tote movement path.

In some embodiments, the computer-implemented method further comprises initializing the data graph matrix representation of the modular superstructure based at least in part on a matrix manifest that defines a location of each smart rack of the plurality of smart racks, and movement resistance data associated with each smart rack of the plurality of smart racks.

In some embodiments, the computer-implemented method further comprises initializing each particular node of the plurality of nodes by setting, for each particular node, a peer information set comprising peer information associated with each peer node connected to the particular node by at least one edge of the plurality of edges. In some embodiments, the peer information associated with a particular peer node comprises: state data associated with the particular peer node; and/or behavior data associated with the particular peer node.

In some embodiments, identifying the graph matrix representation of the modular superstructure comprises: reading configuration data comprising first configuration data representing a structure of the modular superstructure and second configuration data representing a set of current tote positions for at set of totes stored via the modular superstructure; generating the plurality of nodes and the plurality of edges of the data graph matrix based at least in part on the first data; and configuring at least one data property for at least a portion of the plurality of nodes based at least in part on the second data.

In some embodiments, each node of the plurality of nodes comprises behavior data. In some embodiments, the behavior data for a particular node is used to derive at least one resistance value associated with the particular node.

In some embodiments, the at least one tote query comprises order indication data indicating whether an order of the relocation of the at least one tote via the modular superstructure is defined.

In some embodiments, the at least one tote query comprises a first tote query. In some embodiments, the first tote query comprises: first data indicating a request to relocate a first tote from a first tote starting position to a first tote ending position; second data indicating a request to relocate a first set of totes from a first set of tote starting positions to a first set of tote ending positions; or third data indicating a request to relocate the first tote from the first tote starting position to the first set of tote ending positions.

In some embodiments, at least a first node of the plurality of nodes comprises a time movement value set comprising a time movement value for each direction in which a particular smart rack associated with the first node is capable of moving a particular tote.

In some embodiments, each node of the plurality of nodes comprises current state data. In some embodiments, the current state data for a particular node is configurable between an empty state in a circumstance where a particular smart rack corresponding to the particular node is empty and an occupied state in a circumstance where the particular smart rack is occupied by a particular tote. In some embodiments, the sliding A* algorithm processes at least one data value that is based at least in part on the current state data associated with the particular node.

In some embodiments, each node of the plurality of nodes comprises behavior data that is configurable between at least first behavior, a second behavior, and a second behavior. In some embodiments, the first behavior indicates a particular node is inaccessible. In some embodiments, the second behavior indicates the particular node corresponds to a particular smart rack that operates according to a first set of resistance values. In some embodiments, the third behavior indicates the particular node corresponds to a particular smart rack that operates according to a second set of resistance values. In some embodiments, the second set of resistance values comprises at least a first resistance value associated with a first relocation operation that is preferable to a second resistance value associated with the first relocation operation in the second set of resistance values.

In some embodiments, the data graph matrix represents the modular superstructure and at least one hole associated with the modular superstructure.

In some embodiments, the at least one tote ending position represents an egress position external from the plurality of smart racks.

In accordance with various embodiments of the present disclosure, a method for generating a digital twin of a smart rack superstructure is provided. In some embodiments, the method comprises: accessing a configuration file and a smart rack matrix having peer information; accessing a tote plan having one or more movement instructions for moving rectangular prisms from a start location in a smart rack to an egress point; generating the digital twin based on the configuration file, the smart rack matrix having peer information, and one or more rendering instructions; and causing the tote plan to be executed on the digital twin.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIGS. 27a-27d illustrate an example smart rack matrix with smart racks labeled according to their state information.

FIGS. 28a-28d illustrate an example smart rack matrix with smart racks labeled according to their state information.

DETAILED DESCRIPTION OF THE INVENTION

Figure 1:
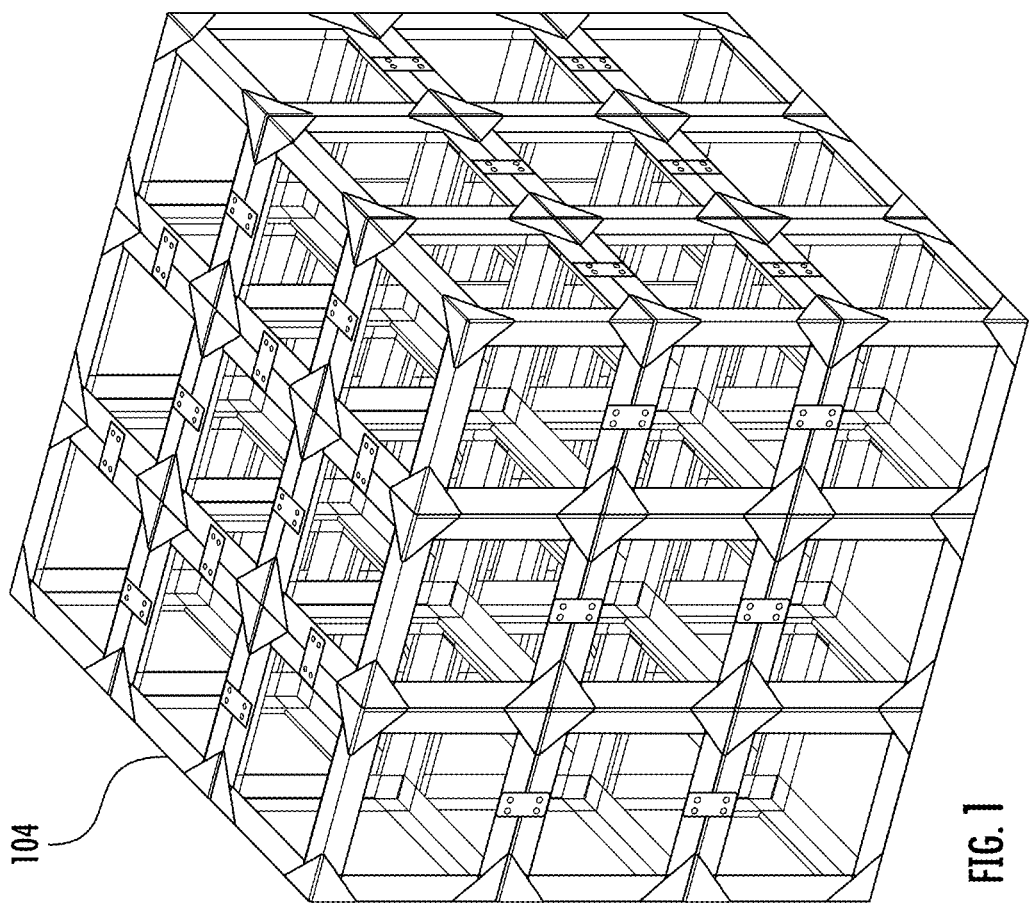
FIG. 1 is an example system architecture diagram illustrating an example environment for movement of rectangular prisms in a modular superstructure in accordance with some embodiments of the present disclosure.
Figure 1:

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "back," "top," "bottom," "left," "right," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

The term "rectangular prism" refers to a container of any geometry, preferably rectangular, that is configured to hold or otherwise retain goods, items, stock keeping units, or the like. In some examples, a rectangular prism may be any type of container used, such as a carton, a case, a tote, a divided tote, a tray, a pallet, or the like. In some embodiments, an example rectangular prism may comprise material such as plastic, silicone, and/or the like.

The term "target rectangular prism" refers to a current, selected, or otherwise identified rectangular prism that is to be moved. For example, a "target rectangular prism" may be identified as the rectangular prism that is to be moved forward, back, left, right, up, or down.

The term "tote plan" refers to one or more instructions that cause the movement of one or more rectangular prisms. In some examples, the tote plan may include a movement instruction to a first smart rack (or its related processing circuitry) to move a rectangular prism to a second smart rack. Alternatively, or additionally, the tote plan may provide movement instructions that cause one or more smart racks to move a rectangular prism, such as a target rectangular prism, to an egress point. In some examples, the tote plan may be the result of one or more algorithms discussed herein and may take the form of a text file, a JSON file, or the like.

The term "smart rack" refers to a component of the modular superstructure that is configured to store a rectangular prism and/or to cause the movement of the rectangular prisms within the modular superstructure. In some embodiments, an example smart rack provides a modular square or rectangle rack that provides structure, power, control, and/or mechanical movements of one or more rectangular prisms. For example, an example smart rack comprises an example rack frame and a plurality of rack actuators, details of which are described herein.

The term "peer smart rack" of a smart rack is defined as another smart rack that is secured to, in physical connection with, or is otherwise linked to the smart rack. In some embodiments, a processing circuitry of a smart rack may provide direct data communications with peer processing circuitries of peer smart racks through dedicated communication channels (for example, input/output (I/O) channels), details of which are described herein.

The term "behavior data" refers to electronically managed data that represents a state of functionality and/or performable operations of a particular smart rack of a modular superstructure.

The term "best peer rack" refers to a second smart rack connected to a first smart rack that is along a path determined to be associated with minimal cost based on one or more data value(s) associated with said cost.

The term "configuration data" refers to any data that represents the physical structure of a modular superstructure, data property/properties of one or more smart racks or other subunits of the modular superstructure, and/or state(s) of one or more smart racks or other subunits of the modular superstructure.

The term "current tote positions" refers to electronically managed data representing the current smart rack or location of a particular tote in a modular superstructure.

The term "data graph matrix" refers to a directed or undirected graph representation of smart racks in a modular superstructure. In some embodiments, a data graph matrix includes at least a node for each active smart rack in the modular superstructure, with peer smart racks connected via edges.

The term "lowest resistance peer node" refers to a node connected to a particular node that is along a path determined to be associated with a lowest movement resistance value. A lowest resistance peer node corresponds to a best peer rack.

The term "lowest resistance value path" refers to a path traversing through one or more nodes in a graph that is determined to result in the lowest total movement resistance value to traverse from a first, start node to a second, end node.

The term "movement plan" refers to data representing instructions for moving totes in a modular superstructure. In some embodiments, the movement plan includes or is embodied by a tote plan.

The term "movement resistance value" refers to any determinable data value that represents a cost for moving a tote in a particular direction via a smart rack. In some embodiments, a movement resistance value for a particular movement is dependent on an assisting and/or resisting force associated with such a movement (e.g., gravity decreasing a movement resistance value for a downward motion, and/or increasing a movement resistance value for an upwards motion).

The term "peer information" refers to data representing an indication of a second node or second smart rack connected to a first node and/or first smart rack, and/or a movement resistance value associated with traversing from the first node to the second node and/or moving a tote from the first smart rack to the second smart rack.

The term "peer node" refers to a node connected by an edge to another node in a graph representation. In some embodiments, peer smart racks are represented as peer nodes within a graph representation, for example a data graph matrix representing a modular superstructure. In some embodiments, a first node is associated with a peer node that is associated with an aspect of a modular superstructure other than a smart rack, including and without limitation a node representing a hole, an egress point, and/or other moveable area in the configuration of the modular superstructure connected to a particular smart rack corresponding to the first node.

The term "queried tote" refers to a particular tote identifier for which a tote query was received. A queried tote is to be repositioned from its tote starting position to at least one tote ending position.

The term "rack operation" refers to any action, process, or operation that is performable by a smart rack. In some embodiments, a rack operation is performable/can be performed using one or more actuators, plates, or other hardware of the smart rack for engaging and/or otherwise interacting with a tote.

The term "sliding A* algorithm" refers to an algorithm that utilizes one or more executed A* pathfinder algorithms to route totes along a particular path in a modular superstructure and alter locations of totes obstructing one or more smart racks in the particular path.

The term "smart rack manifest" refers to electronically managed data associated with the physical structure of a modular superstructure, configuration of smart racks in the modular superstructure, states, and/or behaviors of smart racks in the modular superstructure.

The term "smart rack matrix" refers to electronically managed data that represents a physical structure of a modular superstructure.

The term "status data" refers to data associated with a particular smart rack that indicates whether the smart rack is occupied/filled or unoccupied/empty.

The term "target end position" refers to a location identifier where a tote is authorized to move. Non-limiting representations of a target end point include, without limitation, an index, a two-dimensional (X,Y) identifier, a column/row identifier, and a three-dimensional (X,Y,Z) identifier.

The term "total movement resistance value" refers to a total cost associated with a particular path between nodes of a graph. In some embodiments, the total movement resistance value is embodied by the aggregation of movement resistance values for each step in the path.

The term "tote ending position" refers to a target end position for repositioning any number of totes.

The term "tote movement path" refers to a path between nodes of a data graph matrix from a tote starting position to a tote ending position. A tote movement path represents how a tote should be repositioned via smart racks corresponding to the nodes in the tote movement path.

The term "tote query" refers to data indicating a request to relocate a tote from a particular smart rack.

The term "tote starting position" refers to a location identifier from which a tote is beginning movement.

The term "tote" refers to any rectangular prism or other physical object that is capable of being manipulated by a smart rack in one or more directions. In some embodiments, the term "tote" and the term "rectangular prism" can be used interchangeably.

Current storage and retrieval systems rely on complex and individually designed superstructures for storage of one or more rectangular prisms within a factory or a warehouse. In some examples, the construction of the superstructure is time consuming given the design time and construction time. In addition, the superstructure requires significant empty space around it and/or within it for robots, shuttles, elevators, conveyors, and/or the like to be able to operate. For example, in one such system, a multi-dimensional superstructure is designed to house or otherwise store columns of rectangular prisms that are retrieved by robots operating along the top of the superstructure. In operation, each of the robots dig or otherwise retrieve a particular rectangular prism from the structure, transport it to an egress point, such as an elevator, and then discharge it to a conveyor or other transport system for movement to another location, such as a picking station.

Storage and retrieval systems may utilize various material handling products such as various shuttles, carriages, carts, lifts, conveyors, and/or the like to facilitate the transportation of rectangular prisms from a position within the superstructure to an egress point where the rectangular prism is then able to be delivered to a desired delivery location within a factory or a warehouse. For example, automated shuttles may be used to transport rectangular prisms to and/or from various storage locations within the superstructure. To retrieve a stored rectangular prism from a location within a storage and retrieval system, automated shuttles may be transported to the storage location, where automated shuttles are often configured to utilize various electronically-driven components disposed on the shuttle to physically retrieve the stored rectangular prism from within the storage location. For example, to extract an object from a storage location, shuttles in storage and retrieval system may use electronically-driven motors to deploy various electronically-actuated retention elements (e.g., hooks, fingers, and/or the like) connected to an extendable load arm that is extended from the shuttle into the storage location such that the electrical retention elements disposed about a distal end of the load arm may interface the stored rectangular prism. Automated shuttles that operate using such motor-driven control systems or electronic retrieval components exhibit extremely high manufacturing costs and are often plagued by an increased amount of part and/or system failures resulting from the configuration of such electronic and/or motor-driven instruments on inherently dynamic parts of an automated shuttle, such as, for example, along a load arm. Alternatively, or additionally, automated shuttles require space in and around a superstructure to be able to move around and accomplish the task of retrieving a rectangular prism.

Various embodiments described herein disclose a smart rack apparatus that is capable of being bolted to, joined with, or otherwise linked to one or more peer smart racks for the purpose of creating a modular superstructure that is configured to allow for the ingress, storage, and/or egress of one or more rectangular prisms. In some examples, smart racks within the modular superstructure are configured to move or otherwise urge rectangular prisms through the modular superstructure without reliance on automated shuttles. Instead, the one or more smart rack disclosed herein may comprise rack actuators that are mechanically actuatable (e.g. motors and arms) and controllable (e.g. such as by a processing circuitry) to move or otherwise urge a rectangular prism to a peer smart rack. As a result, the systems, apparatus, and methods described herein are able to more effectively use space while allowing for increased speed of ingress and egress given the ability of rectangular prisms to traverse the modular superstructure more directly as compared to alternative solutions. Moreover, in some examples, each smart rack is individually powered and controllable so as to allow the smart racks to work together (e.g., like a swarm) to enable the rectangular prisms to traverse the modular superstructure.

In some examples, the smart rack apparatus is configured with one or more arms and one or more motors. In some examples, the one or more motors are configured to actuate the one or more arms to lift, urge, or otherwise direct a rectangular prism up, down, left, right, forward, or back. In some examples, one or more of the arms may move simultaneously. Alternatively, or additionally, the one or more arms and the one or more motors may operate to receive a rectangular prism from a peer tote and urge it into a static or resting position within the smart rack.

In some examples, each smart rack within the modular superstructure may be defined by a series of coordinates (also referred to a "rack coordination set") in a defined coordinate system, such as an x, y, z coordinate system. In such examples, a first smart rack may be defined as 0, 0, 0 and each of the one or more additional smart racks may be defined with respect to the 0, 0, 0 smart rack. In such a way, each smart rack has an address for the purposes of control, messaging, power, location, and/or the like. Alternatively, or additionally, the address may be dynamic and, thus, may be changed as the modular superstructure is changed, modified, or the like.

In some examples, each smart rack may house or otherwise be linked to processing circuitry. In some examples, the processing circuitry is configured to process and/or route messages and/or control the one or more arms and/or the one or more motors. In some examples, a smart rack may receive a first message, such as via the processing circuitry. If not directed to the smart rack, based on the x, y, z addressing scheme, the message may be routed to a closest peer. If, instead, the message is indeed directed to the smart rack, the processing circuitry is configured to analyze, store, and/or process the message. In some examples, the message may cause the processing circuitry to activate the one or more motors, which in turn activate the one or more arms, to move a rectangular prism. In some examples, the processing circuitry may communicate with peer smart racks to confirm that a peer smart rack is prepared to receive a rectangular prism. Advantageously, such a communication and control pathway provides a low power, low cost, and/or scalable architecture that allows for communication with each of the smart racks, even a smart rack in the middle of the superstructure.

In some examples, each smart rack may be configured with power, such as with one or more, preferably three or more, smart rack switch circuits. In some examples, each of the smart rack switch circuits are connected to one or more, preferably two or more, peer smart racks. In some examples, the smart rack switch circuits are configured to provide a power path within the modular superstructure. Alternatively, or additionally, the power path may be an on-demand power path that is established during a period when a smart rack is to actuate its motors to move a rectangular prism and is disabled when the move is complete. Advantageously, in some examples, such an on demand power path may reduce overall power usage and may allow for a larger modular superstructure.

In some examples and in operation, a superstructure controller is configured to manage the movements of the one or more rectangular prisms within the superstructure. In some examples, the superstructure controller is configured to receive or otherwise determine the location of one or more rectangular prisms within a modular infrastructure. In some examples, the superstructure controller may receive, access, or otherwise determine a rectangular prism, such as a target rectangular prism, and an egress point for that rectangular prism. In response, the superstructure controller may determine a tote plan that provides instructions to one or more smart racks to move the rectangular prism in such a way that it traverses the modular superstructure from its current location to its egress point.

In some examples, an emulation or simulation may be created by the superstructure controller based on the tote plan. In such cases, the emulation or simulation may be run in advance of the tote plan being executed in the physical modular infrastructure or it may be run simultaneously with the tote plan being executed in the physical modular infrastructure (e.g., a digital twin). In some examples and when the emulation or simulation is run in advance of the tote plan being executed in the physical modular infrastructure, certain metrics and/or timings may be calculated (e.g., time from current location to egress). In some examples when the emulation or simulation is run simultaneously with the tote plan being executed in the physical modular infrastructure, the emulation or simulation may operate as a digital twin and allow a user to view operations in the emulator or simulator that mimic or otherwise represent operations that are occurring in the physical world. In some examples, the emulation or simulation may include details from the physical world so as to provide a realistic view of the modular superstructure. In some examples, the simulator or emulator may be viewable via the Internet, such as via HTML 5.

As such, various embodiments of the present disclosure may provide technical advantages and improvements such as, but not limited to, reducing the space needed for transporting rectangular prisms to, from, and within the modular superstructure and improving the speed of transporting the rectangular prisms, details of which are described herein.

FIG. 1 illustrates at least a portion of an example modular superstructure 104 that is controlled by one or more superstructure controllers 102 in accordance with some example embodiments described herein.

As described above, the modular superstructure 104 is configured to allow for the ingress, store, and egress of one or more rectangular prisms. To achieve such functions, the example modular superstructure 104 comprises a plurality of smart racks that are configured to urge and/or otherwise move rectangular prisms through the modular superstructure 104.

In some examples, the superstructure controller 102 may comprise a controller device (such as, but not limited to, a desktop computer, a laptop computer, and/or the like). In some example embodiments, the superstructure controller may be configured to manage the movements of the one or more rectangular prisms within the superstructure. For example, the superstructure controller 102 is configured to receive or otherwise determine the location of one or more rectangular prisms within a modular infrastructure. In some examples, the superstructure controller 102 may receive, access, or otherwise determine a rectangular prism, such as a target rectangular prism, and an egress point for that rectangular prism. In response, the superstructure controller may determine, input, or otherwise execute a tote plan that provides instructions to one or more smart racks to move the rectangular prism in such a way that it traverses the modular superstructure from its current location to its egress point.

In some examples, the superstructure controller 102 may transmit the tote plan to one or more processing circuitries of the one or more smart racks in the modular superstructure. In some embodiments, the tote plan may comprise one or more movement instructions for one or more smart racks. In some embodiments, each of the one or more movement instructions may indicate a movement of a rectangular prism. In some embodiments, to execute these movement instructions, the one or more smart racks may transmit one or more movement messages to one another, and may cause one or more arms of one or more rack actuators to move the rectangular prism, details of which are described herein.

Some embodiments utilize various particular algorithms to reduce or minimize one or more costs associated with movement of totes via a modular superstructure (e.g., time, power consumption, resources, and/or the like). Some embodiments utilize a sliding A* algorithm that generates a tote movement path corresponding to an efficient set of movements for relocating a particular tote from a particular tote starting position to a particular tote ending position with reduced or minimized total movement resistance value to accomplish said movements. By leveraging various underlying executed A* pathing, the sliding A* algorithm determines an efficient path for relocating a tote for which a tote query was received, as well as determining how to efficiently relocate other totes currently blocking an identified path for the queried tote. In this regard, the sliding A* algorithm advantageously is usable to identify instructions for operating a modular superstructure for efficiently repositioning the totes therein as tote queries are received, and in some embodiments to facilitate such operations via the modular superstructure.

Figure 2A:
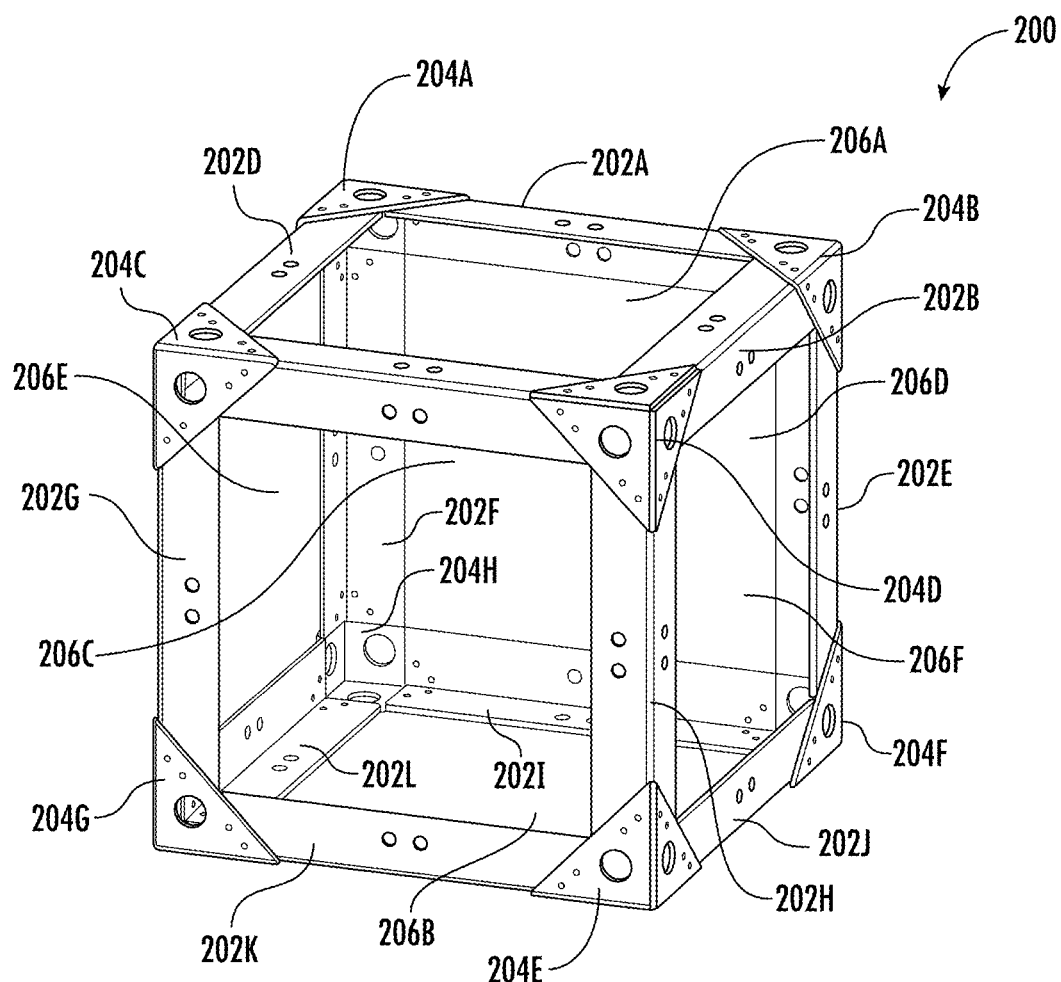
FIG. 2A is an example perspective view of an example rack frame of an example smart rack that is a part of a modular superstructure in accordance with some embodiments of the present disclosure.

Referring now to FIG. 2A, an example rack frame 200 in accordance with some embodiments of the present disclosure is illustrated. In some embodiments, the example rack frame 200 is a part of an example smart rack that can be used in a modular superstructure in accordance with some embodiments of the present disclosure.

In the example shown in FIG. 2A, the example rack frame 200 comprises a plurality of rack beams and a plurality of rack corners. In some embodiments, the plurality of rack beams and the plurality of rack corners of the example rack frame 200 may define a three-dimensional shape that is similar to a cuboid shape or a cube shape.

For example, the example rack frame 200 may comprise a rack beam 202A, a rack beam 202B, a rack beam 202C, a rack beam 202D, a rack beam 202E, a rack beam 202F, a rack beam 202G, a rack beam 202H, a rack beam 202I, a rack beam 202J, a rack beam 202K, and a rack beam 202L. In some embodiments, each rack beam defines an edge of the example rack frame 200, and the plurality of rack beams define a plurality of openings through which one or more rectangular prisms may be transported.

For example, the rack beam 202A and the rack beam 202C are positioned in a parallel arrangement with one another, and the rack beam 202B and the rack beam 202D are positioned in a parallel arrangement with one another. In some embodiments, each of the rack beam 202A and the rack beam 202C are positioned in a perpendicular or an orthogonal arrangement with both the rack beam 202D and the rack beam 202B, such that the rack beam 202A, the rack beam 202B, the rack beam 202C, and the rack beam 202D define a plane and/or a top opening 206A. In some embodiments, the one or more rectangular prisms may be transported from within the rack frame 200 through the top opening 206A (for example, to a top peer smart rack that is secured on top of the rack frame 200) by one or more rack actuators, details of which are described herein.

As another example, the rack beam 202I and the rack beam 202K are positioned in a parallel arrangement with one another, and the rack beam 202L and the rack beam 202J are positioned in a parallel arrangement with one another. In some embodiments, each of the rack beam 202I and the rack beam 202K are positioned in a perpendicular or an orthogonal arrangement with both the rack beam 202J and the rack beam 202L, such that the rack beam 202I, the rack beam 202L, the rack beam 202K, and the rack beam 202J define a plane and/or a bottom opening 206B. In some embodiments, the one or more rectangular prisms may be transported from within the rack frame 200 through the bottom opening 206B (for example, to a bottom peer smart rack that is secured under the rack frame 200) by one or more rack actuators, details of which are described herein.

As another example, the rack beam 202C and the rack beam 202K are positioned in a parallel arrangement with one another, and the rack beam 202G and the rack beam 202H are positioned in a parallel arrangement with one another. In some embodiments, each of the rack beam 202C and the rack beam 202K are positioned in a perpendicular or an orthogonal arrangement with both the rack beam 202G and the rack beam 202H, such that the rack beam 202C, the rack beam 202G, the rack beam 202K, and the rack beam 202H define a plane and/or a front opening 206C. In some embodiments, the one or more rectangular prisms may be transported from within the rack frame 200 through the front opening 206C (for example, to a front peer smart rack that is secured to the front of the rack frame 200) by one or more rack actuators, details of which are described herein.

As another example, the rack beam 202A and the rack beam 202I are positioned in a parallel arrangement with one another, and the rack beam 202E and the rack beam 202F are positioned in a parallel arrangement with one another. In some embodiments, each of the rack beam 202A and the rack beam 202I are positioned in a perpendicular or an orthogonal arrangement with both the rack beam 202E and the rack beam 202F, such that the rack beam 202A, the rack beam 202F, the rack beam 202I, and the rack beam 202E define a plane and/or a back opening 206D. In some embodiments, the one or more rectangular prisms may be transported from within the rack frame 200 through the back opening 206D (for example, to a back peer smart rack that is secured on the back of the rack frame 200) by one or more rack actuators, details of which are described herein.

As another example, the rack beam 202D and the rack beam 202L are positioned in a parallel arrangement with one another, and the rack beam 202F and the rack beam 202G are positioned in a parallel arrangement with one another. In some embodiments, each of the rack beam 202D and the rack beam 202L are positioned in a perpendicular or an orthogonal arrangement with both the rack beam 202F and the rack beam 202G, such that the rack beam 202D, the rack beam 202G, the rack beam 202L, and the rack beam 202F define a plane and/or a left opening 206E. In some embodiments, the one or more rectangular prisms may be transported from within the rack frame 200 through the left opening 206E (for example, to a left peer smart rack that is secured on the left of the rack frame 200) by one or more rack actuators, details of which are described herein.

As another example, the rack beam 202H and the rack beam 202E are positioned in a parallel arrangement with one another, and the rack beam 202B and the rack beam 202J are positioned in a parallel arrangement with one another. In some embodiments, each of the rack beam 202H and the rack beam 202E are positioned in a perpendicular or an orthogonal arrangement with both the rack beam 202B and the rack beam 202J, such that the rack beam 202H, the rack beam 202B, the rack beam 202E, and the rack beam 202J define a plane and/or a right opening 206F. In some embodiments, the one or more rectangular prisms may be transported from within the rack frame 200 through the right opening 206F (for example, to a right peer smart rack that is secured to the right of the rack frame 200) by one or more rack actuators, details of which are described herein.

In the example shown in FIG. 2A, the example rack frame 200 may comprise a rack corner 204A, a rack corner 204B, a rack corner 204C, a rack corner 204D, a rack corner 204E, a rack corner 204F, a rack corner 204G, and a rack corner 204H. In some embodiments, each rack corner securely connects three rack beams that are in perpendicular arrangements with one another in a three dimensional shape to form a vertex of the example rack frame 200.

For example, the rack corner 204A connects the rack beam 202A, the rack beam 202D, and the rack beam 202F, and secures the positions of the rack beam 202A, the rack beam 202D, and the rack beam 202F relative to one another. In some embodiments, the rack beam 202A, the rack beam 202D, and the rack beam 202F are in perpendicular arrangement with one another in a three dimensional space, such that each of the rack beam 202A, the rack beam 202D, and the rack beam 202F defines an edge of a cuboid shape or a cube shape, and the rack corner 204A defines a left, back, top vertex of the cuboid shape or the cube shape.

As another example, the rack corner 204B connects the rack beam 202A, the rack beam 202B, and the rack beam 202E, and secures the positions of the rack beam 202A, the rack beam 202B, and the rack beam 202E relative to one another. In some embodiments, the rack beam 202A, the rack beam 202B, and the rack beam 202E are in perpendicular arrangement with one another in a three dimensional space, such that the rack beam 202A, the rack beam 202B, and the rack beam 202E define edges of a cuboid shape or a cube shape, and the rack corner 204B defines a right, back, top vertex of the cuboid shape or the cube shape.

As another example, the rack corner 204F connects the rack beam 202I, the rack beam 202J, and the rack beam 202E, and secures the positions of the rack beam 202I, the rack beam 202J, and the rack beam 202E relative to one another. In some embodiments, the rack beam 202I, the rack beam 202J, and the rack beam 202E are in perpendicular arrangement with one another in a three dimensional space, such that each of the rack beam 202I, the rack beam 202J, and the rack beam 202E defines an edge of a cuboid shape or a cube shape, and the rack corner 204F defines a right, back, bottom vertex of the cuboid shape or the cube shape.

As another example, the rack corner 204H connects the rack beam 202I, the rack beam 202L, and the rack beam 202F, and secures the positions of the rack beam 202I, the rack beam 202L, and the rack beam 202F relative to one another. In some embodiments, the rack beam 202I, the rack beam 202L, and the rack beam 202F are in perpendicular arrangement with one another in a three dimensional space, such that each of the rack beam 202I, the rack beam 202L, and the rack beam 202F defines an edge of a cuboid shape or a cube shape, and the rack corner 204H defines a left, back, bottom vertex of the cuboid shape or the cube shape.

As another example, the rack corner 204C connects the rack beam 202D, the rack beam 202G, and the rack beam 202C, and secures the positions of the rack beam 202D, the rack beam 202G, and the rack beam 202C relative to one another. In some embodiments, the rack beam 202D, the rack beam 202G, and the rack beam 202C are in perpendicular arrangement with one another in a three dimensional space, such that each of the rack beam 202D, the rack beam 202G, and the rack beam 202C defines an edge of a cuboid shape or a cube shape, and the rack corner 204C defines a left, front, top vertex of the cuboid shape or the cube shape.

As another example, the rack corner 204D connects the rack beam 202B, the rack beam 202H, and the rack beam 202C, and secures the positions of the rack beam 202B, the rack beam 202H, and the rack beam 202C relative to one another. In some embodiments, the rack beam 202B, the rack beam 202H, and the rack beam 202C are in perpendicular arrangement with one another in a three dimensional space, such that each of the rack beam 202B, the rack beam 202H, and the rack beam 202C defines an edge of a cuboid shape or a cube shape, and the rack corner 204D defines a right, front, top vertex of the cuboid shape or the cube shape.

As another example, the rack corner 204G connects the rack beam 202G, the rack beam 202K, and the rack beam 202L, and secures the positions of the rack beam 202G, the rack beam 202K, and the rack beam 202L relative to one another. In some embodiments, the rack beam 202G, the rack beam 202K, and the rack beam 202L are in perpendicular arrangement with one another in a three dimensional space, such that each of the rack beam 202G, the rack beam 202K, and the rack beam 202L defines an edge of a cuboid shape or a cube shape, and the rack corner 204G defines a left, front, bottom vertex of the cuboid shape or the cube shape.

As another example, the rack corner 204E connects the rack beam 202H, the rack beam 202K, and the rack beam 202J, and secures the positions of the rack beam 202H, the rack beam 202K, and the rack beam 202J relative to one another. In some embodiments, the rack beam 202H, the rack beam 202K, and the rack beam 202J are in perpendicular arrangement with one another in a three dimensional space, such that each of the rack beam 202H, the rack beam 202K, and the rack beam 202J defines an edge of a cuboid shape or a cube shape, and the rack corner 204E defines a right, front, bottom vertex of the cuboid shape or the cube shape.

Figure 2B:
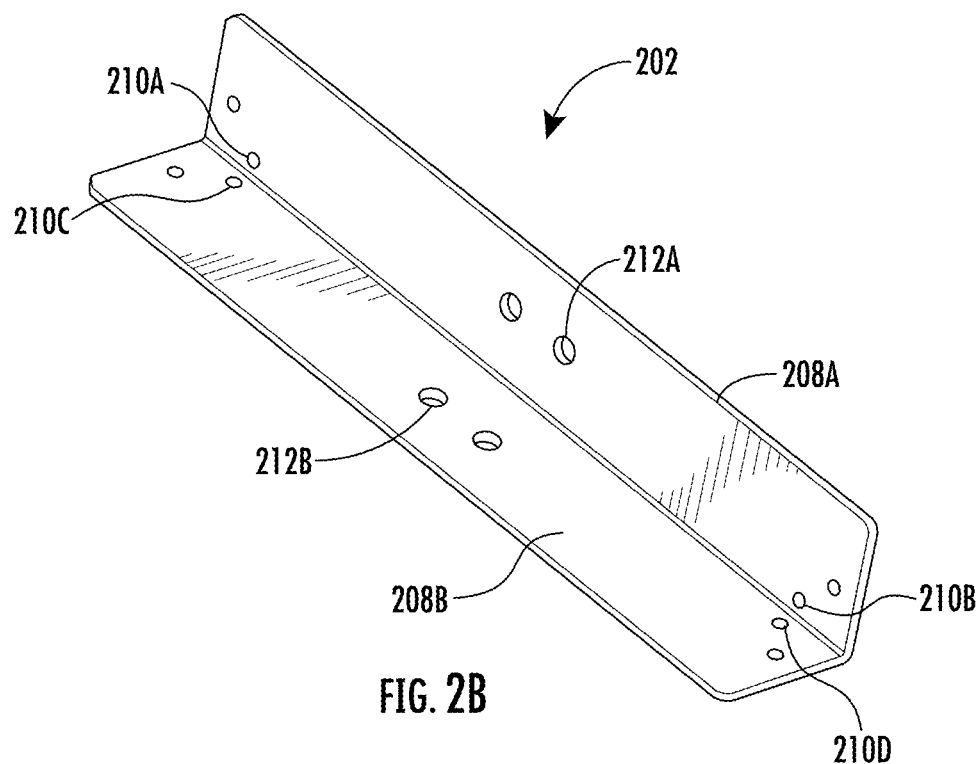
FIG. 2B is an example perspective view of an example rack beam that is a part of an example rack frame in accordance with some embodiments of the present disclosure.

Referring now to FIG. 2B, an example rack beam 202 in accordance with some embodiments of the present disclosure is illustrated.

In the example shown in FIG. 2B, the example rack beam 202 comprises a beam plate 208A and a beam plate 208B. In some embodiments, each of the beam plate 208A and the beam plate 208B may comprise metal material(s) such as, but not limited to, iron, steel, aluminum, and/or the like. In some embodiments, each of the beam plate 208A and the beam plate 208B may have a thickness of ⅛ inches. In some embodiments, one or both of the beam plate 208A and the beam plate 208B may have a thickness that is less than or more than ⅛ inches.

In some embodiments, each of the beam plate 208A and the beam plate 208B is in a shape similar to a rectangular shape. In some embodiments, the beam plate 208A and the beam plate 208B are connected to one another through, for example but not limited to, welding, machine cutouts, and/or the like. For example, an edge of the beam plate 208A may be welded to an edge of the beam plate 208B. Additionally, or alternatively, the beam plate 208A and the beam plate 208B may be cutouts from an edge of a square tubing. Additionally, or alternatively, the beam plate 208A and the beam plate 208B may be connected through other ways.

In some embodiments, the beam plate 208A may be positioned at an angle with respect to the beam plate 208B. For example, a surface of the beam plate 208A may be in a perpendicular arrangement with a surface of the beam plate 208B. Additionally, or alternatively, an angle between the surface of the beam plate 208A and the surface of the beam plate 208B may be less than or more than 90 degrees.

In some embodiments, the example rack beam 202 may be in the form of a ⅛" angle iron. Additionally, or alternatively, the example rack beam 202 may be in other forms.

In the example shown in FIG. 2B, the example rack beam 202 may comprise one or more holes on each of the beam plate 208A and the beam plate 208B, including, but not limited to, one or more middle holes and one or more end holes.

For example, the beam plate 208A may comprise one or more middle holes, including a middle hole 212A that is disposed at or near a middle portion of the beam plate 208A. In some embodiments, a fastener (such as, but not limited to, a screw) may connect the example rack beam 202 to another example rack beam of another rack frame through at least the middle hole 212A, details of which are described herein. Similarly, the beam plate 208B may comprise one or more middle holes, including a middle hole 212B that is disposed at or near a middle portion of the beam plate 208B. In some embodiments, a fastener (such as, but not limited to, a screw) may connect the example rack beam 202 to another example rack beam through the at least the middle hole 212B, details of which are described herein.

As another example, the beam plate 208A may comprise one or more end holes, including a first end hole 210A that is disposed near a first end of the beam plate 208A and a second end hole 210B that is disposed near a second end of the beam plate 208A. In some embodiments, a fastener (such as, but not limited to, a screw) may connect the beam plate 208A to a first rack corner through the at least the first end hole 210A, and may connect the beam plate 208A to a second rack corner through the at least the second end hole 210B, details of which are described herein.

Similarly, the beam plate 208B may comprise one or more end holes, including a first end hole 210C that is disposed near a first end of the beam plate 208B and a second end hole 210D that is disposed near a second end of the beam plate 208B. In some embodiments, a fastener (such as, but not limited to, a screw) may connect the beam plate 208B to the first rack corner through the at least the first end hole 210C, and may connect the beam plate 208B to the second rack corner through the at least the second end hole 210D, details of which are described herein.

Figure 2C:
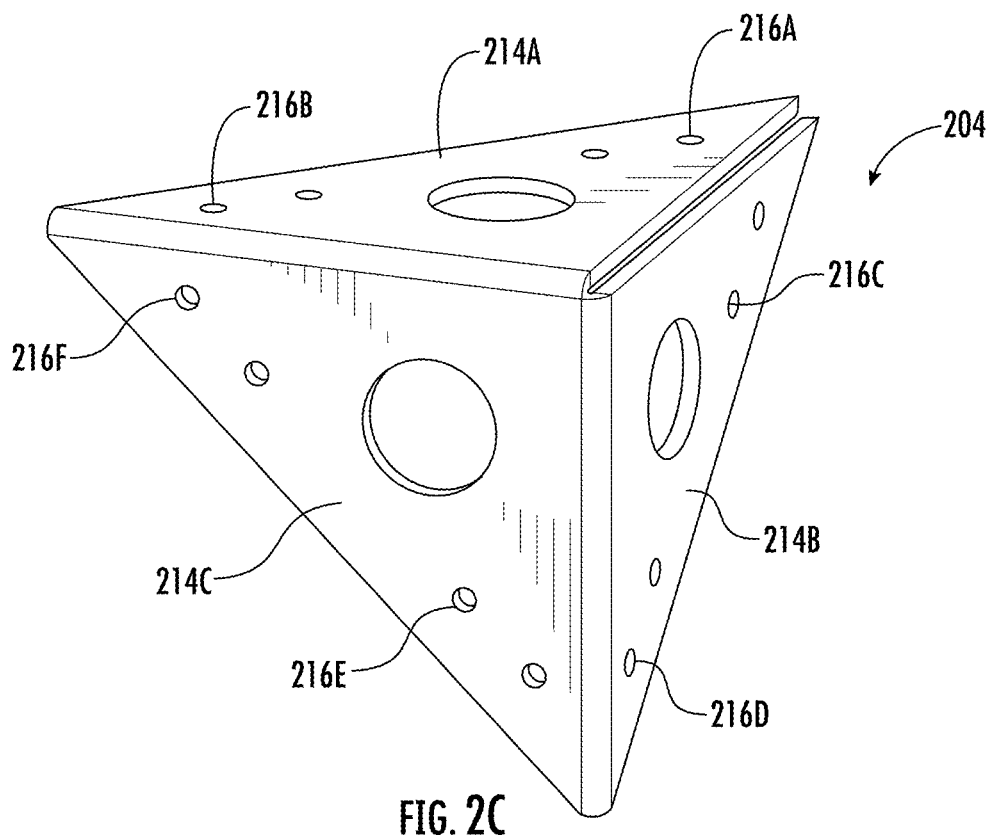
FIG. 2C is an example perspective view of an example rack corner that is a part of an example rack frame in accordance with some embodiments of the present disclosure.

Referring now to FIG. 2C, an example rack corner 204 in accordance with some embodiments of the present disclosure is illustrated.

In the example shown in FIG. 2C, the example rack corner 204 may comprise three corner plates: a corner plate 214A, a corner plate 214B, and a corner plate 214C. In some embodiments, each of the corner plate 214A, the corner plate 214B, and the corner plate 214C may comprise metal material(s) such as, but not limited to, iron, steel, aluminum, and/or the like. In some embodiments, each of the corner plate 214A, the corner plate 214B, and the corner plate 214C may have a thickness of ⅛ inches. In some embodiments, one or more of the corner plate 214A, the corner plate 214B, and the corner plate 214C may have a thickness that is less than or more than ⅛ inches.

In some embodiments, each of the corner plate 214A, the corner plate 214B, and the corner plate 214C may be connected to and positioned at an angle with one another. For example, the corner plate 214A, the corner plate 214B, and the corner plate 214C are connected to one another, for example but not limited to, through welding, from machine cutouts, and/or the like. For example, a first edge of the corner plate 214A may be welded to a first edge of the corner plate 214B, a second edge of the corner plate 214B may be welded to a first edge of the corner plate 214C, and a second edge of the corner plate 214C may be welded to a second edge of the corner plate 214A. Additionally, or alternatively, the corner plate 214A, the corner plate 214B, and the corner plate 214C may be cutouts from a corner of a square tubing. Additionally, or alternatively, the corner plate 214A, the corner plate 214B, and/or the corner plate 214C may be connected through other ways.

In some embodiments, each of the corner plate 214A, the corner plate 214B, and the corner plate 214C is in a shape similar to a triangular shape. For example, each of the corner plate 214A, the corner plate 214B, and the corner plate 214C may be in a shape similar to a right triangle shape (such as, but not limited to, an isosceles right triangle) that comprises a pair of legs at the right angle with one another. Similar to those described above, a first leg of the corner plate 214A is connected to a first leg of the corner plate 214B, a second leg of the corner plate 214B is connected to a first leg of the corner plate 214C, and a second leg of the corner plate 214C is connected to a second leg of the corner plate 214A. In some embodiments, the angle between a surface of the corner plate 214A and a surface of the corner plate 214B, the angle between the surface of the corner plate 214B and a surface of the corner plate 214C, and the angle between the surface of the corner plate 214C and a surface of the corner plate 214A are all 90 degrees. Additionally, or alternatively, the angle between the surface of the corner plate 214A and the surface of the corner plate 214B, the angle between the surface of the corner plate 214B and the surface of the corner plate 214C, and/or the angle between the surface of the corner plate 214C and the surface of the corner plate 214A may be less than or more than 90 degrees.

In the example shown in FIG. 2C, each of the corner plate 214A, the corner plate 214B, and the corner plate 214C may comprise one or more holes for securing the corner plate to one or more rack beams. As described above, each of the corner plate 214A, the corner plate 214B, and the corner plate 214C may be in a shape similar to a right triangle shape (such as, but not limited to, an isosceles right triangle), and the one or more holes may be positioned along a hypotenuse side of the right triangle shape (or the isosceles right triangle shape).

For example, the corner plate 214A may comprise one or more edge holes (such as, but not limited to, the edge hole 216A) that are positioned at one end of the hypotenuse side of the corner plate 214A and one or more edge holes (such as, but not limited to, the edge hole 216B) that are positioned at the other end of the hypotenuse side of the corner plate 214A. Similarly, the corner plate 214B may comprise one or more edge holes (such as, but not limited to, the edge hole 216C) that are positioned at one end of the hypotenuse side of the corner plate 214B and one or more edge holes (such as, but not limited to, the edge hole 216D) that are positioned at the other end of the hypotenuse side of the corner plate 214B. Similarly, the corner plate 214C may comprise one or more edge holes (such as, but not limited to, the edge hole 216F) that are positioned at one end of the hypotenuse side of the corner plate 214C and one or more edge holes (such as, but not limited to, the edge hole 216E) that are positioned at the other end of the hypotenuse side of the corner plate 214C.

In some embodiments, the rack corner 204 is secured to one or more rack beams through fasteners (such as, but not limited to, screws). In such examples, the fasteners connect the edge holes of the rack corner and the end holes of the rack beams to form a rack frame.

For example, as illustrated in FIG. 2C, the edge hole 216B of the corner plate 214A is a mirror image of the edge hole 216F of the corner plate 214C along the edge that connects the corner plate 214A and the corner plate 214C. As illustrated in FIG. 2B, the second end hole 210B of the beam plate 208A is a mirror image of the second end hole 210D of the beam plate 208B along the edge that connects the beam plate 208A and the beam plate 208B. In some embodiments, one or more fasteners may connect the edge hole 216B of the corner plate 214A to the second end hole 210B of the beam plate 208A, so that the beam plate 208A is secured to the corner plate 214A. One or more fasteners may connect the edge hole 216F of the corner plate 214C to the second end hole 210D of the beam plate 208B, so that the beam plate 208B is secured to the corner plate 214C. Because the beam plate 208A is secured to the beam plate 208B, and the corner plate 214C is secured to the corner plate 214A, the rack beam 202 shown in FIG. 2B can be secured to the rack corner 204 shown in FIG. 2C.

As such, a rack beam may be secured to the corner plate 214A and the corner plate 214C. Similarly, a rack beam may be secured to the corner plate 214A and the corner plate 214B, and a rack beam may be secured to the corner plate 214B and the corner plate 214C. Because the corner plate 214A, the corner plate 214B, and the corner plate 214C are in perpendicular arrangements with one another, the three rack beams that are secured to the rack corner 204 are in perpendicular arrangements with one another as well. As such, rack beams may define edges of a cuboid shape or a cube shape, and rack corners may define vertices of the cuboid shape or the cube shape.

Figure 3A:
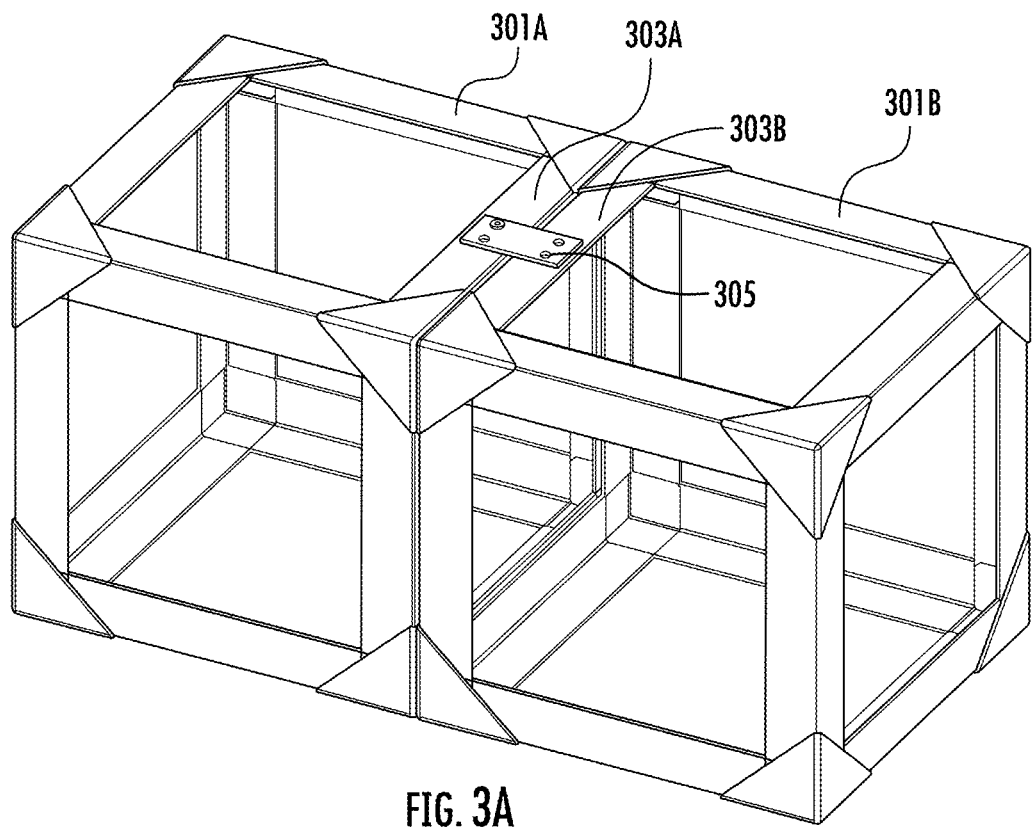
FIG. 3A is an example perspective view of two example rack frames that are connected through an example connector plate in accordance with some embodiments of the present disclosure.
Figure 3B:
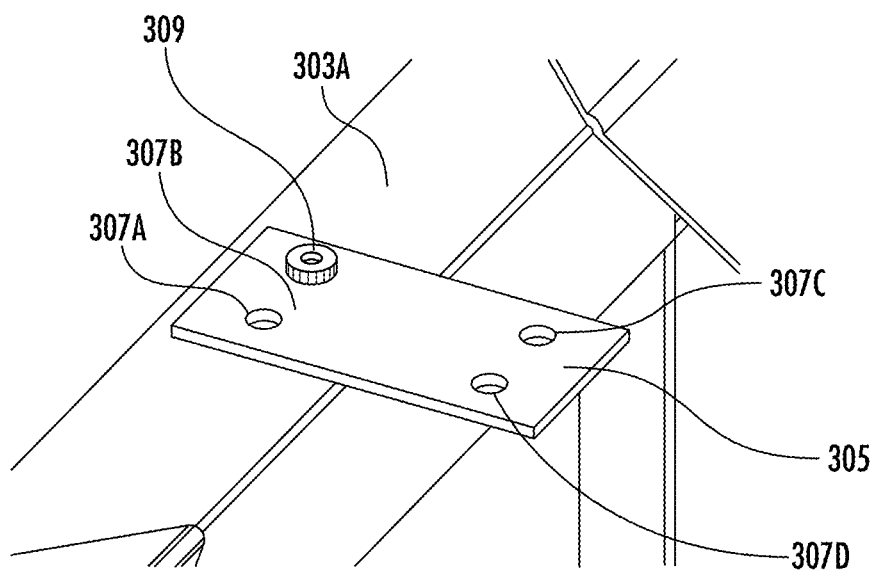
FIG. 3B is an example zoomed view of an example portion of FIG. 3A showing the example connector plate in accordance with some embodiments of the present disclosure.

Referring now to FIG. 3A, an example perspective view of two example rack frames is illustrated. In particular, FIG. 3A illustrates an example of connecting two example rack frames through an example connector plate. FIG. 3B illustrates an example zoomed view of an example portion of the example perspective view shown in FIG. 3A.

In the example shown in FIG. 3A, the rack frame 301A and the rack frame 301B are secured to one another through an example connector plate 305. For example, the rack frame 301A may comprise a rack plate 303A, and the rack frame 301B may comprise a rack plate 303B. In such an example, the rack frame 301A and the rack frame 301B are secured to one another through the example connector plate 305 that is secured to both the rack plate 303A and the rack plate 303B.

In the example shown in FIG. 3B, the connector plate 305 is in a shape similar to a rectangle shape. In some embodiments, the connector plate 305 may comprise metal material(s) such as, but not limited to, iron, steel, aluminum, and/or the like. For example, the connector plate 305 may be in the form of a metal plate.

In some embodiments, a first end of the connector plate 305 may be secured to the rack plate 303A, and a second end of the connector plate 305 may be secured to the rack plate 303B. For example, the example connector plate 305 may comprise one or more connector holes (such as, but not limited to, the connector hole 307A and the connector hole 307B) that are disposed on the first end of the example connector plate 305, and may comprise one or more connector holes (such as, but not limited to, the connector hole 307C and the connector hole 307D) that are disposed on a second end of the example connector plate 305. In some embodiments, each of the connector holes of the connector plate 305 may be positioned to overlap with one of the middle holes of a beam plate of a rack plate, and a fastener (such as, but not limited to, a screw) may be disposed through both the connector hole and the middle hole, so as to secure the connector plate 305 to a rack plate.

For example, the connector hole 307A and the connector hole 307B of the example connector plate 305 are positioned to overlap with the middle holes of the rack plate 303A. A screw 309 may be disposed through both the connector hole 307B and the corresponding middle hole of the rack plate 303A, so as to secure the first end of the connector plate 305 to the rack plate 303A. Similarly, the connector hole 307C and the connector hole 307D of the example connector plate 305 are positioned to overlap with the middle holes of the rack plate 303B. Screws may be disposed through both the connector hole 307C and the corresponding middle hole of the rack plate 303B, so as to secure the second end of the connector plate 305 to the rack plate 303B.

As both the rack plate 303A and the rack plate 303B can be secured to the connector plate 305, the rack frame 301A and the rack frame 301B can be secured relative to one another through the connector plate 305 such that their positions relative to one another do not change.

While the description above provides an example of securing the rack frame 301B to the right of the rack frame 301A (e.g. the rack frame 301B is a right peer smart rack frame of the rack frame 301A), it is noted that the scope of the present disclosure is not limited to the description above. In some examples, another rack frame can be secured to and positioned on the top of the rack frame 301A (e.g. a top peer smart rack frame of the rack frame 301A) through, for example but not limited to, one or more connector plates. Additionally, or alternatively, another rack frame can be secured to and positioned under the rack frame 301A (e.g. a bottom peer smart rack frame of the rack frame 301A) through, for example but not limited to, one or more connector plates. Additionally, or alternatively, another rack frame can be secured to and positioned on the left of the rack frame 301A (e.g. a left peer smart rack frame of the rack frame 301A) through, for example but not limited to, one or more connector plates. Additionally, or alternatively, another rack frame can be secured to and positioned on the front of the rack frame 301A (e.g. a front peer smart rack frame of the rack frame 301A) through, for example but not limited to, one or more connector plates. Additionally, or alternatively, another rack frame can be secured to and positioned on the back of the rack frame 301A (e.g. a back peer smart rack frame of the rack frame 301A) through, for example but not limited to, one or more connector plates.

As described above in connection with at least FIG. 2A, the plurality of rack beams defines a plurality of openings in a three-dimensional space through which one or more rectangular prisms may be transported to and/or from an example rack frame/smart rack. As such, one or more rectangular prisms may be transported from the rack frame 301A to a top peer smart rack frame of the rack frame 301A, and/or transported to the rack frame 301A from the top peer smart rack frame of the rack frame 301A. Additionally, or alternatively, one or more rectangular prisms may be transported from the rack frame 301A to a bottom peer smart rack frame of the rack frame 301A, and/or transported to the rack frame 301A from the bottom peer smart rack frame of the rack frame 301A. Additionally, or alternatively, one or more rectangular prisms may be transported from the rack frame 301A to a left peer smart rack frame of the rack frame 301A, and/or transported to the rack frame 301A from the left peer smart rack frame of the rack frame 301A. Additionally, or alternatively, one or more rectangular prisms may be transported from the rack frame 301A to a right peer smart rack frame of the rack frame 301A, and/or transported to the rack frame 301A from the right peer smart rack frame of the rack frame 301A. Additionally, or alternatively, one or more rectangular prisms may be transported from the rack frame 301A to a front peer smart rack frame of the rack frame 301A, and/or transported to the rack frame 301A from the front peer smart rack frame of the rack frame 301A. Additionally, or alternatively, one or more rectangular prisms may be transported from the rack frame 301A to a back peer smart rack frame of the rack frame 301A, and/or transported to the rack frame 301A from the back peer smart rack frame of the rack frame 301A. Additional details of transporting the one or more rectangular prisms are described herein.

Figure 4A:
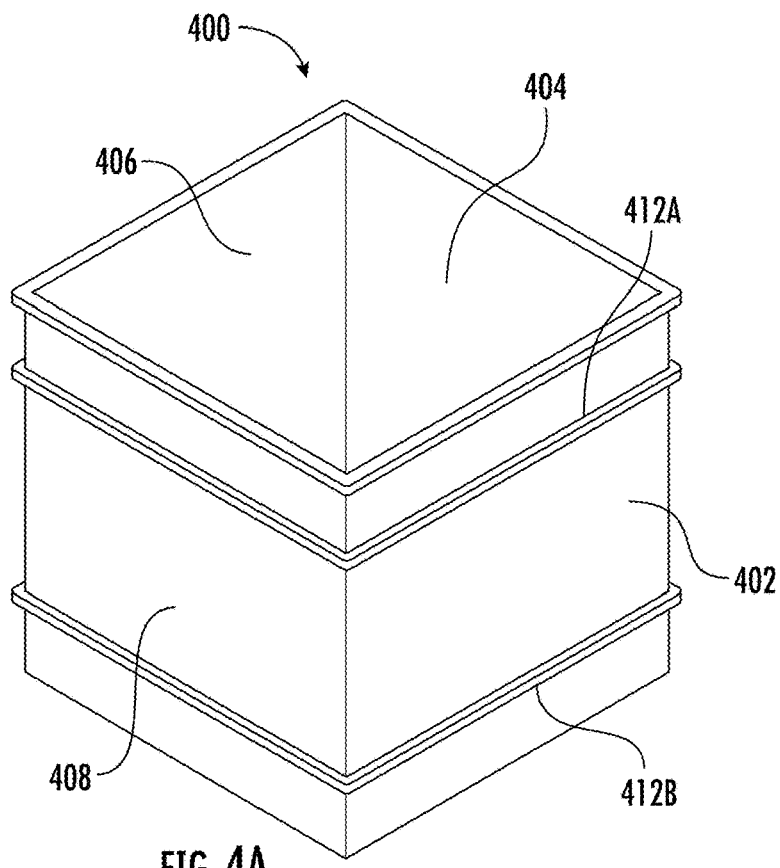
FIG. 4A is an example perspective view of an example rectangular prism in accordance with some embodiments of the present disclosure.
Figure 4B:
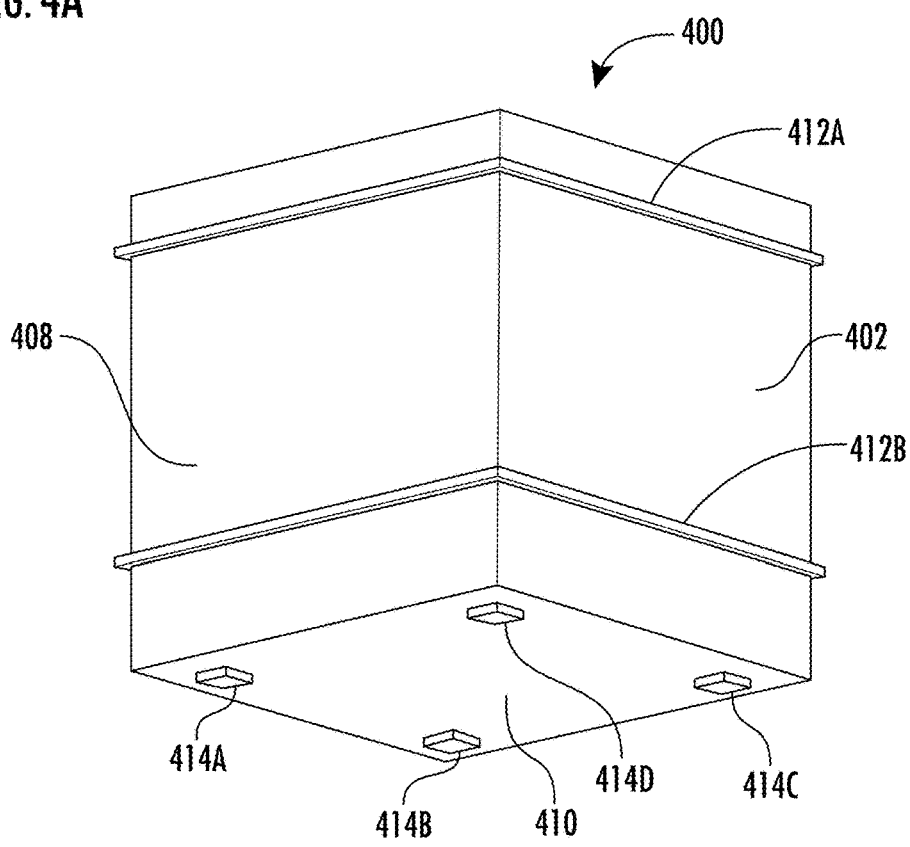
FIG. 4B is another example perspective view of an example rectangular prism in accordance with some embodiments of the present disclosure.

Referring now to FIG. 4A and FIG. 4B, example perspective views of an example rectangular prism 400 in accordance with some embodiments of the present disclosure are illustrated.

In the example shown in FIG. 4A and FIG. 4B, the example rectangular prism 400 may be in the shape that is similar to a hollow rectangular prism shape with the top surface removed. For example, the example rectangular prism 400 may comprise a front lateral wall 408, a back lateral wall 404, a left lateral wall 406, a right lateral wall 402, and a bottom wall 410. In some embodiments, each of the front lateral wall 408, the back lateral wall 404, the left lateral wall 406, the right lateral wall 402, and the bottom wall 410 may be in a shape similar to a thin, flat cuboid shape. In some embodiments, one or more of the front lateral wall 408, the back lateral wall 404, the left lateral wall 406, the right lateral wall 402, and the bottom wall 410 may be in other shape(s).

In some embodiments, the front lateral wall 408 is connected to and in perpendicular arrangements with each of the left lateral wall 406, the right lateral wall 402, and the bottom wall 410. In some embodiments, the right lateral wall 402 is connected to and in perpendicular arrangements with each of the front lateral wall 408, the back lateral wall 404, and the bottom wall 410. In some embodiments, the back lateral wall 404 is connected to and in perpendicular arrangements with each of the left lateral wall 406, the right lateral wall 402, and the bottom wall 410. In some embodiments, the left lateral wall 406 is connected to and in perpendicular arrangements with each of the back lateral wall 404, the front lateral wall 408, and the bottom wall 410.

In some embodiments, the bottom wall 410 is connected to and in a perpendicular arrangement with each of the front lateral wall 408, the back lateral wall 404, the left lateral wall 406, and the right lateral wall 402. For example, the front lateral wall 408 and the back lateral wall 404 may be in a parallel arrangement with one another, and the left lateral wall 406 and the right lateral wall 402 may be in a parallel arrangement with one another, such that the example rectangular prism 400 defines an opening and a space between the front lateral wall 408, the back lateral wall 404, the left lateral wall 406, the right lateral wall 402, and the bottom wall 410. In some embodiments, the opening may be used to receive/retrieve goods, items, stock keeping units, or the like by/from the rectangular prism 400. In some embodiments, the space may be used to store goods, items, stock keeping units, or the like. In some embodiments, the example rectangular prism 400 may be in forms such as, but not limited to, a carton, a case, a tote, a divided tote, a tray, a pallet, or the like.

In some embodiments, the example rectangular prism 400 may comprise one or more ribs and/or protrusions that are disposed on the outer surface of walls of the example rectangular prism 400. In some embodiments, each of the one or more ribs and/or protrusions defines an elevated surface from the outer surface of the walls of the example rectangular prism 400. In some embodiments, the one or more ribs and/or protrusions may allow peer-to-peer engagement and movement of the rectangular prism between the smart racks.

For example, a top rib 412A may be disposed on the outer surface of the front lateral wall 408, the back lateral wall 404, the left lateral wall 406, and the right lateral wall 402. In some embodiments, the top rib 412A may be in a shape that is similar to an elongated cuboid. Additionally, or alternatively, the top rib 412A may be in a shape that is similar to other shape(s). In some embodiments, portions of the top rib 412A that are disposed on the front lateral wall 408, the back lateral wall 404, the left lateral wall 406, and the right lateral wall 402 may be connected to one another. In some embodiments, one or more portions of the top rib 412A that are disposed on the front lateral wall 408, the back lateral wall 404, the left lateral wall 406, and the right lateral wall 402 may not be connected to one another.

As another example, a bottom rib 412B may be disposed on the outer surface of the front lateral wall 408, the back lateral wall 404, the left lateral wall 406, and the right lateral wall 402. In some embodiments, the bottom rib 412B is positioned under the top rib 412A in the vertical direction. Similar to the top rib 412A, the bottom rib 412B may be in a shape that is similar to an elongated cuboid. Additionally, or alternatively, the bottom rib 412B may be in a shape that is similar to other shape(s). In some embodiments, portions of the bottom rib 412B that are disposed on the front lateral wall 408, the back lateral wall 404, the left lateral wall 406, and the right lateral wall 402 may be connected to one another. In some embodiments, one or more portions of the bottom rib 412B that are disposed on the front lateral wall 408, the back lateral wall 404, the left lateral wall 406, and the right lateral wall 402 may not be connected to one another.

In the example shown in FIG. 4B, the outer surface of the bottom wall 410 comprises a plurality of protrusions, such as, but not limited to, a left front bottom protrusion 414A, a left back bottom protrusion 414B, a right back bottom protrusion 414C, and a right front bottom protrusion 414D. In some embodiments, each of the left front bottom protrusion 414A, a left back bottom protrusion 414B, a right back bottom protrusion 414C, and a right front bottom protrusion 414D may be disposed on one of the corners of the outer surface of the bottom wall 410.

For example, the left front bottom protrusion 414A may be disposed on a left front corner of the outer surface of the bottom wall 410 that is connected to the left lateral wall 406 and the front lateral wall 408. As another example, the left back bottom protrusion 414B may be disposed on a left back corner of the outer surface of the bottom wall 410 that is connected to the left lateral wall 406 and the back lateral wall 404. As another example, the right back bottom protrusion 414C may be disposed on a right back corner of the outer surface of the bottom wall 410 that is connected to the right lateral wall 402 and the back lateral wall 404. As another example, the right front bottom protrusion 414D may be disposed on a right front corner of the outer surface of the bottom wall 410 that is connected to the right lateral wall 402 and front lateral wall 408.

While the description above provides an example rectangular prism that comprises a top rib, a bottom rib, and four bottom protrusions, it is noted that the scope of the present disclosure is not limited to the description above.

In some embodiments, the one or more ribs and/or protrusions (including, but not limited to, the top rib 412A, the bottom rib 412B, the left front bottom protrusion 414A, the left back bottom protrusion 414B, the right back bottom protrusion 414C, and/or the right front bottom protrusion 414D) of the rectangular prism 400 may be engaged with the one or more rack actuators of a smart rack. For example, the one or more rack actuators of a smart rack may engage with the one or more ribs and/or protrusions to secure the rectangular prism 400 within the smart rack. Additionally, or alternatively, the one or more rack actuators of the smart rack may engage with the one or more ribs and/or protrusions to cause the rectangular prism 400 to be moved to another smart rack that is adjacent to the smart rack, details of which are described herein.

Figure 5:
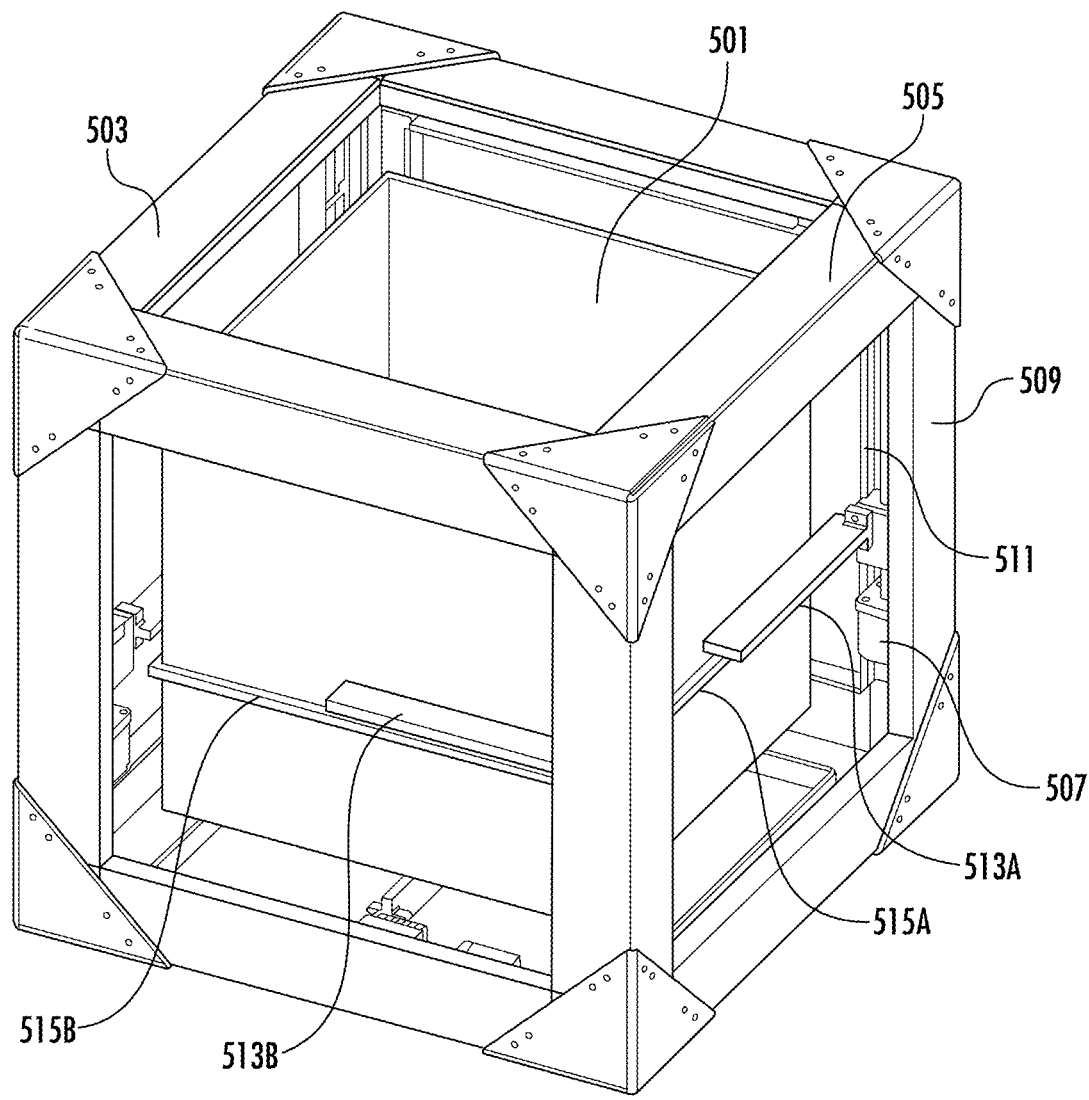
FIG. 5 is an example perspective view of an example rectangular prism positioned within an example smart rack in accordance with some embodiments of the present disclosure.

Referring now to FIG. 5, an example rectangular prism 501 positioned within an example smart rack 503 in accordance with some embodiments of the present disclosure is illustrated.

In particular, the example smart rack 503 may comprise a rack frame 505 that is similar to the example rack frame described above in connection with at least FIG. 2A to FIG. 2C, as well as a plurality of rack actuators that are secured to inner surfaces of the rack frame 505. In some embodiments, the rack frame comprises a plurality of rack plates, and at least one rack actuator is secured to at least an inner surface of at least one of the plurality of rack plates. For example, the example smart rack 503 may comprise a rack actuator 507 that is disposed on an inner surface of the rack beam 509 of the rack frame 505.

In some embodiments, each of the plurality of rack actuators comprises at least an arm that is secured to a slider on a lead screw. For example, each of the plurality of rack actuators may comprise a slider movably disposed on a lead screw, and an arm connected to the slider. In some embodiments, the lead screw may provide outer threads that engage with the inner threads of the slider, such that the slider may move along the lead screw. As the arm is connected to the slider, the arm may move along the lead screw as well.

In some embodiments, the lead screw may be positioned in a parallel arrangement with one of the rack beams. In the example shown in FIG. 5, the lead screw 511 of the rack actuator 507 is positioned in a parallel arrangement with the rack beam 509, and the arm 513A is secured to the slider of the lead screw 511. In some embodiments, the arm 513A is in a perpendicular arrangement with the lead screw 511, such that the arm 513A may extend on a horizontal plane and move in a vertical direction along the lead screw 511.

Similar to those described above in connection with at least FIG. 4A and FIG. 4B, the rectangular prism 501 may comprise one or more ribs on its outer surface, such as, but not limited to, a rib 515A. Similar to those described above in connection with at least FIG. 4A and FIG. 4B, the rib 515A may protrude from an outer surface of the rectangular prism 501. As shown in FIG. 5, the rib 515A may extend on the horizontal plane, and the arm 513A is in a parallel arrangement with the rib 515A.

In various embodiments of the present disclosure, an example arm of an example rack actuator may be in different positions along the lead screw and relative to a rib of the rectangular prism. For example, an example arm/an example rack actuator of an example smart rack may be at a "top position." When the example arm/the example rack actuator is in the top position, the example arm is positioned adjacent to and under the top rib of the rectangular prism. Additionally, or alternatively, an example arm/an example rack actuator of an example smart rack may be at a "bottom position." When the example arm/the example rack actuator is in the bottom position, the example arm is positioned adjacent to and under the bottom rib of the rectangular prism.

In various embodiments of the present disclosure, an example arm/an example rack actuator of an example rack actuator may be configured to operate in different modes relative to a rib of the rectangular prism.

For example, an example arm/an example rack actuator of an example smart rack may be configured to operate in an "engaged mode" relative to the rectangular prism. When the example arm/the example rack actuator is in the engaged mode, the example arm may be positioned to be in contact with the outer surface of the rectangular prism.

Additionally, or alternatively, an example arm/an example rack actuator of an example smart rack may be configured to operate in a "disengaged mode" relative to the rectangular prism. When the example arm/the example rack actuator is in the disengaged mode, the example arm may be positioned not in contact with the outer surface of the rectangular prism.

In the example shown in FIG. 5, the arm 513A is at the bottom position and in an engaged mode. In other words, the arm 513A is positioned adjacent to and under the rib 515A and in contact with the outer surface of the rectangular prism 501. While gravity may pull the rectangular prism 501 in a downwards direction, the arm 513A may provide support to the rectangular prism 501 through engagement with the rib 515A, and may prevent the rectangular prism 501 from falling through the example smart rack 503. Similarly, the arm 513B is at the bottom position and in an engaged mode. In other words, the arm 513B is positioned adjacent to and under the rib 515B and in contact with the outer surface of the rectangular prism 501, so as to provide support to the rectangular prism 501 and prevent the rectangular prism 501 from falling through the example smart rack 503.

As such, various embodiments of the present disclosure may secure one or more rectangular prisms within a smart rack through positioning of arm(s) of rack actuators and engagements between arm(s) of rack actuators and ribs of the one or more rectangular prisms.

Figure 6A:
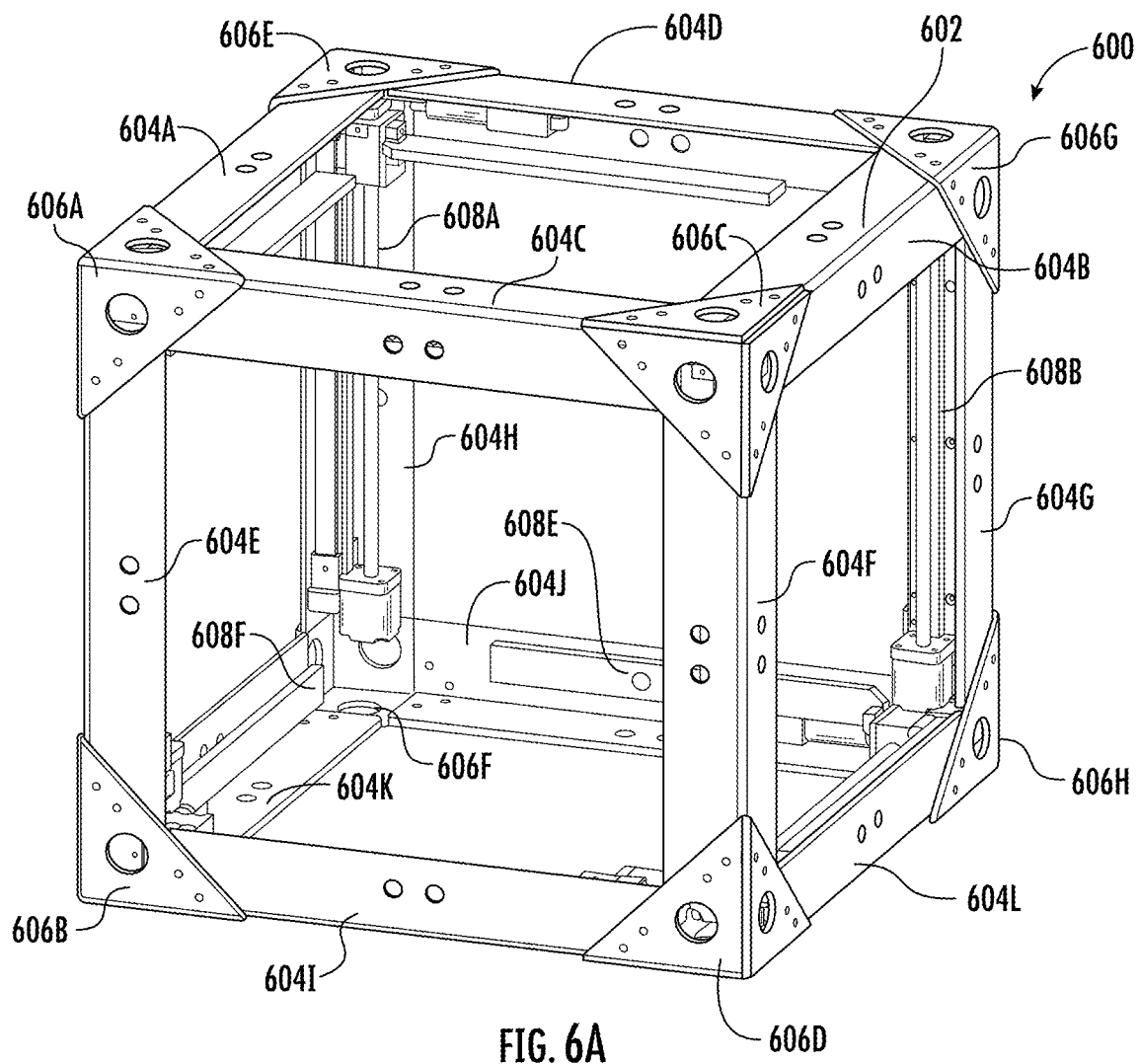
FIG. 6A is an example perspective view of an example smart rack in accordance with some embodiments of the present disclosure.
Figure 6B:
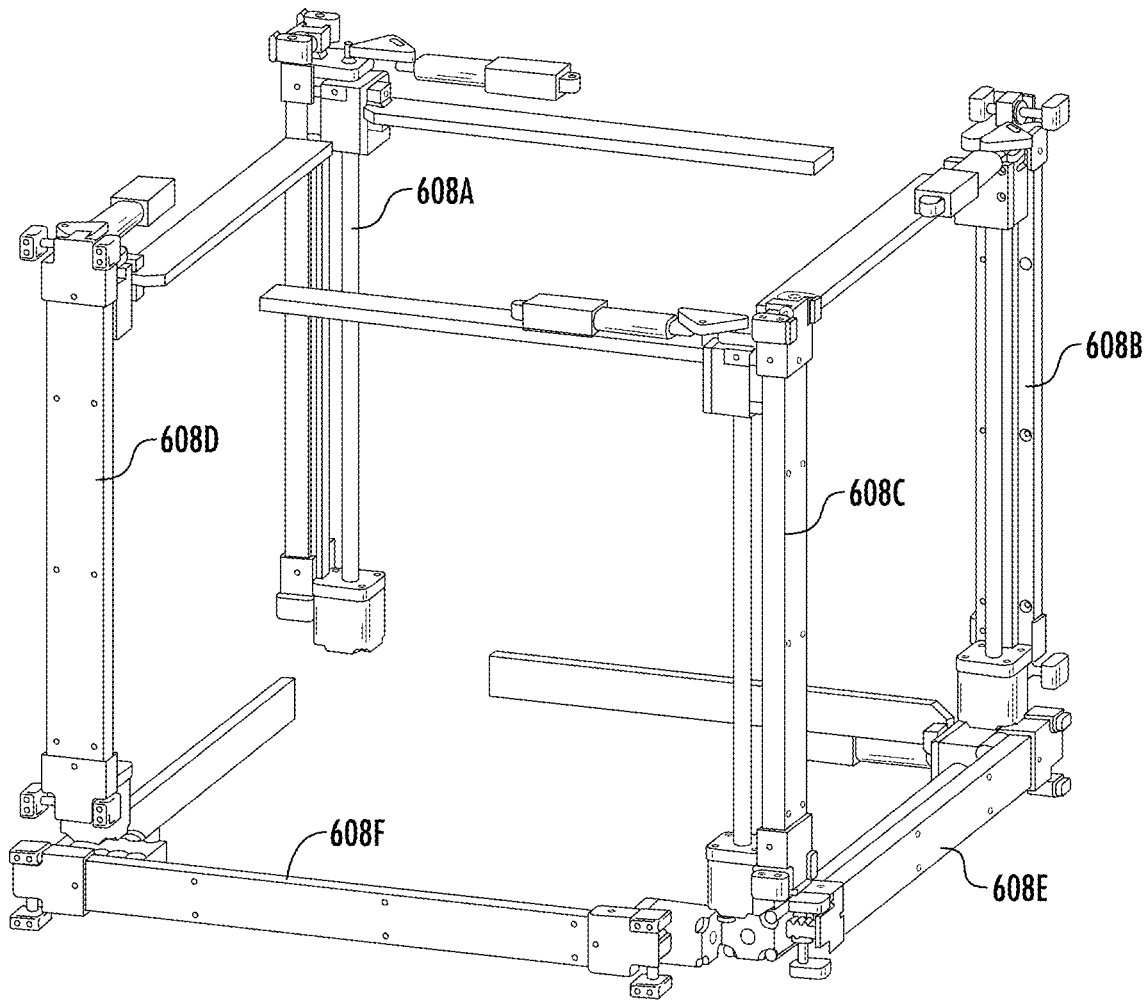
FIG. 6B is an example perspective view of a plurality of rack actuators in an example smart rack in accordance with some embodiments of the present disclosure.

FIG. 6A illustrates an example smart rack 600 in accordance with some embodiments of the present disclosure. FIG. 6B illustrates a plurality of rack actuators of the example smart rack 600 shown in FIG. 6A in accordance with some embodiments of the present disclosure. In particular, FIG. 6B removes the example rack frame 602 from the example smart rack 600 shown in FIG. 6A to illustrate the positions of the plurality of rack actuators of the example smart rack 600.

In the example shown in FIG. 6A and FIG. 6B, the example smart rack 600 comprises a rack frame 602 and a plurality of rack actuators that are secured within the rack frame 602. Similar to those described above in connection with FIG. 2A, the rack frame 602 may comprise a plurality of rack beams, including, but not limited to, a plurality of top rack beams (such as, but not limited to, a left top rack beam 604A, a right top rack beam 604B, a front top rack beam 604C, and a back top rack beam 604D), a plurality of lateral rack beams (such as, but not limited to, a left front lateral rack beam 604E, a right front lateral rack beam 604F, a left back lateral rack beam 604H, and a right back lateral rack beam 604G), and a plurality of bottom rack beams (such as, but not limited to, a left bottom rack beam 604K, a right bottom rack beam 604L, a front bottom rack beam 604I, and a back bottom rack beam 604J).

For example, the rack frame 602 may comprise a left top rack beam 604A that is positioned at a left top portion of the rack frame 602. The rack frame 602 may comprise a right top rack beam 604B that is positioned at a right top portion of the rack frame 602. In some embodiments, the left top rack beam 604A and the right top rack beam 604B may be in a parallel arrangement with one another, similar to those described above.

In some embodiments, the rack frame 602 may comprise a front top rack beam 604C that is positioned at a front top portion of the rack frame 602, and a back top rack beam 604D that is positioned at a back top position of the rack frame 602. In some embodiments, the front top rack beam 604C and the back top rack beam 604D are in a parallel arrangement with one another, similar to those described above.

In some embodiments, the rack frame 602 may comprise a left bottom rack beam 604K that is positioned at a left bottom portion of the rack frame 602. The rack frame 602 may comprise a right bottom rack beam 604L that is positioned at a right bottom portion of the rack frame 602. In some embodiments, the left bottom rack beam 604K and the right bottom rack beam 604L may be in a parallel arrangement with one another, similar to those described above.

In some embodiments, the rack frame 602 may comprise a front bottom rack beam 604I that is positioned at a front bottom portion of the rack frame 602, and a back bottom rack beam 604J that is positioned at a back bottom position of the rack frame 602. In some embodiments, front bottom rack beam 604I and the back bottom rack beam 604J are in a parallel arrangement with one another, similar to those described above.

In some embodiments, the rack frame 602 may comprise a plurality of lateral rack beams that are secured between top rack beams and bottom rack beams.

For example, the rack frame 602 may comprise a left front lateral rack beam 604E that is positioned at a left front portion of the rack frame 602 and in a parallel arrangement with the lateral side of the rack frame 602. In some embodiments, the left front lateral rack beam 604E is secured to the left top rack beam 604A and the front top rack beam 604C through the left front top rack corner 606A, similar to those described above. In some embodiments, the left front lateral rack beam 604E is secured to the left bottom rack beam 604K and the front bottom rack beam 604I through the left front bottom rack corner 606B, similar to those described above.

In some embodiments, the rack frame 602 may comprise a right front lateral rack beam 604F that is positioned at a right front portion of the rack frame 602 and in a parallel arrangement with the lateral side of the rack frame 602. In some embodiments, the left front lateral rack beam 604E is secured to the right top rack beam 604B and the front top rack beam 604C through the right front top rack corner 606C, similar to those described above. In some embodiments, the right front lateral rack beam 604F is secured to the right bottom rack beam 604L and the front bottom rack beam 604I through the right front bottom rack corner 606D, similar to those described above.

In some embodiments, the rack frame 602 may comprise a left back lateral rack beam 604H that is positioned at a left back portion of the rack frame 602 and in a parallel arrangement with the lateral side of the rack frame 602. In some embodiments, the left back lateral rack beam 604H is secured to the left top rack beam 604A and the back top rack beam 604D through the left back top rack corner 606E, similar to those described above. In some embodiments, the left back lateral rack beam 604H is secured to the left bottom rack beam 604K and the back bottom rack beam 604J through the left back bottom rack corner 606F, similar to those described above.

In some embodiments, the rack frame 602 may comprise a right back lateral rack beam 604G that is positioned at a right back portion of the rack frame 602 and in a parallel arrangement with the lateral side of the rack frame 602. In some embodiments, the right back lateral rack beam 604G is secured to the right top rack beam 604B and the back top rack beam 604D through the right back top rack corner 606G, similar to those described above. In some embodiments, the right back lateral rack beam 604G is secured to the right bottom rack beam 604L and the back bottom rack beam 604J through the right back bottom rack corner 606H, similar to those described above.

In some embodiments, the example smart rack 600 may comprise one or more rack actuators that are secured within the rack frame 602 and between the rack beams of the rack frame 602.

In some embodiments, the one or more rack actuators may function as single axis linear actuators to transfer force/motion perpendicular to the axis of movement inside a smart rack. In some embodiments, the one or more rack actuators are hidden within the smart rack structure (for example, within the rack frame) to allow movement of the rectangular prism within the modular superstructure.

For example, as shown in FIG. 6A and/or FIG. 6B, the example smart rack 600 may comprise a left back lateral rack actuator 608A, a right back lateral rack actuator 608B, a right front lateral rack actuator 608C, a left front lateral rack actuator 608D, a front bottom rack actuator 608F, and a right bottom rack actuator 608E.

In some embodiments, the left back lateral rack actuator 608A may be positioned such that the lead screw of the left back lateral rack actuator 608A is in a parallel arrangement with the left back lateral rack beam 604H, and that the arm of the left back lateral rack actuator 608A extends in a horizontal plane. For example, the left back lateral rack actuator 608A may comprise a linear guide that is secured to the inner surface of the left back lateral rack beam 604H (for example, secured to the left beam plate of the left back lateral rack beam 604H), and the linear guide is in a parallel arrangement with the lead screw of the left back lateral rack actuator 608A. In such an example, the arm of the left back lateral rack actuator 608A may provide a single axis movement along the left back lateral rack beam 604H. For example, the arm of the left back lateral rack actuator 608A may move up and down on the back of the smart rack 600.

In some embodiments, the right back lateral rack actuator 608B may be positioned such that the lead screw of the right back lateral rack actuator 608B is in a parallel arrangement with the right back lateral rack beam 604G, and that the arm of the right back lateral rack actuator 608B extends in a horizontal direction. For example, the right back lateral rack actuator 608B may comprise a linear guide that is secured to the inner surface of the right back lateral rack beam 604G (for example, secured to the back beam plate of the right back lateral rack actuator 608B), and the linear guide is in a parallel arrangement with the lead screw of the right back lateral rack actuator 608B. In such an example, the arm of the right back lateral rack actuator 608B may provide a single axis movement along the right back lateral rack beam 604G. For example, the arm of the right back lateral rack actuator 608B may move up and down on the right of the smart rack 600.

In some embodiments, the right front lateral rack actuator 608C may be positioned such that the lead screw of the right front lateral rack actuator 608C is in a parallel arrangement with the right front lateral rack beam 604F, and that the arm of the right front lateral rack actuator 608C extends in a horizontal direction. For example, the right front lateral rack actuator 608C may comprise a linear guide that is secured to the inner surface of the right front lateral rack beam 604F (for example, secured to the right beam plate of the right front lateral rack beam 604F), and the linear guide is in a parallel arrangement with the lead screw of the right front lateral rack actuator 608C, details of which are described herein. In such an example, the arm of the right front lateral rack actuator 608C may provide a single axis movement along the right front lateral rack beam 604F. For example, the arm of the right front lateral rack actuator 608C may move up and down on the front of the smart rack 600.

In some embodiments, the left front lateral rack actuator 608D may be positioned such that the lead screw of the left front lateral rack actuator 608D is in a parallel arrangement with the left front lateral rack beam 604E, and/or that the arm of the left front lateral rack actuator 608D extends in a horizontal direction. For example, the left front lateral rack actuator 608D may comprise a linear guide that is secured to the inner surface of the left front lateral rack beam 604E (for example, secured to the front beam plate of the left front lateral rack beam 604E), and the linear guide is in a parallel arrangement with the lead screw of the left front lateral rack actuator 608D, details of which are described herein. In such an example, the arm of the left front lateral rack actuator 608D may provide a single axis movement along the left front lateral rack beam 604E. For example, the arm of the left front lateral rack actuator 608D may move up and down on the left of the smart rack 600.

In some embodiments, the front bottom rack actuator 608F may be positioned such that the lead screw of the front bottom rack actuator 608F is in a parallel arrangement with the front bottom rack beam 604I, and/or that the arm of the front bottom rack actuator 608F extends in a horizontal direction. For example, the front bottom rack actuator 608F may comprise a linear guide that is secured to the inner surface of the front bottom rack beam 604I (for example, secured to the front beam plate of the front bottom rack beam 604I), and the linear guide is in a parallel arrangement with the lead screw of the front bottom rack actuator 608F, details of which are described herein. In such an example, the arm of the front bottom rack actuator 608F may provide a single axis movement along the front bottom rack beam 604I. For example, the arm of the front bottom rack actuator 608F may move left and right on the bottom of the smart rack 600.

In some embodiments, the right bottom rack actuator 608E may be positioned such that the lead screw of the right bottom rack actuator 608E is in a parallel arrangement with the right bottom rack beam 604L, and/or that the arm of the right bottom rack actuator 608E extends in a horizontal direction. For example, the right bottom rack actuator 608E may comprise a linear guide that is secured to the inner surface of the right bottom rack beam 604L (for example, secured to the right beam plate of the right bottom rack beam 604L), and the linear guide is in a parallel arrangement with the lead screw of the right bottom rack actuator 608E, details of which are described herein. In such an example, the arm of the right bottom rack actuator 608E may provide a single axis movement along the right bottom rack beam 604L. For example, the arm of the right bottom rack actuator 608E may move front and back on the bottom of the smart rack 600.

As such, the examples shown in FIG. 6A and FIG. 6B illustrate examples of symmetrical/semi-symmetrical designs by mounting rack actuators on all sides of the rack frame.

Figure 7A:
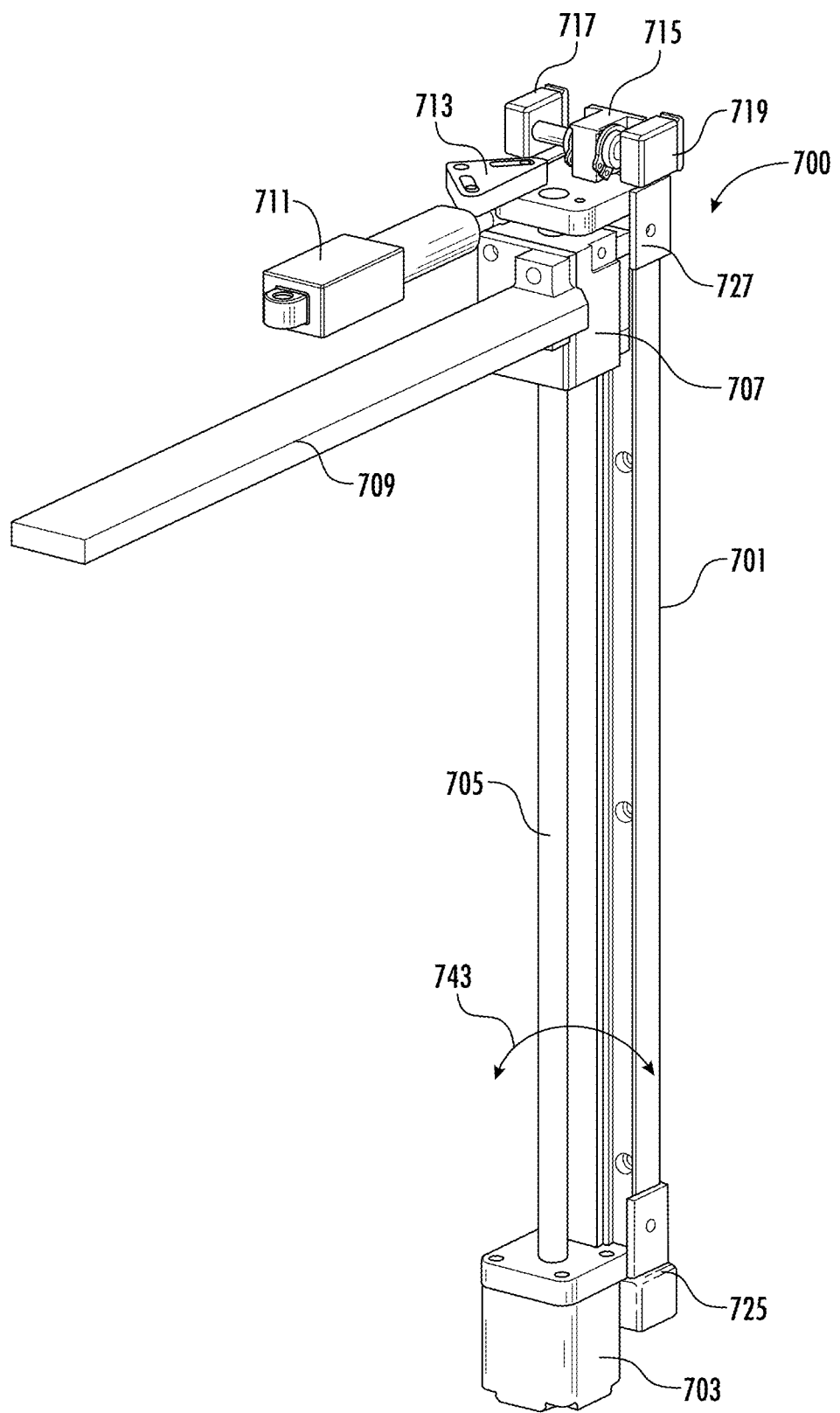
FIG. 7A is an example perspective view of an example rack actuator in accordance with some embodiments of the present disclosure.
Figure 7B:
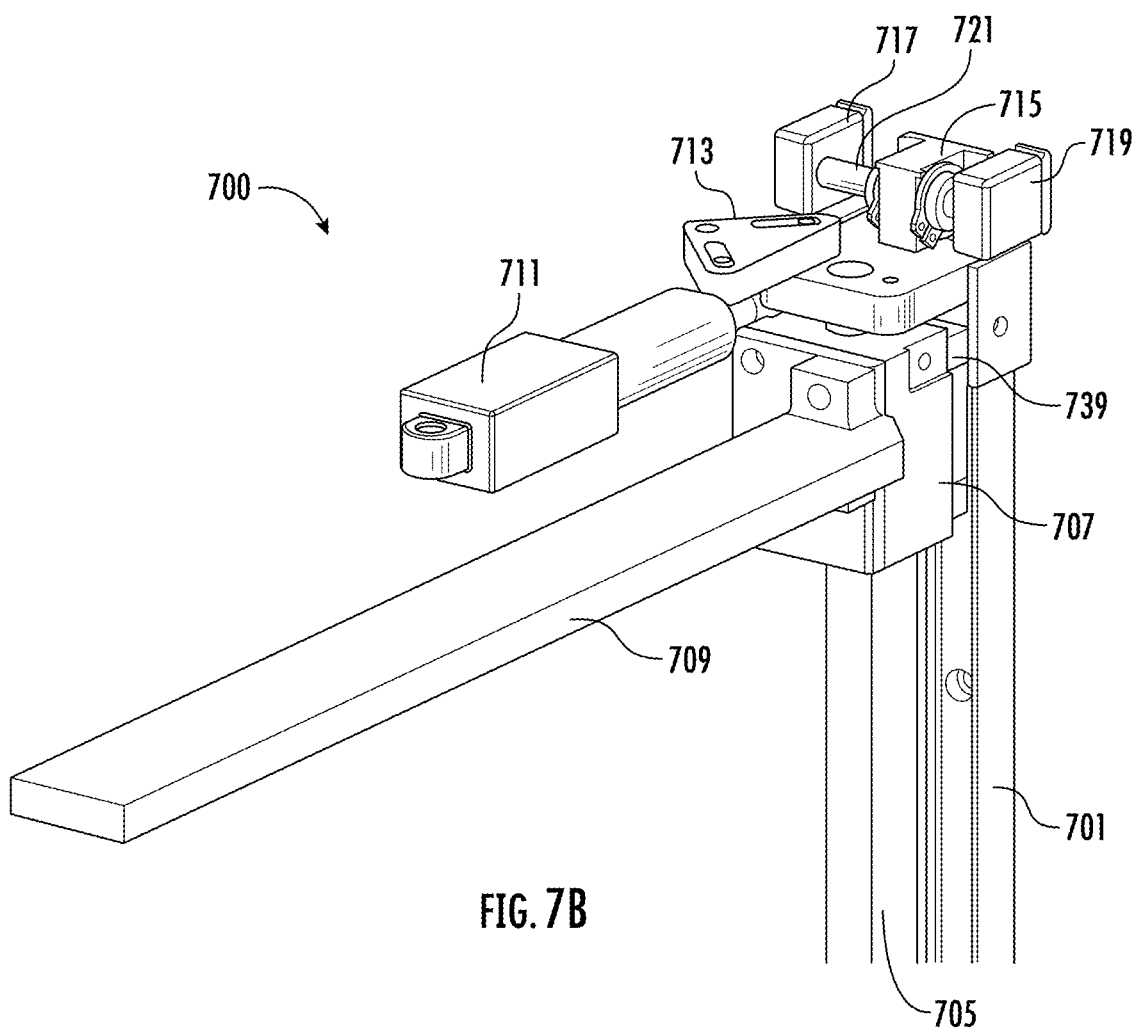
FIG. 7B is an example zoomed view of an example portion of the example rack actuator shown in FIG. 7A in accordance with some embodiments of the present disclosure.
Figure 7C:
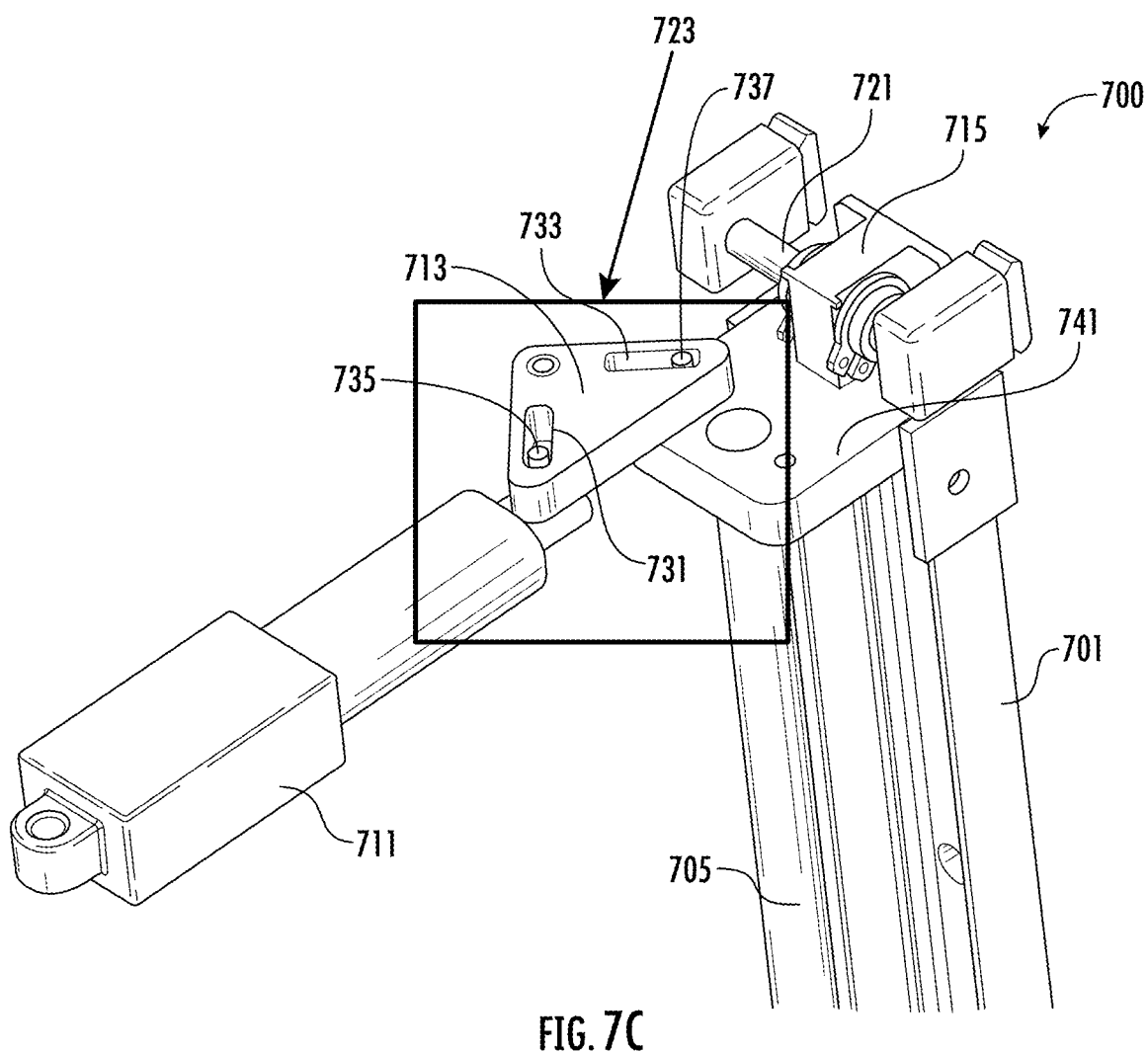
FIG. 7C is another example zoomed view of an example portion of the example rack actuator shown in FIG. 7A in accordance with some embodiments of the present disclosure.

Referring now to FIG. 7A to FIG. 7G, example views of an example rack actuator 700 in accordance with various embodiments of the present disclosure are illustrated. In particular, FIG. 7A illustrates an example perspective view of an example rack actuator 700 in accordance with some embodiments of the present disclosure. FIG. 7B illustrates an example zoomed view of an example portion of the example rack actuator 700 shown in FIG. 7A in accordance with some embodiments of the present disclosure. FIG. 7C illustrates another example zoomed view of an example portion of the example rack actuator 700 shown in FIG. 7A in accordance with some embodiments of the present disclosure.

In the example shown in FIG. 7A, the example rack actuator 700 may comprise a linear guide 701. Similar to those described above, the linear guide 701 may be secured to an inner surface of the rack plate of a rack beam.

In some embodiments, the linear guide 701 may be in the form of a FLS 30 linear guide. In some embodiments, the linear guide 701 may be in the form of other linear guide(s).

In some embodiments, the linear guide 701 may comprise a first end 725 and a second end 727. In some embodiments, an actuator base 703 may be disposed at the first end 725 of the linear guide 701. In some embodiments, the actuator base 703 may provide housing for components that include, but are not limited to, step motors, controllers, and/or the like.

In some embodiments, the step motor within the actuator base 703 may be in the form of a Nema 11 motor. In some embodiments, the step motor may be in other forms.

In the example shown in FIG. 7A, a lead screw 705 extends from the actuator base 703. For example, the lead screw 705 may be connected to the step motor that is housed within the actuator base 703, so that the step motor may exert rotational motion on the lead screw 705. In some embodiments, the connection between the actuator base 703 to the linear guide 701 may not be fixed. For example, the actuator base 703 (along with the lead screw 705) may rotate, as shown by the arrow 743 in FIG. 7A.

In some embodiments, a second end of the lead screw 705 may be secured to a swing plate 715. As shown in FIG. 7B, the swing plate 715 may be positioned on a swing bar 721. For example, the swing plate 715 may comprise an opening in the center, and the swing bar 721 may be positioned through the opening in the center. In some embodiments, one or more bearings may be provided between the opening in the center of the swing plate 715 and the swing bar 721, such that the swing plate 715 may move along the swing bar 721. In some embodiments, one or more snap rings may be positioned on the inner circumference of the bearings contacting the swing bar 721 and/or the outer circumference of the bearings contacting the opening in the center of the swing plate 715, so as to secure the bearings. In some embodiments, the swing plate 715 is moveable between a distal end of the swing bar 721 and a proximal end of the swing bar 721, details of which are described herein.

In some embodiments, the swing bar 721 is secured between a first spacer 717 and a second spacer 719. In some embodiments, the first spacer 717 and the second spacer 719 may provide support to secure the rack actuator within the rack frame. For example, support and spacing may be provided for better fitment of the first spacer 717 and the second spacer 719 against the rack plates of the rack frame.

In some embodiments, the example rack actuator 700 further comprises a slider 707 that is positioned on the lead screw 705. In some embodiments, the slider 707 may be movably along the lead screw 705. For example, the lead screw 705 may comprise outer threads that engage with the inner threads of the slider 707. Additionally, the slider 707 may comprise slider legs 739 that can travel along the inner groove of the linear guide 701.

In some embodiments, the step motor stored in the actuator base 703 may cause the lead screw 705 to rotate. As the inner threads of the slider 707 is engaged with the outer threads of the lead screw 705, and that the slider 707 can travel along the inner groove of the linear guide 701, the rotational motion from the lead screw 705 can be translated into a vertical motion of the slider 707. In other words, the step motor stored in the actuator base 703 can cause the slider 707 to travel along the lead screw 705.

In some embodiments, an arm 709 is secured to the slider 707. In some embodiments, the arm 709 may be in a shape similar to a cuboid shape. In some embodiments, the arm 709 may be in a perpendicular arrangement with the lead screw 705. Similar to those described above in connection with at least FIG. 6A and FIG. 6B, the step motor stored in the actuator base 703 may cause the arm 709 to be moved to different positions relative to a rib of a rectangular prism, including a top position and a bottom position.

Further, the arm 709 may operate in an engaged mode or a disengaged mode. As described above, when the arm 709 is in the engaged mode, the arm 709 is in contact with the outer surface of the rectangular prism. When the arm 709 is in the disengaged mode, the arm 709 is not in contact with the outer surface of the rectangular prism. In some embodiments, the linear motor 711 may cause the rack actuator 700 to switch between the engaged mode and the disengaged mode.

Referring now to FIG. 7C, a zoomed view of a portion of the rack actuator 700 is illustrated. In particular, FIG. 7C highlights the connections between the linear motor 711 and the hinge plate 713 shown in area 723.

In the example shown in FIG. 7C, the hinge plate 713 comprises/defines a first groove 731 and a second groove 733. In some embodiments, the first groove 731 and the second groove 733 are at a 90-degree angle with one another. For example, the first groove 731 defines a first longitudinal axis, and the second groove 733 defines a second longitudinal axis. In some embodiments, the first longitudinal axis is at a 90-degree angle with the second longitudinal axis.

In some embodiments, the linear motor 711 may exert a linear motion. In some embodiments, the linear motor 711 may comprise an actuator pin 735 that is disposed in the first groove 731 and moveable along the first groove 731. For example, the actuator pin 735 may be moveable along the first longitudinal axis of the first groove 731.

In some embodiments, the rack actuator 700 may comprise an intermediate plate 741. As shown in FIG. 7C, the intermediate plate 741 may comprise a connector pin 737 that is disposed in the second groove 733, and is moveable along the second longitudinal axis of the second groove 733. In some embodiments, the intermediate plate 741 is secured to the swing plate 715.

As described above, the first longitudinal axis of the first groove 731 and the second longitudinal axis of the second groove 733 may be at a 90-degree angle with one another, such that the hinge plate 713 transfers the linear motion exerted by the linear motor 711 to movements of the swing plate between the distal end and the proximal end across a 90-degree turn. For example, because the actuator pin 735 of the linear motor 711 may travel along the first longitudinal axis of the first groove 731, and the connector pin 737 of the intermediate plate 741 may travel along the second longitudinal axis of the second groove 733, the hinge plate 713 may translate the linear motions from the linear motor 711 in a first direction to motions of the intermediate plate 741 (and the swing plate 715) in a second direction. In some embodiments, the first direction is at a 90-degree angle with the second direction.

As such, the hinge plate 713 may transfer linear motion across a 90-degree angle corner to engage arms onto the outer surface of the rectangular prism, details of which are described in connection with at least FIG. 7D to FIG. 7G.

Figure 7D:
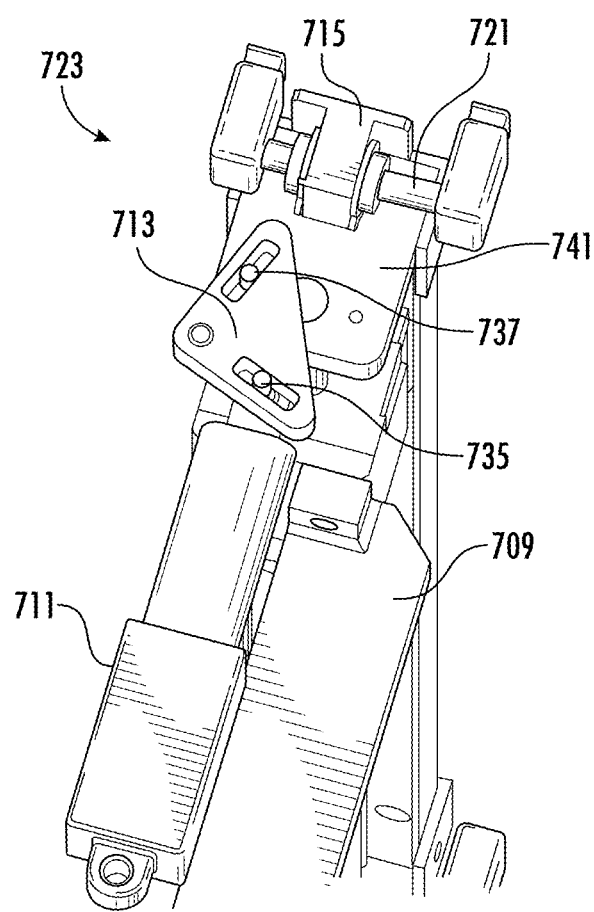
FIG. 7D is an example perspective view of at least a portion of the example rack actuator that is in a disengaged mode in accordance with some embodiments of the present disclosure.
Figure 7E:
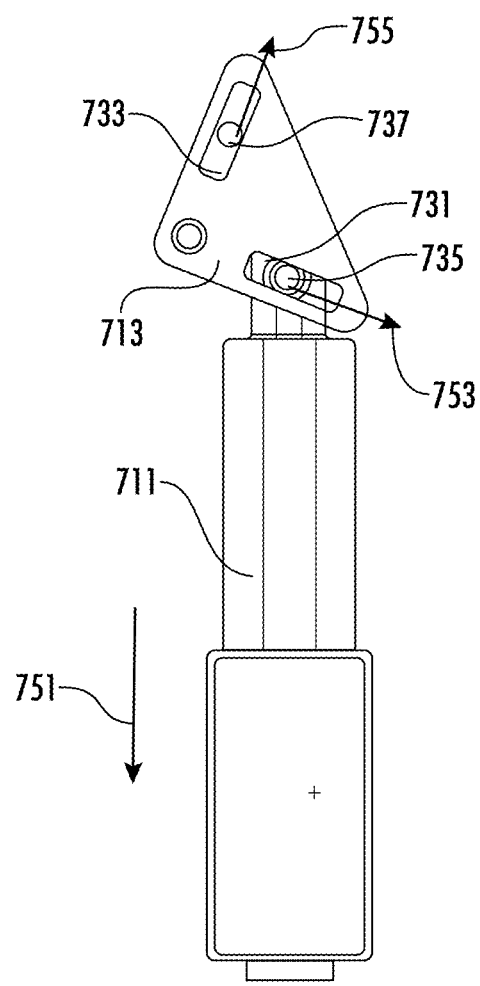
FIG. 7E is an example top view of at least a portion of the example rack actuator that is in a disengaged mode in accordance with some embodiments of the present disclosure.
Figure 7F:
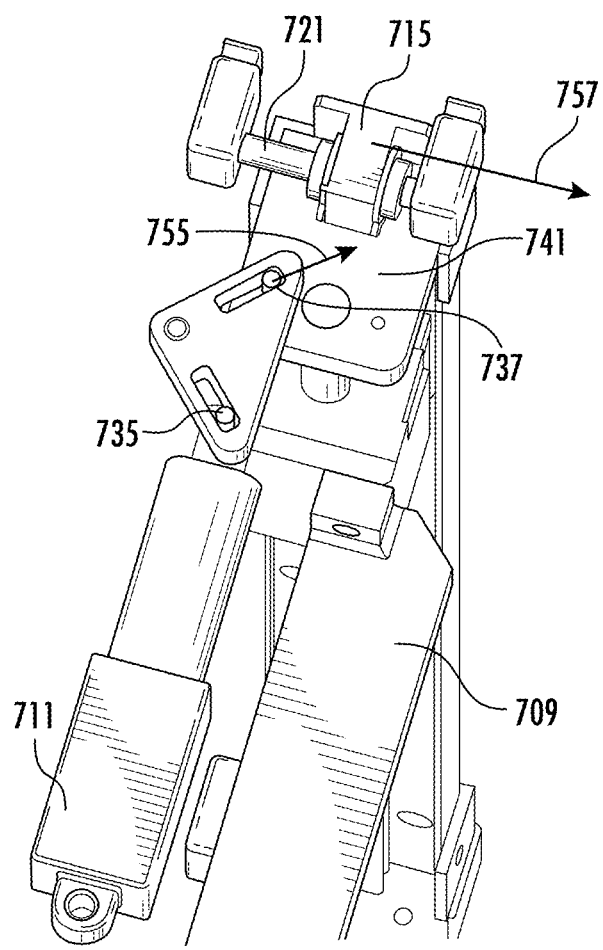
FIG. 7F is an example perspective view of at least a portion of the example rack actuator that is in an engaged mode in accordance with some embodiments of the present disclosure.
Figure 7G:
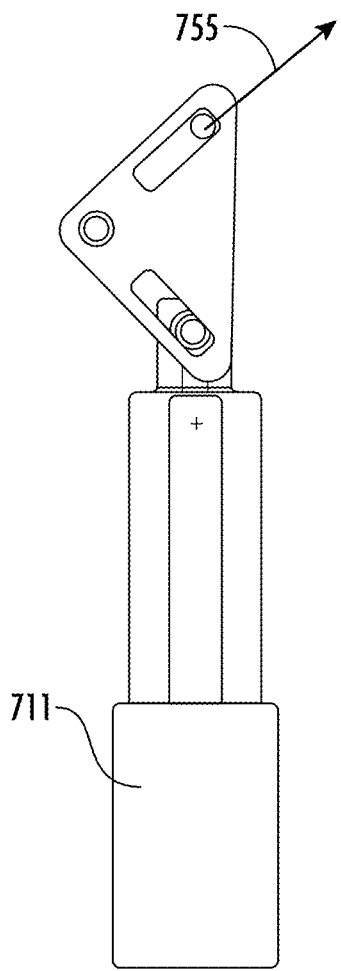
FIG. 7G is an example top view of at least a portion of the example rack actuator that is in an engaged mode in accordance with some embodiments of the present disclosure.

Referring now to FIG. 7D to FIG. 7G, example perspective views and top views of at least a portion of the example rack actuator 700 in accordance with some embodiments of the present disclosure are illustrated. In particular, FIG. 7D and FIG. 7E illustrate example views when the arm 709 is in the disengaged mode. FIG. 7F and FIG. 7G illustrate example views when the arm 709 is in the engaged mode.

In the example shown in FIG. 7D, the swing plate 715 is positioned near a distal end of the swing bar 721. In the present disclosure, the distal end of the swing bar 721 refers to an end of the swing bar 721 that is the furthest from an outer surface of the rectangular prism that is positioned within the smart rack. In some embodiments, when the swing plate 715 is at the distal end of the swing bar, the arm 709 is in the disengaged mode.

As shown in FIG. 7D, the swing plate 715 is connected to the intermediate plate 741, which in turn is connected to the lead screw 705. Because the swing plate 715 is positioned furthest from the outer surface of the rectangular prism, the lead screw 705 is also rotated away from the outer surface of the rectangular prism. Because the arm 709 is secured to a slider 707 that is on the lead screw 705, the arm 709 is rotated further away from the outer surface of the rectangular prism. As such, the arm 709 is as shown in FIG. 7D is in a disengaged mode.

In some embodiments, to cause the arm 709 to switch from the disengaged mode to the engaged mode, the linear motor 711 may exert a linear motion. Referring now to FIG. 7E, an example linear motion 751 of the linear motor 711 is illustrated. In particular, the linear motion 751 exerted by the linear motor 711 is in a direction that is in a parallel arrangement with the outer surface of the rectangular prism, and is away from the lead screw 705. As described above, the linear motor 711 may comprise an actuator pin 735 that travels along the first longitudinal axis of the first groove 731. As such, the linear motion 751 is exerted to the actuator pin 735, and causes the actuator pin 735 to travel along the first groove 731 in the movement direction 753 shown in FIG. 7D.

As described above, the connector pin 737 of the intermediate plate 741 may travel along the second longitudinal axis of the second groove 733 of the hinge plate 713. Because the second longitudinal axis of the second groove 733 is at a 90 degrees angle with the first longitudinal axis of the first groove 731, when the linear motion 751 causes the actuator pin 735 to travel along the first groove 731 in the movement direction 753, the movement direction 755 of the connector pin 737 of the intermediate plate 741 is rotated at 90 degrees from the movement direction 753, as shown in FIG. 7E.

Referring now to FIG. 7F and FIG. 7G, the movement direction 755 of the connector pin 737 of the intermediate plate 741 caused by the linear motion 751 is shown. As described above, the intermediate plate 741 is secured to the swing plate 715. Because the swing plate 715 is positioned on a swing bar 721, the movement direction 755 of the connector pin 737 is transferred to a movement direction 757 of the swing plate 715. As shown in FIG. 7F, the movement direction 757 indicates that the swing plate 715 is moving towards a proximal end of the swing bar 721. In the present disclosure, the proximal end of the swing bar 721 refers to an end of the swing bar 721 that is the closest to an outer surface of the rectangular prism that is positioned within the smart rack.

Because the swing plate 715 is positioned closest to the outer surface of the rectangular prism, the lead screw 705 is also rotated to be close to the outer surface of the rectangular prism. Because the arm 709 is secured to a slider 707 that is on the lead screw 705, the arm 709 is rotated to be closed to the outer surface of the rectangular prism. As such, when the swing plate 715 is at the proximal end of the swing bar, the arm 709 is in the engaged mode as shown in FIG. 7F and FIG. 7G.

As such, FIG. 7D to FIG. 7G illustrate an example of causing the arm 709 to switch from a disengaged mode to an engaged mode. In particular, the linear motor 711 may exert a force in a direction that is in a parallel arrangement with the outer surface of the rectangular prism, and away from the lead screw 705 to cause the arm 709 to switch from a disengaged mode to an engaged mode. Similarly, the linear motor 711 may exert a force in a direction that is in a parallel arrangement with the outer surface of the rectangular prism, and towards the lead screw 705 to cause the arm 709 to switch from an engaged mode to a disengaged mode.

Referring now to FIG. 8A, FIG. 8B, FIG. 8C, and FIG. 8D, example views of an example rectangular prism and two peer example smart racks are provided.

In particular, FIG. 8A, FIG. 8B, FIG. 8C, and FIG. 8D illustrate example movements of an example rectangular prism 804 between the two peer example smart racks: from a smart rack 802A to a smart rack 802B that is secured to the right of the smart rack 802A. FIG. 8A to FIG. 8D illustrate an example of using rack actuators that are mounted symmetrically on all sides of a smart rack to move rectangular prisms in all directions, where each rack actuator provides single axis movements.

Figure 8A:
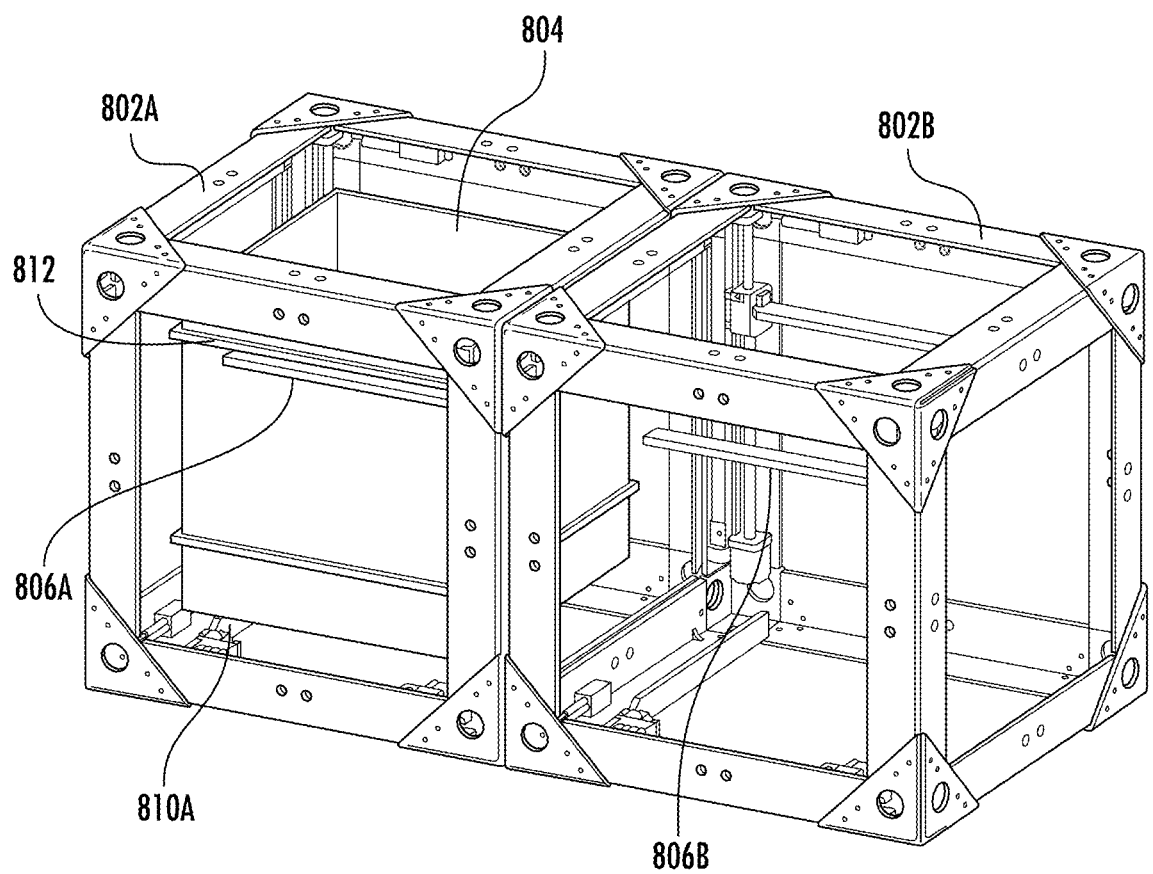
FIG. 8A, FIG. 8B, FIG. 8C, and FIG. 8D illustrate example movements of an example rectangular prism from one example smart rack to another example smart rack in a horizontal direction in accordance with some embodiments of the present disclosure.

In the example shown in FIG. 8A, a rectangular prism 804 may be positioned within the smart rack 802A. Similar to those described above, the rectangular prism 804 may comprise ribs that are disposed on an outer surface of the rectangular prism 804, including, but are not limited to, a top rib 812.

In some embodiments, the smart rack 802A may comprise a plurality of rack actuators. For example, the smart rack 802A may comprise a right front lateral rack actuator 806A. In some embodiments, to secure the rectangular prism 804 within the smart rack 802A, the right front lateral rack actuator 806A may be in the top position for the top rib 812 and in an engaged mode, similar to those described above. Similarly, the smart rack 802A may comprise another rack actuator (e.g. a left back lateral rack actuator) that is positioned opposite to the right front lateral rack actuator 806A, and may be moved to be in top position and in the engaged mode so that it can also support the rectangular prism 804.

Figure 8B:
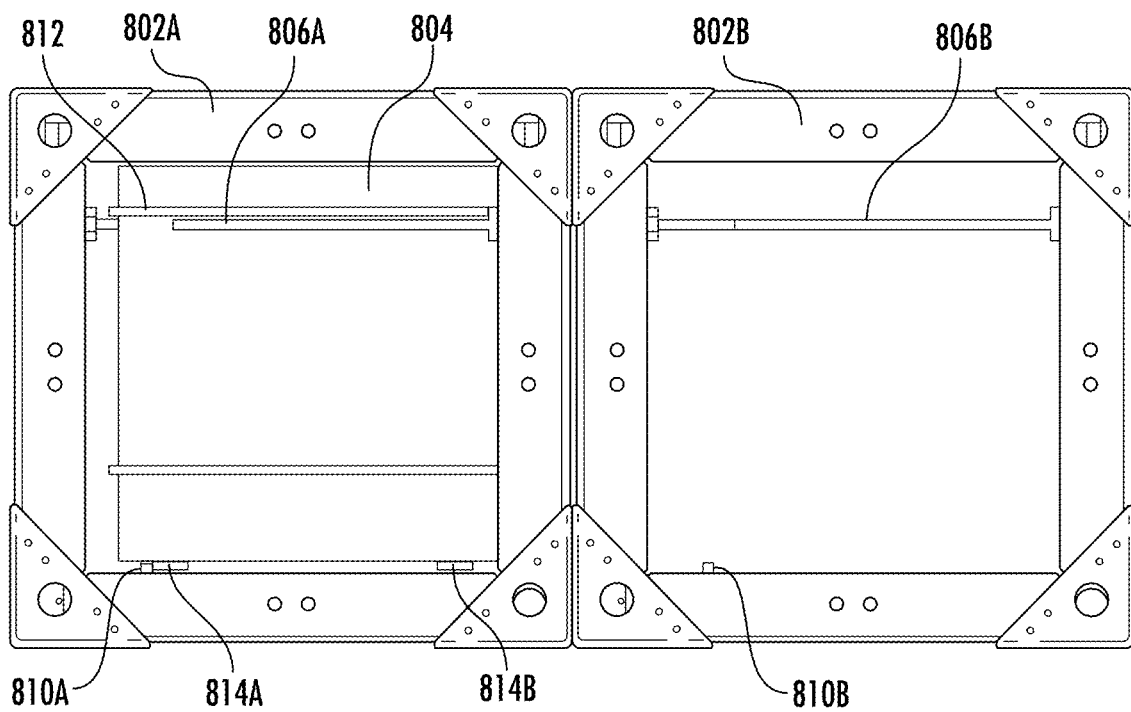

Referring now to FIG. 8B, a side view of the example shown in FIG. 8A is illustrated. In the example shown in FIG. 8B, the smart rack 802A may comprise a front bottom rack actuator 810A. In some embodiments, the front bottom rack actuator 810A may be positioned adjacent to left front bottom protrusion 814A, and may be in the engaged mode. For example, the front bottom rack actuator 810A may contact a left side of the left front bottom protrusion 814A.

In some embodiments, the front bottom rack actuator 810A may cause the smart rack 802B to be pushed to the right. For example, the front bottom rack actuator 810A may activate its step motor, and cause the slider to move towards the right along with the arm. Because the arm of the front bottom rack actuator 810A is in contact with the left front bottom protrusion 814A, the front bottom rack actuator 810A may cause the rectangular prism 804 to be moved to the right.

In some embodiments, the smart rack 802B may comprise one or more rack actuators. For example, the smart rack 802B may comprise a right front lateral rack actuator 806B and a front bottom rack actuator 810B. In some embodiments, the right front lateral rack actuator 806B may be moved to the top position and be in the engaged mode, such that the right front lateral rack actuator 806B may provide support to the rectangular prism 804 once it is moved into the smart rack 802B.

In some embodiments, prior to the top rib 812 is moved to be within the smart rack 802B, the front bottom rack actuator 810B may be in a disengaged mode, such that the right front protrusion 814B of the rectangular prism 804 may travel past the front bottom rack actuator 810B, without being blocked by the front bottom rack actuator 810B.

Figure 8C:
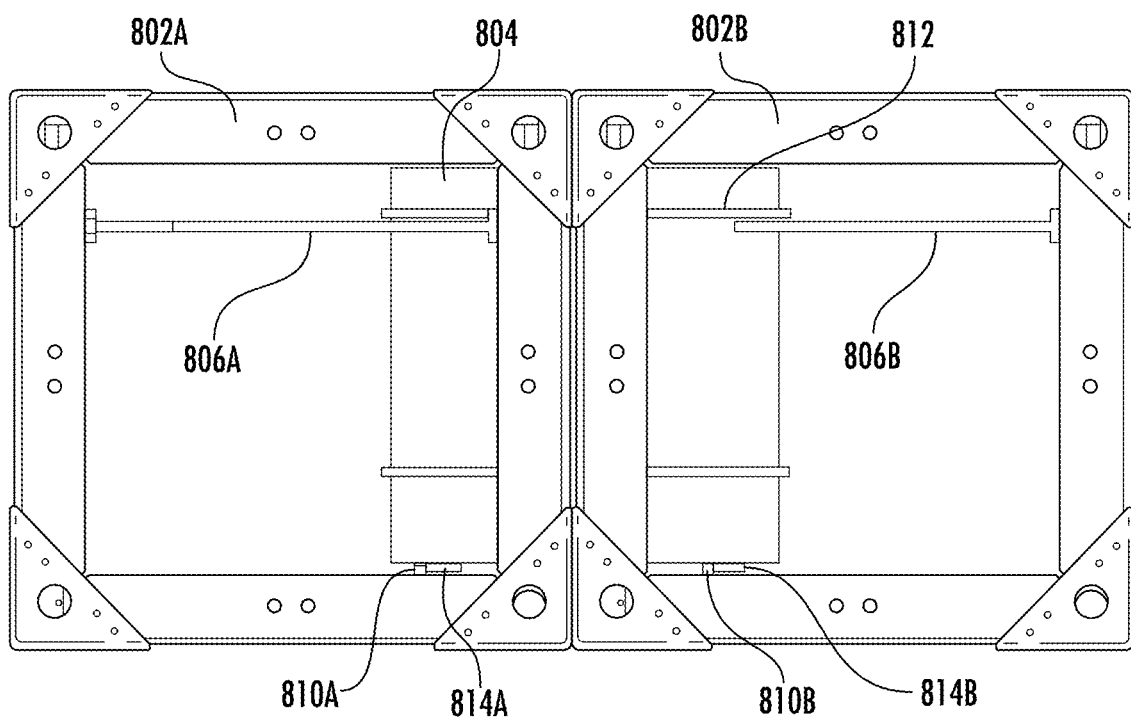

Referring now to FIG. 8C, the rectangular prism 804 is moved from the smart rack 802A to the smart rack 802B. In some embodiments, in response to determining that the right front protrusion 814B is moved past the front bottom rack actuator 810B, the front bottom rack actuator 810B may switch to engaged mode. In some embodiments, after the front bottom rack actuator 810B is in the engaged mode, the front bottom rack actuator 810B may push the rectangular prism 804 to the right, while the right front lateral rack actuator 806B may support the rectangular prism 804 via the top rib 812 throughout the right movement.

Figure 8D:
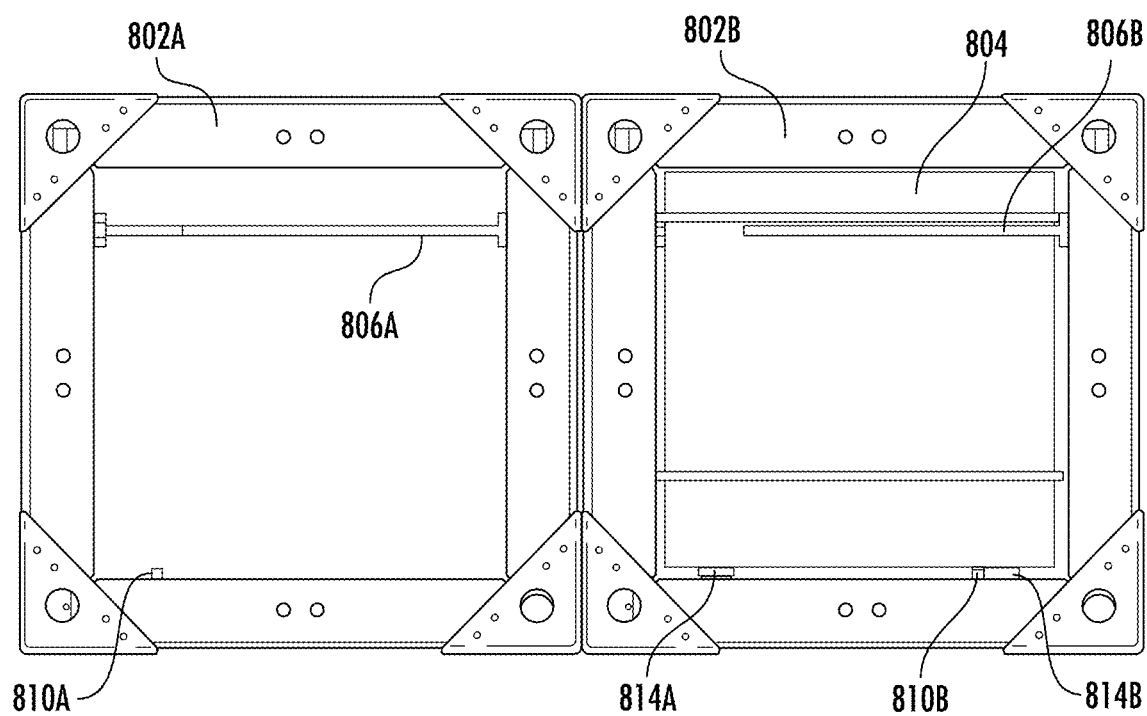

Referring now to FIG. 8D, the front bottom rack actuator 810A may continue pushing the right front protrusion 814B of the rectangular prism 804 towards the right, until the rectangular prism 804 is completely positioned with the smart rack 802B. As such, the rectangular prism 804 may be transported from the smart rack 802A to the smart rack 802B through the rack actuators.

Figure 9A:
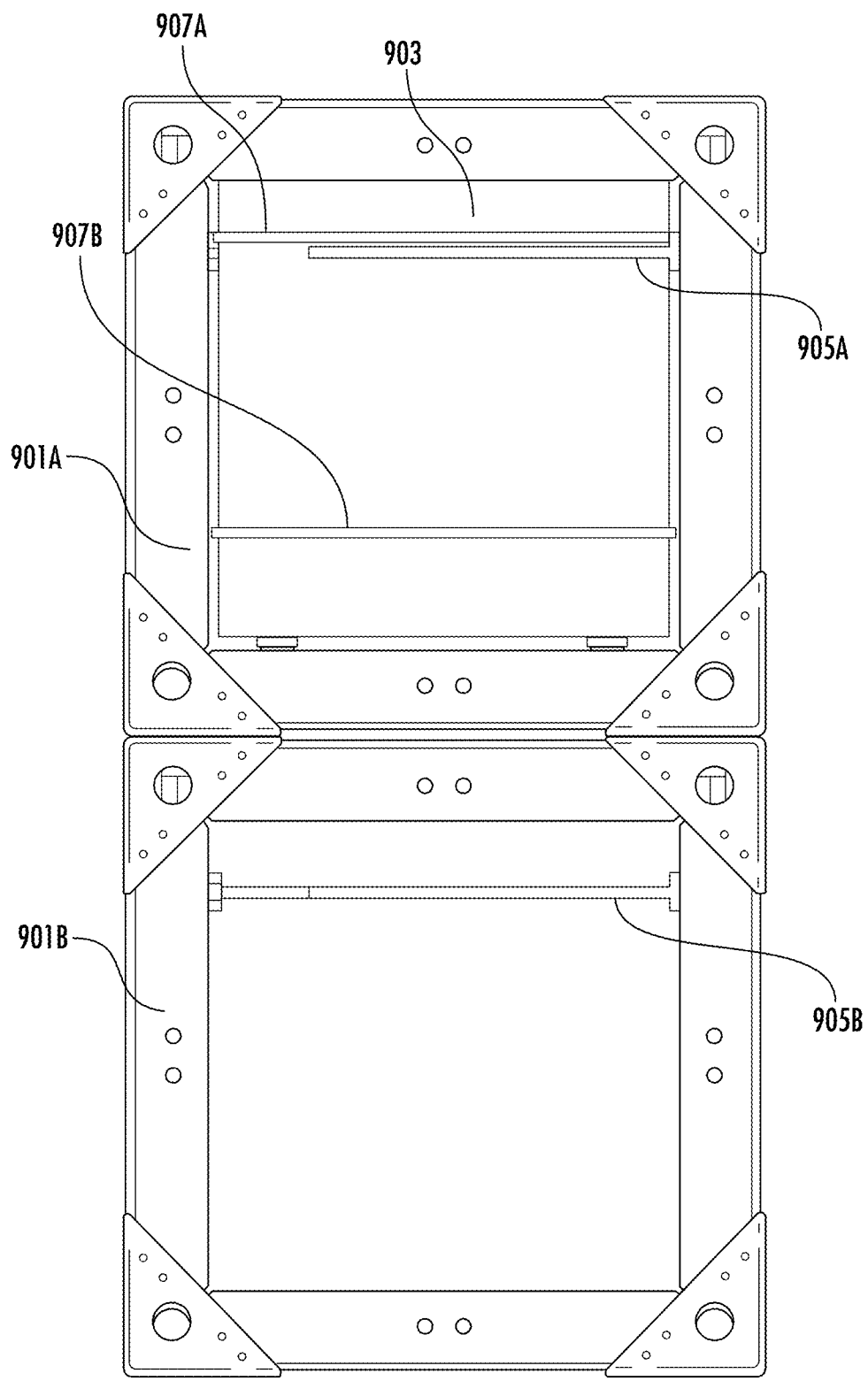
FIG. 9A, FIG. 9B, and FIG. 9C illustrate example movements of an example rectangular prism from one example smart rack to another example smart rack in a vertical direction in accordance with some embodiments of the present disclosure.
Figure 9B:
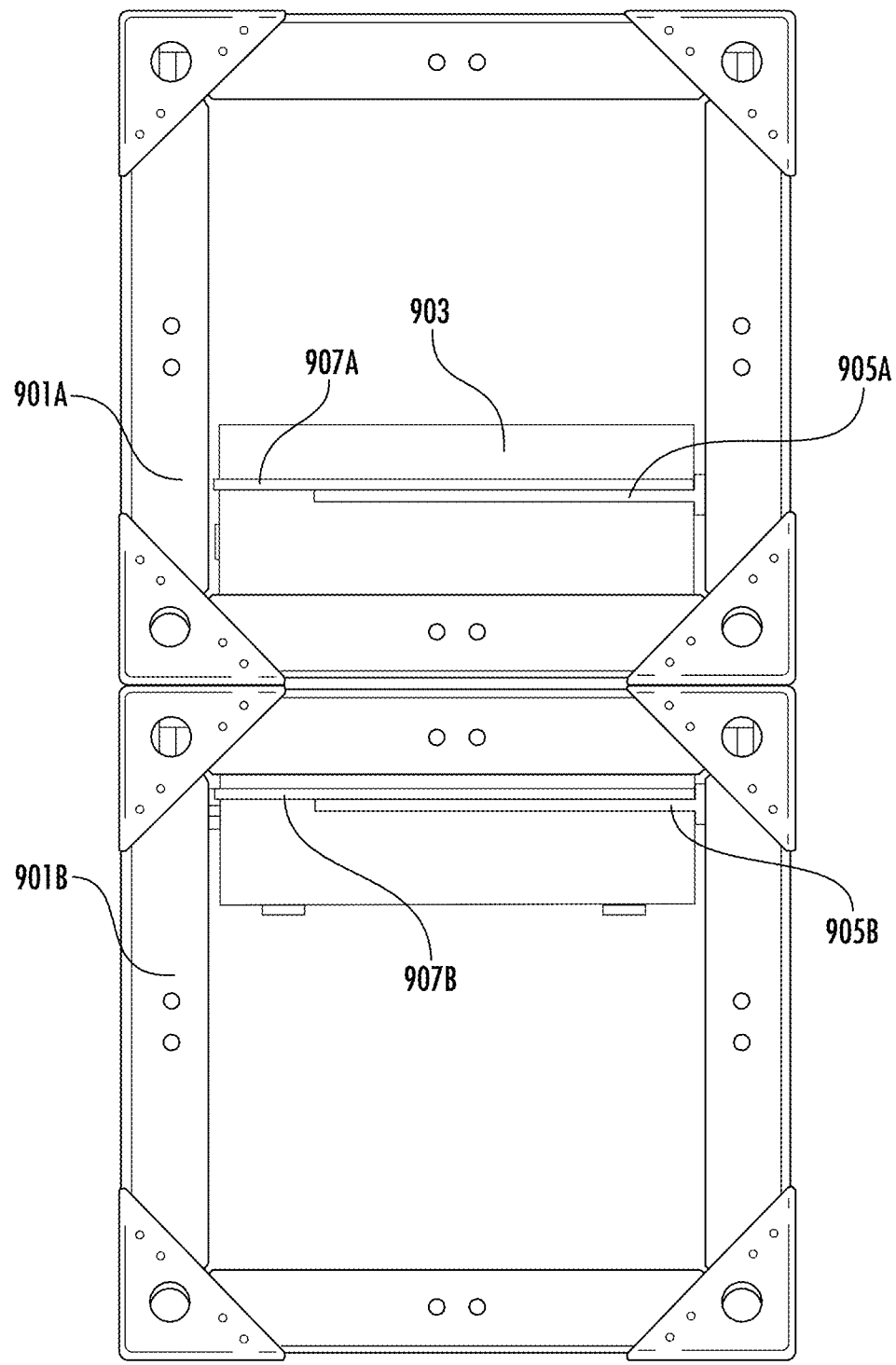
Figure 9C:
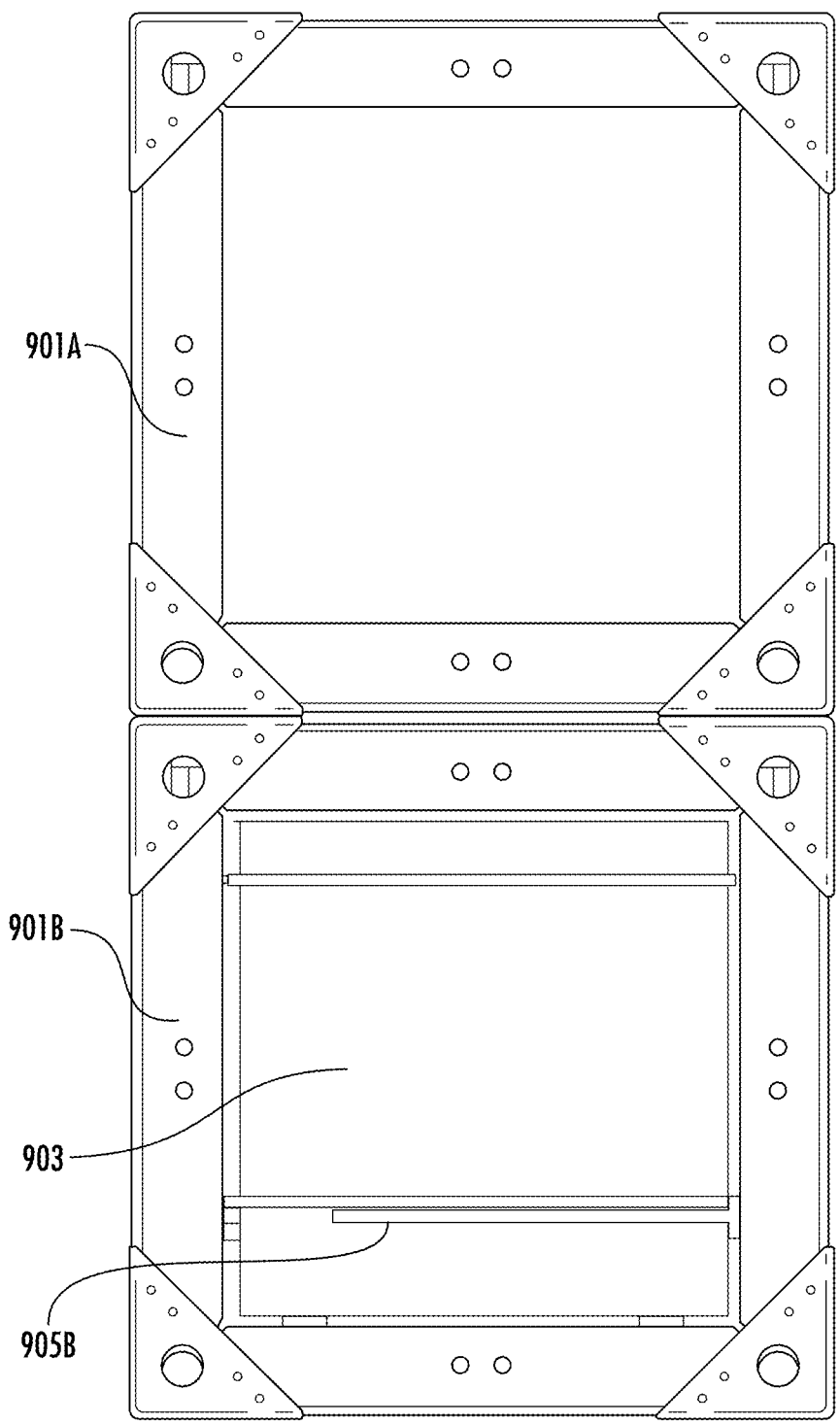

Referring now to FIG. 9A, FIG. 9B, and FIG. 9C, example views of an example rectangular prism and two peer example smart racks are provided.

In particular, FIG. 9A, FIG. 9B, and FIG. 9C illustrate a rectangular prism 903 between the two peer example smart racks: from a smart rack 901A to a smart rack 901B that is secured to the bottom of the smart rack 901A. FIG. 9A to FIG. 9C illustrate an example of using rack actuators that are mounted symmetrically on all sides of a smart rack to move rectangular prisms in all directions, where each rack actuator provides single axis movements.

Referring now to FIG. 9A, the rectangular prism 903 is positioned within the smart rack 901A. For example, the smart rack 901A may comprise one or more rack actuators, such as the right front lateral rack actuator 905A. In some embodiments, the right front lateral rack actuator 905A may be in the engaged mode and in the top position, such that the right front lateral rack actuator 905A may contact the top rib 907A of the rectangular prism 903, and may provide support for the rectangular prism 903. Similarly, the rectangular prism 903 may comprise another rack actuator (for example, a left back lateral rack actuator) that is positioned opposite to the right front lateral rack actuator 905A. In some embodiments, the rack actuator that is positioned opposite to the right front lateral rack actuator 905A may also provide support for the rectangular prism 903. In some embodiments, the rectangular prism 903 may be caused to travel downwards by lowering the arm of the right front lateral rack actuator 905A.

Referring now to FIG. 9B, in some embodiments, prior to or as the rectangular prism 903 travels downwards by lowering the right front lateral rack actuator 905A, the 905B of the 901B may be in an engaged mode. When the rectangular prism 903 travels downwards, the right front lateral rack actuator 905B may be in an engaged mode. As the rectangular prism 903 continues traveling downwards, the arm of the right front lateral rack actuator 905B becomes in contact with the bottom rib 907B of the rectangular prism 903. In some embodiments, after the arm of the right front lateral rack actuator 905B is in contact with the bottom rib 907B of the rectangular prism 903, the right front lateral rack actuator 905A be switched to a disengaged mode to release the top rib 907A.

Referring now to FIG. 9C, in some embodiments, after the right front lateral rack actuator 905A becomes disengaged from the 907A, the right front lateral rack actuator 905B may continue lowering the rectangular prism 903. As such, the rectangular prism 903 may be transported from the smart rack 901A to the smart rack 901B through a down movement.

Figure 10:
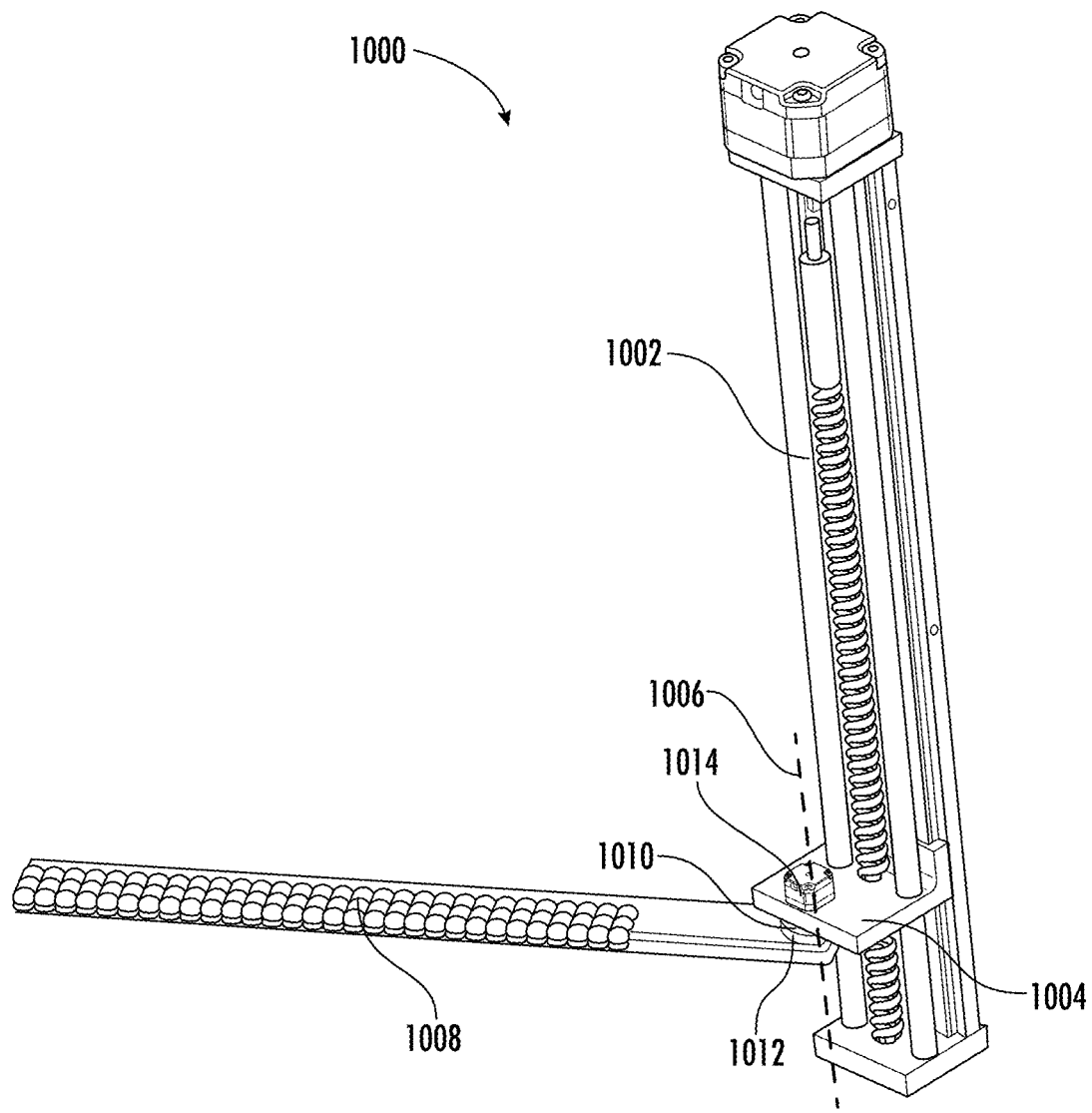
FIG. 10 is an example perspective view of an example rack actuator in accordance with some embodiments of the present disclosure.

Referring now to FIG. 10, an example perspective view of an example rack actuator 1000 in accordance with some embodiments of the present disclosure is illustrated. In particular, the example shown in FIG. 10 illustrates utilizing rack actuators that function as single axis linear actuators and coupled with rotational motion mechanism to engage and move rectangular prisms in a modular superstructure in accordance with various embodiments of the present disclosure.

In some embodiments, the example rack actuator 1000 may comprise a slider 1004 and a lead screw 1002. For example, a stepped motor may cause the lead screw 1002 to rotate, which in turn may cause the slider 1004 to move along the lead screw 1002, similar to those described above.

In some embodiments, an arm 1008 may be rotatably connected to the slider 1004. For example, the example rack actuator 1000 may comprise a rotary motor 1014 that can cause the arm 1008 to rotate/swing along the rotation axis 1006.

For example, the rotary motor 1014 may be secured to the slider 1004 and rotationally connected to an end of the arm 1008 through one or more bearings. In some embodiments, one or more bearings may include, but are not limited to, a thrust bearing 1012 that provides structural support for the arm 1008 to support a rectangular prism, as well as a ball bearing 1010 that allows the arm 1008 to rotate. As such, the example rack actuator 1000 shown in FIG. 10 provides structural support and transfers movement in rotation with use of bearings.

In some embodiments, the rotary motor 1014 is configured to cause a rotational motion of the arm 1008 relative to the slider. In some embodiments, the rotary motor 1014 may cause a maximum of 90-degree rotation of the arm 1008. For example, the rotary motor 1014 may cause the arm 1008 to rotate between the front of a smart rack and the left of the smart rack. As another example, the rotary motor 1014 may cause the arm 1008 to rotate between the front of a smart rack and the right of the smart rack. As another example, the rotary motor 1014 may cause the arm 1008 to rotate between the back of a smart rack and the right of the smart rack. As another example, the rotary motor 1014 may cause the arm 1008 to rotate between the back of a smart rack and the left of the smart rack.

In some embodiments, the rotary motor may cause the arm 1008 to rotate towards the outer surface of the rectangular prism, so as to cause the arm 1008 to be in an engaged mode. Additionally, or alternatively, the rotary motor may cause the arm 1008 to rotate away from the outer surface of the rectangular prism, so as to cause the arm 1008 to be in a disengaged mode.

As such, the example rack actuator 1000 shown in FIG. 10 illustrates examples of causing an arm of the rack actuator to switch between an engaged mode and a disengaged mode by utilizing a rotary motor to cause the arm to rotate towards/away from the outer surface of the rectangular prism. In accordance with various embodiments of the present disclosure, an example smart rack may comprise four rack actuators that are positioned similar to a turntable type design. For example, each of the arms of the rack actuators of the smart rack may be positioned in a perpendicular arrangement with the arms of its peer smart rack actuators, thereby providing force and direction of movement, additional details of which are described herein.

Figure 11A:
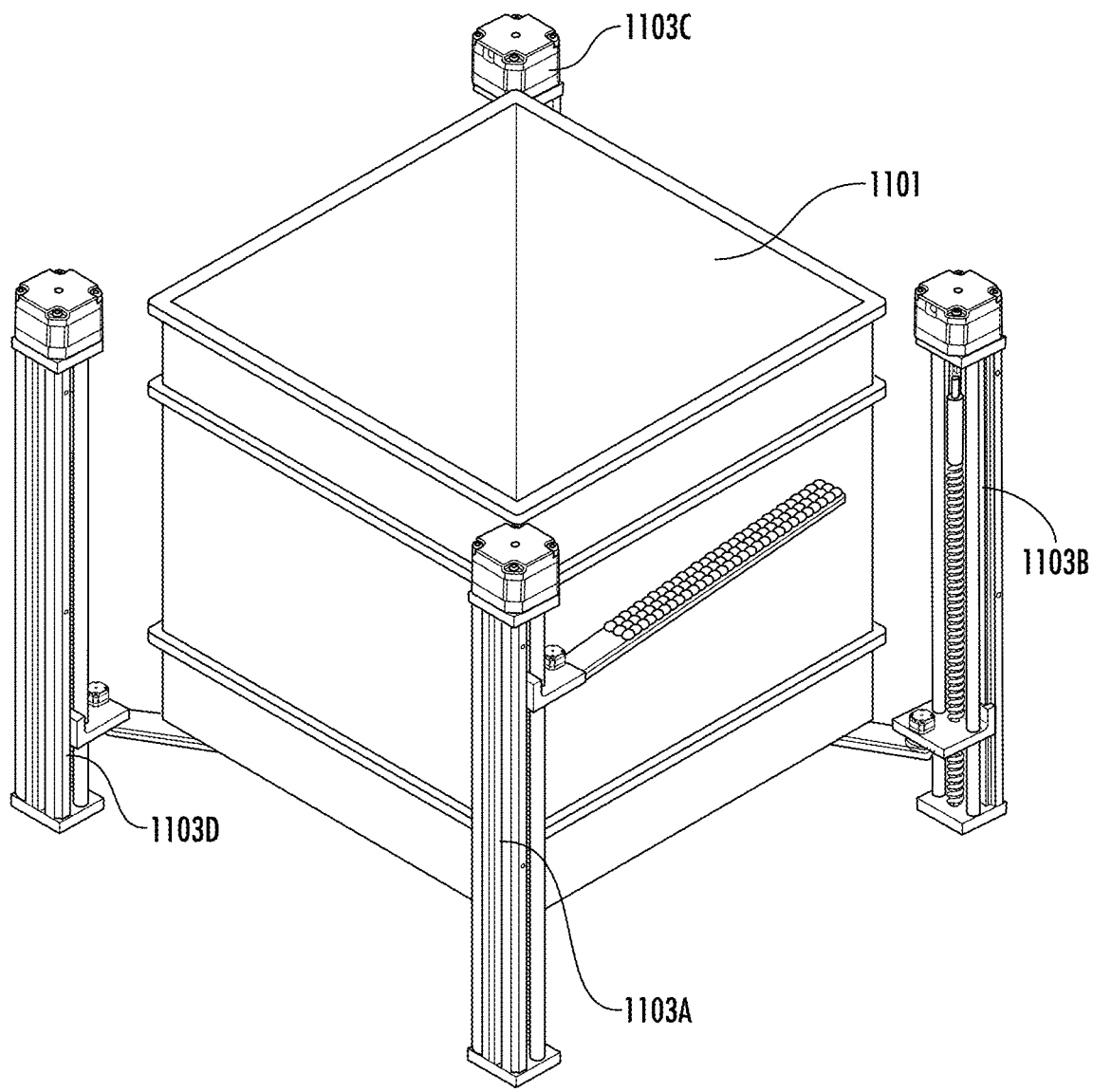
FIG. 11A illustrates example movements of an example rectangular prism in a horizontal direction in accordance with some embodiments of the present disclosure.
Figure 11B:
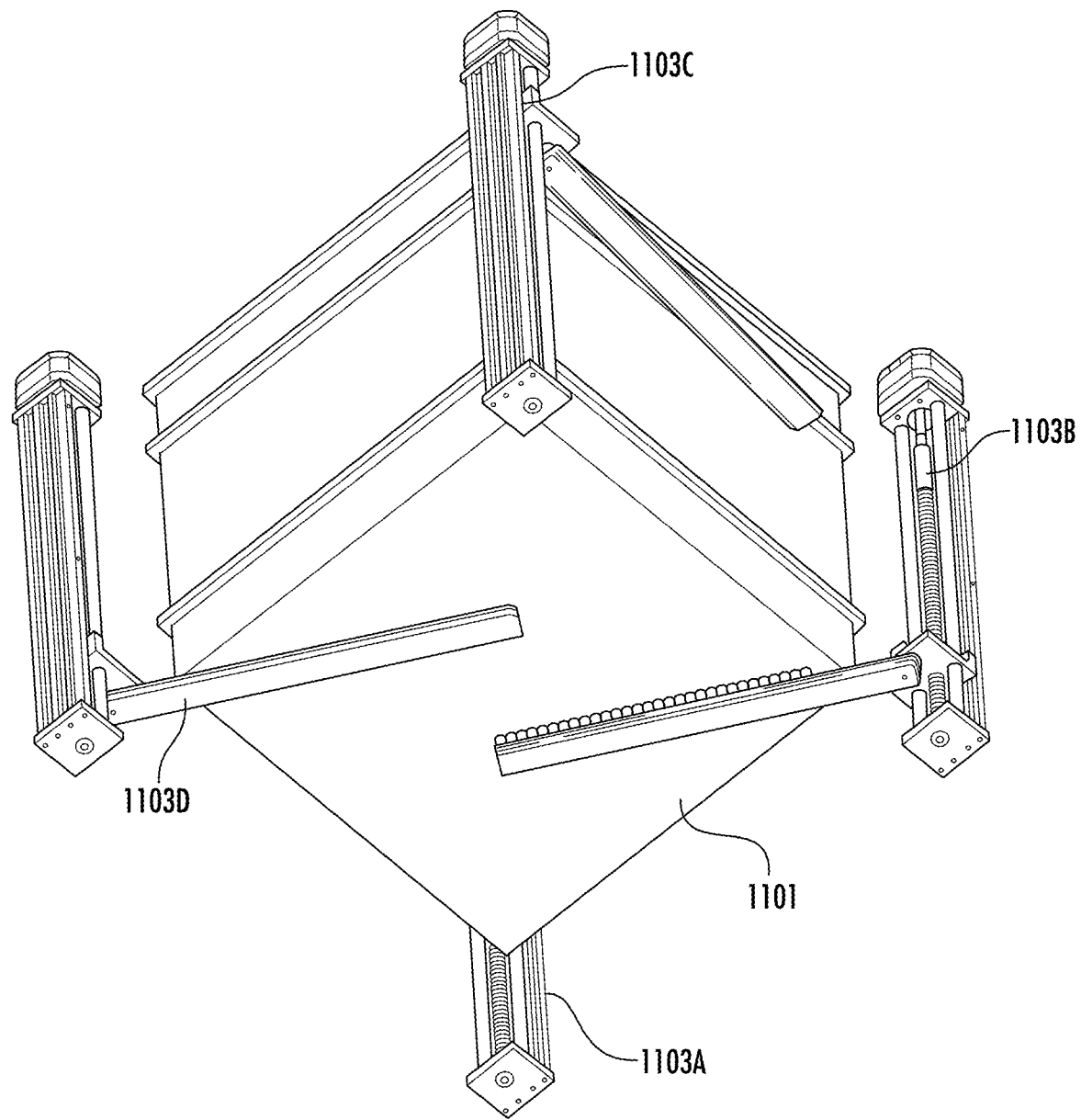
FIG. 11B illustrates example movements of an example rectangular prism in a vertical direction in accordance with some embodiments of the present disclosure.

Referring now to FIG. 11A and FIG. 11B, example movements of an example rectangular prism 1101 caused by example rack actuators shown in FIG. 10 are provided.

In particular, FIG. 11A illustrates example movements of an example rectangular prism 1101 in a horizontal direction. In the example shown in FIG. 11A, the example smart rack comprises a left front lateral rack actuator 1103A, a right front lateral rack actuator 1103B, a left back lateral rack actuator 1103D, and a right back lateral rack actuator 1103C.

In some embodiments, based on the movement instructions, a rack actuator is selected to exert force on the rectangular prism 1101. For example, if the movement instructions indicate a front movement (e.g. the rectangular prism 1101 is to be moved to a front peer smart rack), the left back lateral rack actuator 1103D and/or the right back lateral rack actuator 1103C may be selected to exert force on the rectangular prism 1101. If the movement instructions indicate a back movement (e.g. the rectangular prism 1101 is to be moved to a back peer smart rack), the left front lateral rack actuator 1103A and/or the right front lateral rack actuator 1103B may be selected to exert force on the rectangular prism 1101. If the movement instructions indicate a left movement (e.g. the rectangular prism 1101 is to be moved to a left peer smart rack), the right front lateral rack actuator 1103B and/or the right back lateral rack actuator 1103C may be selected to exert force on the rectangular prism 1101. If the movement instructions indicate a right movement (e.g. the rectangular prism 1101 is to be moved to a right peer smart rack), the left front lateral rack actuator 1103A and the left back lateral rack actuator 1103D may be selected to exert force on the rectangular prism 1101.

In some embodiments, to cause the selected rack actuator to exert force on the rectangular prism 1101, the rotary motor of the selected rack actuator may cause the arm to be rotated towards the outer surface of the rectangular prism 1101. In some embodiments, the rack actuators that are not selected to exert force on the rectangular prism 1101 may provide support for the rectangular prism 1101. For example, arms of the rack actuators that are not selected may be positioned near the bottom of the smart rack and be in contact with the bottom wall of the rectangular prism 1101, so as to prevent the rectangular prism 1101 from falling through.

Referring now to FIG. 11B, example movements of an example rectangular prism 1101 in a vertical direction caused by the rack actuators shown in FIG. 10 are illustrated.

In some embodiments, to cause the example rectangular prism 1101 to move in a vertical direction (e.g. up or down), one or more rack actuators may be moved to be engaged with the bottom wall of the example rectangular prism 1101 or one of the ribs of the example rectangular prism 1101.

For example, as shown in FIG. 11B, the arm of the right front lateral rack actuator 1103B and the arm of the left back lateral rack actuator 1103D may be positioned to be in contact with and support the bottom wall of the rectangular prism 1101. The arm of the left front lateral rack actuator 1103A and the arm of the right back lateral rack actuator 1103C may be positioned to be in contact with a rib of the rectangular prism 1101.

In some embodiments, to cause the example rectangular prism 1101 to transported to a top peer smart rack, the arms of the left front lateral rack actuator 1103A, the right front lateral rack actuator 1103B, the left back lateral rack actuator 1103D, and the right back lateral rack actuator 1103C may travel up along their corresponding lead screws. After the top rib of the example rectangular prism 1101 enters the top peer smart rack, an arm of the rack actuator of the top peer smart rack may become in an engaged mode with the top rib, and may continue lifting the example rectangular prism 1101 up until it is positioned within the top peer smart rack.

In some embodiments, to cause the example rectangular prism 1101 to be transported to a bottom peer smart rack, the arms of the left front lateral rack actuator 1103A, the right front lateral rack actuator 1103B, the left back lateral rack actuator 1103D, and the right back lateral rack actuator 1103C may travel down along their corresponding lead screws. After the bottom rib of the example rectangular prism 1101 enters the bottom peer smart rack, an arm of the rack actuator of the bottom peer smart rack may become in an engaged mode with the bottom rib, and may continue lowering the example rectangular prism 1101 down until it is positioned within the bottom peer smart rack.

Figure 12:
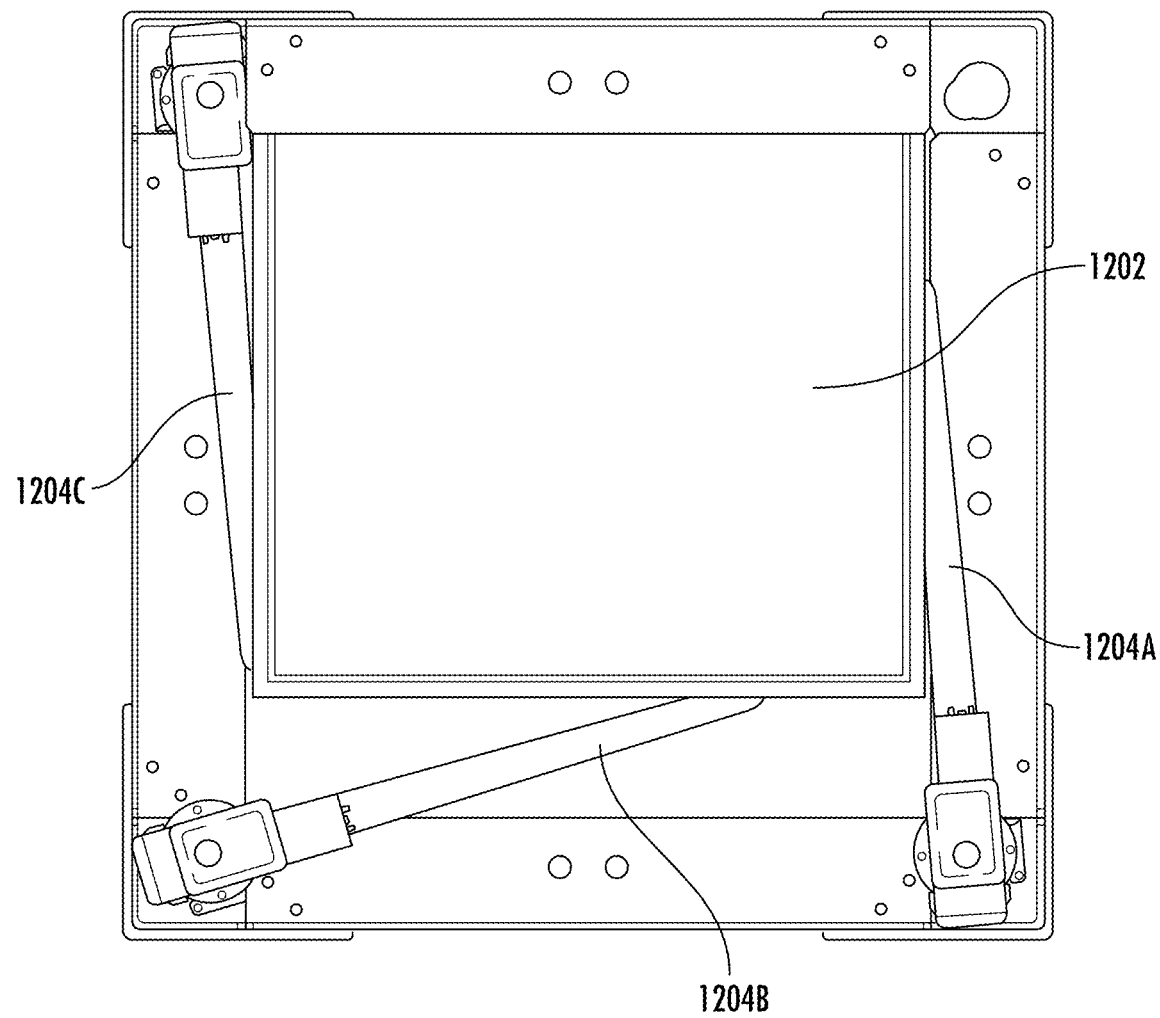
FIG. 12 illustrates example movements of an example rectangular prism in a vertical direction in accordance with some embodiments of the present disclosure.

FIG. 12 illustrates example movements of an example rectangular prism in a vertical direction caused by the example rack actuator shown in FIG. 10 in accordance with some embodiments of the present disclosure.

In the examples shown in FIG. 12, the arm of the example rack actuator 1204A, the arm of the example rack actuator 1204B, and the arm of the example rack actuator 1204C may engaged with a rib of the rectangular prism 1202. Similar to those described above, the arms may cause the rectangular prism 1202 to be lifted up or lowered down.

As described above, an example smart rack in accordance with various embodiments of the present discourse can be connected to up to six peer smart racks: a left peer smart rack, a right peer smart rack, a front peer smart rack, a back peer smart rack, a top peer smart rack, and/or a bottom peer smart rack. In some embodiments, the example smart rack may be configured to cause a rectangular prism within the example smart rack to be transported from one of the six peer smart racks.

In some embodiments, an example smart rack may be a part of a modular superstructure that receives a tote plan from a superstructure controller. For example, the superstructure controller may be configured to generate one or more tote plans, details of which are described herein. In some embodiments, the superstructure controller may transmit a tote plan to one of the smart racks in the modular superstructure at a time interval. In some embodiments, the smart rack that receives the tote plan may comprise dedicated peer-to-peer communication channels with each of its peer smart racks, and may transmit the tote plan to each of its peer smart rack, details of which are described herein.

In some embodiments, the tote plan may comprise one or more movement instructions that request a smart rack to move a rectangular prism that is currently stored in the smart rack to one of its peer smart racks. However, the tote plan does not dictate when the smart rack needs to carry out the movement. Instead, the smart rack may utilize the peer-to-peer communication channels to communicate with one or more of its peer smart racks to determine when the carry out the movement of the rectangular prism (for example, based on when the conditions of the one or more of its peer smart racks are suitable to receive the rectangular prism from the smart rack).

As such, while the tote plan may provide "directive" that may, for example, define one or more tote movement paths for a rectangular prism to move through the smart racks of the modular superstructure, the real time "traffic" of the rectangular prism within the modular superstructure can be managed by peer-to-peer communications between the smart racks without interference or input from the superstructure controller. Through peer-to-peer communications between the smart racks and without reliance on the superstructure controller, each smart rack of the modular superstructure maintains its own set of expected instructions (for example, messages) and only communicates with its direct 6 potential peer smart racks to fulfill the requested moves when/if a space is available in a peer smart rack. By allowing each smart rack to determine its own abilities to meet the request from the tote plan during the time interval in between receiving the tote plans, various embodiments of the present disclosure may provide technical benefits such as, but not limited to, reducing the communication bandwidth that is needed between the superstructure controller and the modular superstructure, while improving the accuracies in tracking and monitoring the real-time traffic of the rectangular prism between the smart racks, detail of which are described herein.

Figure 13:
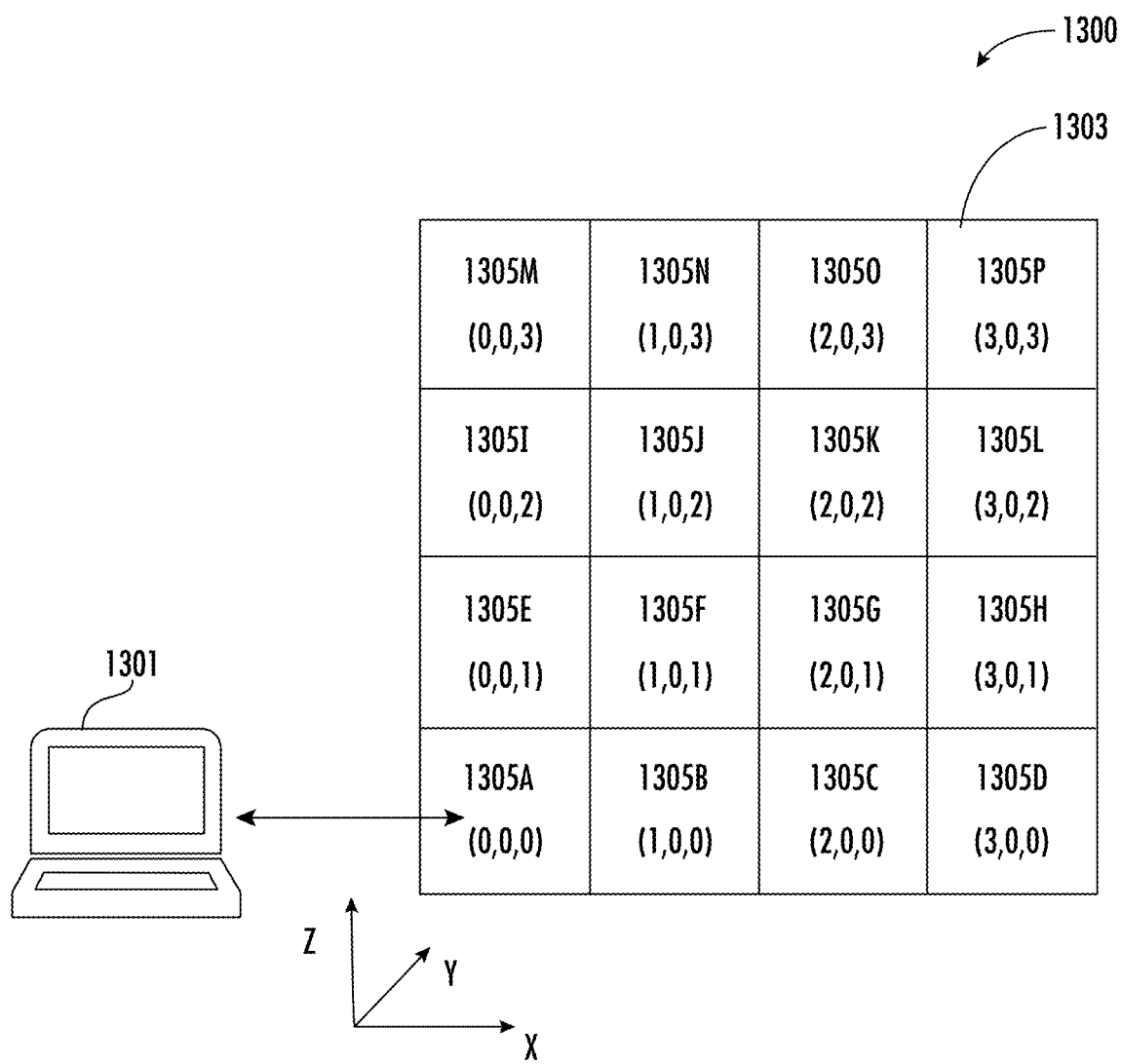
FIG. 13 is an example diagram illustrating example data communications from a superstructure controller to a modular superstructure in accordance with some embodiments of the present disclosure.

Referring now to FIG. 13, an example diagram 1300 is illustrated. In particular, the example diagram 1300 illustrates example data communications between an example superstructure controller 1301 and an example modular superstructure 1303.

In some embodiments, the example modular superstructure 1303 may comprise a plurality of smart racks. In some embodiments, each smart rack is associated with a corresponding rack coordination set that defines a location of the smart rack in a three-dimensional space. For example, the rack coordination set may define a relative position, such as via a set of coordinates in a Cartesian coordinate system, of the smart rack in the modular superstructure 1303.

In some embodiments, each rack coordination set may comprise three coordinates that are defined by their relative positions in the x axis, y axis, and the z axis. In some embodiments, each rack coordination set is in the form of (x, y, z). In some embodiments, the x axis and the y axis are in a perpendicular arrangement with one another and meet at an origin point. The z axis intersects the x axis and the y axis at the origin point, forming right angles with each of the x axis and the y axis. In some embodiments, the origin point may be represented as (0, 0, 0).

In some embodiments, the origin point (0, 0, 0) may be assigned to a smart rack that is positioned at a bottom corner of the example modular superstructure 1303. Additionally, or alternatively, the origin point (0, 0, 0) may be assigned to a smart rack that is positioned at a top corner of the example modular superstructure 1303. Additionally, or alternatively, the origin point (0, 0, 0) may be assigned to a smart rack that is positioned at neither any top corner nor any bottom corner of the example modular superstructure 1303.

In some embodiments, the x axis originates from the origin point and shows locations of smart racks in left and right directions of the modular superstructure 1303 (for example, from the left direction to the right direction of the modular superstructure 1303). For example, a first smart rack associated with the rack coordination set (0, 1, 1) is secured to the left of a second smart rack associated with the rack coordination set (1, 1, 1), as the x coordinate value of the first smart rack decreases by 1 in comparison to the x coordinate value of the second smart rack. As another example, a first smart rack associated with the rack coordination set (2, 1, 1) is secured to the right of a second smart rack associated with the rack coordination set (1, 1, 1), as the x coordinate value of the first smart rack increases by 1 as compared to the x coordinate value of the second smart rack.

In some embodiments, the y axis originates from the origin point and shows locations of smart racks in front and back directions of the modular superstructure 1303 (for example, from the front direction to the back direction of the modular superstructure 1303). For example, a first smart rack associated with the rack coordination set (1, 0, 1) is secured to the front of a second smart rack associated with the rack coordination set (1, 1, 1), as the y coordinate value of the first smart rack decreases by 1 as compared to the y coordinate value of the second smart rack. As another example, a first smart rack associated with the rack coordination set (1, 2, 1) is secured to the back of a second smart rack associated with the rack coordination set (1, 1, 1), as the y coordinate value of the first smart rack increases by 1 as compared to the y coordinate value of the second smart rack.

In some embodiments, the z axis originates from the origin point and shows locations of smart racks in up and down directions of the modular superstructure 1303 (for example, from the bottom direction to the top direction of the modular superstructure 1303). For example, a first smart rack associated with the rack coordination set (1, 1, 0) is secured under a second smart rack associated with the rack coordination set (1, 1, 1), as the z coordinate value of the first smart rack decreases by 1 as compared to the z coordinate value of the second smart rack. As another example, a first smart rack associated with the rack coordination set (1, 1, 2) is secured to the top of a second smart rack associated with the rack coordination set (1, 1, 1), as the z coordinate value of the first smart rack increases by 1 as compared to the z coordinate value of the second smart rack.

In the example shown in FIG. 13, the origin point (0, 0, 0) is assigned to the smart rack 1305A. The smart rack 1305B is secured to the right of the smart rack 1305A, and therefore is assigned the rack coordination set (1, 0, 0). The smart rack 1305C is secured to the right of the smart rack 1305B, and therefore is assigned the rack coordination set (2, 0, 0). The smart rack 1305D is secured to the right of the smart rack 1305C, and therefore is assigned the rack coordination set (3, 0, 0). The smart rack 1305E is secured to the top of the smart rack 1305A, and therefore is assigned the rack coordination set (0, 0, 1). The rack coordination sets of the smart rack 1305F, the smart rack 1305G, the smart rack 1305H, the smart rack 1305I, the smart rack 1305J, the smart rack 1305K, the smart rack 1305L, the smart rack 1305M, the smart rack 1305N, the smart rack 1305O, and the smart rack 1305P may be similarly assigned.

In some embodiments, a superstructure controller 1301 may determine, generate, input, or otherwise execute a tote plan that comprises one or more movement instructions that are to be performed by one or more smart racks simultaneously, near-simultaneously, and/or the like. The one or more movement instructions may define one or more movements of one or more rectangular prisms entering, exiting, and/or being transported within the modular superstructure 1303. In some embodiments, each of the movement instructions may be assigned to one of the smart racks. In some embodiments, each of the smart racks may comprise a processing circuitry that may generate movement messages, and may transmit movement messages to other peer smart rack(s) based on the movement instructions.

However, there are technical challenges associated with transmitting a tote plan to the modular superstructure and executing the tote plan by the smart racks of the modular superstructure. For example, an example modular superstructure may comprise tens, hundreds, or thousands of smart racks. Directly transmitting the tote plan to the processing circuitries of each individual smart rack can consume extensive processing power and communication bandwidth. Moreover, and given the simultaneously, near-simultaneously nature of the required movements, each smart rack advantageously, in some examples, is configured to perform its movements by communicating with its peer smart racks and not, in some examples, with the superstructure controller 1301 (e.g., not a swarm behavior controlled by the superstructure controller 1301).

Various embodiments of the present disclosure overcome the above technical challenges, and provide various technical improvements. For example, various embodiments of the present disclosure may provide a peer-to-peer network between processing circuitries of smart racks to transmit the tote plan. Additionally, each of the processing circuitries of smart racks may individually determine times points as to when to execute the movement instructions within the tote plan that are assigned to the corresponding smart racks, details of which are described herein.

In the example shown in FIG. 13, the superstructure controller 1301 may transmit the tote plan to one of the processing circuitries of the smart racks of the modular superstructure. In some embodiments, the superstructure controller 1301 may transmit the tote plan to only one of the processing circuitries of the smart racks, without transmitting the tote plan to any other processing circuitry of the smart racks. In the example shown in FIG. 13, the superstructure controller 1301 may transmit the tote plan to the processing circuitry of the smart rack that is assigned the origin point (0, 0, 0).

While the description above provides an example of transmitting the tote plan to the smart rack with the rack coordination set (0, 0, 0), it is noted that the scope of the present disclosure is not limited to the description above. In some examples, the superstructure controller 1301 may transmit the tote plan to a different processing circuitry of a different smart rack in the modular superstructure.

As described above, the superstructure controller 1301 may not transmit the tote plan to all of the processing circuitries of all of the smart racks in the modular superstructure. In some embodiments, each processing circuitry may communicate the tote plan to processing circuitries of peer smart racks, details of which are described in connection with at least FIG. 14 and FIG. 15.

As described above, the tote plan may provide movement instructions for one or more of the smart racks. However, the tote plan may not define the time point as to when to execute each individual movement of the tote plan. In some embodiments, each of the processing circuitry of the smart rack may determine when to execute the movement instructions that are assigned to a corresponding smart rack. For example, each of the processing circuitry may transmit one or more movement messages to one or more processing circuitries of one or more peer smart racks. In other words, each smart rack independently works out when to take action without interference by or input from the superstructure controller 1301. As such, example embodiments of the present disclosure allow each smart rack to dynamically execute the tote plan, which may improve the transportation speed and reduce the power consumption as compared to a system that relies on the superstructure controller 1301 to dictate when each smart rack should take action. Example data communications between the processing circuitries of smart racks are described herein, including, but not limited to, those described in connection with at least FIG. 17A to FIG. 18F.

Figure 14:
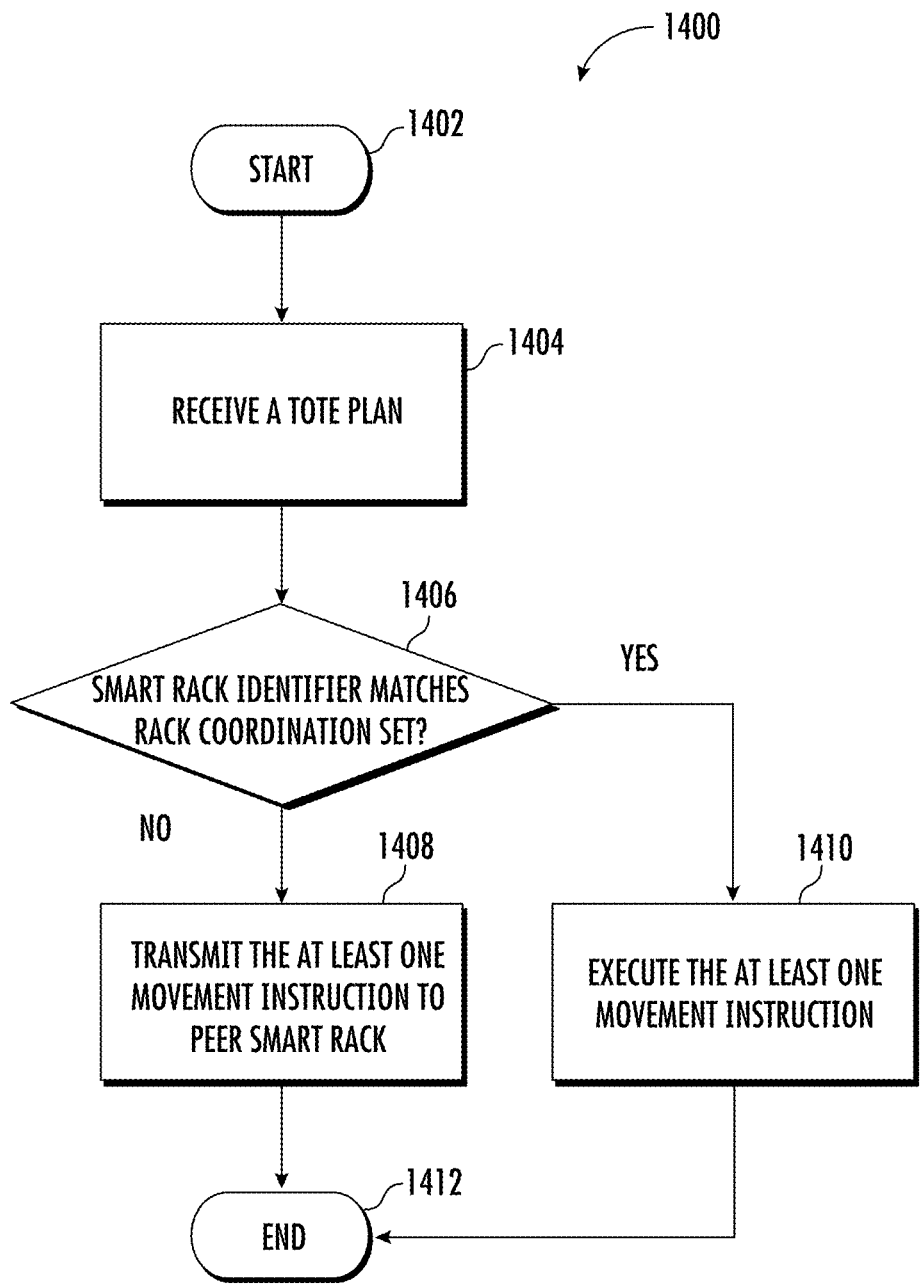
FIG. 14 is an example flow diagram illustrating an example method of transmitting a tote plan to example processing circuitries of smart racks in accordance with some embodiments of the present disclosure.

Referring now to FIG. 14, an example flow diagram illustrating an example method 1400 of transmitting a tote plan to example processing circuitries of smart racks in an example modular superstructure in accordance with some embodiments of the present disclosure is illustrated.

In the example shown in FIG. 14, the example method 1400 starts at step/operation 1402. In some embodiments, subsequent to step/operation 1402, the example method 1400 proceeds to step/operation 1404. At step/operation 1404, a processing circuitry (such as, but not limited to, a processing circuitry of a smart rack in accordance with various embodiments described herein) receives a tote plan from a superstructure controller.

As described above, the tote plan may comprise movement instructions assigned to one or more of the smart racks in the modular superstructure. In some embodiments, each of the movement instructions may comprise a smart rack identifier and a movement indication.

In some embodiments, the smart rack identifier may describe, indicate and/or otherwise identify a particular smart rack from the smart racks in the modular superstructure. In some embodiments, the movement indication may describe, indicate and/or otherwise identify a movement of a rectangular prism to be executed by that particular smart rack.

For example, a movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise a down movement indication, which shows that the movement instruction requests the smart rack with rack coordination set (1, 1, 1) to move a rectangular prism down to the bottom peer smart rack with rack coordination set (1, 1, 0).

As another example, a movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise an up movement indication, which shows that the movement instruction requests the smart rack with rack coordination set (1, 1, 1) to move a rectangular prism up to the top peer smart rack with rack coordination set (1, 1, 2).

As another example, a movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise a front movement indication, which shows that the movement instruction requests the smart rack with rack coordination set (1, 1, 1) to move a rectangular prism to a front peer smart rack with rack coordination set (1, 0, 1).

As another example, movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise a back movement indication, which shows that the movement instruction requests the smart rack with rack coordination set (1, 1, 1) to move a rectangular prism to a back peer smart rack with rack coordination set (1, 2, 1).

As another example, a movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise a left movement indication, which shows that the movement instruction requests the smart rack with rack coordination set (1, 1, 1) to move a rectangular prism to a left peer smart rack with rack coordination set (0, 1, 1).

As another example, a movement instruction from the tote plan may comprise a smart rack identifier of (1, 1, 1), which indicates that the movement instruction is for a smart rack in the modular superstructure with the corresponding rack coordination set (1, 1, 1). The movement instruction may comprise a front movement indication, which shows that the movement instruction requests the smart rack with rack coordination set (1, 1, 1) to move a rectangular prism to a right peer smart rack with rack coordination set (2, 1, 1).

Referring back to FIG. 14, subsequent to step/operation 1404, the example method 1400 proceeds to step/operation 1406. At step/operation 1406, a processing circuitry (such as, but not limited to, a processing circuitry of a smart rack in accordance with various embodiments described herein) determines whether the smart rack identifier from the movement instruction in the tote plan matches the rack coordination set of the smart rack that receive the tote plan at step/operation 1404.

For example, at step/operation 1404, a smart rack associated with the rack coordination set (1, 1, 1) may receive the tote plan. The tote plan may provide a movement instruction with a smart rack identifier of (0, 1, 1). In such an example, the smart rack identifier (0, 1, 1) does not match the rack coordination set (1, 1, 1) of the smart rack, indicating that the movement indication defined by the movement instruction is not for the smart rack that receives the tote plan.

As an example, at step/operation 1404, a smart rack associated with the rack coordination set (1, 1, 1) may receive the tote plan. The tote plan may provide a movement instruction with a smart rack identifier of (1, 1, 1). In such an example, the smart rack identifier (1, 1, 1) matches the rack coordination set (1, 1, 1) of the smart rack, indicating that the movement indication defined by the movement instruction is for the smart rack that receives the tote plan.

Referring back to FIG. 14, if, at step/operation 1406, the processing circuitry determines that the smart rack identifier does not match the rack coordination set, the example method 1400 proceeds to step/operation 1408. At step/operation 1408, a processing circuitry (such as, but not limited to, a processing circuitry of a smart rack in accordance with various embodiments described herein) transmits the tote plan to at least one peer smart rack of the smart rack.

As described above, a peer smart rack of a smart rack is another smart rack that is secured to, in physical connection with, or is otherwise linked to the smart rack. In some embodiments, a processing circuitry of a smart rack may provide direct data communications with processing circuitries of peer smart racks through dedicated communication channels (for example, input/output (I/O) channels), details of which are described herein. In the present disclosure, the processing circuitry of a peer smart rack is also referred to as a peer processing circuitry.

In some embodiments, the at least one peer smart rack comprises at least one of a top peer smart rack, a bottom peer smart rack, a front peer smart rack, a back peer smart rack, a left peer smart rack, and/or a right peer smart rack. For example, a top peer smart rack of a smart rack may be secured above the smart rack through, for example but not limited to, one or more connector plates described above. As another example, a bottom peer smart rack of a smart rack may be secured under the smart rack through, for example but not limited to, one or more connector plates described above. As another example, a left peer smart rack of a smart rack may be secured to the left of the smart rack through, for example but not limited to, one or more connector plates described above. As another example, a right peer smart rack of a smart rack may be secured to the right of the smart rack through, for example but not limited to, one or more connector plates described above. As another example, a front peer smart rack of a smart rack may be secured to the front of the smart rack through, for example but not limited to, one or more connector plates described above. As another example, a back peer smart rack of a smart rack may be secured to the back of the smart rack through, for example but not limited to, one or more connector plates described above.

Figure 15:
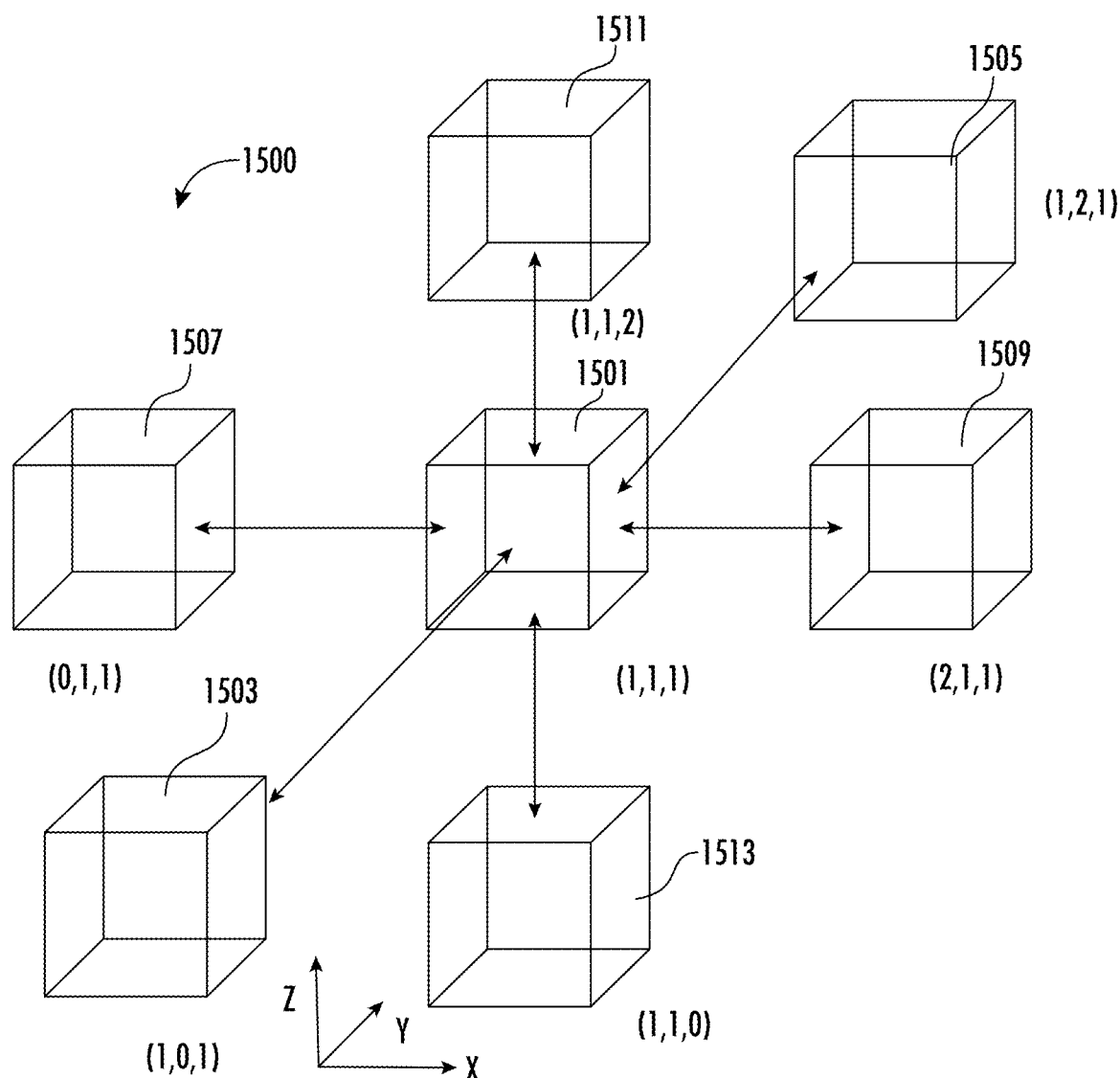
FIG. 15 illustrates example input/out (I/O) data communications between an example processing circuitry of an example smart rack and other example processing circuitry(s) of example peer smart rack(s) in accordance with some embodiments of the present disclosure.

Referring now to FIG. 15, an example diagram 1500 showing a plurality of smart racks in accordance with some embodiments of the present disclosure is provided.

In the example shown in FIG. 15, the processing circuitry of the smart rack 1501 associated with the rack coordination set (1, 1, 1) may receive one or more portions of a tote plan, and may determine whether one or more movement instructions from those one or more portions of the tote plan are associated with smart rack identifier(s) that match the rack coordination set (1, 1, 1) of the smart rack 1501.

In some embodiments, the processing circuitry of the smart rack 1501 may determine that at least one of the one or more movement instructions is associated with the smart rack identifier that matches the rack coordination set (1, 1, 1) of the smart rack 1501. In such an example, the processing circuitry of the smart rack 1501 may store and/or execute at least one of the one or more movement instructions, details of which are described herein.

In some embodiments, the processing circuitry of the smart rack 1501 may determine that at least one of the one or more movement instructions is not associated with the smart rack identifier that matches the rack coordination set (1, 1, 1) of the smart rack 1501. In such an example, the processing circuitry of the smart rack 1501 may transmit the tote plan to some or all of the peer smart racks of the smart rack 1501, including the top peer smart rack (e.g. the smart rack 1511), the bottom peer smart rack (e.g. the smart rack 1513), the front peer smart rack (e.g. the smart rack 1503), the back peer smart rack (e.g. the smart rack 1505), the left peer smart rack (e.g. the smart rack 1507), and the right peer smart rack (e.g. the smart rack 1509).

In some embodiments, the processing circuitry of the smart rack 1501 may provide six input/output (I/O) communication channels, and each of the six data I/O communication channels communicates with one of the six peer smart racks. For example, the processing circuitry of the smart rack 1501 may be in the form of a Raspberry Pi with a dedicated data I/O communication channel or interface for each of the all six sides. (e.g. a front peer smart rack, a back peer smart rack, a top peer smart rack, a bottom peer smart rack, a left peer smart rack, and a right peer smart rack). In some embodiments, the processing circuitry of the smart rack 1501 may provide a communication interface for each of the peer smart racks for peer-to-peer connection. Additionally, or alternatively, the processing circuitry of the smart rack 1501 may be in other forms and/or embedded as other processing circuitries.

As described above, the processing circuitry of the smart rack 1501 may provide a communication interface for each of the peer smart racks for peer-to-peer connection. For example, the processing circuitry of the smart rack 1501 may comprise a data I/O communication channel/interface for a front peer smart rack for providing direct data communications between the smart rack 1501 and the front peer smart rack (e.g. the smart rack 1513). Additionally, or alternatively, the processing circuitry of the smart rack 1501 may comprise a data I/O communication channel/interface for a back peer smart rack for providing direct data communications between the smart rack 1501 and the back peer smart rack (e.g. the smart rack 1505). Additionally, or alternatively, the processing circuitry of the smart rack 1501 may comprise a data I/O communication channel/interface for a left peer smart rack for providing direct data communications between the smart rack 1501 and the left peer smart rack (e.g. the smart rack 1507). Additionally, or alternatively, the processing circuitry of the smart rack 1501 may comprise a data I/O communication channel/interface for a right peer smart rack for providing direct data communications between the smart rack 1501 and the right peer smart rack (e.g. the smart rack 1509). Additionally, or alternatively, the processing circuitry of the smart rack 1501 may comprise a data I/O communication channel/interface for a top peer smart rack for providing direct data communications between the smart rack 1501 and the top peer smart rack (e.g. the smart rack 1511). Additionally, or alternatively, the processing circuitry of the smart rack 1501 may comprise a data I/O communication channel/interface for a bottom peer smart rack for providing direct data communications between the smart rack 1501 and the bottom peer smart rack (e.g. the smart rack 1513).

As an example, the processing circuitry of the smart rack 1501 may include a CAN interface for establishing a communication interface with one or more peer processing circuitries of one or more of the peer smart racks. Additionally, or alternatively, the processing circuitry of the smart rack 1501 may include a RS 485 interface for establishing a communication interface with one or more peer processing circuitries of one or more of the peer smart racks. Additionally, or alternatively, the processing circuitry of the smart rack 1501 may include a UART interface for establishing a communication interface with one or more peer processing circuitries of one or more of the peer smart racks.

For example, the processing circuitry of the smart rack 1501 may be in the form of a Raspberry Pi. In some embodiments, the processing circuitry of the smart rack 1501 may include one or more CAN interfaces for establishing data I/O communication channels/interfaces with one or more peer processing circuitries of one or more of the peer smart racks. For example, the processing circuitry of the smart rack 1501 may comprise one CAN interface for each peer smart rack, where the CAN interface establishes a data I/O communication channel/interface with a CAN interface of a processing circuitry of a peer smart rack. In some embodiments, the one or more CAN interfaces of the smart rack 1501 may be connected in serial.

Additionally, or alternatively, the processing circuitry of the smart rack 1501 may include a RS 485 interface for establishing a data I/O communication channel/interface with one of the peer processing circuitries of one or more of the peer smart racks.

Additionally, or alternatively, the processing circuitry of the smart rack 1501 may include a UART interface for establishing a data I/O communication channel/interface with one of the peer processing circuitries of one or more of the peer smart racks.

The table below illustrates example characteristic of different data I/O communication channels/interfaces.

|  | RS485 | CAN | CAN FD | UART |
|---|---|---|---|---|
| Data Rate | 10 Mbps | 1 Mbps | 8 Mbps | 5 Mbps |
| Distance | 1200 m | 250 m | 250 m | 15 m |
| Nodes | 32 | 30 | 30 | 32 |
| Wires | 2 | 2 | 2 | 3 |
| Error Detection | No | Yes | Yes | No |

Referring back to FIG. 15, in some embodiments, in response to determining that at least one of the one or more movement instructions is not associated with the smart rack identifier that matches the rack coordination set (1, 1, 1) of the smart rack 1501, the processing circuitry of the smart rack 1501 may transmit the at least one of the one or more movement instructions that is not associated with the smart rack identifier (1, 1, 1) to the processing circuitry of the smart rack 1503 associated with the rack coordination set (1, 0, 1). For example, the processing circuitry of the smart rack 1501 may transmit the at least one of the one or more movement instructions through a dedicated data I/O communication channel/interface, similar to those described above. In this example, the smart rack 1503 is a front peer smart rack of the smart rack 1501.

Additionally, or alternatively, the processing circuitry of the smart rack 1501 may transmit the at least one of the one or more movement instructions that is not associated with the smart rack identifier (1, 1, 1) to the processing circuitry of the smart rack 1505 associated with the rack coordination set (1, 2, 1). For example, the processing circuitry of the smart rack 1501 may transmit the at least one of the one or more movement instructions through a dedicated data I/O communication channel/interface, similar to those described above. In this example, the smart rack 1505 is a back peer smart rack of the smart rack 1501.

Additionally, or alternatively, the processing circuitry of the smart rack 1501 may transmit the at least one of the one or more movement instructions that is not associated with the smart rack identifier (1, 1, 1) to the processing circuitry of the smart rack 1507 associated with the rack coordination set (0, 1, 1). For example, the processing circuitry of the smart rack 1501 may transmit the at least one of the one or more movement instructions through a dedicated data I/O communication channel/interface, similar to those described above. In this example, the smart rack 1507 is a left peer smart rack of the smart rack 1501.

Additionally, or alternatively, the processing circuitry of the smart rack 1501 may transmit the at least one of the one or more movement instructions that is not associated with the smart rack identifier (1, 1, 1) to the processing circuitry of the smart rack 1509 associated with the rack coordination set (2, 1, 1). For example, the processing circuitry of the smart rack 1501 may transmit the at least one of the one or more movement instructions through a dedicated data I/O communication channel/interface, similar to those described above. In this example, the smart rack 1509 is a right peer smart rack of the smart rack 1501.

Additionally, or alternatively, the processing circuitry of the smart rack 1501 may transmit the at least one of the one or more movement instructions that is not associated with the smart rack identifier (1, 1, 1) to the processing circuitry of the smart rack 1511 associated with the rack coordination set (1, 1, 2). For example, the processing circuitry of the smart rack 1501 may transmit the at least one of the one or more movement instructions through a dedicated data I/O communication channel/interface, similar to those described above. In this example, the smart rack 1511 is a top peer smart rack of the smart rack 1501.

Additionally, or alternatively, the processing circuitry of the smart rack 1501 may transmit the at least one of the one or more movement instructions that is not associated with the smart rack identifier (1, 1, 1) to the processing circuitry of the smart rack 1513 associated with the rack coordination set (1, 1, 0). For example, the processing circuitry of the smart rack 1501 may transmit the at least one of the one or more movement instructions through a dedicated data I/O communication channel/interface, similar to those described above. In this example, the smart rack 1513 is a bottom peer smart rack of the smart rack 1501.

In some embodiments, the processing circuitry of the smart rack 1501 may transmit the at least one of the one or more movement instructions that is not associated with the smart rack identifier that matches the rack coordination set (1, 1, 1) of the smart rack 1501 to all of the peer processing circuitries to all of the peer smart racks, similar to those described above.

In some embodiments, subsequent to the processing circuitry of a peer smart rack receiving the at least one of the one or more movement instructions from the tote plan, the processing circuitry of the peer smart rack may carry out the example method 1400 shown in FIG. 14. For example, the processing circuitry of a peer smart rack may determine whether the at least one of the one or more movement instructions from the tote plan is associated with the smart rack identifier of the peer smart rack. If not, the processing circuitry of the peer smart rack carries out the step/operation 1408 of FIG. 14 described above. If so, the processing circuitry of the peer smart rack carries out the step/operation 1410 of FIG. 14 described herein.

Referring back to FIG. 14, if, at step/operation 1406, the processing circuitry determines that the smart rack identifier matches the rack coordination set, the example method 1400 proceeds to step/operation 1410. At step/operation 1410, a processing circuitry (such as, but not limited to, a processing circuitry of a smart rack in accordance with various embodiments described herein) may execute the movement instruction(s) by generating movement messages and transmitting movement messages to other peer smart racks.

In some embodiments, in response to determining that the smart rack identifier of the tote plan matches the rack coordination set of the smart rack, the controller device executes at least one movement instruction of the tote plan.

As described above, given the simultaneously, near-simultaneously nature of the required movements, each smart rack advantageously, in some examples, is configured to perform its movements by communicating with its peer smart racks and not with the superstructure controller 1301 (e.g., not a swarm behavior defined by the superstructure controller 1301). For example, the movement instructions from the tote plan do not describe or dictate the time as to when to execute each movement instruction. Instead, the processing circuitry of each smart rack may determine whether the conditions of the smart rack (and its peer smart rack) are suitable for carrying out the movement instruction through, for example but not limited to, generating movement messages and transmitting movement messages to the peer processing circuitries of the peer smart racks. Additional details of movement messages are described herein, including, but not limited to, those described in connection with at least FIG. 17A to FIG. 18F.

Referring back to FIG. 14, subsequent to step/operation 1408 and step/operation 1410, the example method 1400 proceeds to step/operation 1412 and ends.

Figure 16:
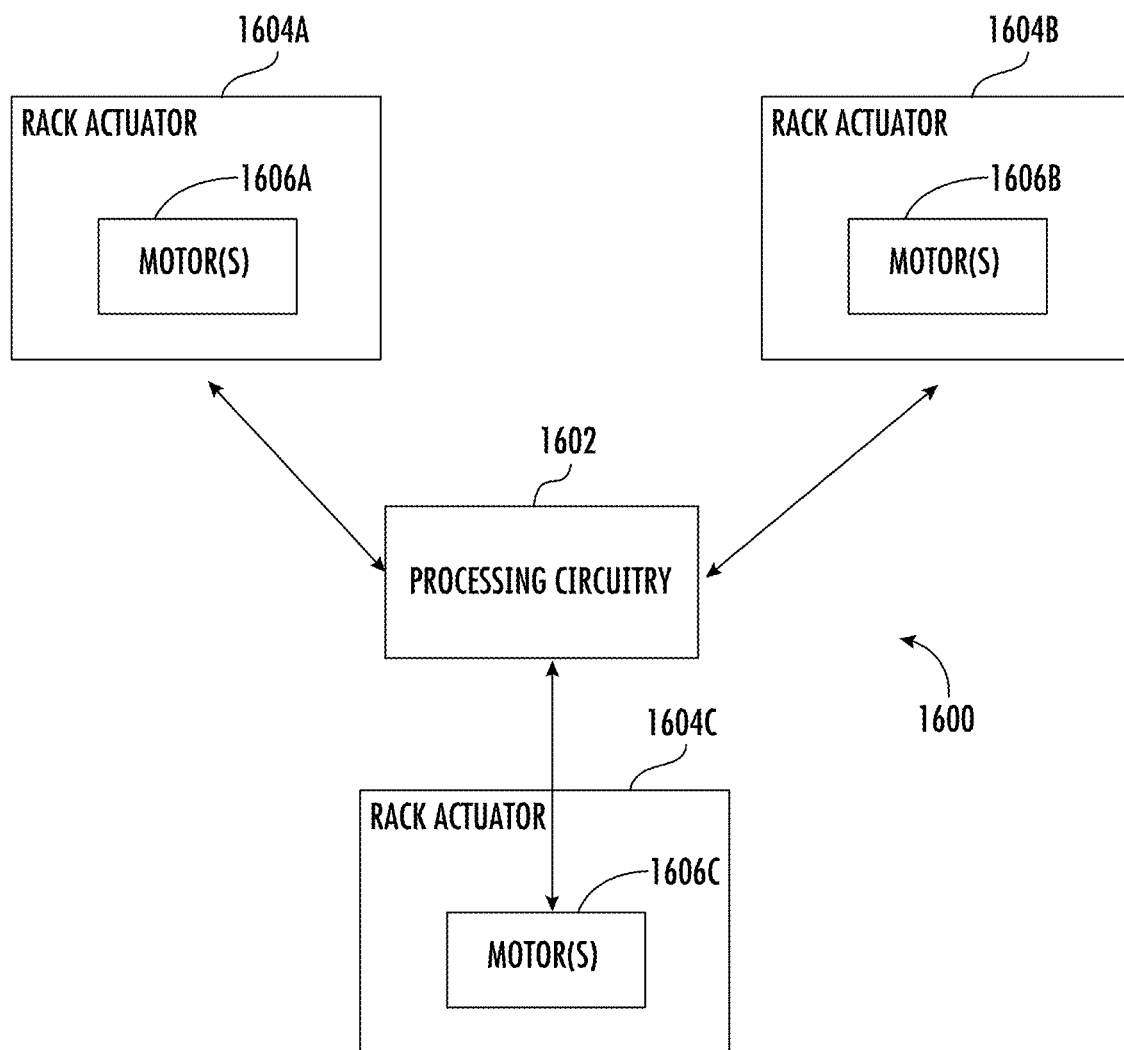
FIG. 16 is an example block diagram of example data communications between an example processing circuitry and example rack actuator(s) of the smart rack in accordance with some embodiments of the present disclosure.

Referring now to FIG. 16, an example block diagram 1600 illustrates example data communications between an example processing circuitry and example rack actuator(s) of the smart rack in accordance with some embodiments of the present disclosure.

In the example shown in FIG. 16, the example smart rack comprises a rack actuator 1604A, a rack actuator 1604B, and a rack actuator 1604C. In some embodiments, each of the rack actuator 1604A, the rack actuator 1604B, and the rack actuator 1604C is similar to the various example rack actuators described herein.

For example, the rack actuator 1604A may comprise one or more motors 1606A. The one or more motors 1606A may include, but not limited to, a linear motor that causes an arm of the rack actuator 1604A to switch between an engaged mode and a disengaged mode, as well as a step motor that causes the arm of the rack actuator 1604A to move to various positions.

Similarly, the rack actuator 1604B may comprise one or more motors 1606B. The one or more motors 1606B may include, but not limited to, a linear motor that causes an arm of the rack actuator 1604B switch between an engaged mode and a disengaged mode, as well as a step motor that causes the arm of the rack actuator 1604B to move to various positions.

Similarly, the rack actuator 1604C may comprise one or more motors 1606C. The one or more motors 1606C may include, but not limited to, a linear motor that causes an arm of the rack actuator 1604C switch between an engaged mode and a disengaged mode, as well as a step motor that causes the arm of the rack actuator 1604C to move to various positions.

In some embodiments, as part of executing the movement instructions and the movement messages, the processing circuitry 1602 may transmit instructions to the one or more motors of the smart racks. In some embodiments, the processing circuitry 1602 may transmit instructions to the motor(s) 1606A of the rack actuator 1604A, the motor(s) 1606B of the rack actuator 1604B, and/or the motor(s) 1606C of the rack actuator 1604C, so as to cause the arm of the rack actuator 1604A, the arm of the rack actuator 1604B, and/or the arm of the rack actuator 1604C to move to various positions and/or to switch between the engaged mode and the disengaged mode.

For example, in response to receiving a movement instruction in the tote plan with the smart rack identifier matching the rack coordination set of the smart rack, the processing circuitry of the smart rack may determine to move a rectangular prism from the smart rack to a peer smart rack, and/or to cause a peer smart rack to move its rectangular prism so that the smart rack can transport the rectangular prism to the peer smart rack. In some embodiments, the processing circuitry of the smart rack generate and transmit a MoveReady message to one of its peer smart racks.

As an example, the processing circuitry 1602 is the processing circuitry of the peer smart rack, and may receive the MoveReady message. In response to receiving the MoveReady message, the processing circuitry may transmit instructions the motor(s) 1606A of the rack actuator 1604A, the motor(s) 1606B of the rack actuator 1604B, and/or the motor(s) 1606C of the rack actuator 1604C, so as to cause the arm of the rack actuator 1604A, the arm of the rack actuator 1604B, and/or the arm of the rack actuator 1604C to be in their corresponding positions/modes and ready to cause movements of a rectangular prism. Additional details associated with the MoveReady messages are described herein.

As another example, the processing circuitry of the smart rack may determine that the peer smart rack is ready to receive a rectangular prism from the smart rack, and/or that the peer smart rack is ready to move its rectangular prism to another smart rack. In some embodiments, the processing circuitry of the smart rack generates and transmits a MoveRequest message to one of its peer smart racks.

As an example, the processing circuitry 1602 is the processing circuitry of the peer smart rack, and may receive the MoveRequest message. In response to receiving the MoveReady message, the processing circuitry may transmit instructions the motor(s) 1606A of the rack actuator 1604A, the motor(s) 1606B of the rack actuator 1604B, and/or the motor(s) 1606C of the rack actuator 1604C, so as to cause the arm of the rack actuator 1604A, the arm of the rack actuator 1604B, and/or the arm of the rack actuator 1604C to cause movements of a rectangular prism. Additional details associated with the MoveRequest messages are described herein.

While the example shown in FIG. 16 provides an example smart rack comprising three rack actuators, it is noted that the scope of the present disclosure is not limited to this example. In some examples, an example smart rack may comprise less than three rack actuators or more than three rack actuators.

Referring now to FIG. 17A, FIG. 17B, FIG. 17C, and FIG. 17D, example data communications between example smart racks for executing an example tote plan in accordance with some embodiments of the present disclosure are illustrated.

Figure 17A:
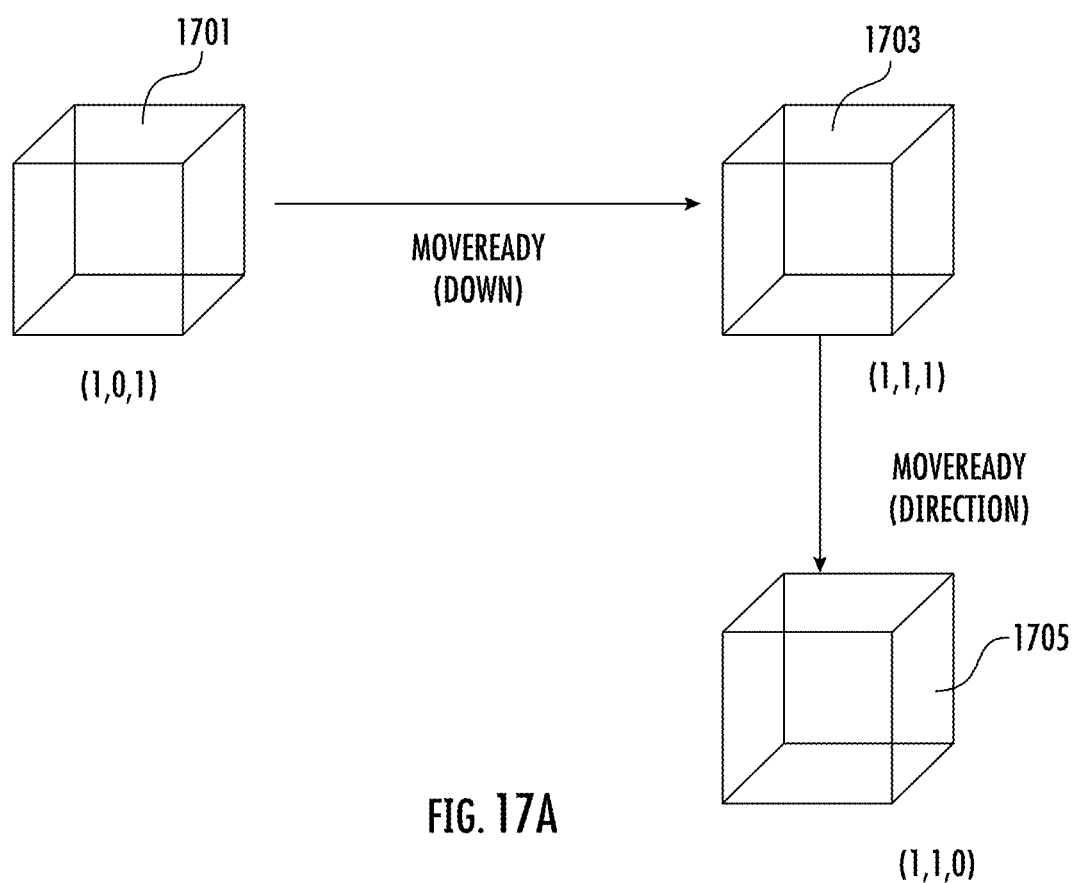
FIG. 17A illustrates example data communications between example smart racks to request one or more smart racks to be ready for transporting a rectangular prism in accordance with some embodiments of the present disclosure.

In the example shown in FIG. 17A, an example smart rack 1701 associated with the rack coordination set (1, 0, 1), an example smart rack 1703 associated with the rack coordination set (1, 1, 1), and an example smart rack 1705 associated with the rack coordination set (1, 1, 0) are illustrated. Based on their corresponding rack coordination sets, the example smart rack 1703 is positioned to the right of the smart rack 1701, and the example smart rack 1705 is positioned under the example smart rack 1703.

In some embodiments, the example smart rack 1701 may receive a movement instruction that is a part of the tote plan. As an example, the tote plan may request the example smart rack 1701 to move a rectangular prism from the example smart rack 1701 to the example smart rack 1703.

However, the example smart rack 1703 may not be in a suitable condition and/or may not be ready to receive the smart rack 1703. For example, the example smart rack 1703 may currently store a rectangular prism and cannot receive the rectangular prism from the example smart rack 1701. In such an example, in order to execute the movement instruction, the example smart rack 1701 may request the example smart rack 1703 to move the rectangular prism that is currently stored in the example smart rack 1703 downwards to the example smart rack 1705.

For example, the example smart rack 1701 may transmit a MoveReady message to the example smart rack 1703. As an example, a processing circuitry of the example smart rack 1701 may transmit the MoveReady message to a processing circuitry of the example smart rack 1703 through the dedicated data I/O communication channel. In some embodiments, the MoveReady message from the example smart rack 1701 indicates a request from the example smart rack 1701 to the example smart rack 1703 to move its rectangular prism downwards to the example smart rack 1705.

In some examples, the communications between the smart racks 1701 and 1703 is an example of smart racks executing movements without the superstructure controller 1301 (e.g., swarm behavior).

For example, while the movement instruction from the tote plan generated by the superstructure controller 1301 and received by the example smart rack 1701 may describe causing the movement of the example rectangular prism from the example smart rack 1701 to the example smart rack 1703, the movement instruction does not specify when to cause such a movement. In some embodiments, the processing circuitry of the example smart rack 1701 (and not the superstructure controller 1301) may determine when to cause such a movement based on determining whether/when the smart rack 1701 is in a suitable condition to cause the rectangular prism to be transported to the smart rack 1703, and whether/when the smart rack 1703 is in a suitable conduction to receive the rectangular prism from the smart rack 1701. If the smart rack 1703 is not in a suitable conduction to receive the rectangular prism from the smart rack 1701 (e.g. if another rectangular prism may currently be stored in the example smart rack 1703), the smart rack 1701 may transmit a MoveReady message to the smart rack 1703 to request the smart rack 1703 to move the rectangular prism that is currently stored in the example smart rack 1703.

In some embodiments, upon receiving the MoveReady message, the processing circuitry of the example smart rack 1703 may cause the motors of the example smart rack 1703 to be in position to cause the rectangular prism to be transported out of the example smart rack 1703. For example, the example smart rack 1703 may be in position to move the rectangular prism from the example smart rack 1703 to the example smart rack 1705.

In some embodiments, the processing circuitry of the example smart rack 1703 (and not the superstructure controller 1301) may determine when to cause such a movement based on determining whether the smart rack 1703 is in a suitable condition to cause the rectangular prism to be transported, and whether the smart rack 1705 is in a suitable conduction to receive the smart rack from the smart rack 1703. For example, the example smart rack 1703 may generate and/or transmit a MoveReady message to the example smart rack 1705. For example, a processing circuitry of the example smart rack 1703 may generate and/or transmit the MoveReady message to a processing circuitry of the example smart rack 1705. In this example, the MoveReady message may describe a request from the example smart rack 1703 to the example smart rack 1705 to confirm that the example smart rack 1705 is ready to receive the rectangular prism from the example smart rack 1703.

While the description above provides an example of the smart rack 1701 transmitting the MoveReady message to the smart rack 1703 to request the smart rack 1703 to move its rectangular prism, it is noted that the scope of the present disclosure is not limited to the description above. In some embodiments, the smart rack 1703 may determine to move the rectangular prism stored in the smart rack 1703 without the MoveReady message from the smart rack 1701. For example, the smart rack 1703 may receive a movement instruction that requests the smart rack 1703 to move the rectangular prism from the smart rack 1703 to the smart rack 1705. Similar to those described above, the processing circuitry of the smart rack 1703 may determine when to move the rectangular prism from the smart rack 1703 to the smart rack 1705 without any input or interference from the superstructure controller 1301. For example, the smart rack 1703 may transmit a MoveReady message to the smart rack 1705, similar to those described above.

Figure 17B:
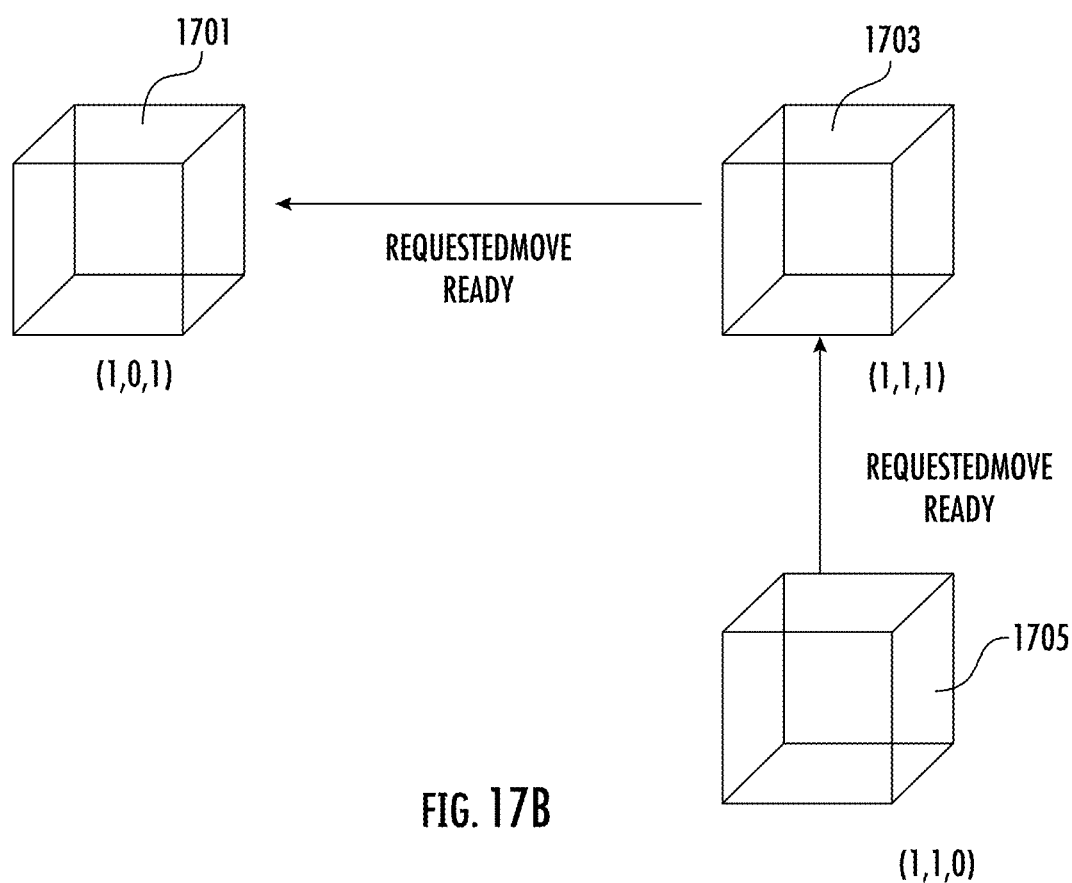
FIG. 17B illustrates example data communications between example smart racks to notify that one or more smart racks are ready for transporting a rectangular prism in accordance with some embodiments of the present disclosure.

In some embodiments, upon receiving the MoveReady message, the processing circuitry of the example smart rack 1705 may cause the motors of the example smart rack 1705 to be in position to receive the rectangular prism from the example smart rack 1703. In some embodiments, subsequent to motors of the example smart rack 1705 being in position, the example smart rack 1705 may transmit a RequestedMoveReady message to the example smart rack 1703 as shown in FIG. 17B. In some embodiments, the RequestedMoveReady message describes that the example smart rack 1705 is ready for the movement described in the MoveReady message. For example, the RequestedMoveReady message may indicate to the example smart rack 1703 that the example smart rack 1705 is ready to receive the rectangular prism from the example smart rack 1703.

Referring now to FIG. 17B, example data communications between the example smart rack 1701, the example smart rack 1703, and the example smart rack 1705 are illustrated. In particular, FIG. 17B illustrates example data communications subsequent to the example data communications shown in FIG. 17A.

As described above, subsequent to receiving the MoveReady message from the example smart rack 1703, the example smart rack 1705 may cause the motors of the example smart rack 1705 to be in position to receive the rectangular prism from the example smart rack 1703. In some embodiments, after the motors of the example smart rack 1705 are in position, the example smart rack 1705 may generate and transmit a RequestedMoveReady message to the example smart rack 1703. For example, a processing circuitry of the example smart rack 1705 may transmit the RequestedMoveReady message to a processing circuitry of the example smart rack 1703. As described above, the RequestedMoveReady message may indicate to the example smart rack 1703 that the example smart rack 1705 is ready to receive the rectangular prism from the example smart rack 1703.

Similarly, subsequent to receiving the MoveReady message from the example smart rack 1701, the example smart rack 1703 may cause the motors of the example smart rack 1703 to be in position to transport the rectangular prism from the example smart rack 1703 to the example smart rack 1705. In some embodiments, upon receiving the RequestedMoveReady message from the example smart rack 1705 and determining that the motors of the example smart rack 1703 are in position, the example smart rack 1703 may generate and transmit a RequestedMoveReady to the example smart rack 1701. For example, a processing circuitry of the example smart rack 1703 may transmit the RequestedMoveReady message to a processing circuitry of the example smart rack 1701. In some embodiments, the RequestedMoveReady message indicates that the example smart rack 1703 is ready to move the rectangular prism from the example smart rack 1703 to the example smart rack 1705.

Figure 17C:
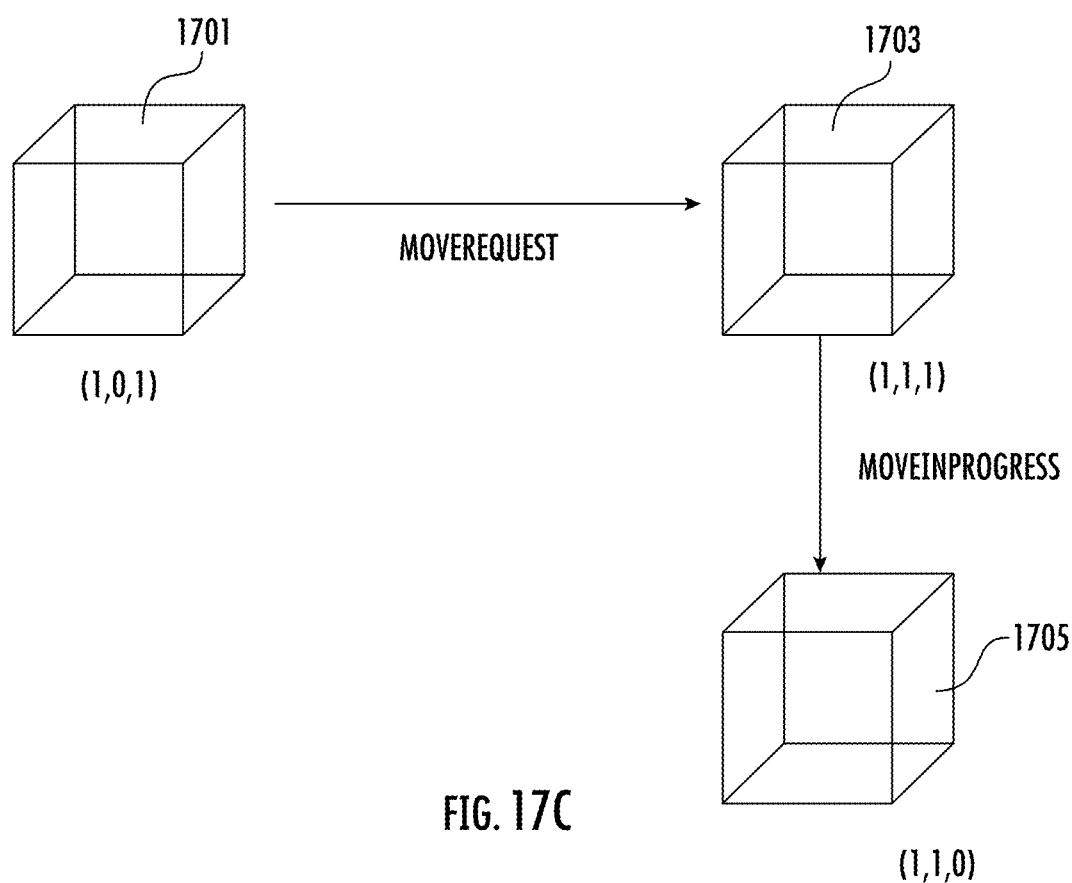
FIG. 17C illustrates example data communications between example smart racks to request transporting a rectangular prism in accordance with some embodiments of the present disclosure.

Referring now to FIG. 17C, example data communications between the example smart rack 1701, the example smart rack 1703, and the example smart rack 1705 are illustrated. In particular, FIG. 17C illustrates example data communications subsequent to the example data communications shown in FIG. 17B.

As described above, the example smart rack 1701 may receive a RequestedMoveReady message from the example smart rack 1703. As described above, the RequestedMoveReady message indicates that the example smart rack 1703 is ready to move the rectangular prism that is currently stored in the example smart rack 1703 to the example smart rack 1705. In some embodiments, upon receiving the RequestedMoveReady message, the example smart rack 1701 may transmit a MoveRequest message to the example smart rack 1703.

In some embodiments, the MoveRequest message may indicate a request from the example smart rack 1701 to the example smart rack 1703 to request that the example smart rack 1703 to move the rectangular prism from the example smart rack 1703 to the example smart rack 1705. In some embodiments, upon receiving the MoveRequest message, a processing circuitry of the example smart rack 1703 may cause the one or more motors to be activated so that an arm of a rack actuator of the example smart rack 1703 causes a down movement of the rectangular prism from the example smart rack 1703 to the example smart rack 1705.

In some embodiments, prior to or while the example smart rack 1703 causing a down movement of the rectangular prism to the example smart rack 1705, the example smart rack 1703 may transmit a MoveInProgress message to the example smart rack 1705. For example, a processing circuitry of the example smart rack 1703 may transmit the MoveInProgress message to a processing circuitry of the example smart rack 1705. In some embodiments, the MoveInProgress message provides a notification to the example smart rack 1705 so that the processing circuitry of the example smart rack 1705 can start activating the one or more motors to receive the rectangular prism from the example smart rack 1703.

Figure 17D:
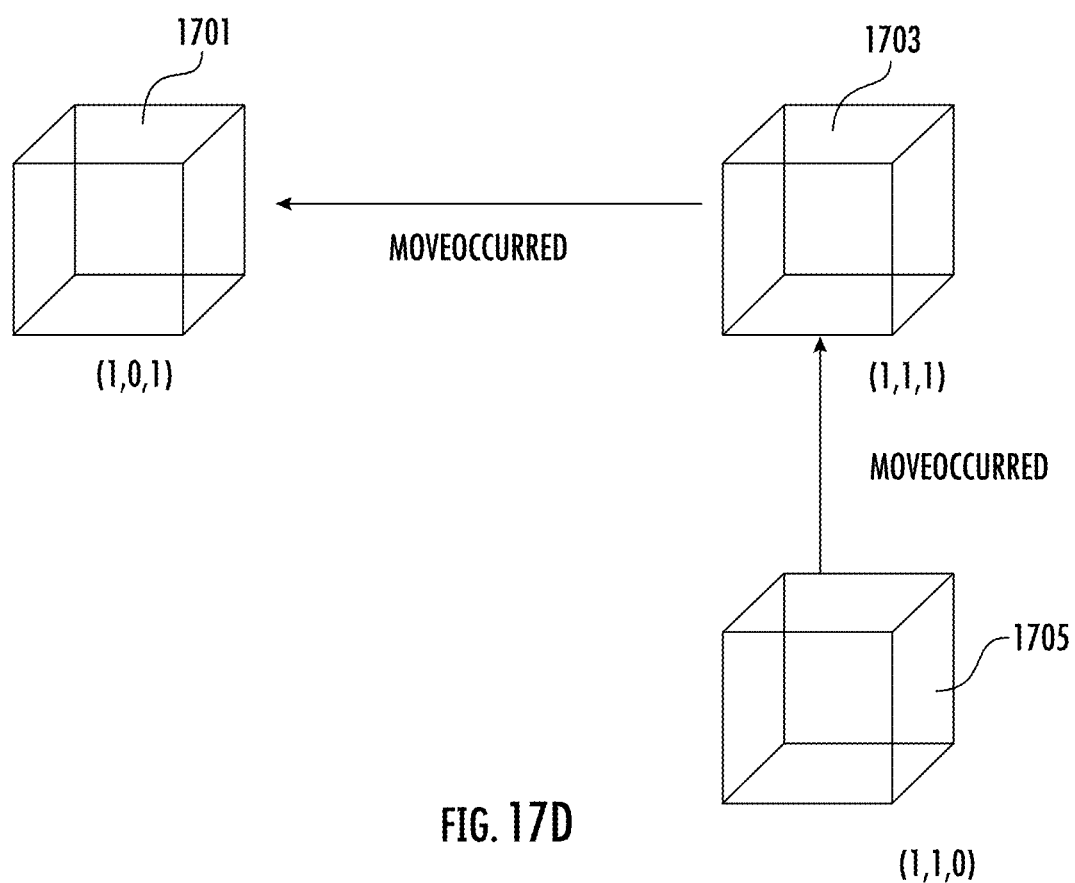
FIG. 17D illustrates example data communications between example smart racks to notify that the transporting of the rectangular prism has been completed in accordance with some embodiments of the present disclosure.

Referring now to FIG. 17D, example data communications between the example smart rack 1701, the example smart rack 1703, and the example smart rack 1705 are illustrated. In particular, FIG. 17D illustrates example data communications subsequent to the example data communications shown in FIG. 17C.

In some embodiments, subsequent to the example rectangular prism being completely moved into the example smart rack 1705, the example smart rack 1705 may transmit a MoveOccured message to the example smart rack 1703. For example, a processing circuitry of the example smart rack 1705 may transmit the MoveOccured message to a processing circuitry of the example smart rack 1703. In some embodiments, the MoveOccured message indicates that the example smart rack 1705 has completed the operations of receiving the rectangular prism from the example smart rack 1703, and/or that the rectangular prism from the example smart rack 1703 has been placed within the example smart rack 1705.

In some embodiments, in response to receiving the MoveOccured message from the example smart rack 1705, the example smart rack 1703 may transmit a MoveOccured message to the example smart rack 1701. For example, a processing circuitry of the example smart rack 1703 may transmit the MoveOccured message to a processing circuitry of the example smart rack 1701. In some embodiments, the MoveOccured message indicates that the example smart rack 1703 has completely moved the rectangular prism away from the example smart rack 1703 to the example smart rack 1705, and/or is ready to receive a rectangular prism from the example smart rack 1701.

In some embodiments, subsequent to receiving the MoveOccured message, the example smart rack 1701 may cause a movement of a rectangular prism from the example smart rack 1701 to the example smart rack 1703.

Referring now to FIG. 18A, FIG. 18B, FIG. 18C, FIG. 18D, FIG. 18E, and FIG. 18F, example movement logics of example rack actuators (such as, but not limited to, the left back lateral rack actuator 1802A, the right front lateral rack actuator 1802B, the front bottom rack actuator 1802C, the right back lateral rack actuator 1802D, the left front lateral rack actuator 1802E, and the left bottom rack actuator 1802F) in accordance with some embodiments of the present disclosure are illustrated. In particular, FIG. 18A, FIG. 18B, FIG. 18C, FIG. 18D, FIG. 18E, and FIG. 18F illustrate example movement logics in response to different movement messages.

Figure 18A:
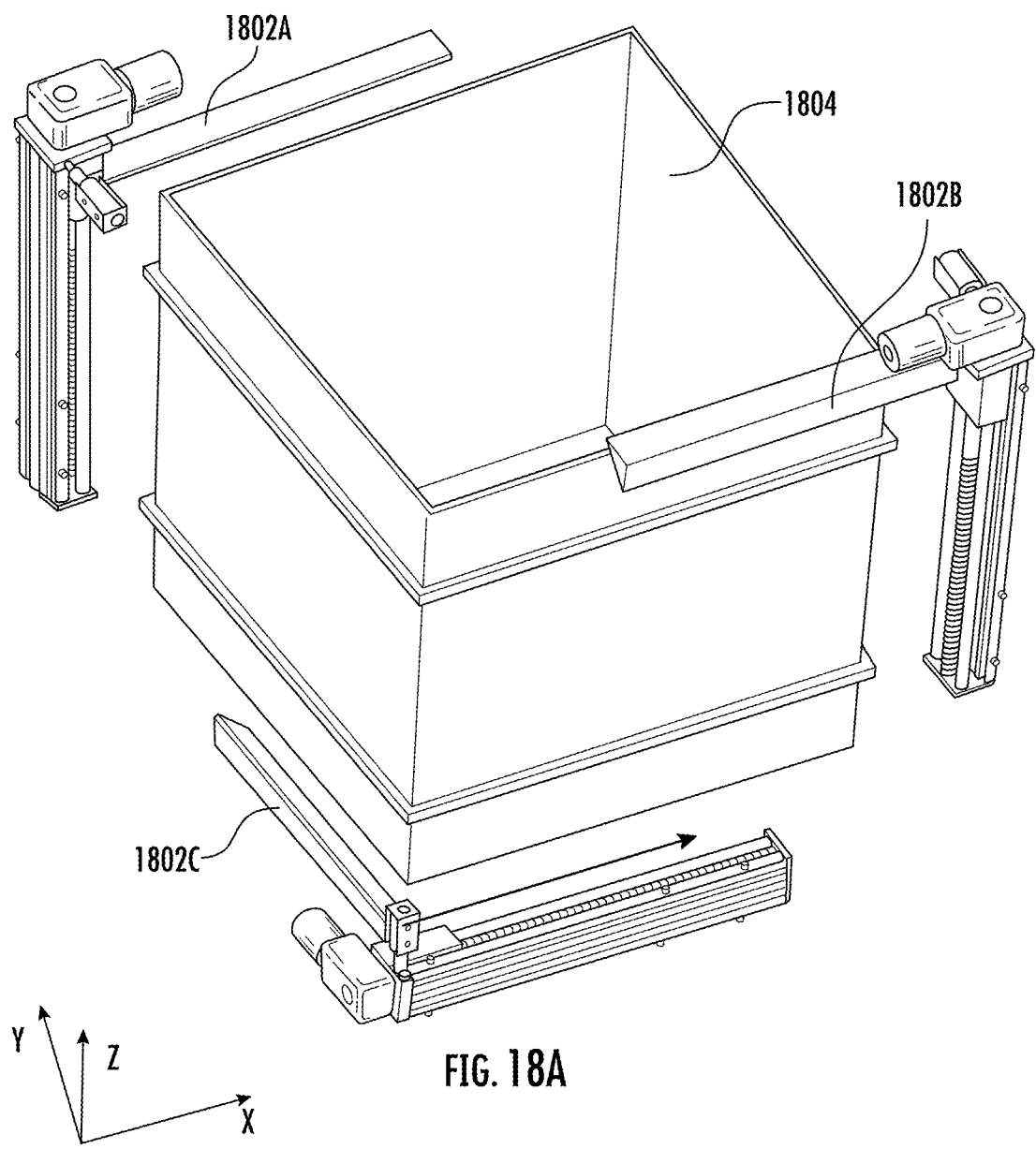
FIG. 18A illustrates example movements of example rack actuators in response to movement messages indicating a right movement in accordance with some embodiments of the present disclosure.

Referring now to FIG. 18A, the example movement logic associated with a right movement of the rectangular prism 1804 in accordance with some embodiments of the present disclosure are illustrated. In particular, FIG. 18A illustrates the example movement logic associated with causing the rectangular prism to be transported to a right peer smart rack.

As described above, a processing circuitry of a smart rack may receive a MoveReady message. In some embodiments, the MoveReady message may describe a request to confirm that the smart rack is ready to move the rectangular prism 1804 to a right peer smart rack.

In some embodiments, subsequent to receiving the MoveReady message, the processing circuitry of the smart rack may cause the arms of the left back lateral rack actuator 1802A and the right front lateral rack actuator 1802B to be moved to the top positions and be in engaged mode. For example, the processing circuitry of the smart rack may transmit instructions to the one or more motor(s), similar to those described and illustrated above in connection with at least FIG. 16. As such, the left back lateral rack actuator 1802A and the right front lateral rack actuator 1802B may be in position to provide support for the rectangular prism 1804.

Additionally, or alternatively, subsequent to receiving the MoveReady message, the processing circuitry of the smart rack may cause front bottom rack actuator 1802C to be moved to a far left position and engaged with a bottom protrusion of the rectangular prism 1804. For example, the processing circuitry of the smart rack may transmit instructions to the one or more motor(s), similar to those described and illustrated above in connection with at least FIG. 16.

In some embodiments, subsequent to the left back lateral rack actuator 1802A, the right front lateral rack actuator 1802B, and front bottom rack actuator 1802C being in position, the processing circuitry may transmit a RequestedMoveReady message indicating that the rectangular prism 1804 is ready to be moved to the right, similar to those described above.

As described above, a processing circuitry of a smart rack may receive a MoveRequest message. In some embodiments, the MoveRequest message may describe a request to move the rectangular prism to a right peer smart rack.

In some embodiments, subsequent to receiving the MoveRequest message, the processing circuitry of the smart rack may cause the arms of front bottom rack actuator 1802C be in engaged mode and exert force towards the right so that the rectangular prism 1804 is pushed to the right. For example, the processing circuitry of the smart rack may transmit instructions to the one or more motor(s), similar to those described and illustrated above in connection with at least FIG. 16.

In some embodiments, after the front bottom rack actuator 1802C exerts force towards the right, the processing circuitry of the smart rack may transmit a MoveInProgress message to the right peer smart rack, notifying the right peer smart rack that the movement to the right is in progress. In some embodiments, after the front bottom rack actuator 1802C completes the right movement of the rectangular prism 1804, the processing circuitry of the smart rack may transmit a MoveOccured message, notifying that the movement has been completed.

Figure 18B:
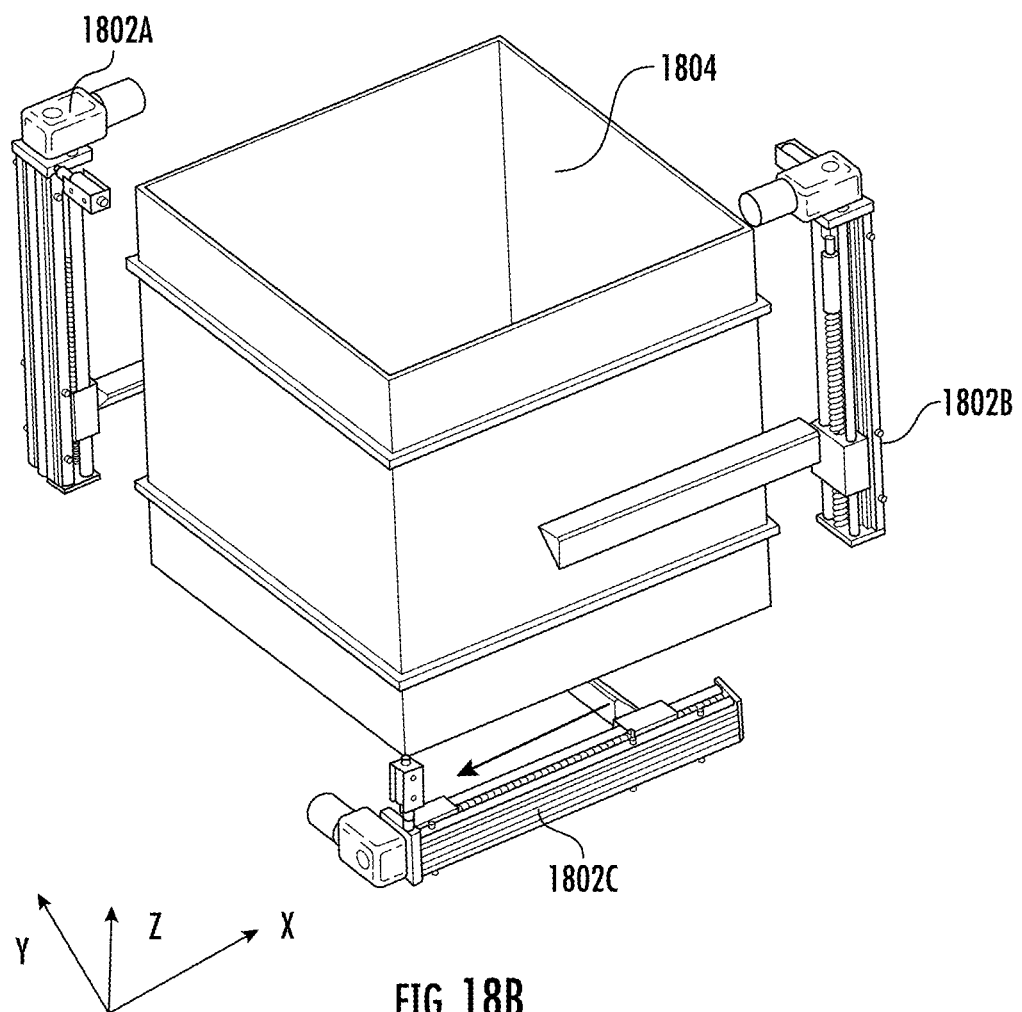
FIG. 18B illustrates example movements of example rack actuators in response to movement messages indicating a left movement in accordance with some embodiments of the present disclosure.

Referring now to FIG. 18B, example movement logic associated with a left movement of the rectangular prism 1804 in accordance with some embodiments of the present disclosure are illustrated. In particular, FIG. 18B illustrates example movement logic associated with causing the rectangular prism 1804 to be transported to a left peer smart rack.

As described above, a processing circuitry of a smart rack may receive a MoveReady message. In some embodiments, the MoveReady message may describe a request to confirm that the smart rack is ready to move the rectangular prism 1804 to a left peer smart rack.

In some embodiments, subsequent to receiving the MoveReady message, the processing circuitry of the smart rack may cause the arms of the left back lateral rack actuator 1802A and the right front lateral rack actuator 1802B to be moved to the top position and be in engaged mode. For example, the processing circuitry of the smart rack may transmit instructions to the one or more motor(s), similar to those described and illustrated above in connection with at least FIG. 16. As such, the left back lateral rack actuator 1802A and the right front lateral rack actuator 1802B may be in position to provide support for the rectangular prism 1804.

Additionally, or alternatively, subsequent to receiving the MoveReady message, the processing circuitry of the smart rack may cause front bottom rack actuator 1802C to be moved to a far right position. For example, the processing circuitry of the smart rack may transmit instructions to the one or more motor(s), similar to those described and illustrated above in connection with at least FIG. 16.

In some embodiments, subsequent to the left back lateral rack actuator 1802A, the right front lateral rack actuator 1802B, and front bottom rack actuator 1802C being in position, the processing circuitry may transmit a RequestedMoveReady message indicating that the rectangular prism 1804 is ready to be moved to the left, similar to those described above.

As described above, a processing circuitry of a smart rack may receive a MoveRequest message. In some embodiments, the MoveRequest message may describe a request to move the rectangular prism to a left peer smart rack.

In some embodiments, subsequent to receiving the MoveRequest message, the processing circuitry of the smart rack may cause the arms of front bottom rack actuator 1802C be in engaged mode and exert force towards the left so that the rectangular prism 1804 is pushed to the left. For example, the processing circuitry of the smart rack may transmit instructions to the one or more motor(s), similar to those described and illustrated above in connection with at least FIG. 16.

In some embodiments, after the front bottom rack actuator 1802C exerts force towards the left, the processing circuitry of the smart rack may transmit a MoveInProgress message to the left peer smart rack, notifying that the movement to the left is in progress. In some embodiments, after the front bottom rack actuator 1802C completes the left movement of the rectangular prism 1804, the processing circuitry of the smart rack may transmit a MoveOccured message, notifying that the movement has been completed.

Figure 18C:
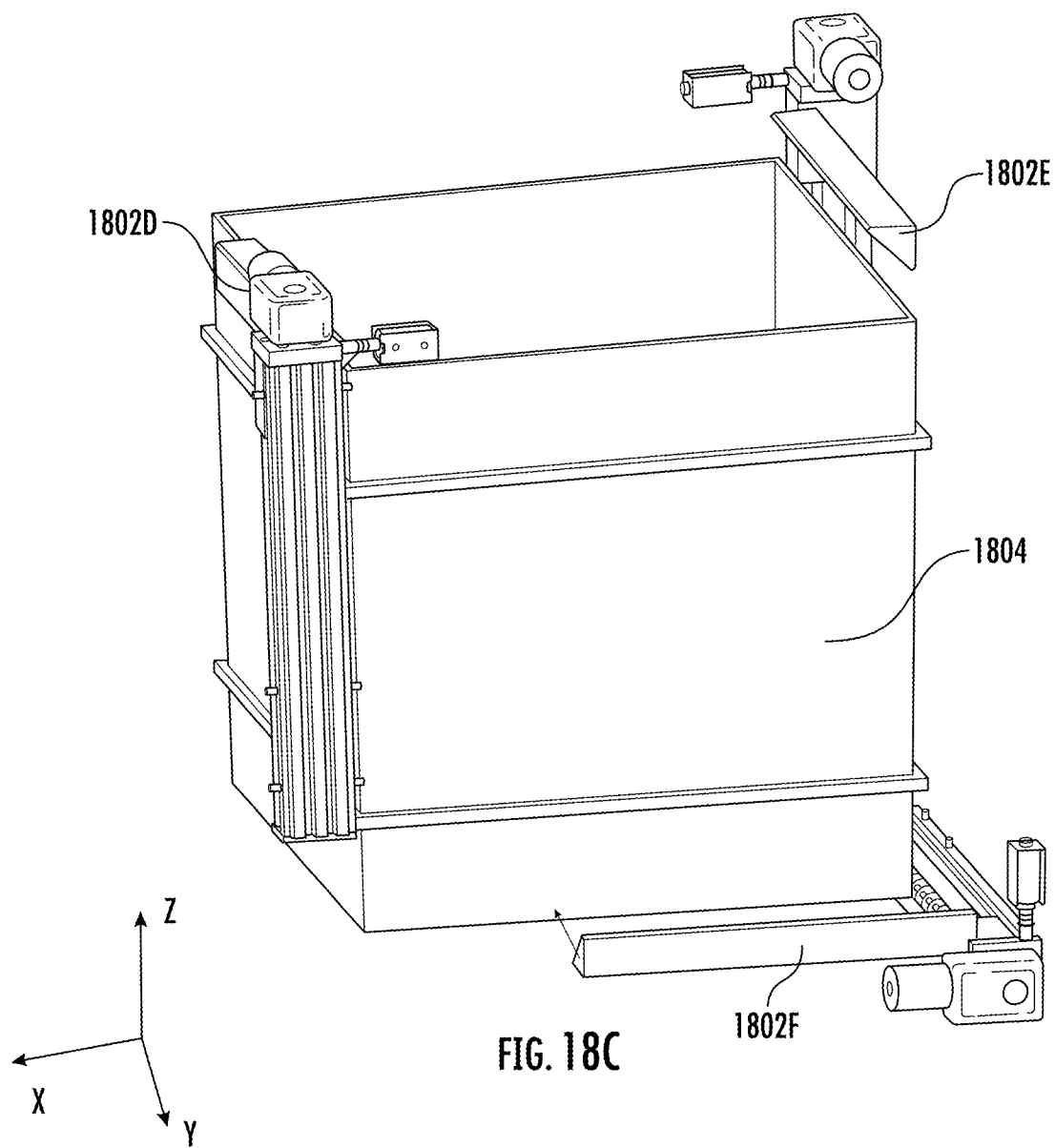
FIG. 18C illustrates example movements of example rack actuators in response to movement messages indicating a front movement in accordance with some embodiments of the present disclosure.

Referring now to FIG. 18C, example movement logic associated with a front movement of the rectangular prism 1804 in accordance with some embodiments of the present disclosure are illustrated. In particular, FIG. 18C illustrates example movement logic associated with causing the rectangular prism 1804 to be transported to a front peer smart rack.

As described above, a processing circuitry of a smart rack may receive a MoveReady message. In some embodiments, the MoveReady message may describe a request to confirm that the smart rack is ready to move the rectangular prism 1804 to a front peer smart rack.

In some embodiments, subsequent to receiving the MoveReady message, the processing circuitry of the smart rack may cause the arms of the right back lateral rack actuator 1802D and the left front lateral rack actuator 1802E to be moved to the top position and be in engaged mode. For example, the processing circuitry of the smart rack may transmit instructions to the one or more motor(s), similar to those described and illustrated above in connection with at least FIG. 16. As such, the right back lateral rack actuator 1802D and the left front lateral rack actuator 1802E may be in position to provide support for the rectangular prism 1804.

Additionally, or alternatively, subsequent to receiving the MoveReady message, the processing circuitry of the smart rack may cause the arms of the left bottom rack actuator 1802F to be moved to a far back position. For example, the processing circuitry of the smart rack may transmit instructions to the one or more motor(s), similar to those described and illustrated above in connection with at least FIG. 16.

In some embodiments, subsequent to right back lateral rack actuator 1802D, the left front lateral rack actuator 1802E, and the left bottom rack actuator 1802F being in position, the processing circuitry may transmit a RequestedMoveReady message indicating that the rectangular prism 1804 is ready to be moved to the front, similar to those described above.

As described above, a processing circuitry of a smart rack may receive a MoveRequest message. In some embodiments, the MoveRequest message may describe a request to move the rectangular prism to a front peer smart rack.

In some embodiments, subsequent to receiving the MoveRequest message, the processing circuitry of the smart rack may cause the arms of the left bottom rack actuator 1802F be in engaged mode and exert force towards the front so that the rectangular prism 1804 is pushed to the front. For example, the processing circuitry of the smart rack may transmit instructions to the one or more motor(s), similar to those described and illustrated above in connection with at least FIG. 16.

In some embodiments, after the left bottom rack actuator 1802F exerts force towards the front, the processing circuitry of the smart rack may transmit a MoveInProgress message to the front peer smart rack, notifying that the movement to the front is in progress. In some embodiments, after the left bottom rack actuator 1802F completes the front movement of the rectangular prism 1804, the processing circuitry of the smart rack may transmit a MoveOccured message, notifying that the movement has been completed.

Figure 18D:
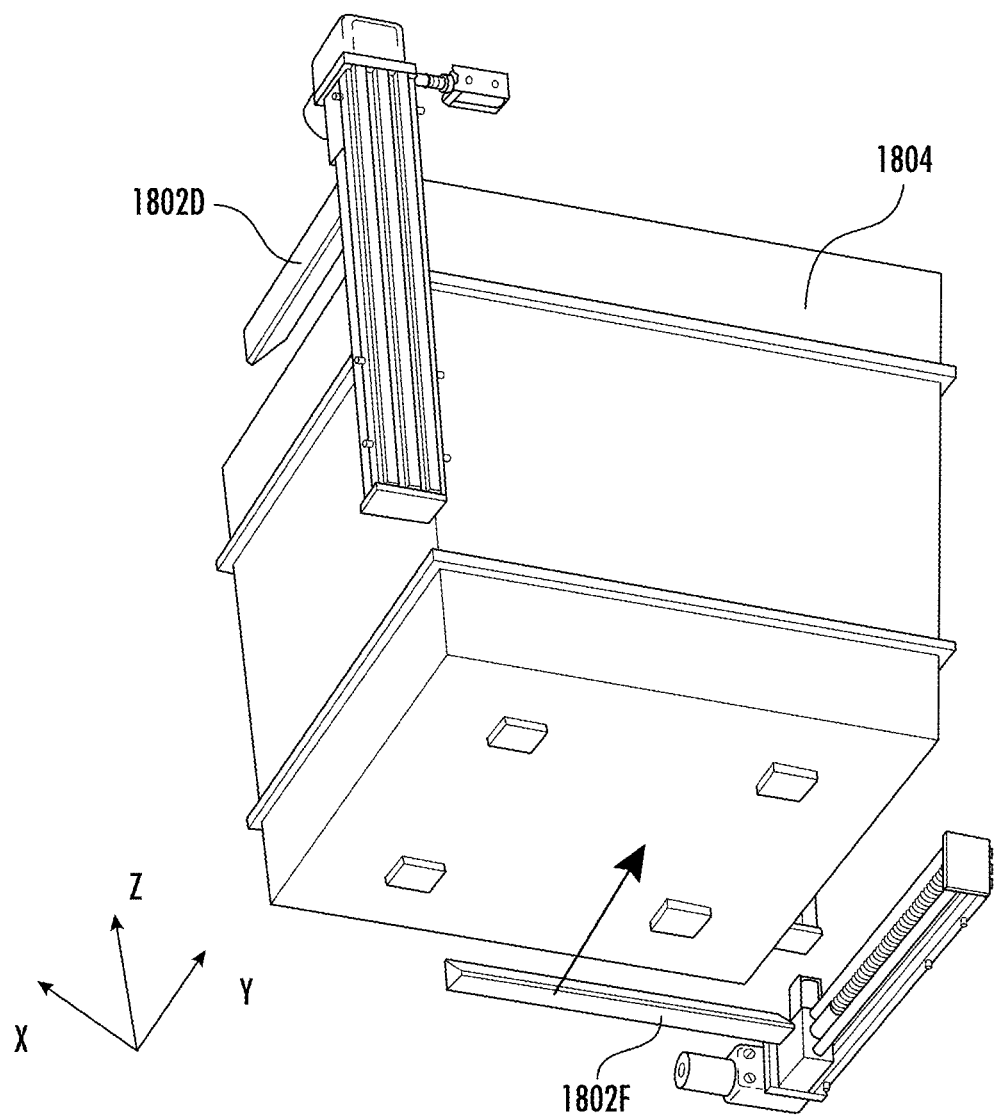
FIG. 18D illustrates example movements of example rack actuators in response to movement messages indicating a back movement in accordance with some embodiments of the present disclosure.

Referring now to FIG. 18D, example movement logic associated with a back movement of the rectangular prism 1804 in accordance with some embodiments of the present disclosure are illustrated. In particular, FIG. 18D illustrates example movement logic associated with causing the rectangular prism 1804 to be transported to a back peer smart rack.

As described above, a processing circuitry of a smart rack may receive a MoveReady message. In some embodiments, the MoveReady message may describe a request to confirm that the smart rack is ready to move the rectangular prism 1804 to a back peer smart rack.

In some embodiments, subsequent to receiving the MoveReady message, the processing circuitry of the smart rack may cause the arms of the right back lateral rack actuator 1802D and the left front lateral rack actuator to be moved to the top position and be in engaged mode. For example, the processing circuitry of the smart rack may transmit instructions to the one or more motor(s), similar to those described and illustrated above in connection with at least FIG. 16. As such, the right back lateral rack actuator 1802D and the left front lateral rack actuator may be in position to provide support for the rectangular prism 1804.

Additionally, or alternatively, subsequent to receiving the MoveReady message, the processing circuitry of the smart rack may cause the arms of the left bottom rack actuator 1802F to be moved to a far front position. For example, the processing circuitry of the smart rack may transmit instructions to the one or more motor(s), similar to those described and illustrated above in connection with at least FIG. 16.

In some embodiments, subsequent to the right back lateral rack actuator 1802D, the left front lateral rack actuator 1802E, and the left bottom rack actuator 1802F being in position, the processing circuitry may transmit a RequestedMoveReady message indicating that the rectangular prism 1804 is ready to be moved to the back, similar to those described above.

As described above, a processing circuitry of a smart rack may receive a MoveRequest message. In some embodiments, the MoveRequest message may describe a request to move the rectangular prism to a back peer smart rack.

In some embodiments, subsequent to receiving the MoveRequest message, the processing circuitry of the smart rack may cause the arms of the left bottom rack actuator 1802F be in engaged mode and exert force towards the back so that the rectangular prism 1804 is pushed to the back. For example, the processing circuitry of the smart rack may transmit instructions to the one or more motor(s), similar to those described and illustrated above in connection with at least FIG. 16.

In some embodiments, after the left bottom rack actuator 1802F exerts force towards the back, the processing circuitry of the smart rack may transmit a MoveInProgress message to the back peer smart rack, notifying that the movement to the back is in progress. In some embodiments, after the left bottom rack actuator 1802F completes the back movement of the rectangular prism 1804, the processing circuitry of the smart rack may transmit a MoveOccured message, notifying that the movement has been completed.

Figure 18E:
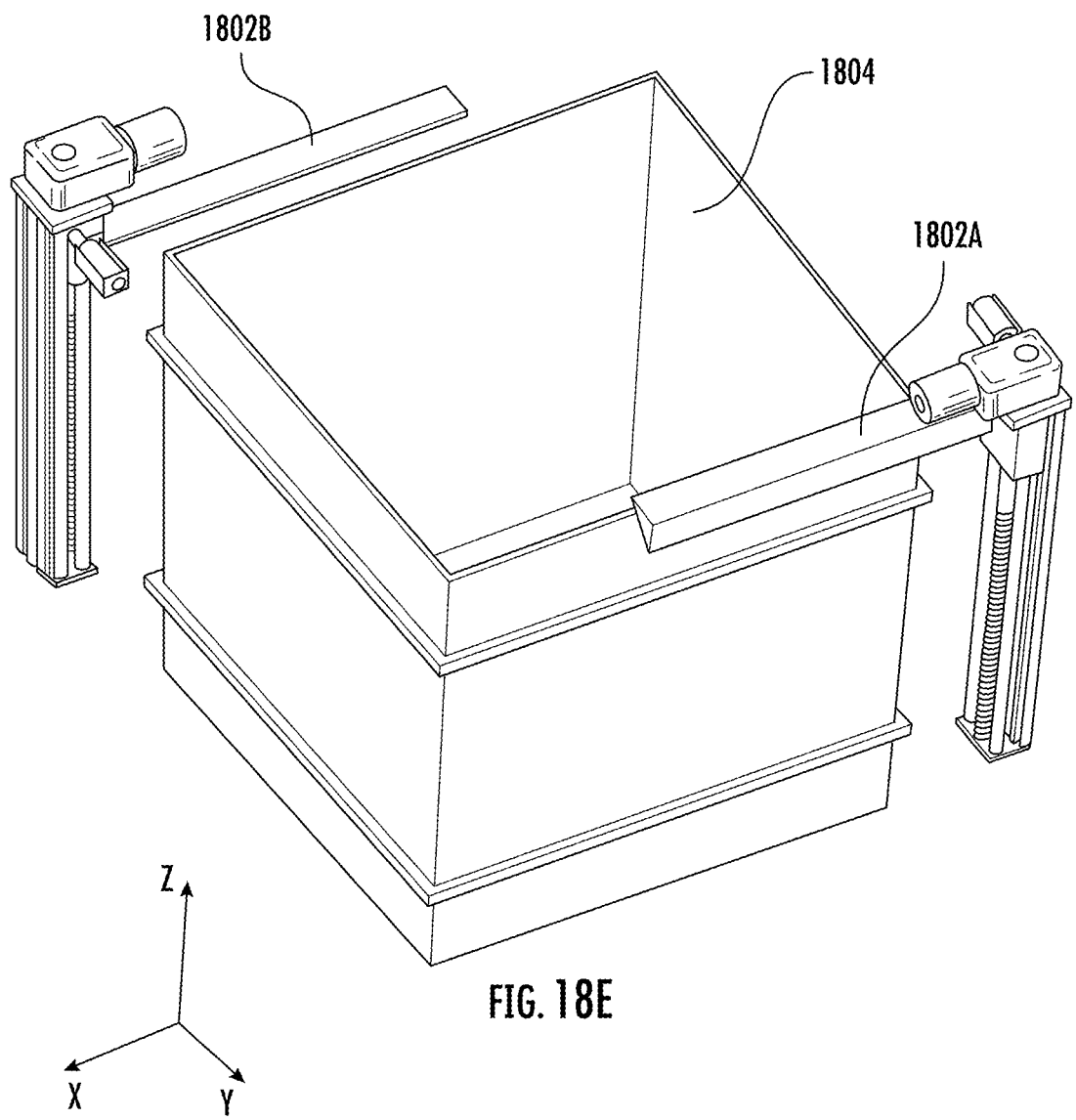
FIG. 18E illustrates example movements of example rack actuators in response to movement messages indicating a down movement in accordance with some embodiments of the present disclosure.

Referring now to FIG. 18E, example movement logic associated with a down movement of the rectangular prism 1804 in accordance with some embodiments of the present disclosure are illustrated. In particular, FIG. 18E illustrates example movement logic associated with causing the rectangular prism 1804 to be pushed to a down peer smart rack.

As described above, a processing circuitry of a smart rack may receive a MoveReady message. In some embodiments, the MoveReady message may describe a request to confirm that the smart rack is ready to move the rectangular prism 1804 to a down peer smart rack.

In some embodiments, subsequent to receiving the MoveReady message, the processing circuitry of the smart rack may cause the arms of the left back lateral rack actuator 1802A and the right front lateral rack actuator 1802B to be moved to their corresponding top positions and be in engaged mode. For example, the processing circuitry of the smart rack may transmit instructions to the one or more motor(s), similar to those described and illustrated above in connection with at least FIG. 16. As such, the left back lateral rack actuator 1802A and the right front lateral rack actuator 1802B may be in position to provide support for the rectangular prism 1804.

Additionally, or alternatively, subsequent to receiving the MoveReady message, the processing circuitry of the smart rack may cause front bottom rack actuator and the left bottom rack actuator to be moved to their end positions so that they do not block the downwards movement of the rectangular prism. For example, the processing circuitry of the smart rack may transmit instructions to the one or more motor(s), similar to those described and illustrated above in connection with at least FIG. 16.

In some embodiments, subsequent to the left back lateral rack actuator 1802A, the right front lateral rack actuator 1802B, front bottom rack actuator and the left bottom rack actuator being in position, the processing circuitry may transmit a RequestedMoveReady message indicating that the rectangular prism 1804 is ready to be moved down, similar to those described above.

As described above, a processing circuitry of a smart rack may receive a MoveRequest message. In some embodiments, the MoveRequest message may describe a request to move the rectangular prism to a down peer smart rack.

In some embodiments, subsequent to receiving the MoveRequest message, the processing circuitry of the smart rack may cause the arms of the left back lateral rack actuator 1802A and the right front lateral rack actuator 1802B to travel downwards so that the rectangular prism 1804 travels downwards. For example, the processing circuitry of the smart rack may transmit instructions to the one or more motor(s), similar to those described and illustrated above in connection with at least FIG. 16.

In some embodiments, after the left back lateral rack actuator 1802A, the right front lateral rack actuator 1802B starts traveling downwards, the processing circuitry of the smart rack may transmit a MoveInProgress message to the bottom peer smart rack, notifying that the movement down is in progress. In some embodiments, after the left back lateral rack actuator 1802A and the right front lateral rack actuator 1802B completing the down movement of the rectangular prism 1804, the processing circuitry of the smart rack may transmit a MoveOccured message, notifying that the movement has been completed.

Figure 18F:
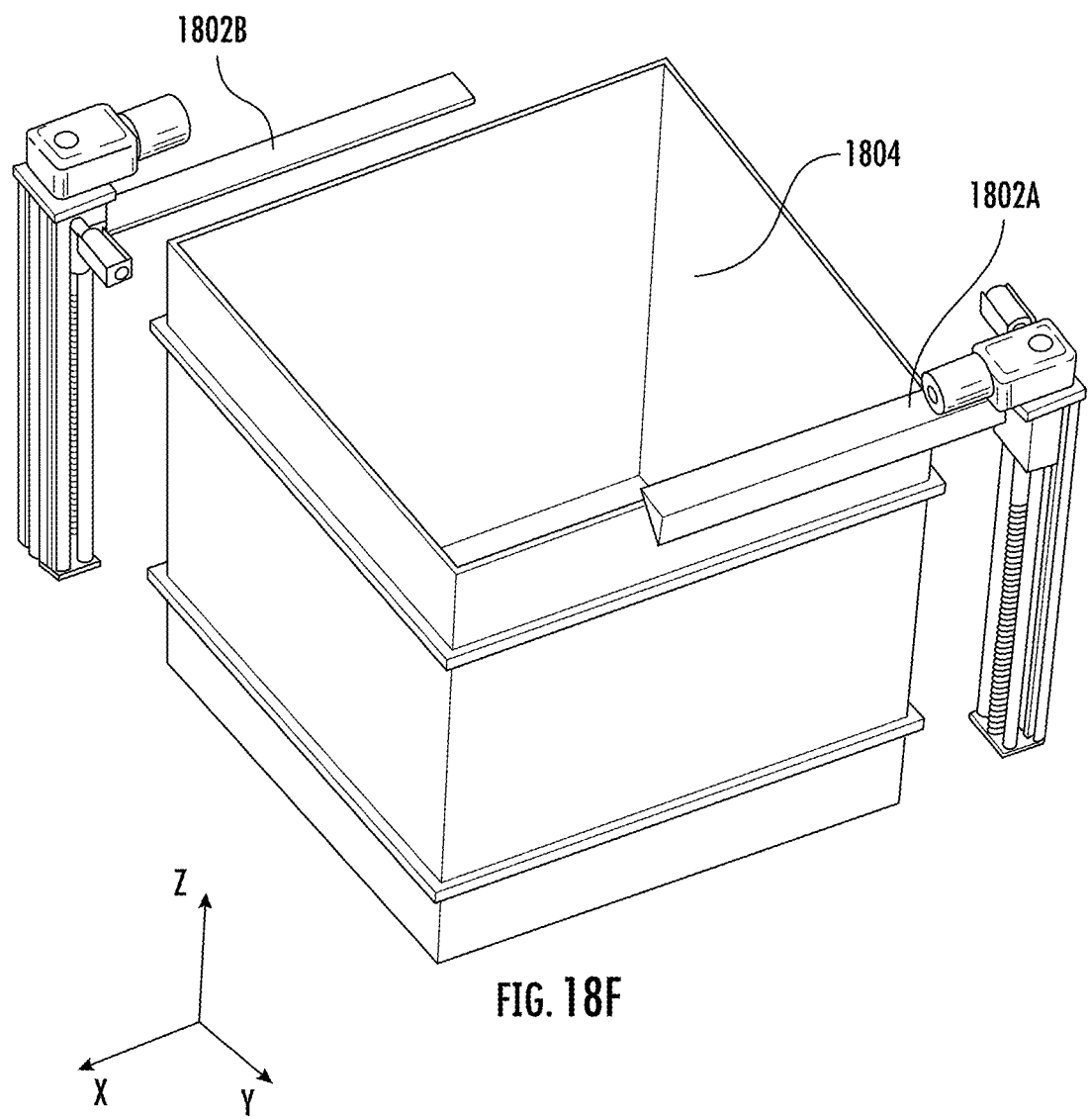
FIG. 18F illustrates example movements of example rack actuators in response to movement messages indicating an up movement in accordance with some embodiments of the present disclosure.

Referring now to FIG. 18F, example movement logic associated with an up movement of the rectangular prism 1804 in accordance with some embodiments of the present disclosure are illustrated. In particular, FIG. 18F illustrates example movement logic associated with causing the rectangular prism 1804 to be lifted to an up peer smart rack.

As described above, a processing circuitry of a smart rack may receive a MoveReady message. In some embodiments, the MoveReady message may describe a request to confirm that the smart rack is ready to move the rectangular prism 1804 to an up peer smart rack.

In some embodiments, subsequent to receiving the MoveReady message, the processing circuitry of the smart rack may cause the arms of the left back lateral rack actuator 1802A and the right front lateral rack actuator 1802B to be moved to their corresponding bottom positions and be in engaged mode. For example, the processing circuitry of the smart rack may transmit instructions to the one or more motor(s), similar to those described and illustrated above in connection with at least FIG. 16. As such, the left back lateral rack actuator 1802A and the right front lateral rack actuator 1802B may be in position to provide support for the rectangular prism 1804.

In some embodiments, subsequent to the left back lateral rack actuator 1802A and the right front lateral rack actuator 1802B being in position, the processing circuitry may transmit a RequestedMoveReady message indicating that the rectangular prism 1804 is ready to be moved up, similar to those described above.

As described above, a processing circuitry of a smart rack may receive a MoveRequest message. In some embodiments, the MoveRequest message may describe a request to move the rectangular prism to an up peer smart rack.

In some embodiments, subsequent to receiving the MoveRequest message, the processing circuitry of the smart rack may cause the arms of the left back lateral rack actuator 1802A and the right front lateral rack actuator 1802B to travel upwards so that the rectangular prism 1804 travels upwards. For example, the processing circuitry of the smart rack may transmit instructions to the one or more motor(s), similar to those described and illustrated above in connection with at least FIG. 16.

In some embodiments, after the left back lateral rack actuator 1802A, the right front lateral rack actuator 1802B starts traveling upwards, the processing circuitry of the smart rack may transmit a MoveInProgress message to the top peer smart rack, notifying that the movement upwards is in progress. In some embodiments, after the left back lateral rack actuator 1802A, the right front lateral rack actuator 1802B completes the up movement of the rectangular prism 1804, the processing circuitry of the smart rack may transmit a MoveOccured message, notifying that the movement has been completed.

As described above, an example smart rack of an example modular superstructure in accordance with some embodiments of the present disclosure may include one or more rack actuators. The rack actuators may support the one or more rectangular prisms to be stored in the example smart rack, and may cause the one or more rectangular prisms to be transported in/out of the example smart rack. In some embodiments, the one or more rack actuators comprise components that require power (e.g. electricity) to be activated or to operate. Such example components may include, but not limited to, motors (including, but not limited to, step motors and linear motors), controllers, and/or the like.

In some embodiments, an example modular superstructure may comprise tens, hundreds or thousands of smart racks. Supplying electricity to all the smart racks at the same time is not only power-consuming, but also unnecessary, as not all the smart racks are activated at the same time. For example, during operation, some smart racks may be activated to transport one or more rectangular prisms from one location to another, while other smart racks may be at an idle state. As such, supplying electricity to all the smart racks can result in a waste of energy.

Various embodiments of the present disclosure overcome the above-referenced difficulties, and provide various technical advancements and improvements. For example, example embodiments of the present disclosure may provide one or more example smart rack switch circuits for each smart rack in the modular superstructure, such that each smart rack may control the flow of electricity in one or more directions/dimensions in the modular superstructure, so as to selectively providing power to only those smart racks that needed to be activated to carry out the movements for the rectangular prisms.

Figure 19:
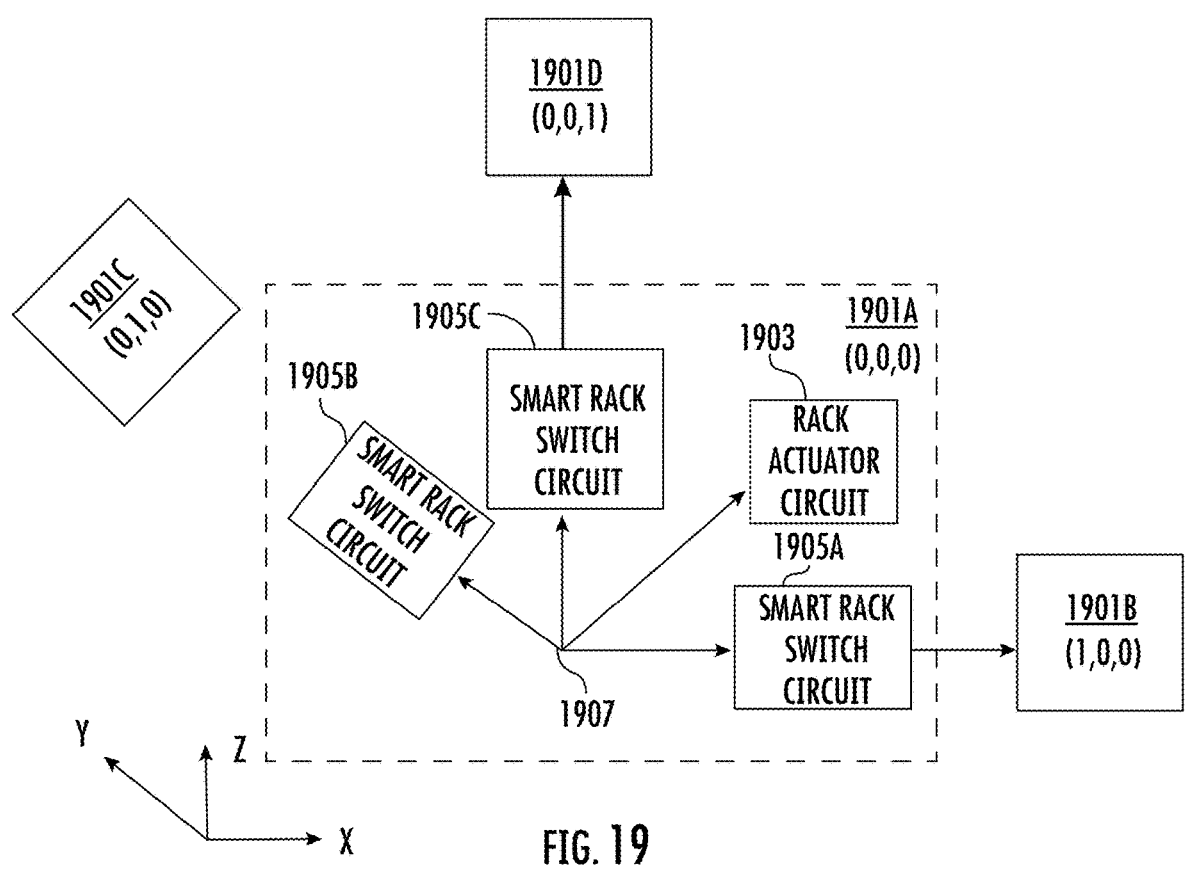
FIG. 19 is an example diagram illustrating example components for providing power within an example smart rack and between the example smart rack and other peer smart racks in accordance with some embodiments of the present disclosure.

Referring now to FIG. 19, an example diagram illustrating an example circuit diagram illustrating example circuits associated with a smart rack 1901A in accordance with some embodiments of the present disclosure is illustrated.

In some embodiments, the example smart rack 1901A may comprise a rack actuator circuit 1903. In some embodiments, a first end of the rack actuator circuit 1903 is connected to smart rack power access point 1907 of the smart rack 1901A. In some embodiments, the smart rack power access point 1907 refers to the point in the circuits associated with a smart rack 1901A that can receive electricity from outside the example smart rack 1901A. In some embodiments, the rack actuator circuit 1903 is configured to provide power to at least one motor of the smart rack 1901A.

For example, when the smart rack power access point 1907 is connected to a power source, and/or when the smart rack power access point 1907 receives electricity from another smart rack, electricity may be supplied to the smart rack power access point 1907. As the rack actuator circuit 1903 is connected to the smart rack power access point 1907, the rack actuator circuit 1903 may provide electricity from the smart rack power access point 1907 to the components of the smart rack that require electricity (such as, but not limited to, motors, similar to those described above).

In some examples, when the smart rack power access point 1907 is not connected to a power source, and does not receive electricity from another smart rack, there may not be any electricity supplied to the smart rack power access point 1907. In such examples, the rack actuator circuit 1903 may not provide electricity to the components of the smart rack that require electricity (such as, but not limited to, motors, similar to those described above), and these components of the smart rack may not be activated.

In some embodiments, the example smart rack 1901A may comprise one or more smart rack switch circuits. In some embodiments, each of the smart rack switch circuits may control the flow of electricity from the example smart rack 1901A to a peer smart rack. In some embodiments, each of the smart rack switch circuits may control the flow of electricity to a peer smart rack in one dimension. For example, each smart rack switch circuit is connected to the smart rack power access point 1907 of the smart rack 1901A, and each of the at least one smart rack switch circuit is also connected to at least one peer smart rack power access point of at least one peer smart rack (such as, but not limited to, the smart rack 1901B, the smart rack 1901C, and the smart rack 1901D).

For example, if the example smart rack 1901A is a part of a three-dimensional modular superstructure, the example smart rack 1901A may comprise three smart rack switch circuits: an x dimension smart rack switch circuit for controlling the flow of electricity in the x dimension, a y dimension smart rack switch circuit for controlling the flow of electricity in the y dimension, and a z dimension smart rack switch circuit for controlling the flow of electricity in the z dimension.

As another example, if the example smart rack 1901A is a part of a two-dimensional modular superstructure, the example smart rack 1901A may comprise two smart rack switch circuits: an x dimension smart rack switch circuit for controlling the flow of electricity in the x dimension and a y dimension smart rack switch circuit for controlling the flow of electricity in the y dimension.

In the example shown in FIG. 19, the example smart rack 1901A may comprise an x dimension smart rack switch circuit 1905A, a y dimension smart rack switch circuit 1905B, and a z dimension smart rack switch circuit 1905C. In some embodiments, a first end of the x dimension smart rack switch circuit 1905A, a first end of the y dimension smart rack switch circuit 1905B, and a first end of the z dimension smart rack switch circuit 1905C are all connected to the smart rack power access point 1907 of the example smart rack 1901A. In some embodiments, a second end of the x dimension smart rack switch circuit 1905A, a second end of the y dimension smart rack switch circuit 1905B, and a second end of the z dimension smart rack switch circuit 1905C are each connected to a smart rack power access point of a peer smart rack.

In some embodiments, the x dimension smart rack switch circuit 1905A controls the flow of electricity from the smart rack 1901A to another smart rack that is positioned adjacent to the example smart rack 1901A in the x axis dimension. As described above, the x dimension smart rack switch circuit 1905A may comprise a first end that is connected to the smart rack power access point 1907 of the example smart rack 1901A. In some embodiments, a second end of the x dimension smart rack switch circuit 1905A is connected to the smart rack power access point of a peer smart rack in the x dimension.

In the example shown in FIG. 19, the example smart rack 1901A may be associated with the rack coordination set (0, 0, 0), and the example smart rack 1901B may be associated with the rack coordination set (1, 0, 0). In such an example, the example smart rack 1901B is positioned to the right of the example smart rack 1901A, and the second end of the x dimension smart rack switch circuit 1905A is connected to the smart rack power access point of the example smart rack 1901B.

In some embodiments, when the x dimension smart rack switch circuit 1905A is turned on, electric current may flow from the smart rack power access point 1907 of the example smart rack 1901A, through the x dimension smart rack switch circuit 1905A, and to the smart rack power access point of the example smart rack 1901B. As such, example embodiments of the present disclosure may supply power to the example smart rack 1901B through the example smart rack 1901A.

In some embodiments, when the x dimension smart rack switch circuit 1905A is turned off, electric current may not flow from the smart rack power access point 1907 of the example smart rack 1901A to the example smart rack 1901B, thereby disconnecting power from the example smart rack 1901B.

While the description above provides an example of utilizing an x dimension smart rack switch circuit to control the flow of power from the example smart rack 1901A to a right peer smart rack, it is noted that the scope of the present disclosure is not limited to the description above. In some examples, an example x dimension smart rack switch circuit may control the flow of the power from the example smart rack 1901A to a left peer smart rack.

In some embodiments, the y dimension smart rack switch circuit 1905B controls the flow of electricity from the smart rack 1901A to another smart rack that is positioned adjacent to the example smart rack 1901A in the y axis dimension. As described above, the y dimension smart rack switch circuit 1905B may comprise a first end that is connected to the smart rack power access point 1907 of the example smart rack 1901A. In some embodiments, a second end of the y dimension smart rack switch circuit 1905B is connected to the smart rack power access point of a peer smart rack in the y dimension.

In the example shown in FIG. 19, the example smart rack 1901A may be associated with the rack coordination set (0, 0, 0), and the example smart rack 1901C may be associated with the rack coordination set (0, 1, 0). In such an example, the example smart rack 1901C is positioned to the back of the example smart rack 1901A, and the second end of the y dimension smart rack switch circuit 1905B is connected to the smart rack power access point of the example smart rack 1901C.

In some embodiments, when the y dimension smart rack switch circuit 1905B is enabled, electric current may flow from the smart rack power access point 1907 of the example smart rack 1901A, through the y dimension smart rack switch circuit 1905B, and to the smart rack power access point of the example smart rack 1901C. As such, example embodiments of the present disclosure may supply power to the example smart rack 1901C through the example smart rack 1901A.

In some embodiments, when the y dimension smart rack switch circuit 1905B is disabled, electric current may not flow from the smart rack power access point 1907 of the example smart rack 1901A to the example smart rack 1901C, thereby disconnecting power from the example smart rack 1901C.

While the description above provides an example of utilizing a y dimension smart rack switch circuit to control the flow of power from the example smart rack 1901A to a back peer smart rack, it is noted that the scope of the present disclosure is not limited to the description above. In some examples, an example y dimension smart rack switch circuit may control the flow of the power from the example smart rack 1901A to a front peer smart rack.

In some embodiments, the z dimension smart rack switch circuit 1905C controls the flow of electricity from the smart rack 1901A to another smart rack that is positioned adjacent to the example smart rack 1901A in the z axis dimension. As described above, the z dimension smart rack switch circuit 1905C may comprise a first end that is connected to the smart rack power access point 1907 of the example smart rack 1901A. In some embodiments, a second end of the z dimension smart rack switch circuit 1905C is connected to the smart rack power access point of a peer smart rack in the z dimension.

In the example shown in FIG. 19, the example smart rack 1901A may be associated with the rack coordination set (0, 0, 0), and the example smart rack 1901D may be associated with the rack coordination set (0, 0, 1). In such an example, the example smart rack 1901D is positioned to the top of the example smart rack 1901A, and the second end of the z dimension smart rack switch circuit 1905C is connected to the smart rack power access point of the example smart rack 1901D.

In some embodiments, when the z dimension smart rack switch circuit 1905C is enabled, electric current may flow from the smart rack power access point 1907 of the example smart rack 1901A, through the z dimension smart rack switch circuit 1905C, and to the smart rack power access point of the example smart rack 1901D. As such, example embodiments of the present disclosure may supply power to the example smart rack 1901D through the example smart rack 1901A.

In some embodiments, when the z dimension smart rack switch circuit 1905C is disabled, electric current may not flow from the smart rack power access point 1907 of the example smart rack 1901A to the example smart rack 1901D, thereby disconnecting power from the example smart rack 1901D.

While the description above provides an example of utilizing a z dimension smart rack switch circuit to control the flow of power from the example smart rack 1901A to a top peer smart rack, it is noted that the scope of the present disclosure is not limited to the description above. In some examples, an example z dimension smart rack switch circuit may control the flow of the power from the example smart rack 1901A to a bottom peer smart rack.

As such, the example shown in FIG. 19 illustrates examples of circuits associated with a smart rack that include smart rack switch circuits to enable the smart rack to selectively provide power to its peer smart racks. In an example modular superstructure, a plurality of smart racks is secured to one another, and the circuits of the smart racks (including smart rack switch circuits) may form a smart matrix that provides power paths for selectively supplying power to the smart racks.

Figure 20:
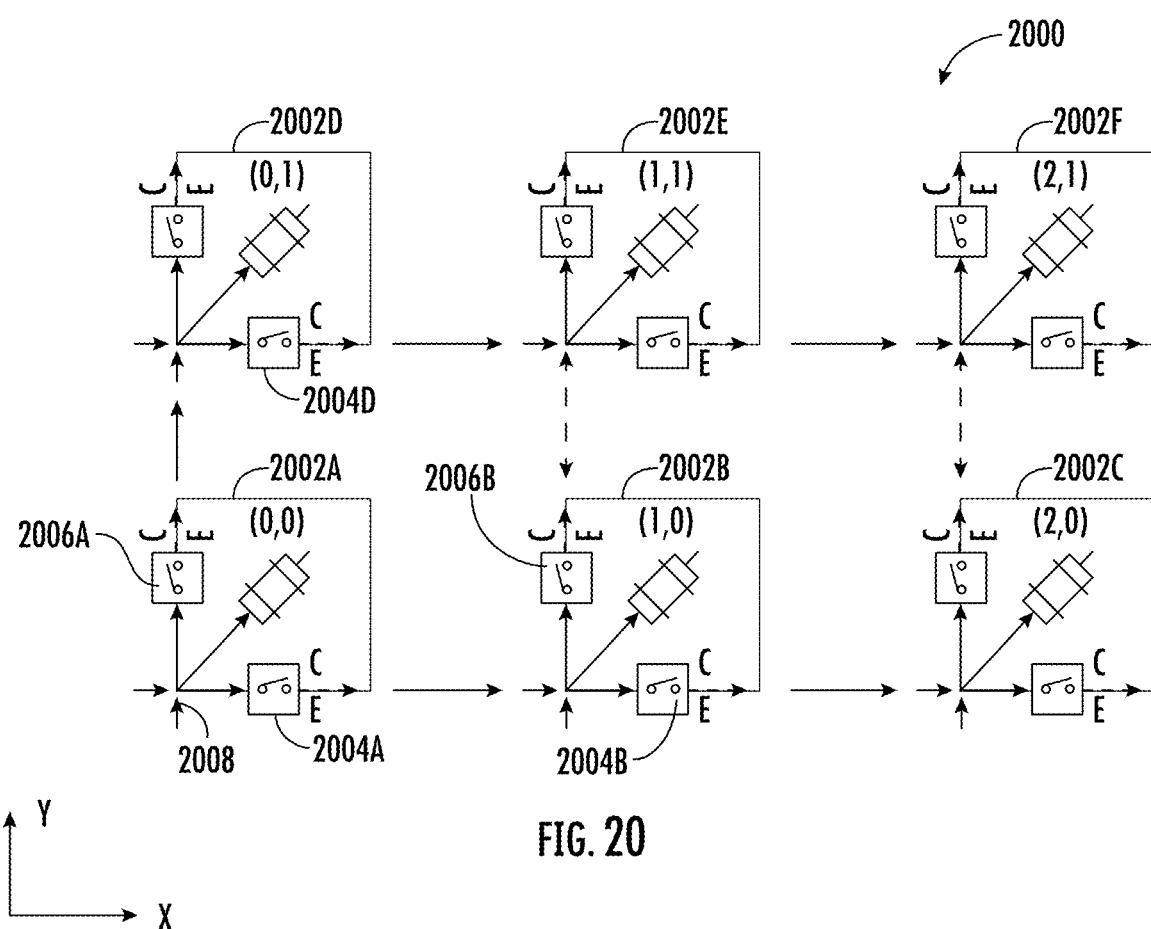
FIG. 20 is an example diagram illustrating an example smart matrix that provides a power path to various smart racks in a modular superstructure in accordance with some embodiments of the present disclosure.

Referring now to FIG. 20, the example diagram illustrates a portion of an example smart matrix 2000 of an example modular superstructure in accordance with some embodiments of the present disclosure.

In the example shown in FIG. 20, the example modular superstructure is a two-dimensional modular superstructure. The example modular superstructure may comprise a plurality of smart racks, including, but not limited to, the smart rack 2002A, the smart rack 2002B, the smart rack 2002C, the smart rack 2002D, the smart rack 2002E, and the smart rack 2002F. In some embodiments, each of smart racks is associated with a rack coordination set that is defined based on their corresponding positions in the x axis and in the y axis. For example, the rack coordination set of each of the smart racks in the example modular superstructure may be in the form of (x, y).

For example, the smart rack 2002A may be associated with a rack coordination set (0, 0), and the smart rack 2002B may be associated with a rack coordination set (1, 0). In such an example, the smart rack 2002B is secured to the right of the smart rack 2002A. The smart rack 2002C may be associated with the rack coordination set (2, 0), which indicates that it is secured to the right of the smart rack 2002B. The smart rack 2002D may be associated with the rack coordination set (0, 1), which indicates that it is secured to the back of the smart rack 2002A. The smart rack 2002E may be associated with the rack coordination set (1, 1), which indicates that it is secured to the right of the smart rack 2002D. The smart rack 2002F may be associated with the rack coordination set (2, 1), which indicates that it is secured to the right of the smart rack 2002E.

Similar to those described above in connection with FIG. 19, each of the smart rack 2002A, the smart rack 2002B, the smart rack 2002C, the smart rack 2002D, the smart rack 2002E, and the smart rack 2002F may comprise one or more smart rack switch circuits that are configured to control the flow of the power to a peer smart rack.

For example, the example smart rack 2002A comprises an x dimension smart rack switch circuit 2004A and a y dimension smart rack switch circuit 2006A, similar to those described above. In some embodiments, a first end of the x dimension smart rack switch circuit 2004A may be connected to the smart rack power access point 2008 of the smart rack 2002A, and a second end of the x dimension smart rack switch circuit 2004A may be connected to the smart rack power access point of the smart rack 2002B. In some embodiments, the smart rack power access point 2008 is connected to a power source (for example, a power outlet). As such, the x dimension smart rack switch circuit 2004A may control the flow of electricity from the smart rack 2002A to the smart rack 2002B. Similarly, in some embodiments, a first end of the y dimension smart rack switch circuit 2006A may be connected to the smart rack power access point of the smart rack 2002A, and a second end of the y dimension smart rack switch circuit 2006A may be connected to the smart rack power access point of the smart rack 2002D. As such, the y dimension smart rack switch circuit 2006A may control the flow of electricity from the smart rack 2002A to the smart rack 2002D.

In some embodiments, the example smart rack 2002B comprises an x dimension smart rack switch circuit 2004B and a y dimension smart rack switch circuit 2006B, similar to those described above. In some embodiments, a first end of the x dimension smart rack switch circuit 2004B may be connected to the smart rack power access point of the smart rack 2002B, and a second end of the x dimension smart rack switch circuit 2004B may be connected to the smart rack power access point of the smart rack 2002C. As such, the x dimension smart rack switch circuit 2004B may control the flow of electricity from the smart rack 2002B to the smart rack 2002C. Similarly, in some embodiments, a first end of the y dimension smart rack switch circuit 2006B may be connected to the smart rack power access point of the smart rack 2002B, and a second end of the y dimension smart rack switch circuit 2006B may be connected to the smart rack power access point of the smart rack 2002E. As such, the y dimension smart rack switch circuit 2006B may control the flow of electricity from the smart rack 2002B to the smart rack 2002D.

In some embodiments, the example smart rack 2002D comprises an x dimension smart rack switch circuit 2004D, similar to those described above. In some embodiments, a first end of the x dimension smart rack switch circuit 2004D may be connected to the smart rack power access point of the smart rack 2002D, and a second end of the x dimension smart rack switch circuit 2004D may be connected to the smart rack power access point of the smart rack 2002E. As such, the x dimension smart rack switch circuit 2004D may control the flow of electricity from the smart rack 2002D to the smart rack 2002E.

In some embodiments, the example smart matrix 2000 may receive, via a processing circuitry, movement instructions that require the smart rack 2002E to be activated. In some embodiments, the example smart matrix 2000 may determine, via a processing circuitry, one or more power paths that allow the power from the power source connected to the smart rack power access point 2008 to be conveyed to the smart rack 2002E. For example, the smart matrix 2000 may selectively enable one or more x dimension smart rack switch circuits and one or more y dimension smart rack switch circuits of the smart racks to enable power supply to the smart rack 2002E.

For example, the example smart matrix 2000 may first determine, via a processing circuitry, the rack coordination set associated with the smart rack that needs power. In the example shown in FIG. 20, the smart rack that needs power is smart rack 2002E, and the rack coordination set associated with the smart rack 2002E is (1, 1).

In some embodiments, the example smart matrix 2000 may transmit, via a processing circuitry, a power management instruction to a smart rack that is connected to the power source, and request that the smart rack enable one of the dimension smart rack switch circuits in one of the dimensions. In some embodiments, the example smart matrix 2000 may transmit the power management instruction to the processing circuitry of the smart rack. For example, the power management instruction may comprise a smart rack identifier that identifies a smart rack of which one or more dimension smart rack switch circuits need to be turned on/off. The power management instruction may further comprise an operation indication that determines whether to turn the corresponding dimension smart rack switch circuit on or off.

In the example shown in FIG. 20, the smart rack that is connected to the power source is smart rack 2002A with rack coordination set (0, 0), and the example smart matrix 2000 may request the smart rack 2002A to enable the x dimension smart rack switch circuit 2004A, allowing power to be provided to the smart rack power access point of the smart rack 2002B with the rack coordination set (1, 0).

In some embodiments, subsequent to enabling a dimension smart rack switch circuit of a smart rack in one dimension and providing power to a peer smart rack in that dimension, the example smart matrix 2000 determine whether the coordinate in that dimension of the peer smart rack is the same as the coordinate in that dimension of the smart rack that requires power.

In some embodiments, subsequent to enabling the x dimension smart rack switch circuit and providing power to a peer smart rack in one dimension (for example, the x dimension), the example smart matrix 2000 may determine whether of the coordinate in x dimension of the powered peer smart rack is the same as the coordinate in x dimension of the smart rack that requires power.

If not, the example smart matrix 2000 may transmit power management instructions to the powered peer smart rack and cause the powered peer smart rack to enable its x dimension smart rack switch circuit to its peer smart rack in the x dimension. This process may be continued until the coordinate in the x dimension of the powered peer smart rack is the same as the coordinate in the x dimension of the smart rack that requires power.

Continuing from the example above, subsequent to powering the smart rack 2002B, the example smart matrix 2000 may determine that the coordinate in the x dimension of the smart rack 2002B is the same as the coordinate in the x dimension of the smart rack that needs power (i.e. the smart rack 2002E).

If the coordinates in the x dimension are the same, the example smart matrix 2000 may determine whether the coordinate in the y dimension of the powered smart rack and the coordinate in the y dimension of the smart rack that needs power are the same. If not, the example smart matrix 2000 may transmit power management instructions to the powered peer smart rack and cause the powered peer smart rack to enable its y dimension smart rack switch circuit to its peer smart rack in the y dimension. This process may be continued until the coordinate in the y dimension of the powered peer smart rack is the same as the coordinate in the y dimension of the smart rack that requires power.

Continuing from the example above, subsequent to powering the smart rack 2002B, the example smart matrix 2000 may determine that the coordinate in the y dimension of the smart rack 2002B is not the same as the coordinate in the y dimension of the smart rack that needs power (i.e. the smart rack 2002E). The example smart matrix 2000 may enable the y dimension smart rack switch circuit of the example smart rack 2002B, and thereby providing power to the smart rack 2002E that needs power.

As such, the example smart matrix 2000 may define an example power path for providing electricity to the smart rack 2002E by: (1) enabling the x dimension smart rack switch circuit 2004A of the smart rack 2002A, which is connected to the smart rack 2002B and allows power to flow from the smart rack 2002A to the smart rack 2002B, and (2) enable the y dimension smart rack switch circuit 2006B of the smart rack 2002B, which is connected to the smart rack 2002E and allows power to flow from the smart rack 2002B. As such, power may flow from the power source that is connected to the smart rack power access point 2008 to the smart rack 2002E through a power path that includes the x dimension smart rack switch circuit 2004A of the smart rack 2002A and the y dimension smart rack switch circuit 2006B of the smart rack 2002B.

While the description above provides an example of a power path, it is noted that the scope of the present disclosure is not limited to the description above. In some examples, an example smart matrix 2000 may define an alternative power path for providing power to the smart rack 2002E. For example, the example smart matrix 2000 may define an example power path for providing electricity to the smart rack 2002E by: (1) enabling the y dimension smart rack switch circuit 2006A of the smart rack 2002A, which is connected to the smart rack 2002D and allows power to flow from the smart rack 2002A to the smart rack 2002D, and (2) enable the x dimension smart rack switch circuit 2004D of the smart rack 2002D, which is connected to the smart rack 2002E and allows power to flow from the smart rack 2002D. As such, power may flow from the power source that is connected to the smart rack power access point 2008 to the smart rack 2002E through a power path that includes the y dimension smart rack switch circuit 2006A of the smart rack 2002A and the x dimension smart rack switch circuit 2004D of the smart rack 2002D.

Figure 21A:
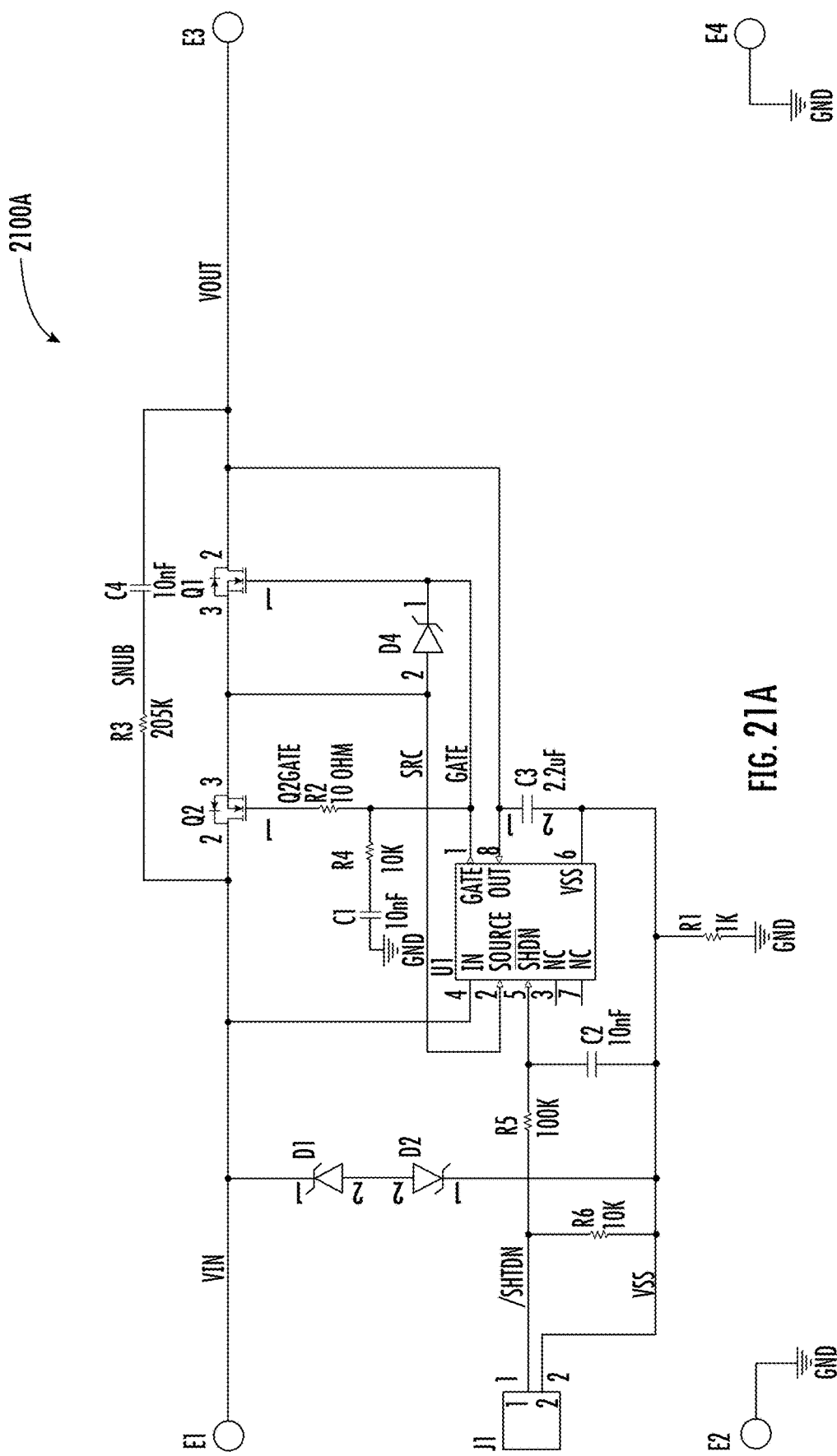
FIG. 21A is an example circuit diagram illustrating an example smart rack switch circuit of an example smart rack in accordance with some embodiments of the present disclosure.

Referring now to FIG. 21A, an example circuit diagram of an example smart rack switch circuit 2100A is illustrated.

In the example shown in FIG. 21A, the example smart rack switch circuit 2100A provides a control switch/relay mechanism that controls the flow of power between the input point E1 and the output point E3.

In some embodiments, the input point E1 may correspond to the first end of the smart rack switch circuit described above. For example, the input point E1 may be a smart rack power access point that is connected to a power source. As another example, the input point E1 may be a smart rack power access point that is connected to another smart rack switch circuit (for example, the input point E1 may be connected to an output point E3' of another smart rack switch circuit).

In some embodiments, the output point E3 may correspond to the second end of the smart rack switch circuit described above. For example, the output point E3 may be connected to a smart rack power access point of another smart rack (for example, the output point E3 may be connected to the input point E1' of another smart rack switch circuit).

In the example shown in FIG. 21A, the example circuit diagram comprises a power management chip U1 (such as, but not limited to, LTC4359). In particular, the power management chip U1 may comprise an input pin U1-4 and an output pin U1-8. In some embodiments, the U1-4 input pin is used to sense the supply power, and the voltage sensed at the output pin U1-8 is used to control the MOSFET gate. In some embodiments, the power-transistor Q2 controls the flow of power between the input point E1 and the output point E3. Power between the input point E1 and the output point E3 does not flow through U1, as the U1 senses the input and output voltages at pins 4 and 8 and controls the power-transistor Q2 to turn it on and/or off. For example, the power management chip U1 may cause the power-transistor Q2 to connect and/or disconnect the power between the input point E1 and the output point E3 based on control inputs received by the power management chip U1.

For example, the control input may be provided through the connector J1. As described above, the smart matrix may transmit the power management instruction to the processing circuitry of the smart rack, and the processing circuitry may transmit switch command through the connector J1 as control input. In the example shown in FIG. 21A, the connector J1 is connected to the shutdown control input pin 5. For example, the connector J1 may receive power management instructions from a processing circuitry. If the power management instruction indicates that the smart rack switch circuit should be turned off, the connector J1 transmits a signal to the power management chip U1, and the power management chip U1 causes the power-transistor Q1 and/or the power-transistor Q2 to disconnect the output point E3 from the input point E1. If the power management instruction indicates that the smart rack switch circuit should be turned on, the connector J1 transmits a signal to the power management chip U1, and the power management chip U1 causes the power-transistor Q1 and/or the power-transistor Q2 to connect the output point E3 to the input point E1.

In other words, the power management chip U1 enables/disables the power-transistor Q1 and/or the power-transistor Q2, which in turn enables/disables the output power at E3.

Pins 1 and 8 of the power management chip U1 monitor the input and output voltages. The power-transistor Q1 performs an ideal diode function, while the power-transistor Q2 acts as a switch to control forward power flow.

In some embodiments, the example smart rack switch circuit 2100A shown in FIG. 21A may provide various protection mechanisms. For example, the example smart rack switch circuit 2100A shown in FIG. 21A may allow multiple outputs of supplies to be tied together with selectable feeds, which may resolve the cube interconnect issue, and provide load switching, reverse input protection, and input short circuit protection.

For example, the power management chip U1 may comprise a pin 8 that may receive feedback voltage from the output point E3 to validate that the smart rack switch circuit is operating correctly. The body diodes of the power-transistor Q1 and the power-transistor Q2 prevent any current flow when the MOSFETS are off. The power-transistor Q1 serves as an ideal diode while the power-transistor Q2 acts as a switch to control power flow. The RC circuit that is comprised of C1 and R4 provides inrush control if needed. The transient voltage diodes (otherwise known as "transZorbs or TVS" diodes) D1 and D2 provide protection to the switch controller whenever the input voltage at E1 and E2 are swapped and/or short-circuited. The zener diode provides a 12 reference voltage. For input voltages 24V and greater, D4 is needed to protect the MOSFET's gate oxide during input short circuit conditions.

Figure 21B:
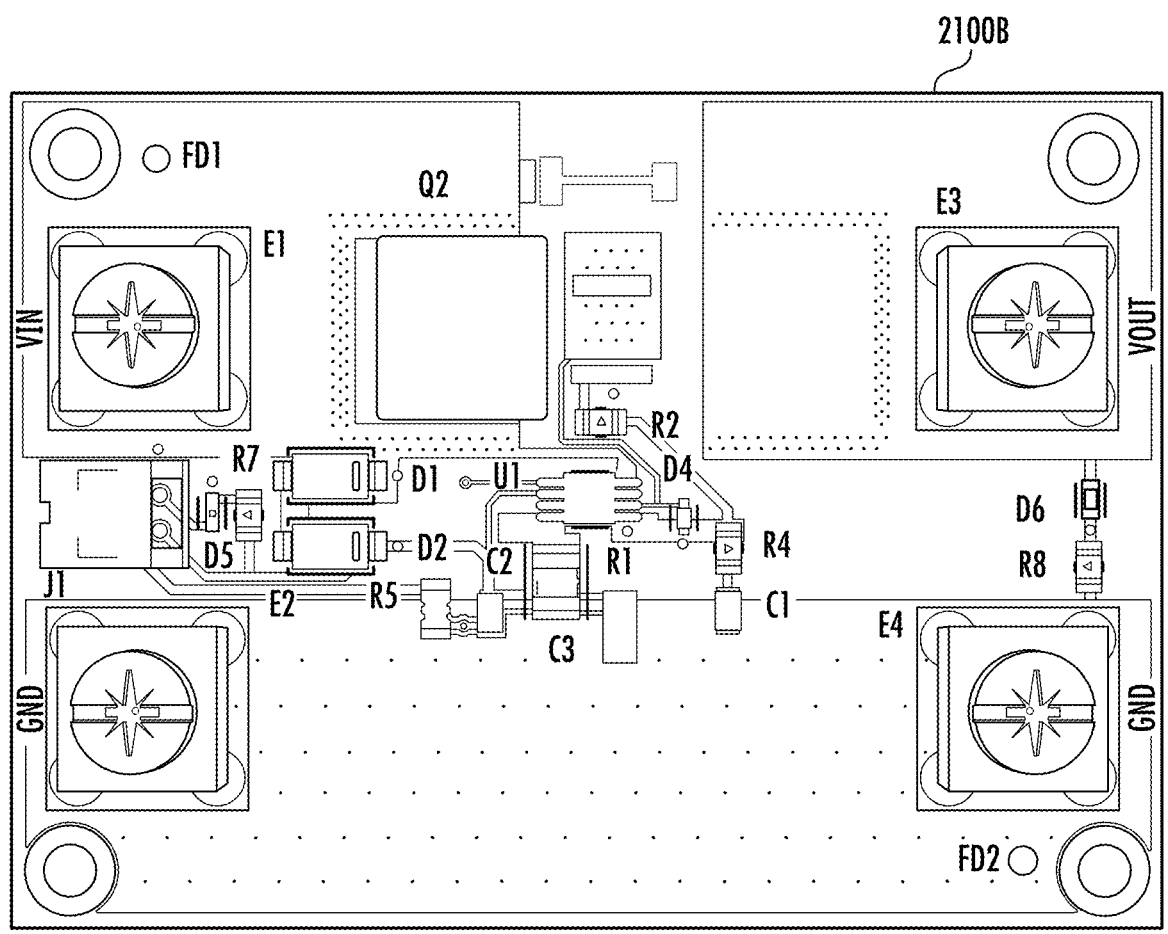
FIG. 21B is an example design diagram illustrating an example power board in accordance with some embodiments of the present disclosure.

FIG. 21B is an example design diagram illustrating an example power board 2100B in accordance with various embodiments of the present disclosure.

In some embodiments, the example power board 2100B illustrates an input point E1 and output point E3, similar to those described above. In some embodiments, the example power board 2100B may comprise a smart rack switch circuit that controls the flow of electricity from the input point E1 to the output point E3. For example, the smart rack switch circuit may include a power management chip U1, similar to those described above. As such, the example shown in FIG. 21B illustrates that there may be one power switch per board.

In some embodiments, the power board 2100B may implement a 2-layer board design that has a 1.6 mm thickness.

Figure 22:
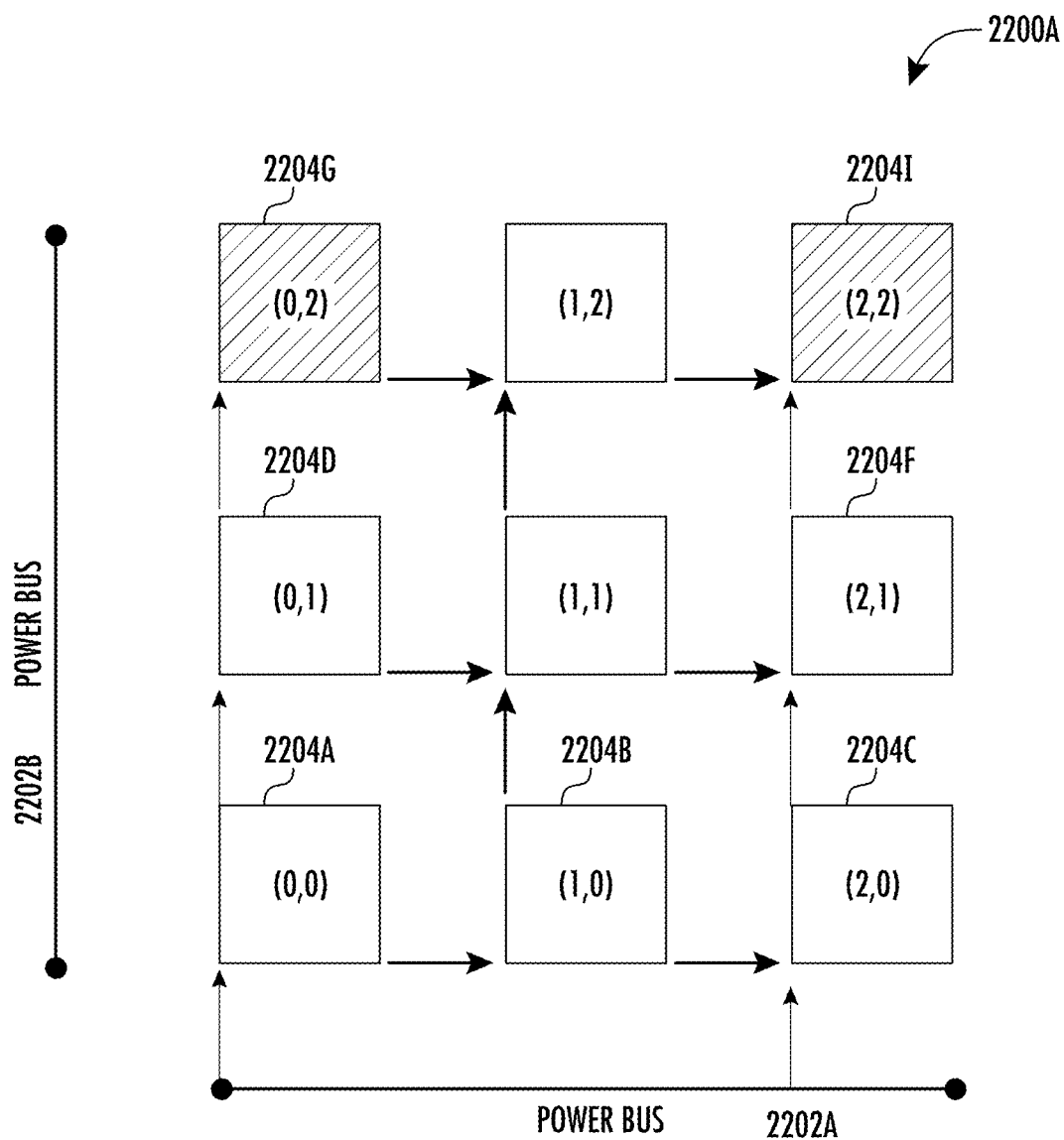
FIG. 22 is an example diagram illustrating an example smart matrix with power buses that provide power paths to various smart racks in a modular superstructure in accordance with some embodiments of the present disclosure.

Referring now to FIG. 22, an example diagram illustrates a portion of an example smart matrix 2200A with power buses in accordance with some embodiments of the present disclosure.

In accordance with various embodiments of the present disclosure, an example smart matrix may utilize one or more power buses to dynamically define one or more power paths and provide power to one or more smart racks in the modular superstructure. For example, the modular superstructure may comprise one power bus for each of the dimensions in the modular superstructure.

For example, if the modular superstructure is a three-dimensional structure, the modular superstructure may comprise an x dimension power bus that is connected to one or more smart racks along the x axis (where each smart rack may have the same coordinates on the y dimension and the z dimension, but different coordinates on the x dimension), a y dimension power bus that is connected to one or more smart racks along the y axis (where each smart rack may have the same coordinates on the x dimension and the z dimension, but different coordinates on the y dimension), and a z dimension power bus that is connected to one or more smart racks along the z axis (where each smart rack may have the same coordinates on the x dimension and the y dimension, but different coordinates on the z dimension).

As another example, if the modular superstructure is a two-dimensional structure, the modular superstructure may comprise an x dimension power bus that is connected to one or more smart racks along the x axis, and a y dimension power bus that is connected to one or more smart racks along the y axis.

The example shown in FIG. 22 illustrates two example power buses, including a power bus 2202A and a power bus 2202B. In some embodiments, the power bus 2202A may be a x dimension power bus, and the power bus 2202B may be a y dimension power bus.

For example, the power bus 2202A may be connected to one or more smart racks that are along the x dimension axis. For example, the one or more smart racks are associated with the same coordinate on the y dimension. In the example shown in FIG. 22, the smart rack 2204A is associated with the rack coordination set (0, 0), the smart rack 2204B is associated with the rack coordination set (1, 0), and the smart rack 2204C is associated with the (2, 0). In this example, the smart rack 2204A, the smart rack 2204B, and the smart rack 2204C are all associated with the same coordinate on the y dimension ("0"), and the power bus 2202A may be connected to each of the smart rack 2204A, the smart rack 2204B, and the smart rack 2204C. For example, the power bus 2202A may be connected to each smart rack power access point of each of the smart rack 2204A, the smart rack 2204B, and the smart rack 2204C. In some embodiments, when the power bus 2202A receives power, each of the smart rack 2204A, the smart rack 2204B, and the smart rack 2204C receives power as well.

Additionally, or alternatively, the power bus 2202B may be connected to one or more smart racks along the y dimension axis. For example, the one or more smart racks are associated with the same coordinate on the x dimension. In the example shown in FIG. 22, the smart rack 2204A is associated with the rack coordination set (0, 0), the smart rack 2204D is associated with the rack coordination set (0, 1), and the smart rack 2204G is associated with the (0, 2). In this example, the smart rack 2204A, the smart rack 2204D, and the smart rack 2204G are all associated with the same coordinate on the x axis, and the power bus 2202B may be connected to each of the smart rack 2204A, the smart rack 2204D, and the smart rack 2204G. For example, the power bus 2202B may be connected to each smart rack power access point of each of the smart rack 2204A, the smart rack 2204D, and the smart rack 2204G. In some embodiments, when the power bus 2202B receives power, each of the smart rack 2204A, the smart rack 2204D, and the smart rack 2204G receives power as well.

In some embodiments, one end of each power bus may be connected to a power bus switch circuit. The power bus switch circuit may be connected directly or indirectly to a power source. As such, the power bus switch circuit may control the flow of power from the power source to the corresponding power bus (and to the one or more smart racks that are connected to the corresponding power bus).

For example, the x dimension power bus switch circuit may be connected between the power source and the x dimension power bus. In such an example, the x dimension power bus switch circuit may control the flow of power from the power source to the x dimension power bus.

As another example, the y dimension power bus switch circuit may be connected between the power source and the y dimension power bus. In such an example, the y dimension power bus switch circuit may control the flow of power from the power source to the y dimension power bus.

As another example, the z dimension power bus switch circuit may be connected between the power source and the z dimension power bus. In such an example, the z dimension power bus switch circuit may control the flow of power from the power source to the z dimension power bus.

In some embodiments, each of the smart racks also comprises one or more smart rack switch circuits. For example, each of the smart racks may comprise an x dimension smart rack switch circuit, a y dimension smart rack switch circuit, and/or a z dimension smart rack switch circuit, similar to those described above.

In some embodiments, the example smart matrix with power buses may receive movement instructions that require one or more smart racks to be powered/to receive electricity, and may dynamically determine one or more power paths for the one or more smart racks. In the example shown in FIG. 22, the example smart matrix 2200A may receive, via a processing circuitry, movement instructions that require the smart rack 2204I to be activated/powered. In some embodiments, the example smart matrix 2200A may determine, via a processing circuitry, one or more power paths that provide power from the power source to the smart rack 2204I. For example, the smart matrix 2200A may selectively turn on one of the power bus switch circuits and one or more smart rack switch circuits.

For example, the example smart matrix 2200A may first determine, via a processing circuitry, the rack coordination set associated with the smart rack that needs power. In the example shown in FIG. 22, the smart rack that needs power is smart rack 2204I, and the rack coordination set associated with the smart rack 2204I is (2, 2).

In some embodiments, the example smart matrix 2200A may transmit, via a processing circuitry, a power management instruction to turn on one of the power bus switch circuits that is connected to one of the power buses along one of the axes/in one of the dimensions. For example, the example smart matrix 2200A may turn on the x dimension power bus switch circuit.

In this example, when the x dimension power bus switch circuit is turned on, power may be provided to the power bus 2202A (e.g. an x dimension power bus). As described above, the power bus 2202A is connected to one or more smart racks along the x axis. As such, power may be provided to the smart rack 2204A, the smart rack 2204B, and the smart rack 2204C.

In some embodiments, subsequent to turning on the power bus switch circuit that is in a particular dimension, the example smart matrix 2200A may select, via a processing circuitry, a smart rack that is connected to the power bus and has the same coordinate in the that particular dimension as that of the smart rack that requires power.

For example, in the example shown in FIG. 22, the example smart matrix 2200A may select, via a processing circuitry, the smart rack 2204C. In this example, the smart rack 2204C is associated with the coordinate "2" in the x dimension, and the smart rack 2204I is associated with the coordinate "2" in the x dimension as well. As such, the smart rack 2204C has the same coordinate in the x dimension as the smart rack 2204I.

In some embodiments, subsequent to selecting the smart rack, the example smart matrix 2200A may determine, via a processing circuitry, whether the selected smart rack has the same coordinate in another dimension as the smart rack that requires power. If not, the example smart matrix 2200A may cause the power smart rack to turn on the smart rack switch circuit in the other dimension.

For example, in the example shown in FIG. 22, the example smart matrix 2200A may determine, via a processing circuitry, whether the smart rack 2204C has the same coordinate in the y dimension as the smart rack 2204I. In this example, the smart rack 2204C is associated with the coordinate "0" in the y dimension, and the smart rack 2204I is associated with the coordinate "2" in the y dimension. As such, the example smart matrix 2200A may determine that the smart rack 2204C is not associated with the same coordinate in the y dimension as that of the smart rack 2204I, and may turn on the y dimension power bus switch circuit of the smart rack 2204I so as to provide power to the smart rack 2204F.

In some embodiments, the above process may be repeated until the coordinate in the y dimension of a powered smart rack is the same as the coordinate in the y dimension of the smart rack that requires power. For example, the processing circuitry may determine that the smart rack 2204F is not associated with the same coordinate in the y dimension as that of the smart rack 2204I, and may turn on the y dimension power bus switch circuit of the smart rack 2204F so as to provide power to the smart rack 2204I.

As such, the description above illustrates an example dynamic power path that provides power to the smart rack 2204I by turning on the x dimension power bus switch circuit and the y dimension smart rack switch circuits of the smart rack 2204C and the smart rack 2204F. In this example, the example smart matrix 2200A may define a power path from the power source, via the power bus 2202A, the smart rack 2204C, the smart rack 2204F, and to the smart rack 2204I.

While the description above provides an example of a power path, it is noted that the scope of the present disclosure is not limited to the description above. In some examples, an example power path may be dynamically determined through other mechanisms.

As such, various embodiments of the present provide mechanisms that can dynamically define an on-demand power path. For example, the on-demand power path may be established during a period when a smart rack is to actuate its motors to move a rectangular prism and is disabled when the move is complete. Advantageously, in some examples, such an on demand power path may reduce overall power usage and may allow for a larger modular superstructure.

Figure 23:
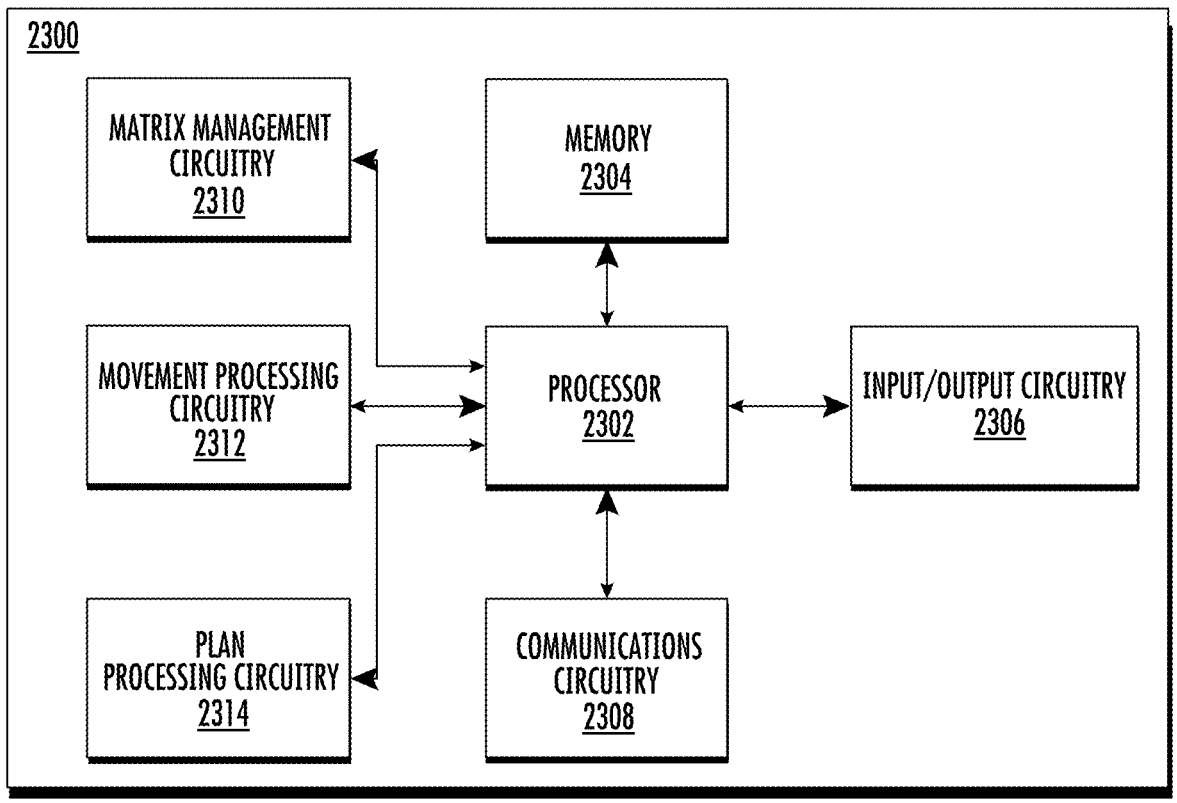
FIG. 23 illustrates a block diagram of an example superstructure control apparatus in accordance with at least some example embodiments of the present disclosure.

FIG. 23 illustrates a block diagram of an example superstructure control apparatus in accordance with at least some example embodiments of the present disclosure. In some embodiments, the superstructure control apparatus embodies one or more computing device(s) and/or system(s) that control operations of a modular superstructure (e.g., embodied in physical smart racks or an emulated modular superstructure). FIG. 23 depicts an example superstructure control apparatus 2300 (also referred to as a "superstructure controller"), as further described herein. The superstructure control apparatus 2300 includes a processor 2302, a memory 2304, input/output circuitry 2306, communications circuitry 2308, matrix management circuitry 2310, movement processing circuitry 2312, and plan processing circuitry 2314. In some embodiments, the superstructure control apparatus 2300 is configured, using one or more of the sets of circuitry 2302, 2304, 2306, 2308, 2310, 2312, and/or 2314, to execute the operations described herein.

Although components are described with respect to functional limitations, it should be understood that the particular implementations necessarily include the user of particular computing hardware. It should also be understood that in some embodiments certain of the components described herein include similar or common hardware. For example, two sets of circuitry may both leverage use of the same processor(s), network interface(s), storage medium(s), and/ or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively, or additionally, in some embodiments, other elements of the superstructure control apparatus 2300 provide or supplement the functionality of other particular sets of circuitry. For example, the processor 2302 in some embodiments provides processing functionality to any of the sets of circuitry, the memory 2304 provides storage functionality to any of the sets of circuitry, the communications circuitry 2308 provides network interface functionality to any of the sets of circuitry, and/or the like.

In some embodiments, the processor 2302 (and/or co-processor or any other processing circuitry assisting or otherwise associated with the processor) is/are in communication with the memory 2304 via a bus for passing information among components of the superstructure control apparatus 2300. In some embodiments, for example, the memory 2304 is non-transitory and may include, for example, one or more volatile and/or non-volatile memories. In other words, for example, the memory 2304 in some embodiments includes or embodies an electronic storage device (e.g., a computer readable storage medium). In some embodiments, the memory 2304 is configured to store information, data, content, applications, instructions, or the like, for enabling the superstructure control apparatus 2300 to carry out various functions in accordance with example embodiments of the present disclosure.

The processor 2302 may be embodied in a number of different ways. For example, in some example embodiments, the processor 2302 includes one or more processing devices configured to perform independently. Additionally, or alternatively, in some embodiments, the processor 2302 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the superstructure control apparatus 2300, and/or one or more remote or "cloud" processor(s) external to the superstructure control apparatus 2300.

In an example embodiment, the processor 2302 is configured to execute instructions stored in the memory 2304 or otherwise accessible to the processor. Alternatively, or additionally, the processor 2302 in some embodiments is configured to execute hard-coded functionality. As such, whether configured by hardware or software methods, or by a combination thereof, the processor 2302 represents an entity (e.g., physically embodied in circuitry) capable of performing operations according to an embodiment of the present disclosure while configured accordingly. Alternatively, or additionally, as another example in some example embodiments, when the processor 2302 is embodied as an executor of software instructions, the instructions specifically configure the processor 2302 to perform the algorithms embodied in the specific operations described herein when such instructions are executed.

As one particular example embodiment, the processor 2302 is configured to perform various operations associated with representing, processing, and/or otherwise controlling a modular superstructure, for example as described herein. In some embodiments, the processor 2302 includes hardware, software, firmware, and/or a combination thereof, that receives configuration data (e.g., in the form of a configuration file or retrieved configuration data) representing a modular superstructure. Additionally, or alternatively, in some embodiments, the processor 2302 includes hardware, software, firmware, and/or a combination thereof, that initializes a smart rack matrix, for example including particular data (e.g., peer information, connections, states, behaviors, and/or the like) from configuration data. Additionally, or alternatively, in some embodiments, the processor 2302 includes hardware, software, firmware, and/or a combination thereof, that executes one or more movement algorithm(s), for example for processing tote queries via the modular superstructure with or without defined constraints. Additionally, or alternatively, in some embodiments, the processor 2302 includes hardware, software, firmware, and/ or a combination thereof, that generates a movement plan, for example based on the results of the movement algorithm(s). Additionally, or alternatively, in some embodiments, the processor 2302 includes hardware, software, firmware, and/or a combination thereof, that outputs a movement plan, for example for execution via an emulated modular superstructure and/or an actual, physical modular superstructure in the real world.

In some embodiments, the superstructure control apparatus 2300 includes input/output circuitry 2306 that provides output to the user and, in some embodiments, to receive an indication of a user input. In some embodiments, the input/ output circuitry 2306 is in communication with the processor 2302 to provide such functionality. The input/output circuitry 2306 may comprise one or more user interface(s) and in some embodiments includes a display that comprises the interface(s) rendered as a web user interface, an application user interface, a user device, a backend system, or the like. In some embodiments, the input/output circuitry 2306 also includes a keyboard, a mouse, a joystick, a touch screen, touch areas, soft keys a microphone, a speaker, a holographic display, an augmented reality display or system, a virtual reality display or system, at least one projector and/or screen display, or other input/output mechanisms. The processor 2302 and/or input/output circuitry 2306 comprising the processor may be configured to control one or more functions of one or more user interface elements through computer program instructions (e.g., software and/or firmware) stored on a memory accessible to the processor (e.g., memory 2304, and/or the like). In some embodiments, the input/output circuitry 2306 includes or utilizes a user-facing application to provide input/output functionality to a client device and/or other display associated with a user.

The communications circuitry 2308 includes any means such as a device or circuitry embodied in either hardware or a combination of hardware and software that is configured to receive and/or transmit data from/to a network and/or any other device, circuitry, or module in communication with the superstructure control apparatus 2300. In this regard, the communications circuitry 2308 includes, for example in some embodiments, a network interface for enabling communications with a wired or wireless communications network. Additionally, or alternatively in some embodiments, the communications circuitry 2308 includes one or more network interface card(s), antenna(s), bus(es), switch(es), router(s), modem(s), and supporting hardware, firmware, and/or software, or any other device suitable for enabling communications via one or more communications network(s). Additionally, or alternatively, the communications circuitry 2308 includes circuitry for interacting with the antenna(s) and/or other hardware or software to cause transmission of signals via the antenna(s) or to handle receipt of signals received via the antenna(s). In some embodiments, the communications circuitry 2308 enables transmission to and/or receipt of data from a client device in communication with the superstructure control apparatus 2300.

The matrix management circuitry 2310 includes hardware, software, firmware, and/or a combination thereof, that supports various functionality associated with smart rack matrix maintenance. For example, in some embodiments, the matrix management circuitry 2310 includes hardware, software, firmware, and/or a combination thereof, that accesses configuration data associated with configuration of a smart data matrix. Additionally, or alternatively, in some embodiments, the matrix management circuitry 2310 includes hardware, software, firmware, and/or a combination thereof, that generates a smart rack matrix embodied by data representing a modular superstructure, for example based on accessed configuration data. Additionally, or alternatively, in some embodiments, the matrix management circuitry 2310 includes hardware, software, firmware, and/or a combination thereof, that initializes one or more data portion(s) of a smart rack matrix (e.g., behaviors, states, allowable moves/actions for repositioning totes, clock management, and/or the like). Additionally, or alternatively, in some embodiments, the matrix management circuitry 2310 includes hardware, software, firmware, and/or a combination thereof, that stores and/or otherwise maintains the smart rack matrix for subsequent use, retrieval, transmission, and/or other processing. In some embodiments, the matrix management circuitry 2310 includes a separate processor, specially configured field programmable gate array (FPGA), or a specially programmed application specific integrated circuit (ASIC).

The movement processing circuitry 2312 includes hardware, software, firmware, and/or a combination thereof, that supports various functionality associated with processing a smart rack matrix to route movement via the corresponding modular superstructure. For example, in some embodiments, the movement processing circuitry 2312 includes hardware, software, firmware, and/or a combination thereof, that initiates one or more movement algorithm(s) that process a smart rack matrix. Additionally, or alternatively, in some embodiments, the movement processing circuitry 2312 includes hardware, software, firmware, and/or a combination thereof, that generates one or more tote movement path(s) by processing the smart rack matrix, for example utilizing one or more movement algorithm(s). Additionally, or alternatively, in some embodiments, the movement processing circuitry 2312 includes hardware, software, firmware, and/or a combination thereof, that minimizes or reduces a particular cost (e.g., a movement resistance value) associated with initiating one or more action(s) via a modular superstructure represented by a smart rack matrix. Additionally, or alternatively, in some embodiments, the movement processing circuitry 2312 includes hardware, software, firmware, and/or a combination thereof, that processes one or more tote query/queries via a smart rack matrix. Additionally, or alternatively, in some embodiments, the movement processing circuitry 2312 includes hardware, software, firmware, and/or a combination thereof, that defines egress and ingress points for any number of queried totes. In some embodiments, the movement processing circuitry 2312 includes a separate processor, specially configured field programmable gate array (FPGA), or a specially programmed application specific integrated circuit (ASIC).

The plan processing circuitry 2314 includes hardware, software, firmware, and/or a combination thereof, that supports various functionality associated with generating and/or outputting instructions associated with operation of a modular superstructure. The plan processing circuitry 2314 includes hardware, software, firmware, and/or a combination thereof, that supports functionality for assigning or otherwise executing operations, steps, and/or tasks to be executed by smart racks of a modular superstructure. For example, in some embodiments, the plan processing circuitry 2314 includes hardware, software, firmware, and/or a combination thereof, that generates a movement plan, for example based on data generated, identified, or otherwise produced via one or more movement algorithm(s). Additionally, or alternatively, in some embodiments, the plan processing circuitry 2314 includes hardware, software, firmware, and/or a combination thereof, that generates one or more data file(s), data command(s), transmission(s), and/or other data embodying instructions for operating one or more portion(s) of a modular superstructure represented by a smart rack matrix. Additionally, or alternatively, in some embodiments, the plan processing circuitry 2314 includes hardware, software, firmware, and/or a combination thereof, that outputs generated data, for example a movement plan, for processing, display, visualization, execution, and/or the like. In some embodiments, the plan processing circuitry 2314 includes a separate processor, specially configured field programmable gate array (FPGA), or a specially programmed application specific integrated circuit (ASIC).

Additionally, or alternatively, in some embodiments, one or more of the sets of circuitry 2302-2314 are combinable. Alternatively, or additionally, in some embodiments, one or more of the sets of circuitry perform some or all of the functionality described associated with another component. For example, in some embodiments, one or more sets of circuitry 2302-2314 are combined into a single module embodied in hardware, software, firmware, and/or a combination thereof. Similarly, in some embodiments, one or more of the sets of circuitry, for example matrix management circuitry 2310, movement processing circuitry 2312, and/or plan processing circuitry 2314, is/are combined such that the processor 2302 performs one or more of the operations described above with respect to each of these circuitry individually.

Figure 24:
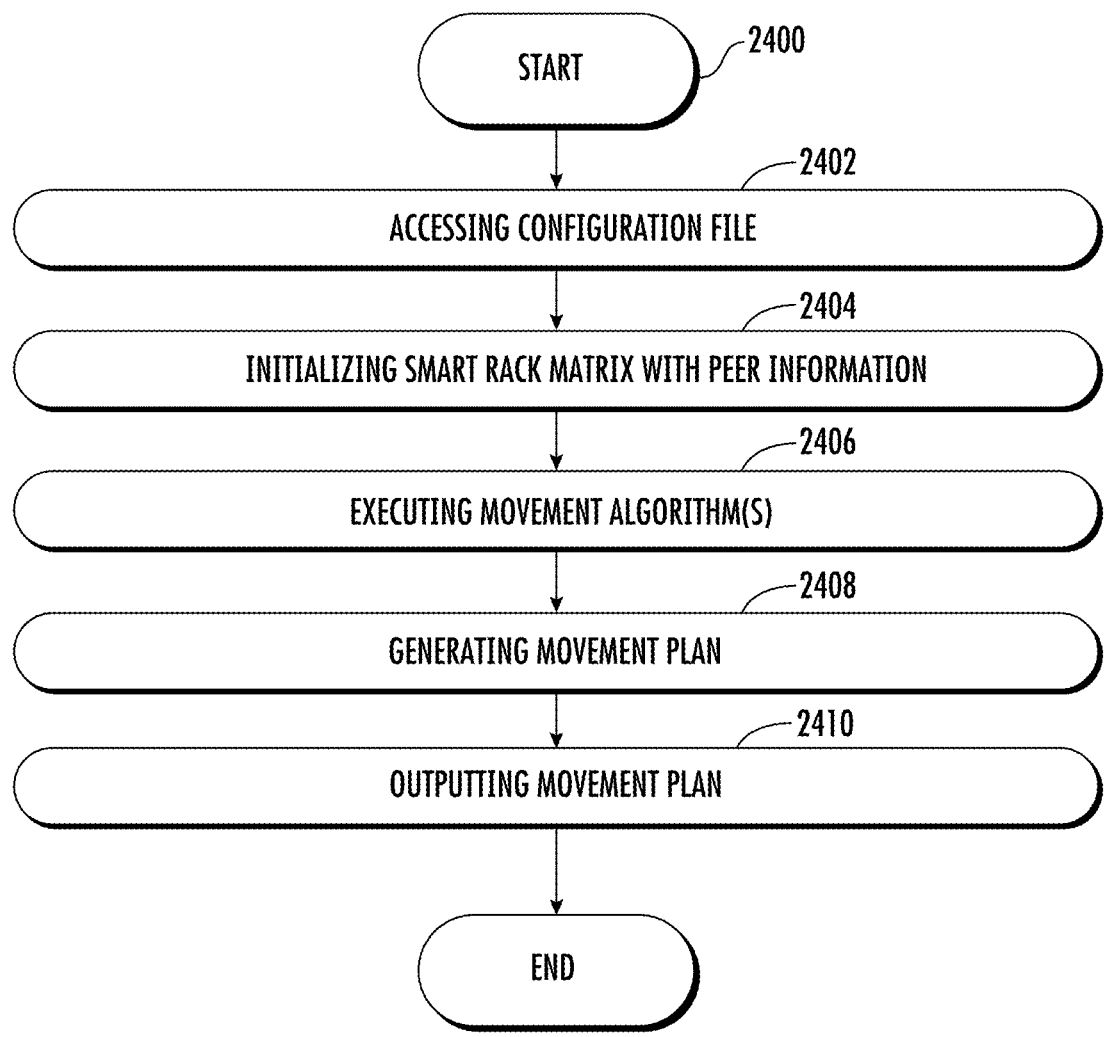
FIG. 24 illustrates a flowchart depicting operations of an example process for outputting a movement plan for a smart rack matrix in accordance with at least some example embodiments of the present disclosure.

FIG. 24 illustrates a flowchart depicting operations of an example process for outputting a movement plan for a smart rack matrix in accordance with at least some example embodiments of the present disclosure. Specifically, FIG. 24 depicts an example process 2400, for example for initializing and processing a smart rack matrix. The process 2400 is performable by any number of computing device(s) as described herein, for example embodiment in hardware, software, firmware, and/or any combination thereof. In some embodiments, the apparatus 2300 includes the various circuitry as means for performing each operation of the process 2400.

At operation 2402, the process 2400 includes accessing a configuration file. In some embodiments, the configuration file embodies a smart matrix manifest and/or other file that represents at least the structure (e.g., a physical configuration and/or connections thereof) of smart racks within a modular superstructure. In some embodiments, the configuration file is received from a server, data repository, and/or the like. In some embodiments, the configuration file is stored locally by a particular computing device, system, data repository, and/or the like. It will be appreciated that, in some embodiments, a configuration file comprises or is defined by a plurality of sub-files that each include particular portions of the configuration of a modular superstructure.

At operation 2404, the process 2400 includes initializing a smart rack matrix with peer information. In some embodiments, the smart rack matrix is initialized as data that represents each smart rack in the modular superstructure, a physical design and/or configuration of the modular superstructure, and/or connection(s) between the smart rack(s) in the modular superstructure. For example, in some embodiments, the peer information indicates peer smart rack(s) associated with a particular smart rack (e.g., peer smart rack identifier) that may be subsequently used to quickly identify the data associated with a peer of a particular smart rack. Additionally, or alternatively, in some embodiments, the peer information includes movement resistance value(s) for moving to a particular peer, whether movement towards a particular peer is possible, whether movement from a particular peer is possible, and/or the like. In some embodiments, the smart rack matrix is initialized as a data graph matrix comprising a plurality of nodes and edges, as described herein.

At operation 2406, the process 2400 includes executing one or more movement algorithm(s). In some embodiments, the movement algorithm(s) determine data representing how a particular tote should move from its current position, representing a tote starting position, to a tote ending position. In some embodiments, the movement algorithm(s) generate in rack operation(s) to be performed to relocate one or more tote(s) via a modular superstructure, for example in accordance with one or more tote queries. In some embodiments, the movement algorithm(s) are performed to reduce or minimize a particular movement resistance value associated with moving the tote(s), for example time, power usage, computing resources, and/or the like. In some embodiments, the movement algorithm(s) are performed to satisfy delineated egress and ingress points, for example defined from input tote queries, user inputs, automatic determination(s), and/or the like. In some embodiments, the movement algorithm(s) include one or more brute force algorithm(s) and/or direct algorithm(s) as described herein with respect to FIGS. 25-28. In some embodiments, the movement algorithm(s) include one or more sliding A* algorithm(s) as described herein with respect to FIGS. 29-43.

At operation 2408, the process 2400 includes generating a movement plan. In some embodiments, the movement plan embodies a tote plan for relocating particular totes within the modular superstructure. The movement plan may include data utilized for operating one or more smart rack(s) according to data resulting from the movement algorithm(s) performed at an earlier operation, for example operation 2406. In some embodiments, the movement plan embodies a file, data stream, instruction set, or other structured data representation of the rack operation(s) to be performed. In one example context, the movement plan embodies a JSON file that includes JSON blocks for performing the tote operations embodying or associated with the movement data (e.g., tote movement path(s)) determined via the movement algorithm(s). In other embodiments, the movement plan embodies hardware-specific instructions for controlling one or more smart rack(s) directly. It will be appreciated that the movement plan may be generated in any of a myriad of desired data format(s).

At operation 2410, the process 2400 includes outputting the movement plan. In some embodiments, the movement plan is output for storing in one or more database(s), cache(s), instruction buffer(s), and/or the like for subsequent retrieval. In some embodiments, the movement plan is output as instructions for execution by smart rack(s) of a particular modular superstructure. In some embodiments, the movement plan is output as a file, transmission, or other data to an external system for executing, storing, and/or further processing. In some embodiments, the movement plan is output to a user interface, for example of a client device, a backend server, one or more user device(s), and/or the like. In some embodiments, the movement plan is output as instructions for executing by an emulation system, for example where the emulation system is configured to emulate operation of a particular modular superstructure. In some embodiments, the apparatus 2300 causes the particular smart racks of the modular superstructure to operate according to the movement plan (e.g., an outputted tote plan). Alternatively, or additionally, in some embodiments, the apparatus 2300 outputs the movement plan such that the subunits of the modular superstructure (e.g., the individual smart racks) may determine when and/or how to execute the instructions embodied in the movement plan.

Figure 25:
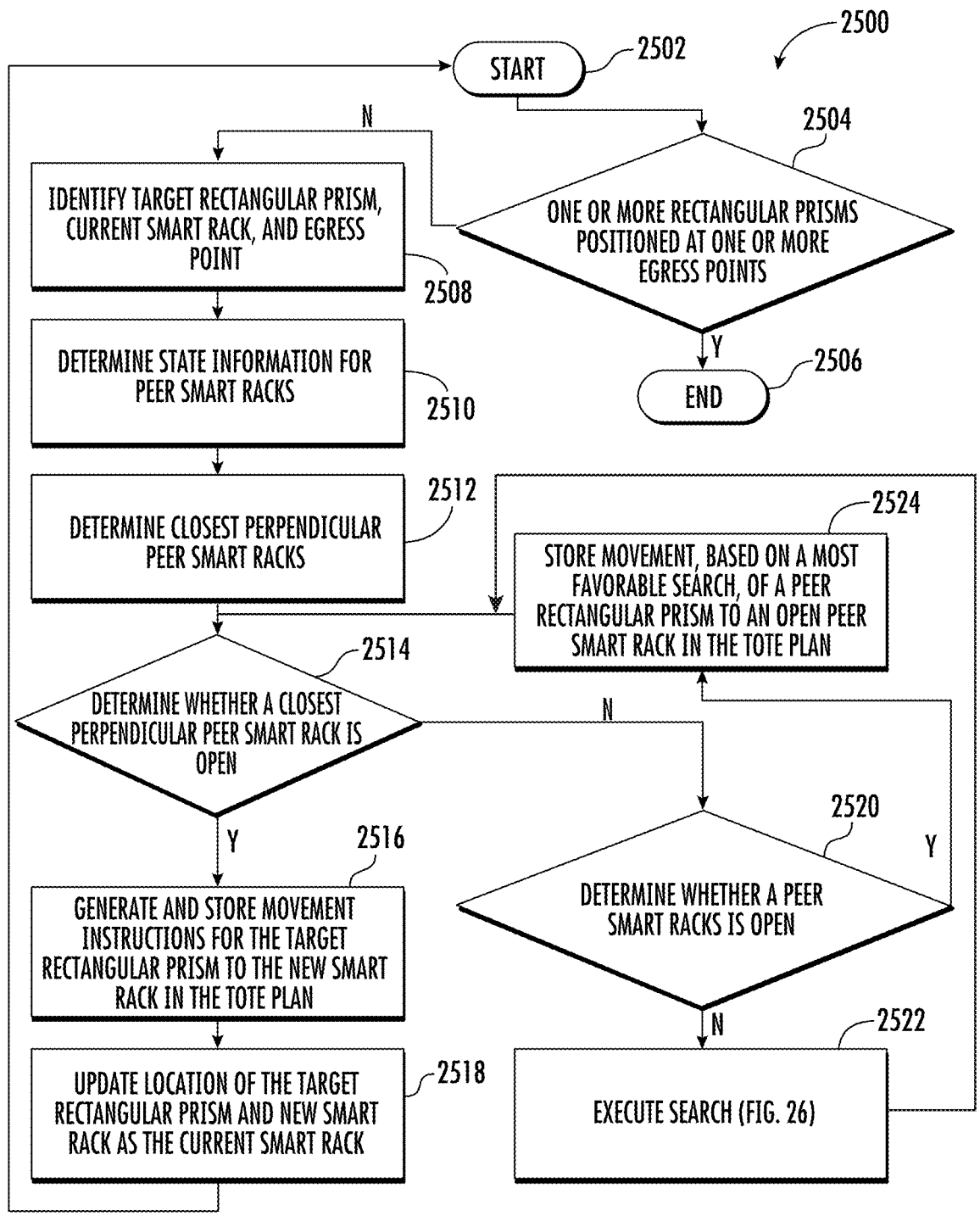
FIG. 25 illustrates a flowchart including operations for generating a tote plan in accordance with at least some example embodiments of the present disclosure.

FIG. 25 illustrates a flowchart including operations for generating a tote plan in accordance with at least some example embodiments of the present disclosure. Specifically, FIG. 25 illustrates operations of an example process 2500. In some embodiments, the example process 2500 is embodied by computer program code stored on a non-transitory computer-readable storage medium of a computer program product configured for execution to perform the process as depicted and described. Alternatively, or additionally, in some embodiments, the process 2500 is performed by one or more specially configured computing devices, such as the superstructure controller 2300 alone or in communication with one or more other component(s), device(s), system(s), and/or the like. In this regard, in some such embodiments, the superstructure controller 2300 is specially configured by computer-coded instructions (e.g., computer program instructions) stored thereon, for example in the memory 2304 and/or another component depicted and/or described herein and/or otherwise accessible to the superstructure controller 2300, for performing the operations as depicted and described. In some embodiments, the superstructure controller 2300 is in communication with one or more external apparatus(es), system(s), device(s), and/or the like, to perform one or more of the operations as depicted and described. For example, the superstructure controller 2300 may be in communication with any number of real-time sensor(s), data stores, input/output streams, other computing device(s), and/or the like. For purposes of simplifying the description, the process 2500 is described as performed by and from the perspective of superstructure controller 2300.

The process 2500 begins at operation 2502. At decision block 2504, the superstructure controller 2300 includes means, such as the processor 2302, memory 2304, input/output circuitry 2306, communications circuitry 2308, and/or the like, or a combination thereof, to determine whether one or more target rectangular prisms are positioned at one or more egress points. As was described with respect to FIG. 24, one or more target rectangular prisms are identified along with one or more corresponding egress points. During operation of process 2500, and in other processes outlined herein, superstructure controller 2300 determines one or more movements that are designed to move the one or more target rectangular prisms so that they may reach and/or exit via one or more corresponding egress points. The one or more movements are stored in a tote plan.

If one or more identified movements have not yet moved the one or more target rectangular prisms to the one or more egress points, the process continues at operation 2508. If, however, one or more identified movements in the movement plan have moved the one or more target rectangular prisms to the one or more egress points, the process ends at operation 2506 and the movement plan is returned in accordance with the operations outlined in FIG. 24.

At operation 2508, the superstructure controller 2300 includes means, such as the processor 2302, memory 2304, input/output circuitry 2306, communications circuitry 2308, and/or the like, or a combination thereof, to identify a target rectangular prism and a current smart rack.

As described above, the superstructure controller 2300 determines, accesses, or otherwise inputs a target rectangular prism. In some examples, the superstructure controller 2300 determines the current smart rack that currently is holding or otherwise retaining the target rectangular prism. In some examples and as described elsewhere herein, the current smart rack may be identified based on a three dimensional coordinate system. In some examples, the superstructure controller 2300 determines, accesses, or otherwise inputs an egress point. As is described herein, the tote plan is configured to provide a series of movements that moves, urges, or otherwise directs the target rectangular prism to the egress point.

At operation 2510, the superstructure controller 2300 includes means, such as the processor 2302, memory 2304, input/output circuitry 2306, communications circuitry 2308, and/or the like, or a combination thereof, to determine state information for peer smart racks. In some examples, state information may include an indication as to whether a smart rack is open, occupied with a rectangular prism, is blocked, or is otherwise unavailable. In some examples, a smart rack may be blocked based on a malfunction. In other examples, a smart rack may be marked as blocked because it is being used or is being otherwise held open based on another operation in the tote plan. Alternatively, or additionally, a flag may be set that marks a smart rack as blocked because it is being used by another process.

As is described above, peers are smart racks that are connected to, in communication with, or are otherwise affixed to the current smart rack. In some examples, a peer may be a perpendicular peer if a rectangular prism in the current smart rack can be directly transferred to it (e.g., a smart rack that is to the left, right, front, back, above, or below the current smart rack). That is, upon actuation of the motors and arms on the current smart rack, a rectangular prism can be transferred from the current smart rack to a perpendicular peer smart rack without any other moves in between. In some examples, the peers and the perpendicular peers are identified by three coordinates.

In order to determine state information, the superstructure controller 2300 accesses the smart rack matrix, the current tote plan, and/or the like. For example, the superstructure controller 2300 may access the smart rack matrix and then update it based on the current tote plan to determine whether a smart rack, to include a peer smart rack can be marked as occupied, blocked, or otherwise unavailable.

At operation 2512, the superstructure controller 2300 includes means, such as the processor 2302, memory 2304, input/output circuitry 2306, communications circuitry 2308, and/or the like, or a combination thereof, to determine closest perpendicular peer smart racks. In some examples, and based on the peers, and their respective states, identified at operation 2510, the superstructure controller 2300, including means such as the processor 2302, memory 2304, input/output circuitry 2306, communications circuitry 2308, and/or the like, or a combination thereof is configured to measure, such as by straight line distance, radial distance, number of moves, mathematical operation or the like, the distance from each perpendicular peer smart rack to the egress point. In some examples, the closest perpendicular peer smart racks (e.g., closest with respect to the egress point and/or in the direction of the egress point) are identified. In other examples two, or preferably three, closest perpendicular peer smart racks are identified.

At decision block 2504, the superstructure controller 2300 includes means, such as the processor 2302, memory 2304, input/output circuitry 2306, communications circuitry 2308, and/or the like, or a combination thereof, to determine whether a closest perpendicular peer smart rack is open. In some examples, a smart rack may have a state of open if a rectangular prism can be transferred to it. That is, if the smart rack is able to accept a rectangular prism, it is marked as open.

By way of example and as shown in FIG. 27a, a target rectangular prism may be positioned in smart rack 2702. Based on the aforementioned steps, the superstructure controller 2300 may have identified that perpendicular peer smart racks 2706 are the closest open smart racks to the egress point 2704. In such a case, and as described below, the target rectangular prism may be moved to one of perpendicular peer smart racks 2706.

Returning to FIG. 25, if the closest perpendicular peer smart rack is open, the target rectangular prism is moved to the open peer and then operations continue at operation 2516. If the closest perpendicular peer smart rack is not marked as open (e.g., it is marked as occupied, blocked or otherwise unavailable), then operations continue at decision block 2520.

At operation 2516, the superstructure controller 2300 includes means, such as the processor 2302, memory 2304, input/output circuitry 2306, communications circuitry 2308, and/or the like, or a combination thereof, to generate movement instructions for the target rectangular prism to the new smart rack and store the movement instructions in the tote plan. In some examples and once a closest perpendicular peer smart rack is determined to be open, the target rectangular prism is moved. In some examples, the target rectangular prism is not yet actually moved in the superstructure but is instead moved virtually as a result of a movement being made in the tote plan. That is, the instructed movement is written in the tote plan. As a result, and in some examples, the move of the target rectangular prism to the closest perpendicular peer smart rack is stored in the tote plan.

At operation 2518, the superstructure controller 2300 includes means, such as the processor 2302, memory 2304, input/output circuitry 2306, communications circuitry 2308, and/or the like, or a combination thereof, to update the location of the location of the target rectangular prism and the new smart rack (e.g., the closest peer that just received the target rectangular prism) is set as the current smart rack. That is, the matrix is updated to include the moves that were made in this iteration. The process then restarts at operation 2502.

At decision block 2520, the superstructure controller 2300 includes means, such as the processor 2302, memory 2304, input/output circuitry 2306, communications circuitry 2308, and/or the like, or a combination thereof, to determine whether a peer smart rack is open. That is, the superstructure controller 2300, after determining that there is not a closest perpendicular peer smart rack that is open, searches (e.g., radially, concentrically at each distance of n, in a particular direction, such as in the direction of the egress point, or the like), based on the state information for peer smart racks, for an open peer smart rack. In some examples, the superstructure controller 2300 may search peers and/or any smart racks that are within a distance of n=1 from the current smart rack. In some examples, and as shown in FIGS. 27b-27d, an open peer may be in a diagonal direction (e.g., smart racks 2710, 2716) or in a perpendicular direction (even if not the closest in the perpendicular direction (e.g., smart rack 2712).

If a peer smart rack is determined to be open at decision block 2520, the process continues at operation 2524. If, however, a peer smart rack is determined to not be open at decision block 2520, then a search is executed for an open smart rack. Examples of the search are further described with respect to FIG. 26. After the search is executed and one or more rectangular prisms are moved, the process restarts after operation 2522 at decision block 2514.

At operation 2524 the superstructure controller 2300 includes means, such as the processor 2302, memory 2304, input/output circuitry 2306, communications circuitry 2308, and/or the like, or a combination thereof, to store movement, based on a most favorable search, of a peer rectangular prism to an open peer smart rack in the tote plan. In some examples, the superstructure controller 2300 is configured to cause a closest perpendicular peer smart rack to become open. In some examples, the superstructure controller 2300, and as shown in FIG. 27b, a closest peer smart rack (e.g., smart rack 2708) may cause a rectangular prism to move to an open peer (e.g., smart racks 2710) thereby creating an open closest perpendicular peer smart rack. In such an example, after the rectangular prism is moved to an open peer, the movements are stored and the process continues at decision block 2514.

In other examples, such as the examples shown in FIGS. 27c and 27d, multiple moves may be required to create an open closest perpendicular peer smart rack. In such examples, and at operation 2524, a move is made and the process continues at decision block 2514. For example, and with respect to FIG. 27c, the superstructure controller 2300 causes a rectangular prism (e.g., rectangular prism 2714) to move to an open smart rack (e.g., smart rack 2712). After the move, a situation similar to FIG. 27b is created. As noted above, the process continues at decision block 2514 and iteratively moves rectangular prisms until an open closest perpendicular peer smart rack is obtained or otherwise created.

Similarly, and with respect to FIG. 27d, at each iteration a rectangular prism (e.g., rectangular prism 2718) is moved to an open smart rack (e.g., smart rack 2716). As noted above, the process continues at decision block 2514 and iteratively moves rectangular prisms until an open closest perpendicular peer smart rack is obtained.

Figure 26:
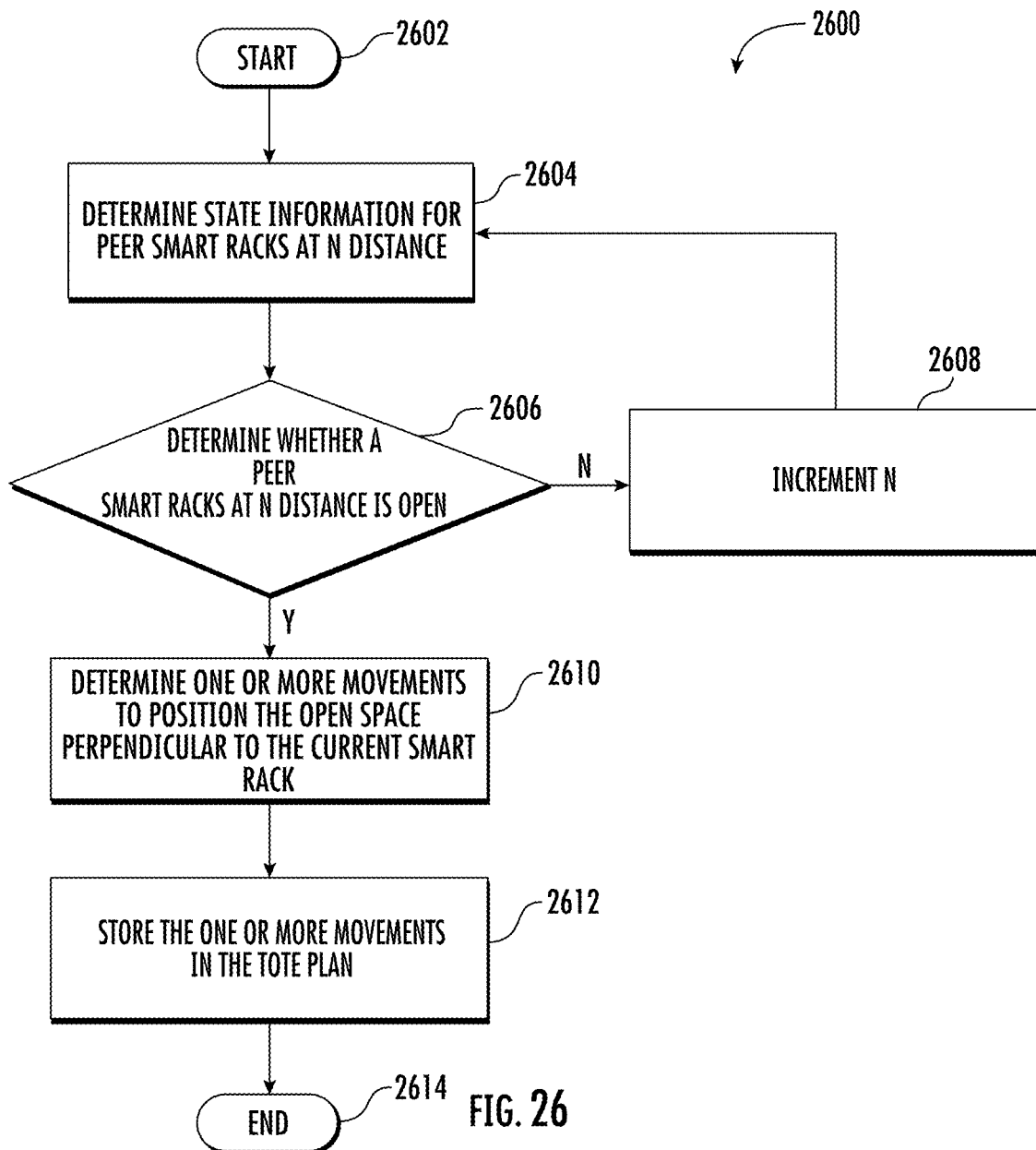
FIG. 26 illustrates a flowchart including operations for searching for an open smart rack within a certain distance of a target rectangular prism with at least some example embodiments of the present disclosure.

FIG. 26 illustrates a flowchart including operations for searching for an open smart rack within a certain distance of a target rectangular prism with at least some example embodiments of the present disclosure. Specifically, FIG. 26 illustrates operations of an example process 2600. In some embodiments, the example process 2600 is embodied by computer program code stored on a non-transitory computer-readable storage medium of a computer program product configured for execution to perform the process as depicted and described. Alternatively, or additionally, in some embodiments, the process 2600 is performed by one or more specially configured computing devices, such as the superstructure controller 2300 alone or in communication with one or more other component(s), device(s), system(s), and/or the like. In this regard, in some such embodiments, the superstructure controller 2300 is specially configured by computer-coded instructions (e.g., computer program instructions) stored thereon, for example in the memory 2304 and/or another component depicted and/or described herein and/or otherwise accessible to the superstructure controller 2300, for performing the operations as depicted and described. In some embodiments, the superstructure controller 2300 is in communication with one or more external apparatus(es), system(s), device(s), and/or the like, to perform one or more of the operations as depicted and described. For example, the superstructure controller 2300 may be in communication with any number of real-time sensor(s), data stores, input/output streams, other computing device(s), and/or the like. For purposes of simplifying the description, the process 2600 is described as performed by and from the perspective of superstructure controller 2300.

The process 2500 begins at operation 2502. At operation 2604, the superstructure controller 2300 includes means, such as the processor 2302, memory 2304, input/output circuitry 2306, communications circuitry 2308, and/or the like, or a combination thereof, to determine state information for peer smart racks at n distance. In some examples, n=1 initially and the superstructure controller 2300, may determine state information for all smart racks within a distance of n=1 (e.g., a peer) of the current smart rack that is housing the target rectangular prism.

By way of example, if superstructure controller 2300 was analyzing the current smart rack having the target rectangular prism (e.g., current smart rack 2802 in FIG. 28a), the smart racks within a distance of n (e.g., FIG. 28b illustrating smart racks 2804 at a distance of n=1) would be checked to determine state information.

At decision block 2606, the superstructure controller 2300 includes means, such as the processor 2302, memory 2304, input/output circuitry 2306, communications circuitry 2308, and/or the like, or a combination thereof, to determine whether a peer smart rack at n distance is open. If at decision block 2606, it is determined that there is no any peer smart rack at n distance open (e.g., FIG. 28b illustrating no open smart racks 2804 at a distance of n=1 and FIG. 28c illustrating no open smart racks 2806 at a distance of n=2), then the process continues to operation 2608 where n is incremented before starting again at operation 2604. If at decision block 2606, it is determined that there is a peer smart rack at n distance open (e.g., FIG. 28d illustrating open smart rack 2810 at a distance of n=3), then the process continues to operation 2610.

At operation 2610, the superstructure controller 2300 includes means, such as the processor 2302, memory 2304, input/output circuitry 2306, communications circuitry 2308, and/or the like, or a combination thereof, to determine one or more movements to position the open space perpendicular to the current smart rack. In some examples, the superstructure controller 2300 is configured to create an open space at a closest perpendicular peer smart rack. As such, irrespective of the distance n the superstructure controller 2300 is configured to move rectangular prisms so as to create an open space at a closest perpendicular peer smart rack.

In some examples and to move rectangular prisms so as to create an open space at a closest perpendicular peer smart rack, superstructure controller 2300 selects a first direction along the coordinate system. In some examples, the first direction may be the x direction, the y direction, and/or the z direction. In some examples, superstructure controller 2300 may intermix directions, such as the x direction for a predetermined number of moves, the y direction for a predetermined number of moves, and/or the z direction for a predetermined number of moves.

Once a direction is selected (e.g., the y direction), the superstructure controller 2300 is configured to cause the open smart rack at distance n to become perpendicular to the current smart rack. For example, and as shown in FIG. 28*d*, the rectangular prism in a smart rack (e.g., smart rack 2812) may be moved up (e.g., the y direction) to the open smart rack (e.g., smart rack 2810) so as to create an open smart rack perpendicular to the current smart rack. In some examples, the process may continue by causing the rectangular prism in a smart rack (e.g., smart rack 2814) to be moved left (e.g., the x direction) to the now open smart rack (e.g., smart rack 2812) so as to create an open smart rack perpendicular and closer to the current smart rack.

At operation 2612, the superstructure controller 2300 includes means, such as the processor 2302, memory 2304, input/output circuitry 2306, communications circuitry 2308, and/or the like, or a combination thereof, to the one or more movements are stored in the tote plan. The process returns to FIG. 25 at operation 2614.

Figure 29:
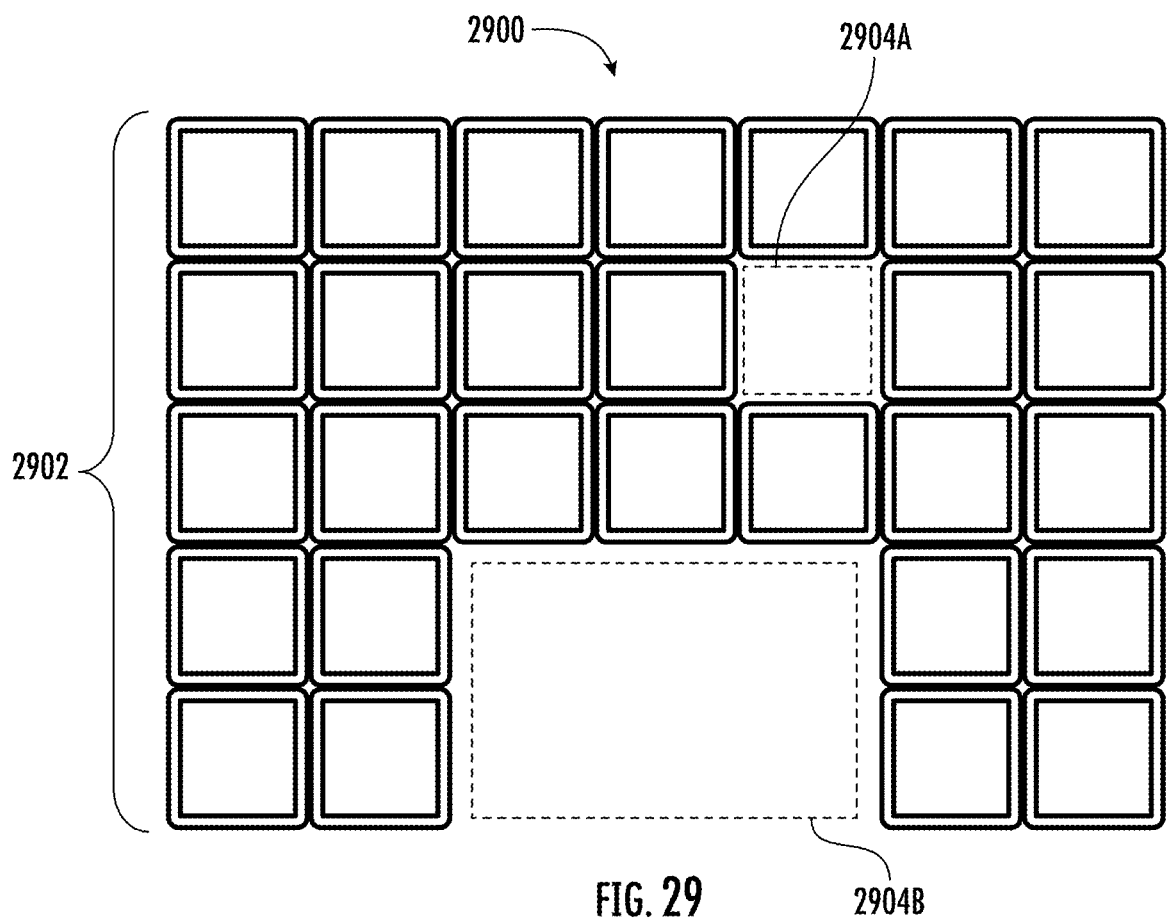
FIG. 29 illustrates an example modular superstructure for storing and moving totes in accordance with at least some example embodiments of the present disclosure.

FIG. 29 illustrates an example modular superstructure for storing and moving totes in accordance with at least some example embodiments of the present disclosure. Specifically, FIG. 29 depicts a modular superstructure 2900. The modular superstructure 2900 includes a plurality of smart racks 2902, wherein the smart racks are structured in a manner such that they are connected to one another. In this regard, each smart rack may pass, swap, slide, or otherwise relocate items (e.g., a tote) in any of a myriad of directions. For example, in some embodiments each smart rack is configured to manipulate an incoming tote from any of a number of cartesian directions (e.g., up, down, left, right, front, back), and to any of a number of cartesian directions. As depicted, each smart rack may be connected to one or more other smart racks on particular sides, such that a given smart rack may only receive a tote from certain directions and send out a tote in a particular direction.

In some embodiments, the modular superstructure is embodied as a perfect grid. For example, the modular superstructure may be embodied by a 5-wide by 5-long by 5-high grid of interconnected smart racks. However, in some embodiments, the modular superstructure includes one or more other elements that add complexity to the connections between the smart racks. For example, as illustrated, the modular superstructure 2900 includes two holes within the structure of the modular superstructure 2900. Such holes are defined by hole 2904A, which defines a hole equivalent to the width and length of one smart rack, and hole 2904B, which defines a hole equivalent to the size of smart racks three long and two wide.

It will be appreciated that the modular superstructure 2900 may be a particular example embodiment configuration of the modular superstructures described throughout. It should be appreciated however that other configurations of modular superstructures may be utilized in other embodiments. Accordingly, FIG. 29 is exemplary and not to limit the scope and spirit of this description.

The particular configuration of the modular superstructure 2900 may be represented in any of a myriad of manners. For example, in some embodiments, the modular superstructure 2900 is represented as a smart rack matrix that defines the smart racks of the modular superstructure and/or other contextual elements associated with the structure of the modular superstructure. In some such embodiments, the smart rack matrix is embodied by a data graph matrix, which represents the configuration of the modular superstructure 2900 as an interconnected set of nodes and edges.

Figure 30:
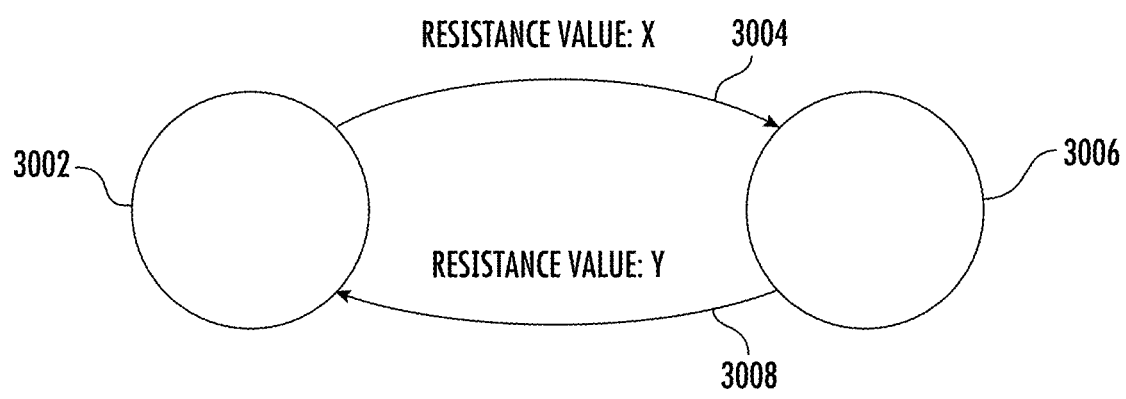
FIG. 30 illustrates an example node representation of connected smart racks in accordance with at least some example embodiments of the present disclosure.

FIG. 30 illustrates an example node representation of connected smart racks in accordance with at least some example embodiments of the present disclosure. Specifically, FIG. 30 depicts a first node 3002 and a second node 3006. In some embodiments, each node represents a smart rack or other element of the configured structure of a modular superstructure, for example the modular superstructure 2900. In some embodiments, a node may represent a smart rack, a hole, another mechanical component or robot, and/or the like, for example. For ease of description, the first node 3002 and second node 3006 are further described as representing smart racks within a modular superstructure, for example the smart racks 2902 of the modular superstructure 2900.

In some embodiments, nodes representing connected smart racks are associated with one or more edges that connect the nodes. For example, as illustrated, the first node 3002 and the second node 3006 are connected by first edge 3004 and second edge 3008. In some embodiments, the first edge 3004 represents a first movement resistance value (X) for repositioning from the first node 3002 to the second node 3006. Similarly, the second edge 3008 represents a second movement resistance value (Y) for repositioning a tote from the second node 3006 to the first node 3002. In this regard, the movement resistance values may each represent a cost or other factor for moving a tote from a smart rack corresponding to the node to another smart rack corresponding to the other node in accordance with the direction of the edge. For example, repositioning a tote from a first smart rack corresponding to the first node 3002 to a second smart rack corresponding to the second node 3006 may incur a movement resistance value of X. In some embodiments, the movement resistance values for moving between two smart racks represented by particular nodes are the same in each direction. In other embodiments, the movement resistance values for moving between two smart racks are different in each direction.

In some embodiments, the nodes may be connected by a single edge. For example, a single edge may indicate bidirectionality of movement (e.g., a tote can be moved in either direction). In this regard, such edges may be assigned a single weight representing a movement resistance value, or two weights associated with movement resistance values in each direction. For brevity and to maintain visibility of the attached figures, single edges are used throughout to indicate bidirectionality with movement resistance values that may be the same or different for the two directions.

Figure 31:
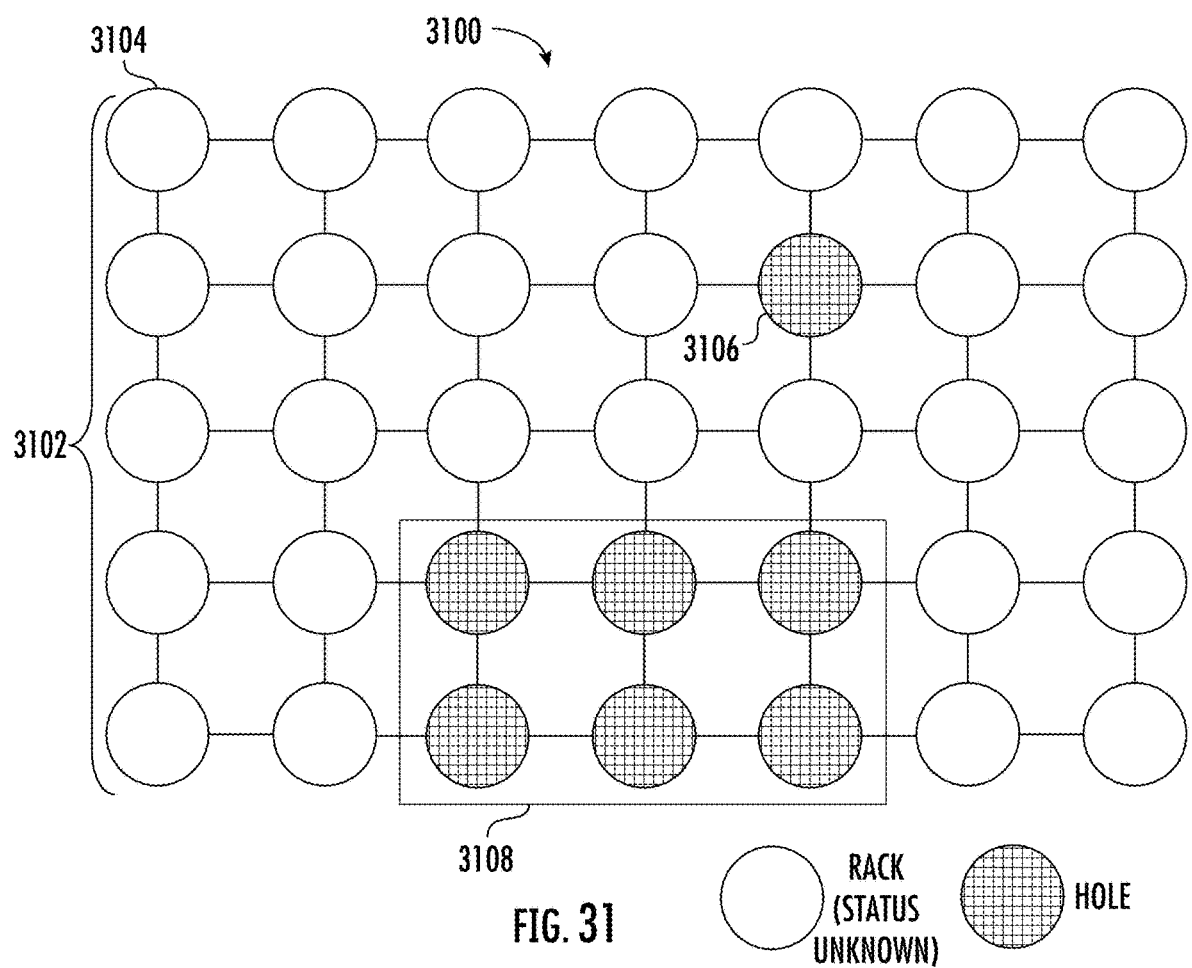
FIG. 31 illustrates a data graph matrix representation of a modular superstructure in accordance with at least some example embodiments of the present disclosure.

FIG. 31 illustrates a data graph matrix representation of a modular superstructure in accordance with at least some example embodiments of the present disclosure. Specifically, FIG. 31 illustrates a data graph matrix 3100 representation of the modular superstructure 2900. As illustrated, the data graph matrix 3100 includes a complete set of nodes 3102 equal to the length and width dimensions of the modular superstructure 2900. In some embodiments, the nodes 3102 are configured to represent the corresponding modular superstructure in accordance with a particular coordinate, grid, or other location identifying methodology. For example, in some embodiments, each node is assigned and identifiable via an assigned position index represented by a 2D or 3D index (e.g., an X-Y or X-Y-Z position). In some embodiments the index begins at an origin point, for example corresponding to the node 3104, and increments at each jump from said origin point. In this regard, the node 3104 may be assigned the position index (0,0) as an (X,Y) tuple, with each increment in row incrementing the X value and each increment in column incrementing the Y value. It will be appreciated that, in this regard, each node may represent a portion of physical space in the modular superstructure 2900 that is equivalent to the length and width of one smart rack.

Each node may be configured by setting one or more data properties that represents the behavior of the corresponding element of the modular superstructure (e.g., whether the node represents a smart rack or a hole in the depicted example). As illustrated, each node that is unshaded represents a smart rack, whereas each node that is shaded with a checkered pattern represents a hole in the structure of the corresponding modular superstructure. In some embodiments, each of the nodes 3102 includes a behavior data property, such that a value for said behavior data may be set that represents the behavior of the corresponding element in the modular superstructure. As illustrated, the nodes corresponding to locations where the modular superstructure 2900 includes a hole are configured with particular behavior data indicating that the node corresponds to a hole. For example, nodes 3108 and node 3106 are each configured to represent a hole. In this regard, the other nodes connected to any of the nodes 3108 and 3106 may determine based on such a behavior setting that movement in the direction of the hole node is not valid.

In some embodiments, for example, each node representing a smart rack may have behavior data set or other state data that is set to a current value that indicates the node represents a rack, and each node representing a hole in the modular superstructure may have behavior data set to a current value of "HOLE." In some embodiments, behaviors may be further broken down within one or more categories. For example, in some embodiments, smart racks may be specially configured to perform different desired behaviors. For example, some smart racks may be assigned a first behavior that prioritizes staying empty (e.g., a "OXYGEN" behavior). Some smart racks may be assigned a second behavior that prioritizes moving totes quickly in a particular direction or particular directions (e.g., a "RAIL" behavior). Other smart racks may be assigned a third behavior that indicates a normally functioning smart rack that has no particular special priority (e.g., a "NORMAL" behavior). In some embodiments, behavior data may similarly be utilized to represent states of operation of one or more smart racks, for example an "OFFLINE" behavior if a smart rack loses connection to a corresponding control system, a "MALFUNCTIONING" behavior if the smart rack is detected to not be functioning properly, and/or the like. In some such embodiments, the value represented in behavior data affects one or more movement resistance values associated with the node corresponding to the particular smart rack. In this regard, it will be appreciated that any desired combination of behaviors may be created and utilized to enable the modular superstructure to function as desired. Additionally, it will be appreciated that the example behaviors depicted and described herein are not meant to limit the scope and spirit of this disclosure.

In some embodiments, a smart rack matrix is determined and/or otherwise initialized via one or more portion(s) of read and/or otherwise received data. In some embodiments, a configuration file embodying a manifest that defines the structure of a modular superstructure is received, retrieved, and/or otherwise identified, and subsequently read to configure a corresponding smart rack matrix accordingly. In the example context of a data graph matrix for example, such configuration data may be read to determine a size of the data graph matrix (e.g., a number of rows and columns of nodes), the configuration of each node (e.g., behavior data for each node), and/or connections between each node. In some embodiments, the configuration file embodies a manifest file comprising JSON data and/or other human-readable configuration data representing the structure of the modular superstructure. In some embodiments, the smart rack matrix for a particular modular superstructure is previously stored and/or initialized, and/or can be retrieved without subsequent initialization.

Once configured, the data graph matrix 3100 is usable for any of a myriad of advantageous processes. In some embodiments, the data graph matrix 3100 is usable to process any of a myriad of tote queries representing requested movement of totes via the corresponding modular superstructure. In this regard, the data graph matrix 3100 may be processed to identify an efficient path for moving one or more tote(s) to one or more target end position(s), and/or to do so with reduced and/or minimizing a particular movement resistance value. Advantageously, the graph-based implementation of the data graph matrix 3100 enables performance of particularly efficient algorithm(s) for facilitating such process(es), for example the sliding A* algorithm implementations as described herein.

Figure 32:
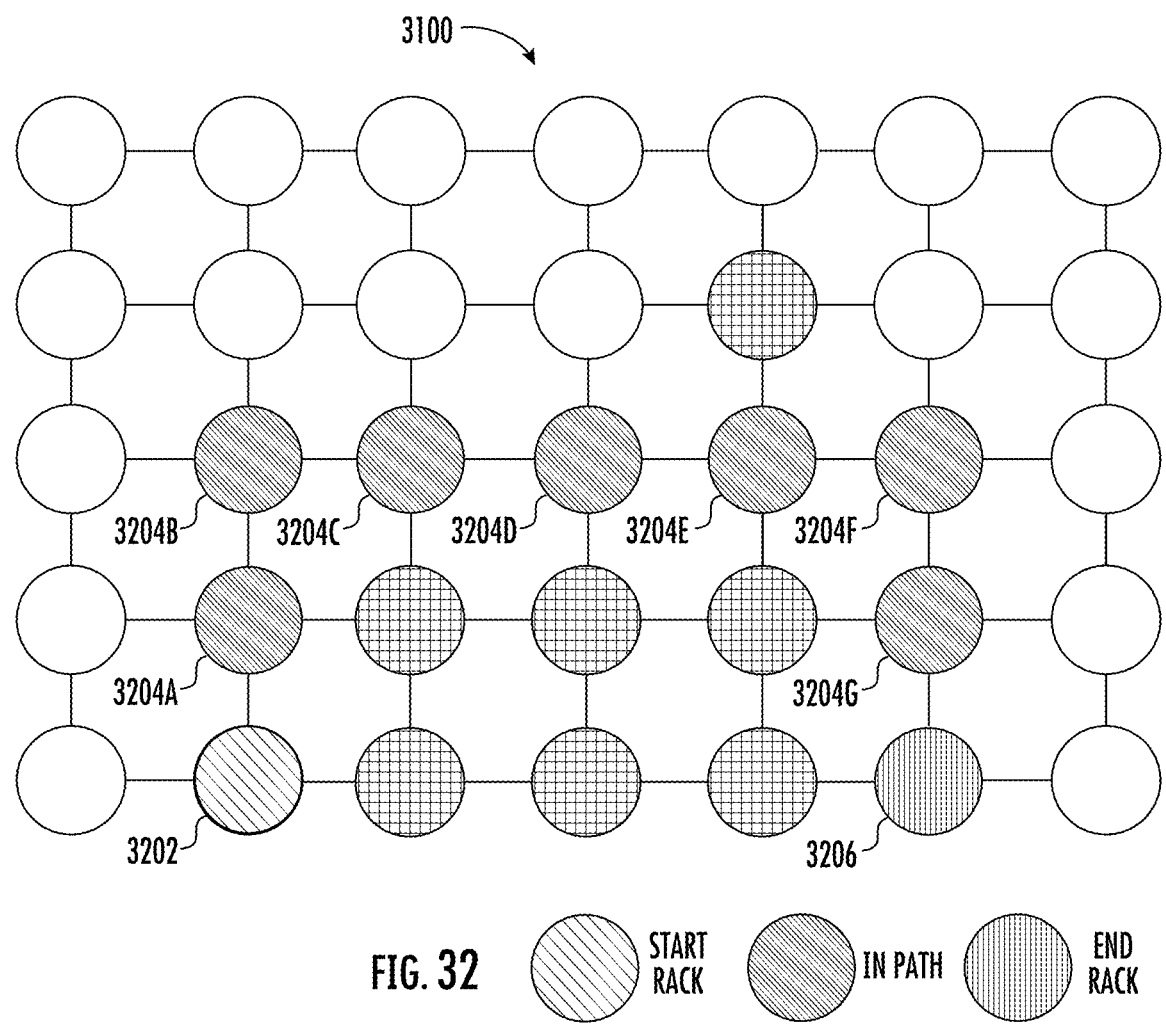
FIG. 32 illustrates a node representation of a tote movement path in a data graph matrix in accordance with at least some example embodiments of the present disclosure.

FIG. 32 illustrates a node representation of a tote movement path in a data graph matrix in accordance with at least some example embodiments of the present disclosure. Specifically, FIG. 32 depicts a tote movement path for repositioning a tote from a smart rack at a first tote starting position associated with the node 3202 to a smart rack at a tote ending position associated with the node 3206. As illustrated, the intermediary portion of the tote movement path is formed via nodes 3204A-3204G, ultimately ending at 3206. In some embodiments, a tote ending position is out of the boundaries defined by the modular superstructure 2900, for example by egressing from the modular superstructure 2900 from a particular egress point. In some such embodiments, the tote ending position may represent an external position where a tote egresses via the node associated with the tote ending position corresponding to the node 3206.

Figure 33:
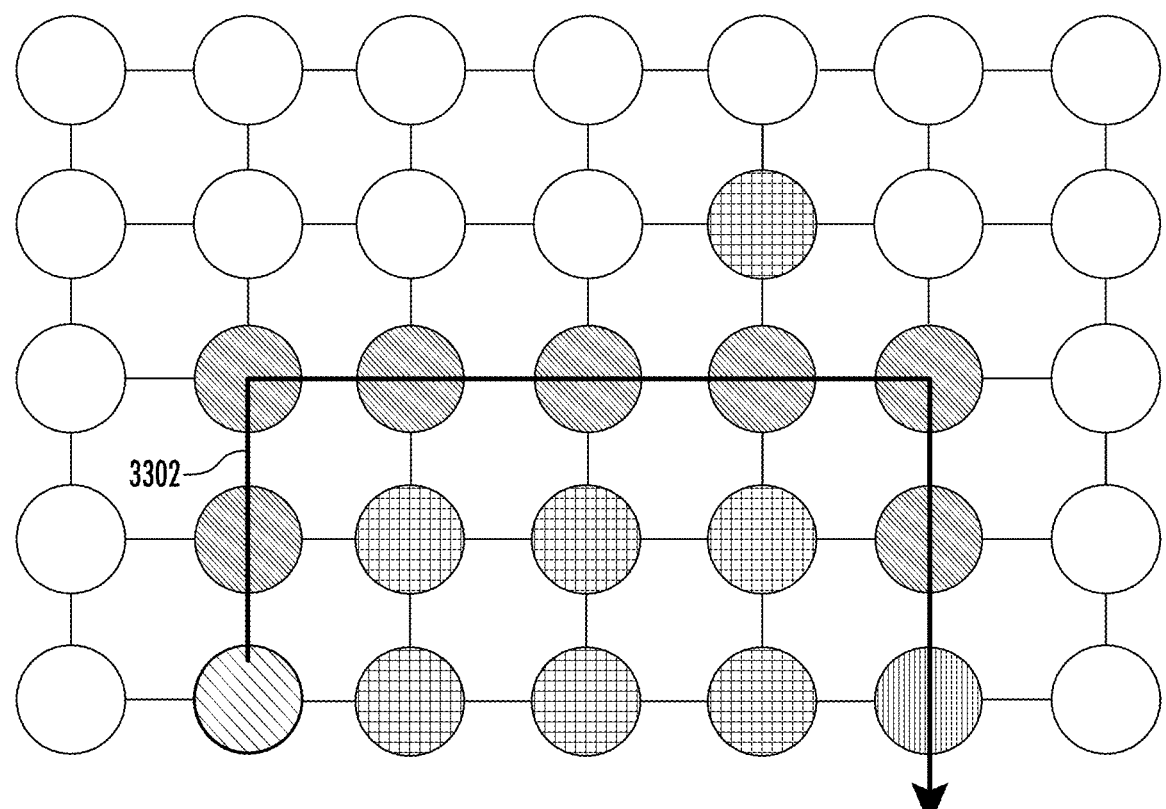
FIG. 33 illustrates a visual representation of the tote movement path in a data graph matrix determinable using an A* algorithm in accordance with at least some example embodiments of the present disclosure.

For example, FIG. 33 illustrates a visual representation of the tote movement path in a data graph matrix determinable using an A* algorithm in accordance with at least some example embodiments of the present disclosure. Specifically, FIG. 33 illustrates a visual representation of the tote movement path determined for repositioning a tote at a first smart rack associated with the node 3202 to a tote ending position representing an egress point via a second smart rack associated with the node 3206. In some embodiments, the tote is manipulated by each smart rack represented by a node in the path to reposition the tote along the path, and ultimately reach the egress point. As illustrated, a tote may move along the tote movement path 3302. In some embodiments, a sliding A* algorithm is executed to determine the tote movement path 3302, for example as described herein with respect to FIG. 32.

In some embodiments, the data graph matrix 3100 is processed utilizing a sliding A* algorithm that identifies the best peer rack to which a tote should be moved to progress the tote from its current position towards a tote ending position (e.g., an egress point) with minimal movement resistance value. In some embodiments, the sliding A* algorithm includes executing an A* pathfinder algorithm from the tote starting position to the tote ending position associated with the egress point, for example from the tote starting position associated with node 3202 to the tote ending position associated with node 3206. The A* pathfinder algorithm generates an F-score associated with each processed node that represents a cost associated with traveling via the processed node. In some embodiments, the A* pathfinder algorithm utilizes the formula $F(n)=G(n)+H(n)$, where $F(n)$ represents the F-score for a particular node n, $G(n)$ represents a current lowest cost (e.g., a shortest distance) via edges from a starting node to the node n, and $H(n)$ represents an estimated cost (e.g., a shortest distance) from node n until the node associated with the tote ending position embodying a target end position. In this regard, in some embodiments the $G(n)$ value for a particular node is built as the path to connected edges are explored between the nodes. The $H(n)$ value is determinable via any of a myriad of heuristics. For example, in some embodiments, a Manhattan distance or Euclidean distance is utilized as a heuristic for determining the $H(n)$ score for a particular node. In some such embodiments, the heuristic represents an expected cost (e.g., an expected movement resistance value) for traversing via the node towards the tote ending position. In this regard, the F-score represented by $F(n)$ for a particular node improves as the nodes are traversed in the correct direction towards the node corresponding to the target end position, where possible.

As illustrated in FIG. 32, the node directly to the right of the starting node 3202 corresponds to a hole in the modular superstructure. Accordingly, the A* pathfinder algorithm may determine that it cannot reposition the tote in that direction. During processing of the remaining peers, the A* pathfinder algorithm determines the F-score for node 3204A is lowest, and therefore this node is identified as corresponding to the best peer rack. Accordingly, this node 3204A is utilized in the tote movement path and the tote may be swapped to that position. The A* pathfinder algorithm continues from node 3204A, determining that the best peer rack is along the path around the hole since the node directly to the right of node 3204A is also a hole. In this regard, the A* pathfinder algorithm continues until each of the nodes 3204A, 3204B, 3204C, 3204D, 3204E, 3204F, 3204G, and finally node 3206 are added to the path. Once the A* pathfinder algorithm reaches node 3206 corresponding to the tote ending position, the algorithm ends the search for new nodes and the tote movement path is determined from looking back to trace the nodes traversed to reach the node 3206. Once determined, the tote movement path represents the movement between nodes for a tote to move from its tote starting position to a target end position with reduced or minimized cost (e.g., a minimized movement resistance value).

Figure 34:
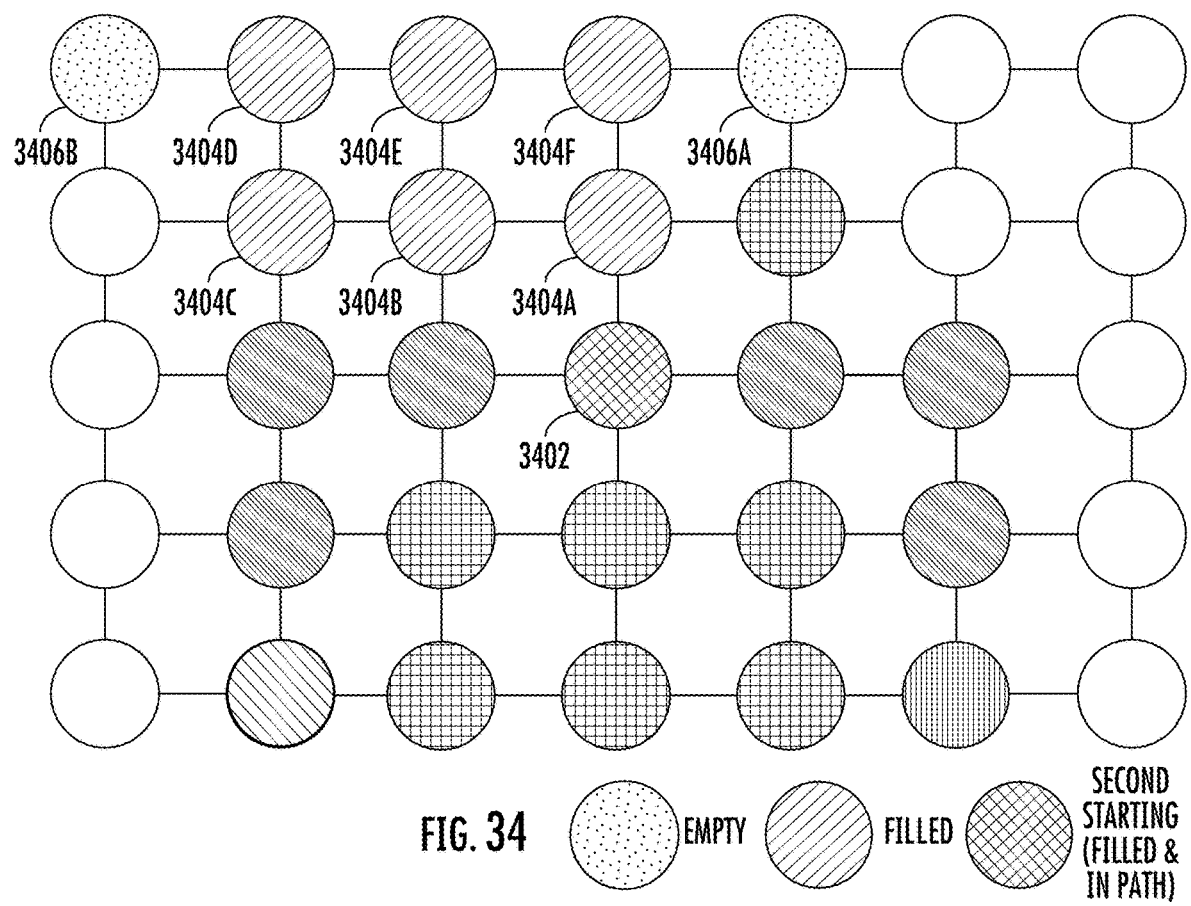
FIG. 34 illustrates a node representation of a secondary tote movement path for repositioning a tote in an identified tote movement path in accordance with at least some example embodiments of the present disclosure.

In some embodiments, the sliding A* algorithm further identifies nodes that are determined as within a tote movement path and also currently occupied, so that such nodes may be further processed. In some such embodiments, the sliding A* algorithm may be configured to efficiently reposition the totes in such occupied nodes within the tote movement path to further reduce the total movement resistance value associated with repositioning a particular tote (e.g., a queried tote to be moved to an egress point). For example, FIG. 34 illustrates a node representation of a secondary tote movement path for repositioning a tote in an identified tote movement path in accordance with at least some example embodiments of the present disclosure.

In some embodiments, the sliding A* algorithm relocates a tote from an occupied smart rack to a closest empty smart rack by determining a closest empty node in a data graph matrix to the node that corresponds to the occupied smart rack. As illustrated in FIG. 34, the node 3402 is within the tote movement path identified from the starting node 3202. In some embodiments, the sliding A* algorithm executes an additional A* pathfinder algorithm to identify a second tote movement path from the occupied node to a closest empty node to said occupied node. The sliding A* algorithm may determine status data (e.g., representing whether the corresponding smart rack is occupied or empty) for any of a myriad of nodes radiating out from the starting node. In some embodiments, the sliding A* algorithm may not consider nodes that are in the first identified tote movement path. In other embodiments, the sliding A* algorithm considers some or all nodes that are in the first identified tote movement path, for example so long as the movements to such nodes do not conflict with the first identified tote movement path.

As illustrated, nodes 3404A-3404F are determined to be occupied. In this regard, in some embodiments, such nodes may be determined as occupied during execution of the second A* pathfinder algorithm, for example by checking the status of each node upon processing it for traversal. Two empty nodes are similarly depicted, specifically nodes 3406A and 3406B. The second A* pathfinder algorithm may continue to process nodes until one of the empty nodes is reached. For example, the second A* pathfinder algorithm may continue to process each node estimated to represent the shortest tote movement path, for example embodying a lowest resistance value path based on the total of movement resistance values for the nodes in the tote movement path. As illustrated, for example, the second A* pathfinder algorithm may continue along a frontier until the algorithm first encounters an empty node, for example the empty node 3406A as illustrated.

Figure 35:
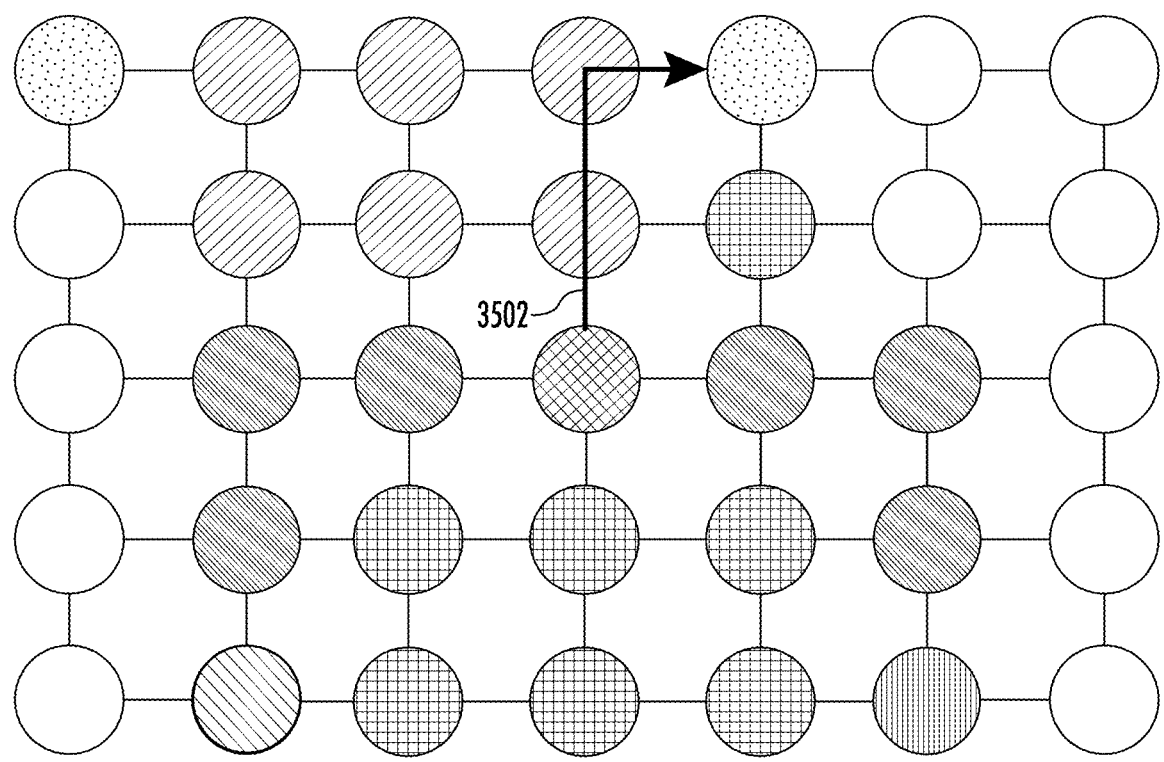
FIG. 35 illustrates a visual representation of the secondary tote movement path to the closest empty node determinable using an A* algorithm in accordance with at least some example embodiments of the present disclosure.

FIG. 35 illustrates a visual representation of the secondary tote movement path to the closest empty node determinable using an A* algorithm in accordance with at least some example embodiments of the present disclosure. Specifically, FIG. 35 illustrates a visual representation of the tote movement path 3502 for repositioning a tote from the smart rack corresponding to the node 3402 (in the first identified tote movement path) to the nearest empty rack. In some embodiments, each smart rack in the second tote movement path 3502 is manipulated to clear the second tote blocking the originally identified, first tote movement path through one or more manipulations with the minimum movement resistance value. Upon determining instructions for clearing the node 3402, further instructions may be generated for continuing the first tote along the originally identified first tote movement path represented as tote movement path 3302.

It should be appreciated that this process for clearing an identified tote movement path utilizing a particular tote movement path representing a reduced, minimized, or lowest resistance value path may be repeated for any number of occupied nodes. For example, in some embodiments, an A* pathfinder algorithm is initiated for each occupied node in a first identified tote movement path (e.g., to get a tote from a tote starting position to a tote ending position for egress). Each implementation of the A* pathfinder algorithm advantageously reduces or minimizes the total cost (represented by a total movement resistance value) of enabling such movements. In this regard, the sliding A* algorithm utilizing such sub-A* pathfinder algorithms produces low cost paths for relocating a tote from a tote starting position to a tote ending position while addressing any intermediary blocking totes in an efficient manner, thus saving various resources and particularly minimizing expenditure resources represented by the movement resistance value (e.g., power consumption, time, other resources, and/or the like).

Figure 36:
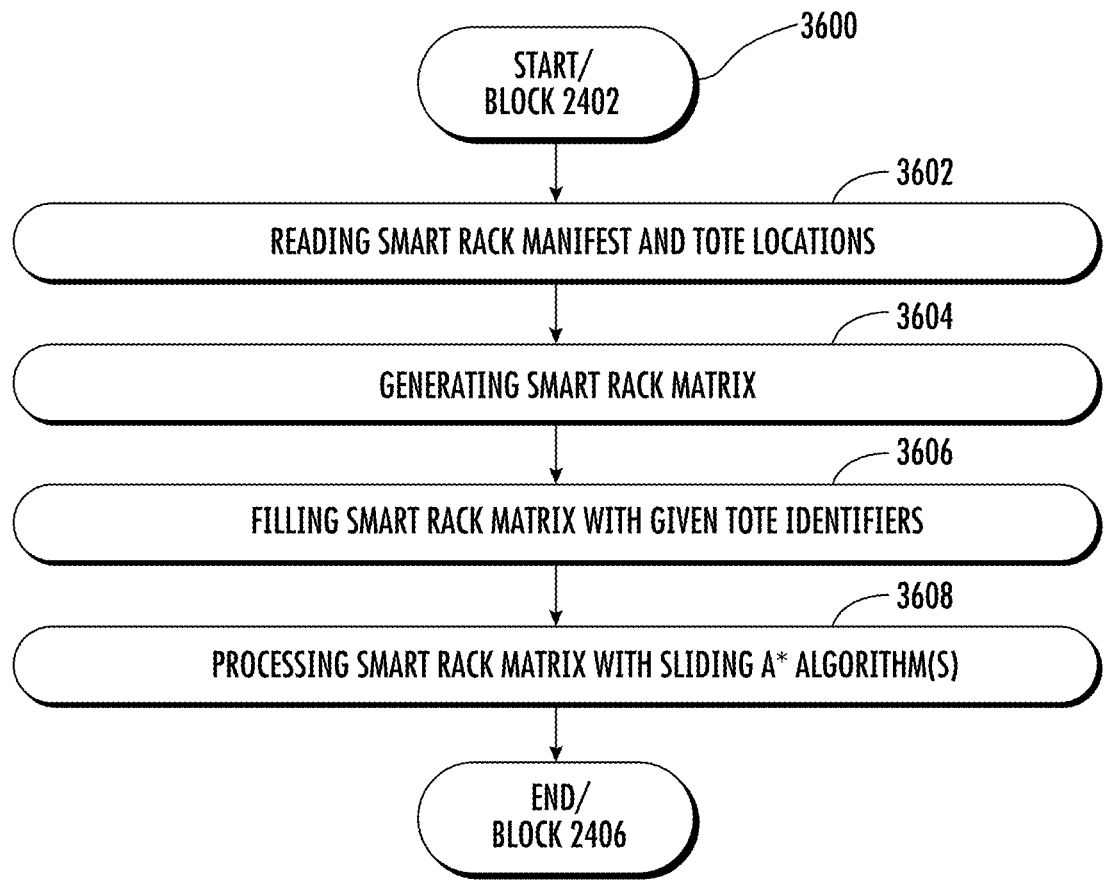
FIG. 36 illustrates a flowchart depicting operations of an example process for creating a smart rack matrix for processing in accordance with at least some example embodiments of the present disclosure.

FIG. 36 illustrates a flowchart depicting operations of an example process for creating a smart rack matrix for processing in accordance with at least some example embodiments of the present disclosure. Specifically, FIG. 36 depicts an example process 3600. The process 3600 is performable by any number of computing device(s) as described herein, for example embodiment in hardware, software, firmware, and/or any combination thereof. In some embodiments, the apparatus 2300 includes the various circuitry as means for performing each operation of the process 3600.

In some embodiments, the process 3600 embodies a sub-process of one or more process(es) depicted and/or described herein. In some embodiments, the process 3600 embodies a sub-process of the process 2400. For example, in some embodiments, the process 3600 embodies a sub-process for initializing a smart rack matrix with peer information. In this regard, it will be appreciated that the process 3600 may replace, and/or supplement, one or more of the operations of such process(es) herein. Additionally, or alternatively, in some embodiments, flow returns to another process upon completion of the operations of process 3600.

At operation 3602, the process 3600 includes reading a smart rack manifest and tote locations. In some embodiments, the smart rack manifest comprises data representing a shape, design, and/or other structure of a modular superstructure. For example, in some embodiments, the smart rack manifest comprises data representing the locations of smart rack(s), hole(s), connection(s) between smart racks, and/or the like. The tote locations in some embodiments comprises data indicating the smart rack(s) that currently are storing and/or otherwise are filled with totes. In some embodiments, the tote locations include data representing a position index, location, or other identifier of smart rack(s) that are currently occupied by a tote.

In some embodiments, the smart rack manifest and tote locations are read from different files, databases, and/or the like. Alternatively, or additionally, in some embodiments, at least a portion of the smart rack manifest and tote locations are read from a shared file. For example, in some embodiments, the smart rack manifest and tote locations are read from a single configuration file with such data.

At operation 3604, the process 3600 includes generating a smart rack matrix. In some embodiments, the smart rack matrix is generated as a data graph matrix comprising any number of nodes and edges. For example, in some embodiments, the smart rack matrix is generated comprising a node representing each position in a grid corresponding to a modular superstructure. Such node(s) may each store behavior information indicating whether a node corresponds to a smart rack, a hole, or another element associated with operation of the modular superstructure. In this regard, the smart rack matrix may represent a data-driven representation of the smart racks of a modular superstructure, connections between the smart racks, holes and/or other obstacles that affect maneuvering totes via the modular superstructure, and/or the like. In some embodiments, each node stores behavior data representing the particular behavior of the element corresponding to the node, such that the behavior data may be set appropriately.

At operation 3606, the process 3600 includes filling the smart rack matrix with given tote identifiers. In some embodiments, the tote identifiers are filled based on the tote locations read at an earlier operation, for example operation 3602. In some such embodiments where the smart rack matrix is embodied by a data graph matrix, the nodes of the data graph matrix may be configured to fill the smart rack matrix with the given tote identifiers. In some embodiments, each node representing a smart rack is associated with one or more properties indicating a tote that is stored via the smart rack. In some embodiments, the node includes a data property embodying current status data, which may be set to a filled/occupied status in the circumstance where a tote is currently being held, stored, and/or otherwise manipulated by the smart rack, and empty in the circumstance where a tote is currently not holding, storing, and/or otherwise manipulating any tote. In some embodiments, the status data stores a tote identifier corresponding to the tote that is currently being stored via the smart rack, and/or a default, null, or empty data value in a circumstance where the smart rack is currently empty.

Upon completion of filling the smart rack matrix, the smart rack matrix may be utilized for processing. For example, in some embodiments, the smart rack matrix may be utilized for processing one or more tote queries, as described herein. At optional operation 3608, the process 3600 includes processing the smart rack matrix with sliding A* algorithm(s). In some such embodiments, the sliding A* algorithm(s) enable repositioning of tote(s) via the modular superstructure with a minimized total movement resistance value to perform such repositioning.

Figure 37:
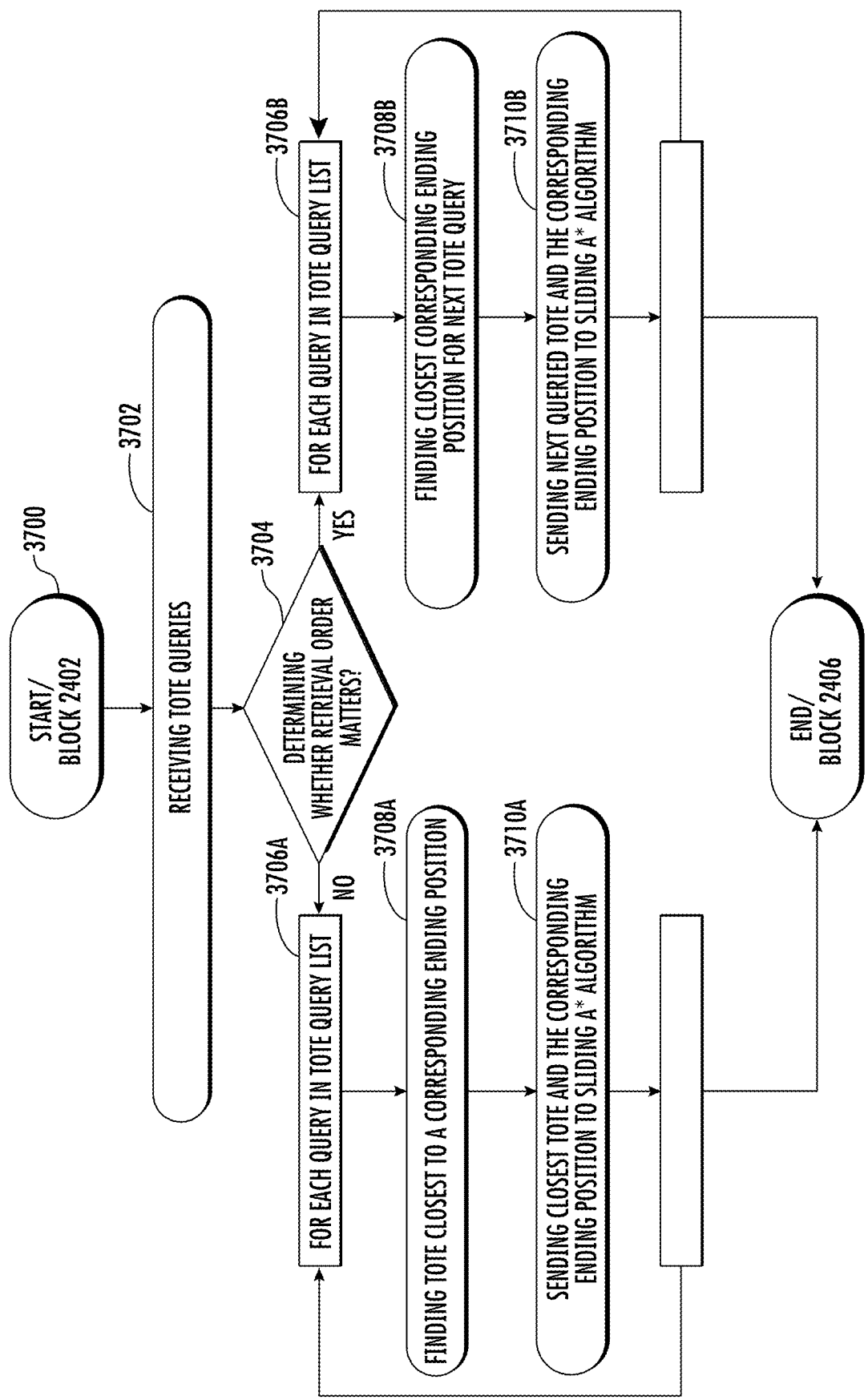
FIG. 37 illustrates a flowchart depicting operations of an example process for processing at least one tote query in accordance with at least some example embodiments of the present disclosure.

FIG. 37 illustrates a flowchart depicting operations of an example process for processing at least one tote query in accordance with at least some example embodiments of the present disclosure. Specifically, FIG. 37 depicts an example process 3700. The process 3700 is performable by any number of computing device(s) as described herein, for example embodiment in hardware, software, firmware, and/or any combination thereof. In some embodiments, the apparatus 2300 includes the various circuitry as means for performing each operation of the process 3700.

In some embodiments, the process 3700 embodies a sub-process of one or more process(es) depicted and/or described herein. In some embodiments, the process 3700 embodies a sub-process of the process 2400. For example, in some embodiments, the process 3700 embodies a sub-process for executing a movement algorithm embodying a sliding A* algorithm. In this regard, it will be appreciated that the process 3700 may replace, and/or supplement, one or more of the operations of such process(es) herein. Additionally, or alternatively, in some embodiments, flow returns to another process upon completion of the operations of process 3700.

At operation 3702, the process 3700 includes receiving tote queries. Each tote query may represent a request to relocate a particular tote from its current position to a target end position, for example from a tote starting position to a tote ending position. Each tote query may represent a request to relocate any number of tote queries, for example including a single tote or plurality of totes to any of plurality of target end positions. In some embodiments, a single tote query is received. In other embodiments, a plurality of tote queries is received. In some embodiments, the tote queries are received via a request, API call, or other incoming transmission. Alternatively, or additionally, in some embodiments the tote queries are received in response to user input via a client computing device associated with a modular superstructure. It should be appreciated that in a circumstance where a plurality of tote queries is received, a single transmission, user input, or other data may be received that represents a plurality of tote queries, or a plurality of transmissions, user inputs, and/or other data portions may be received that represent a plurality of tote queries.

At operation 3704, the process 3700 includes determining whether retrieval order matters for a tote query or plurality of tote queries. In some embodiments, each tote query includes data indicating whether retrieval order matters. In this regard, such data may be extracted and/or otherwise parsed from the tote query and compared with a predefined data value (e.g., indicating order does matter or indicating order does not matter) to determine whether the extracted and/or otherwise parsed data matches. In a circumstance where retrieval order is determined to not matter, flow proceeds to operation 3706A. In a circumstance where retrieval order is determined to matter, flow proceeds to operation 3706B.

At operation 3706A, the process 3700 includes processing each query in a tote query list. In some such embodiments, the tote query list may be processed in any order. It will be appreciated that the subsequent operations 3708A and 3710A may be repeated for any number of tote queries.

At operation 3708A, the process 3700 includes finding a tote closest to a corresponding ending position. In some embodiments, one or more algorithm(s), heuristic(s), and/or other methodologies are utilized to determine which tote is closest to a corresponding ending position. For example, in some embodiments, a Euclidian distance is determined between a current position of a tote (e.g., embodying a tote starting position) and a corresponding ending position for said tote (e.g., embodying a tote ending position), such that the closest is determinable from the lowest value Euclidian distance. Alternatively, or additionally, in some embodiments, a distance to a corresponding ending position for each tote is determined by executing an implementation of an A* pathfinder algorithm for each tote, such that the determined tote movement path with the minimal movement resistance value is determined to correspond to the tote closest to its corresponding ending position. It will be appreciated that any other algorithm and/or heuristic may be utilized to determine the distance between each tote and a corresponding ending position, and thereby determine a tote closest to its corresponding ending position.

At operation 3710A, the process 3700 includes sending the closest tote and the corresponding ending position to a sliding A* algorithm. In some embodiments, the sliding A* algorithm determines a tote movement path for relocating the tote closest to its corresponding ending position to said corresponding ending position, for example with a minimized movement resistance value. Additionally, or alternatively, in some embodiments, the sliding A* algorithm determines additional (e.g., second) tote movement path(s) for each tote in a smart rack along the first tote movement path for relocating the closest tote. Non-limiting examples of executing a sliding A* algorithm are described herein with respect to FIGS. 38-44.

At operation 3706B, the process 3700 includes processing each query in a tote query list. In some such embodiments, the tote query list may be processed in the order received. It will be appreciated that the subsequent operations 3708B and 3710B may be repeated for any number of tote queries.

At operation 3708B, the process 3700 includes finding the closest corresponding ending position for the next tote query. In this regard, such embodiments may not process totes out of order, and may continue with processing the next queried tote in the tote query list. In some embodiments, one or more algorithm(s), heuristic(s), and/or other methodologies are utilized to determine the distance between the next tote query and accessible ending position(s). For example, in some embodiments, a Euclidian distance is determined between a current position of a tote (e.g., embodying a tote starting position) and available ending position(s) for said tote (e.g., each embodying a tote ending position), such that the closest ending position is determinable from the lowest value Euclidian distance. Alternatively, or additionally, in some embodiments, a distance to each corresponding ending position for the next tote query is determined by executing an implementation of an A* pathfinder algorithm for the next tote query, such that the determined tote movement path with the minimal movement resistance value is determined to correspond to the closest corresponding ending position for the next tote query. It will be appreciated that any other algorithm and/or heuristic may be utilized to determine the closest corresponding ending position for the next tote query.

At operation 3710B, the process 3700 includes sending the next queried tote and the corresponding ending position to a sliding A* algorithm. In some embodiments, the sliding A* algorithm determines a tote movement path for relocating the next queried tote to its corresponding ending position=with a minimized movement resistance value. Additionally, or alternatively, in some embodiments, the sliding A* algorithm determines additional (e.g., second) tote movement path(s) for each tote in a smart rack along the first tote movement path for relocating the closest tote. Non-limiting examples of executing a sliding A* algorithm are described herein with respect to FIGS. 38-44.

Figure 38:
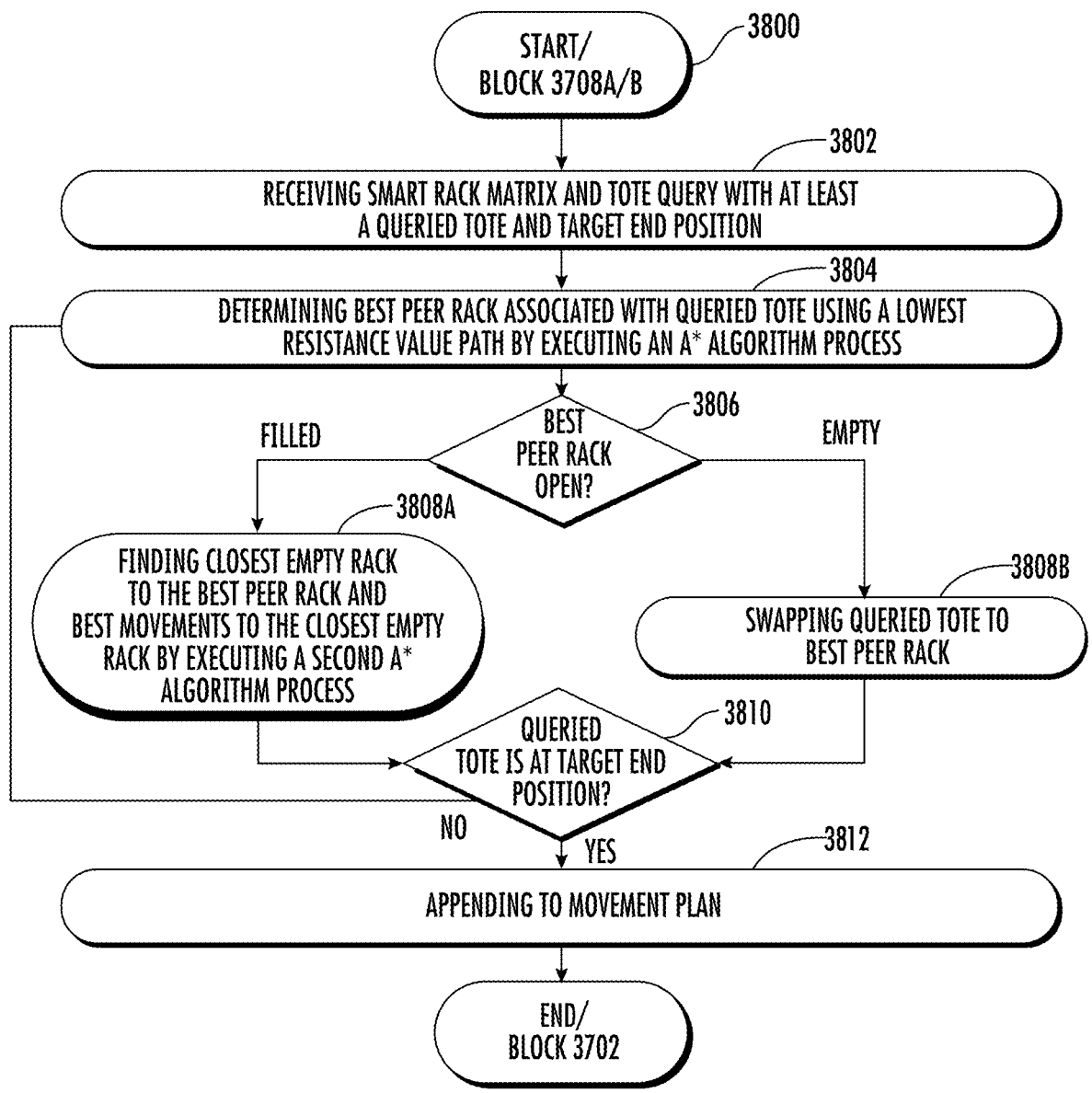
FIG. 38 illustrates a flowchart depicting operations of an example process for performing a sliding A* algorithm in accordance with at least some example embodiments of the present disclosure.

FIG. 38 illustrates a flowchart depicting operations of an example process for performing a sliding A* algorithm in accordance with at least some example embodiments of the present disclosure. Specifically, FIG. 38 depicts an example process 3800. The process 3800 is performable by any number of computing device(s) as described herein, for example embodiment in hardware, software, firmware, and/ or any combination thereof. In some embodiments, the apparatus 2300 includes the various circuitry as means for performing each operation of the process 3800.

In some embodiments, the process 3800 embodies a sub-process of one or more process(es) depicted and/or described herein. In some embodiments, the process 3800 embodies a sub-process of the process 2400. For example, in some embodiments, the process 3800 embodies a sub-process for executing a movement algorithm embodying a sliding A* algorithm. In this regard, it will be appreciated that the process 3800 may replace, and/or supplement, one or more of the operations of such process(es) herein. Additionally, or alternatively, in some embodiments, flow returns to another process upon completion of the operations of process 3800.

At operation 3802, the process 3800 includes receiving a smart rack matrix and tote query with at least a queried tote and target end position. In some such embodiments, the smart rack matrix embodies a data graph matrix representing a particular modular superstructure. In some embodiments, the smart rack matrix is retrieved from a data repository. In some embodiments, the smart rack matrix is initialized at an earlier stage, as described herein.

In some embodiments, the tote query defines the queried tote based at least in part on a particular identifier, tote starting position, and/or the like. Accordingly, the queried tote may be determinable as located at a particular current position corresponding to a particular current smart rack. Additionally, or alternatively, in some embodiments the tote query defines the target end position that represents at least one tote ending position where the queried tote may be relocated. It should be appreciated that the tote query may be received on its own, or together with a plurality of tote queries.

At operation 3804, the process 3800 includes determining a best peer rack associated with the queried tote using a lowest resistance value path by executing an A* pathfinder algorithm. In this regard, the best peer rack may represent a peer smart rack connected to the current smart rack where the queried tote is currently located. The best peer rack may be determined as along a particular tote movement path associated with the lowest total movement resistance value (e.g., the lowest resistance value path. In some embodiments, operation 3804 includes executing a particular implementation of an A* pathfinder algorithm to generate, identify, or otherwise determine the lowest resistance value path from the current position associated with the queried tote to the target end position. It will be appreciated that the A* pathfinder algorithm in some embodiments traverses the smart rack matrix embodying the data graph matrix to determine the lowest resistance value path utilizing the resistance values between the nodes in the data graph matrix.

At operation 3806, the process 3800 includes determining whether the best peer rack is currently open. In some embodiments, status data associated with the best peer rack is determined (e.g., from a node corresponding to the best peer rack) and is compared with a predefined data value representing an open rack (e.g., an empty status). In a circumstance where the best peer rack is not determined opened (or in other words, the smart rack is filled where a tote is currently within the smart rack), flow proceeds to operation 3808A. In a circumstance where the best peer rack is determined open (or in other words, empty where no tote is currently within the smart rack), flow proceeds to operation 3808B.

At operation 3808A, the process 3800 includes finding a closest empty rack to the best peer rack and best movements to the closest empty rack by executing a second A* pathfinder algorithm. In some embodiments, the second A* pathfinder algorithm embodies a second implementation of an A* pathfinder algorithm for pathing from a position associated with the best peer rack to the closest empty rack associated with said best peer rack. In this regard, the second A* pathfinder algorithm minimizes the total movement resistance value for nodes embodying the path between the best peer rack and the closest empty rack. In this regard, the second tote filling the best peer rack may be relocated utilizing the second tote movement path between the best peer rack and the closest empty rack as determined via the second A* pathfinder algorithm, thus clearing the best peer rack to an empty state. It will be appreciated that the particular second A* pathfinder algorithm executed may be the same as the first A* pathfinder algorithm executed for the queried tote, but need not necessarily be the same. In some embodiments, upon finding the closest empty rack, data may be generated representing the movements to reposition the totes along the second tote movement path between the best peer rack and the closest empty rack, for example for inclusion in a movement plan.

At operation 3808B, the process 3800 includes swapping the queried tote to the best peer rack. In some embodiments, a tote plan is generated including data representing the swap of the queried tote to the best peer rack (e.g., by sliding, repositioning, or otherwise moving the tote from its current smart rack to the best peer rack). It will be appreciated that, advantageously, some embodiments detect open smart racks to execute subsequent A* pathfinder algorithm(s) only when necessary to improve operation when the path to be traveled by the queried tote is filled at one or more positions.

At operation 3810, the process 3800 includes determining whether the queried tote is at the target end position representing a tote ending position. In a circumstance where the queried tote is not at the target end position, flow returns to operation 3804 to determine a next best peer rack to continue moving the queried tote towards the target end position. In a circumstance where the queried tote is at the target end position, the flow proceeds to operation 3812.

At operation 3812, the process 3800 includes appending to a movement plan. In some embodiments, data is appended to a movement plan embodying a tote plan, where such data represents the rack operation(s) to be performed to relocate the queried tote along the identified first tote movement path, and relocate any tote(s) currently in the first tote movement path (if necessary) to prevent unnecessary collisions and/or delays.

Figure 39:
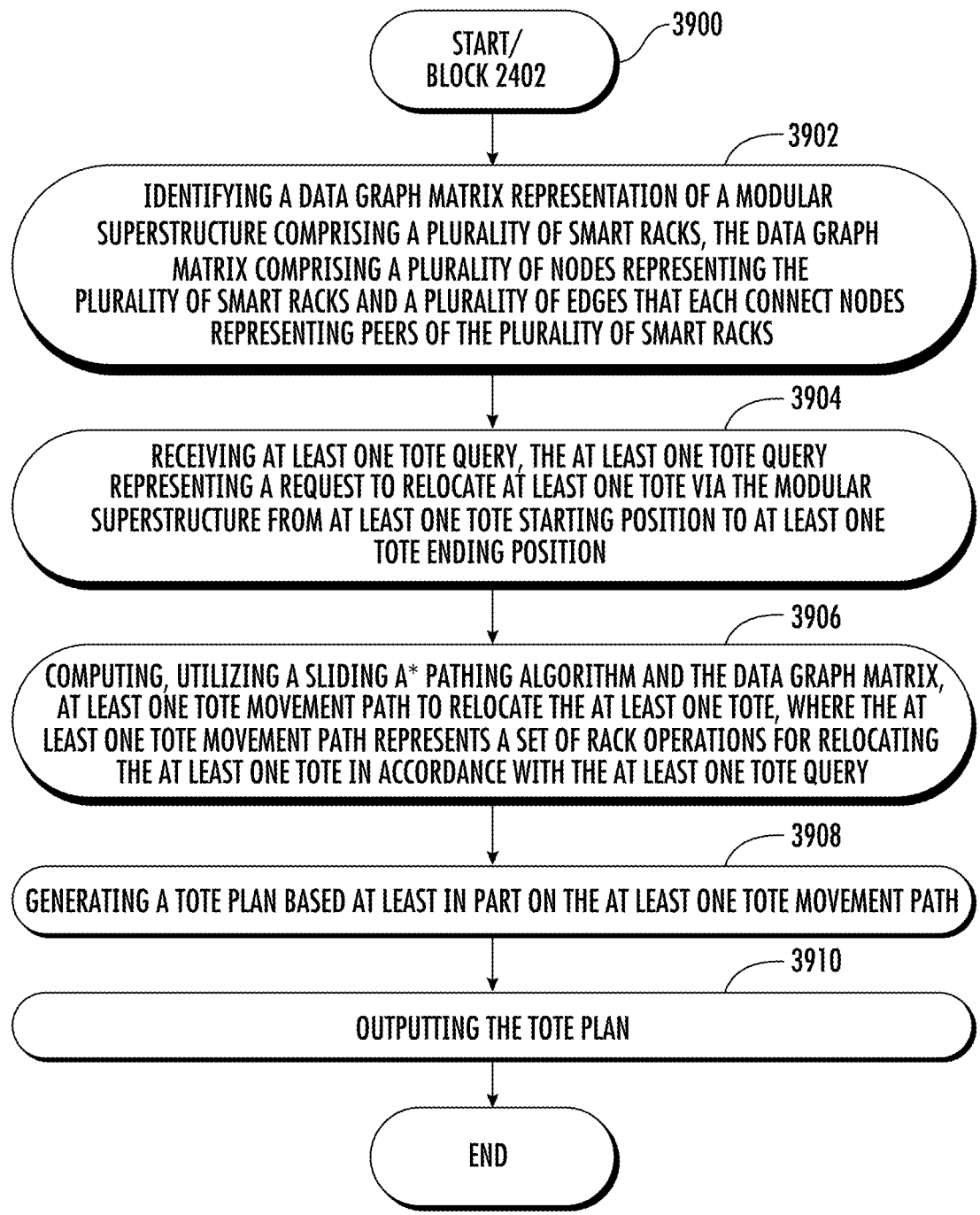
FIG. 39 illustrates a flowchart depicting operations of an example process for generating and outputting a movement plan represented by a tote plan utilizing a sliding A* algorithm in accordance with at least some example embodiments of the present disclosure.

FIG. 39 illustrates a flowchart depicting operations of an example process for generating and outputting a movement plan represented by a tote plan utilizing a sliding A* algorithm in accordance with at least some example embodiments of the present disclosure. Specifically, FIG. 39 depicts an example process 3900. The process 3900 is performable by any number of computing device(s) as described herein, for example embodiment in hardware, software, firmware, and/or any combination thereof. In some embodiments, the apparatus 2300 includes the various circuitry as means for performing each operation of the process 3900.

In some embodiments, the process 3900 embodies a sub-process of one or more process(es) depicted and/or described herein. In some embodiments, the process 3900 embodies a sub-process of the process 2400. For example, in some embodiments, the process 3900 embodies a sub-process for initializing a smart rack matrix with peer information, executing movement algorithm(s), generating a movement plan, and outputting a movement plan. In this regard, it will be appreciated that the process 3900 may replace, and/or supplement, one or more of the operations of such process(es) herein. Additionally, or alternatively, in some embodiments, flow returns to another process upon completion of the operations of process 3900.

At operation 3902, the process 3900 includes identifying a data graph matrix representation of a modular superstructure comprising a plurality of smart racks. In some embodiments, the plurality of smart racks is interconnected with one another, such that each smart rack is capable of repositioning a tote to at least one other smart rack and/or receiving a tote from at least one other smart rack. The data graph matrix may be embodied as a directed graph with a plurality of nodes and edges. In some embodiments, the data graph matrix includes a plurality of nodes representing the plurality of smart racks. Additionally, or alternatively, in some embodiments the data graph matrix includes a plurality of edges that each connect nodes representing peers of the plurality of smart racks. In this regard, in some embodiments an edge connects a node representing a particular smart rack capable of repositioning a tote to a peer smart rack represented by a peer node connected via the edge. In some embodiments, one or more of the edge(s) is directional indicating possible movement of the tote in a particular direction. Alternatively, or additionally, in some embodiments one or more of the edge(s) is bi-directional or not directional, indicating possible movement of the tote in both directions represented via the edge (e.g., from the first node to a second node in a first direction, and similarly from the second node to the first node in a second direction). In some embodiments, the edges and/or nodes are associated with movement resistance value(s) associated with movement of a tote in a particular direction via the corresponding smart rack and/or to or from the corresponding smart rack. In other embodiments, each edge and/or node is associated with the same movement resistance value (e.g., in a circumstance where all smart racks are configured the same in each direction of movement).

At operation 3904, the process 3900 includes receiving at least one tote query. In some embodiments, the at least one tote query represents a request to relocate at least one tote via the modular superstructure. Specifically, the tote query may represent a request to relocate at least one tote from at least one tote starting position to at least one tote ending position. In some embodiments, the tote ending position represents one or more egress point(s) associated with the modular superstructure. In other embodiments, the tote ending position may represent any other desired relocation point to which a tote should be moved. The tote starting position(s) and/or tote ending position(s) may be represented in any of a myriad of manners. For example, in some embodiments, a tote starting position and/or tote ending position is represented as an index (e.g., row/column/depth), a location identifier, an absolute or relative location within the modular super structure, and/or the like.

In some embodiments, a tote query indicates a single tote to be repositioned from a particular, single tote starting position to a particular, single tote ending position. Alternatively, or additionally, in some embodiments, a tote query indicates multiple totes to be repositioned from multiple tote starting positions to a particular, single tote ending position. Alternatively, or additionally, in some embodiments, a tote query indicates multiple totes to be repositioned from multiple tote starting positions to multiple tote ending positions. Alternatively, or additionally, in some embodiments, a tote query indicates a single tote to be repositioned to any of multiple tote ending positions. It will be appreciated that in some embodiments, any tote may be relocated to any identified tote ending position. Alternatively, or additionally, in some embodiments a tote is associated with a particular tote ending position.

At operation 3906, the process 3900 includes computing, utilizing a sliding A* algorithm and the data graph matrix, at least one tote movement path to relocate the at least one tote. In some embodiments, the at least one tote movement path represents a set of rack operations (e.g., movement(s), operation(s), and/or other action(s) to be performed by particular smart rack(s) of the modular superstructure) for relocating the at least one tote in accordance with the at least one tote query. In some embodiments, the sliding A* algorithm includes executing an implementation of the A* pathfinder algorithm to determine a tote movement path that routes each of the at least one tote from its tote starting position to a closest tote ending position. In some embodiments, the closest tote ending position is determined based on movement resistance value(s) between the tote starting position and the tote ending position, for example utilizing the A* pathfinder algorithm. In some embodiments, the closest tote ending position is determined utilizing a heuristic or other algorithm, such that the A* pathfinder algorithm may be executed from the tote starting position to the closest tote ending position.

In some embodiments, the sliding A* algorithm advantageously utilizes one or more subsequent implementations of an A* pathfinder algorithm. For example, in some embodiments, the sliding A* algorithm executes one or more additional A* pathfinder algorithm to reposition totes that fill smart racks within the tote movement path identified as best for the at least one tote queried to be relocated. Advantageously, such embodiments efficiently relocate such totes with minimal resistance.

Non-limiting examples of a sliding A* algorithm are described herein with respect to FIG. 38. Additional and/or alternative details with respect to the sliding A* algorithm are described herein with respect to FIGS. 39-44 herein.

At operation 3908, the process 3900 includes generating a tote plan based at least in part on the at least one tote movement path. In some embodiments the tote plan represents a movement plan of rack operations for relocating the at least one tote in the modular superstructure from tote starting positions embodying the tote(s) current position(s) to the tote ending position(s).

In some embodiments, the tote plan embodies a file, data stream, instruction set, or other structured data representation of the rack operation(s) to be performed. In one example context, the tote plan embodies a human-readable configuration file that includes human-readable instructions for performing tote operations embodying or associated with at least one tote movement path, for example a JSON file that includes JSON instructions for performing the tote operations embodying or associated with the at least one tote movement path. In some embodiments, the tote plan embodies machine-readable data embodying or associated with such at least one tote movement path. In other embodiments, the tote plan embodies hardware-specific instructions for controlling one or more smart rack(s) directly. It will be appreciated that the tote plan may be generated in any of a myriad of desired data format(s).

At operation 3910, the process 3900 includes outputting the tote plan. In some embodiments, the tote plan is output as a file and stored to a data repository/plurality of data repositories, transmitted to one or more external system(s), and/or the like. Alternatively, or additionally, in some embodiments, the tote plan is output by outputting particular portion(s) of the tote plan to one or more smart rack(s), for example by outputting each portion of the tote plan representing particular rack operation(s) to the particular smart rack to perform said rack operation(s) to cause initiation of the rack operation(s). In some embodiments, the tote plan is performed serially with one or more other tote plan(s), and/or in parallel in some embodiments where operations of distinct tote plans may be performed without impeding one another.

Figure 40:
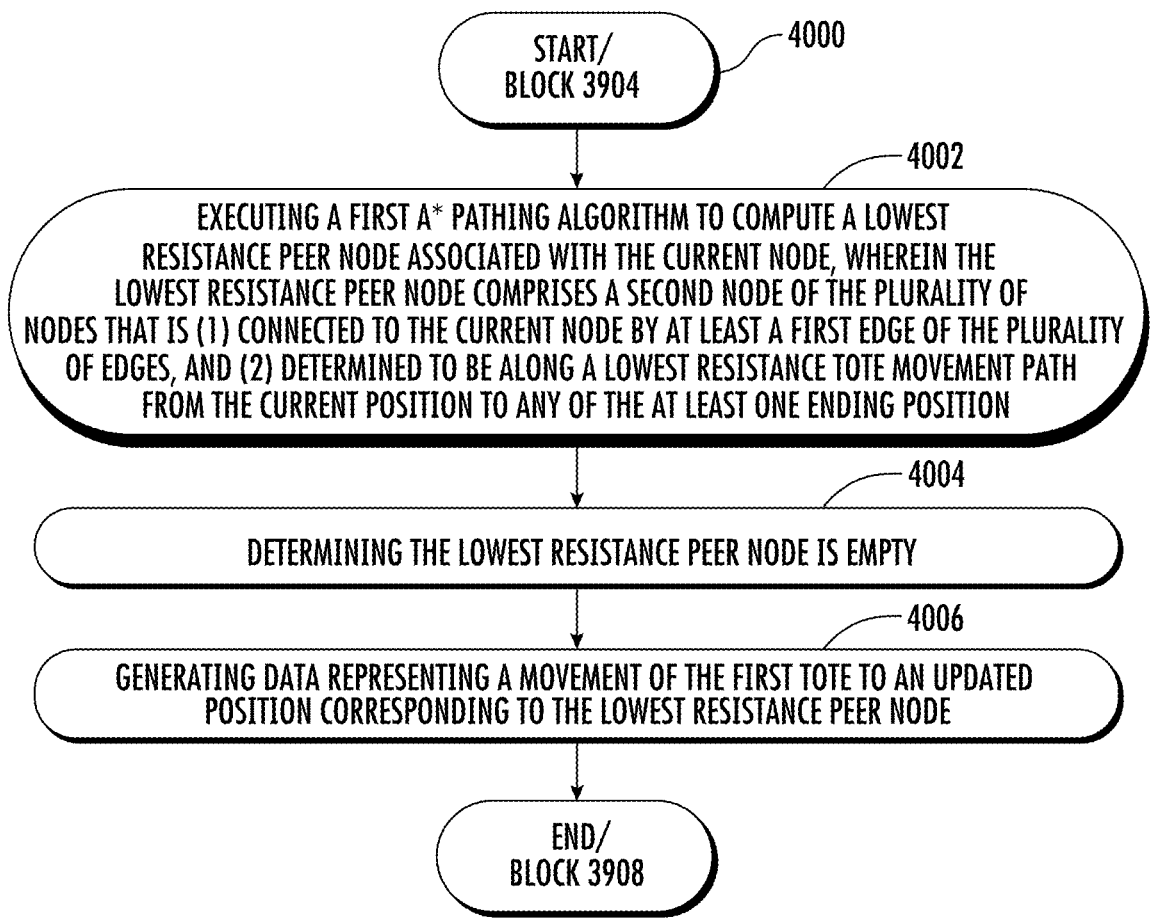
FIG. 40 illustrates a flowchart depicting operations of an example process for generating data movement of a tote to a currently empty in at least some example embodiments of the present disclosure.

FIG. 40 illustrates a flowchart depicting operations of an example process for generating data movement of a tote to a currently empty in at least some example embodiments of the present disclosure. Specifically, FIG. 40 depicts an example process 4000. The process 4000 is performable by any number of computing device(s) as described herein, for example embodiment in hardware, software, firmware, and/or any combination thereof. In some embodiments, the apparatus 2300 includes the various circuitry as means for performing each operation of the process 4000.

In some embodiments, the process 4000 embodies a sub-process of one or more process(es) depicted and/or described herein. In some embodiments, the process 4000 embodies a sub-process of the process 3900. For example, in some embodiments, the process 4000 embodies a sub-process for computing at least one movement path to relocate at least one tote utilizing a sliding A* algorithm and the data graph matrix. In this regard, it will be appreciated that the process 4000 may replace, and/or supplement, one or more of the operations of such process(es) herein. Additionally, or alternatively, in some embodiments, flow returns to another process upon completion of the operations of process 4000.

At operation 4002, the process 4000 includes executing a first A* pathfinder algorithm. The A* pathfinder algorithm is executed to compute a lowest resistance peer node associated with the current node. In some such embodiments, the lowest resistance peer node is a different, unvisited node of the plurality of nodes that is connected to the current node by at least a first edge. Additionally, or alternatively, in some embodiments the lowest resistance peer node is determined to be along a lowest resistance tote movement path from the current position to any of the least one ending position. It will be appreciated that, in some embodiments, the A* pathfinder algorithm is executed based on the edges connecting the various nodes to determine the path from the current position (e.g., corresponding to the current node in the plurality of nodes defining the data graph matrix) to any of the at least one ending position based at least in part on the edges connecting the various node(s). In some embodiments, the first A* pathfinder algorithm is executed utilizing the current position and a particular ending position determined to be closest to the current position based at least in part on one or more algorithm(s), heuristic(s), and/or the like. It will be appreciated that the lowest resistance peer node is determinable based on the first edge connecting the current node to a subsequent node in the lowest resistance tote movement path determined via the first A* pathfinder algorithm.

At operation 4004, the process 4000 includes determining the lowest resistance peer node is empty. In some embodiments, the current node includes peer information utilized to determine status data representing a status of the lowest resistance peer node. In some embodiments, the current status data for the lowest resistance peer node is compared to an empty status, wherein a match indicates that the lowest resistance peer node corresponds to a currently empty smart rack (e.g., currently not storing, holding, and/or otherwise manipulating a tote). In some embodiments, the current node utilizes stored peer information to query for the current status data associated with the lowest resistance peer node.

At operation 4006, the process 4000 includes generating data representing a movement of the first tote to an updated position corresponding to the lowest resistance peer node. In some embodiments, the tote may be swapped, slid, or otherwise relocated to a smart rack corresponding to the corresponding lowest resistance peer node. In this regard, the tote may advantageously be moved without additional relocating of a tote already filling the lowest resistance peer node, advantageously increasing the throughput for movement of the first tote. In some embodiments, in a circumstance where another tote is filling the smart rack corresponding to the lowest resistance peer node, it is advantageous to efficiently move the other tote to a temporary position to enable the first tote to continue along the determined tote movement path. In this regard, one or more of such other tote(s) may be repositioned in accordance with the methodology described with respect to FIG. 41 herein.

Figure 41:
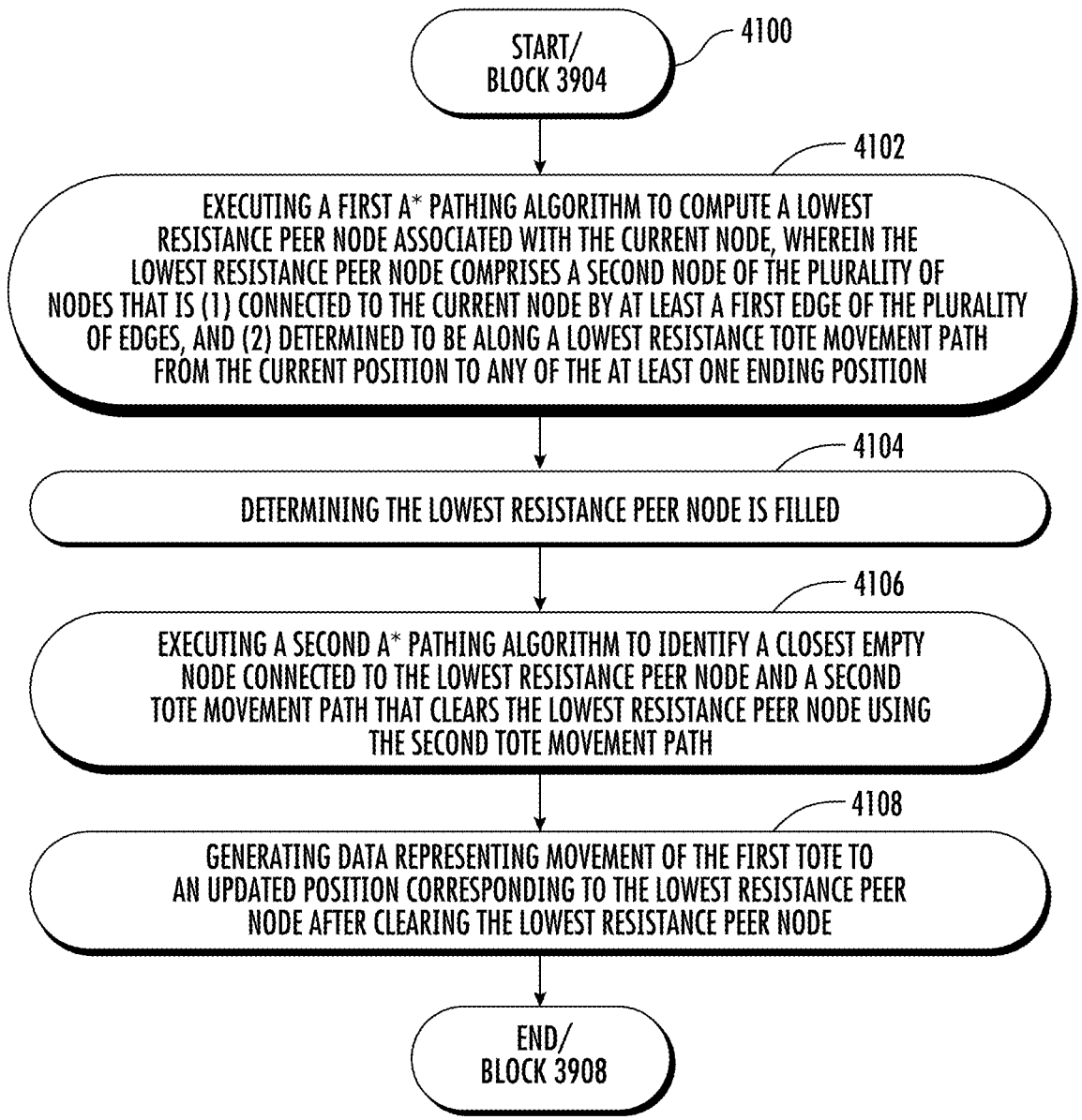
FIG. 41 illustrates a flowchart depicting operations of an example process for movement of a tote to a currently filled position in accordance with at least some example embodiments of the present disclosure.

FIG. 41 illustrates a flowchart depicting operations of an example process for movement of a tote to a currently filled position in accordance with at least some example embodiments of the present disclosure. Specifically, FIG. 41 depicts an example process 4100. The process 4100 is performable by any number of computing device(s) as described herein, for example embodiment in hardware, software, firmware, and/or any combination thereof. In some embodiments, the apparatus 2300 includes the various circuitry as means for performing each operation of the process 4100.

In some embodiments, the process 4100 embodies a sub-process of one or more process(es) depicted and/or described herein. In some embodiments, the process 4100 embodies a sub-process of the process 3900. For example, in some embodiments, the process 4100 embodies a sub-process for computing at least one movement path to relocate at least one tote utilizing a sliding A* algorithm and the data graph matrix. In this regard, it will be appreciated that the process 4100 may replace, and/or supplement, one or more of the operations of such process(es) herein. Additionally, or alternatively, in some embodiments, flow returns to another process upon completion of the operations of process 4100.

At operation 4102, the process 4100 includes executing a first A* pathfinder algorithm. The A* pathfinder algorithm is executed to compute a lowest resistance peer node associated with the current node. In some such embodiments, the lowest resistance peer node is a different, unvisited node of the plurality of nodes that is connected to the current node by at least a first edge. Additionally, or alternatively, in some embodiments the lowest resistance peer node is determined to be along a lowest resistance tote movement path from the current position to any of the least one ending position. It will be appreciated that, in some embodiments, the A* pathfinder algorithm is executed based on the edges connecting the various nodes to determine the path from the current position (e.g., corresponding to the current node in the plurality of nodes defining the data graph matrix) to any of the at least one ending position based at least in part on the edges connecting the various node(s). In some embodiments, the first A* pathfinder algorithm is executed utilizing the current position and a particular ending position determined to be closest to the current position based at least in part on one or more algorithm(s), heuristic(s), and/or the like. It will be appreciated that the lowest resistance peer node is determinable based on the first edge connecting the current node to a subsequent node in the lowest resistance tote movement path determined via the first A* pathfinder algorithm.

At operation 4104, the process 4100 includes determining the lowest resistance peer node is filled. In some embodiments, the current node includes peer information utilized to determine status data representing a status of the lowest resistance peer node. In some embodiments, the current status data for the lowest resistance peer node is compared to an occupied (or filled) status, wherein a match indicates that the lowest resistance peer node corresponds to a currently filled smart rack (e.g., currently storing, holding, or otherwise manipulating a tote). In some embodiments, the current node utilizes stored peer information to query for the current status data associated with the lowest resistance peer node.

At operation 4106, the process 4100 includes executing a second A* pathfinder algorithm to identify a closest empty node connected to the lowest resistance peer node and a second tote movement path. In some embodiments, the second tote movement path embodies a lowest resistance determined for moving a tote from the lowest resistance peer node, which is determined to be filled with a tote) to an empty space. In this regard, the second tote movement path may be used as a path that clears the lowest resistance peer node utilizing low-resistance movements. It will be appreciated that in some embodiments, the closest empty node in some embodiments is determined utilizing the second A* pathfinder algorithm, for example as the second A* pathfinder algorithm proceeds along a frontier to search for empty nodes (e.g., nodes associated with state data representing an empty state). Alternatively, or additionally, in some embodiments, the nearest empty node is determined utilizing known data, another algorithm, a heuristic, and/or the like, such that the second A* pathfinder algorithm may be utilized to generate the lowest resistance movement path to the closest empty node from the lowest resistance peer node.

At operation 4108, the process 4100 includes generating data representing movement of the first tote to an updated position corresponding to the lowest resistance peer node after clearing the lowest resistance peer node. In this regard, the lowest resistance peer node may become empty by relocating the tote in the smart rack associated with the lowest resistance peer node (and/or one or more additional nodes) along the second tote movement path to fill the smart rack associated with the closest empty node. Upon clearing the lowest resistance peer node, the original tote to be moved to the at least one ending position may continue to be relocated without impediment.

Figure 42:
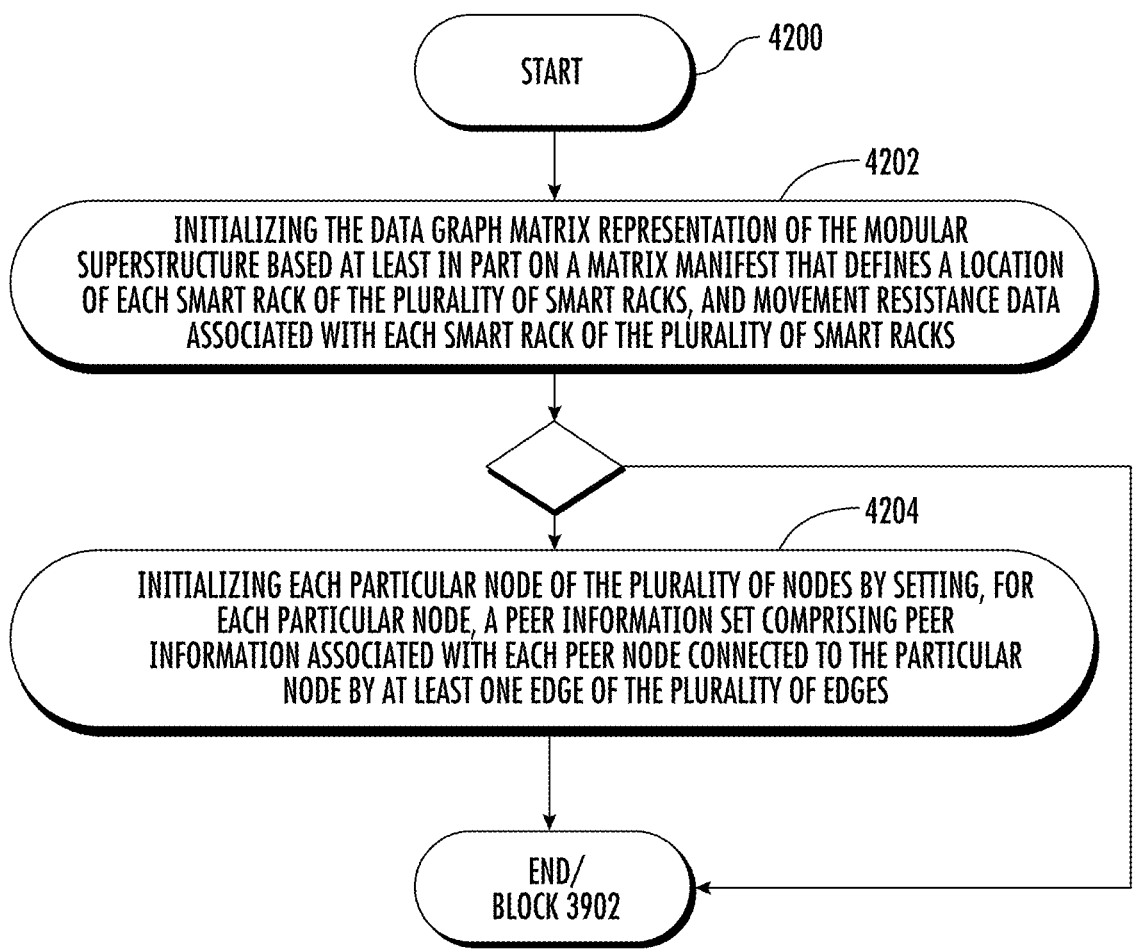
FIG. 42 illustrates a flowchart depicting operations of an example process for initializing a data graph matrix representation of a modular structure in accordance with at least some example embodiments of the present disclosure.

FIG. 42 illustrates a flowchart depicting operations of an example process for initializing a data graph matrix representation of a modular structure in accordance with at least some example embodiments of the present disclosure. Specifically, FIG. 42 depicts an example process 4200. The process 4200 is performable by any number of computing device(s) as described herein, for example embodiment in hardware, software, firmware, and/or any combination thereof. In some embodiments, the apparatus 2300 includes the various circuitry as means for performing each operation of the process 4200.

In some embodiments, the process 4200 embodies a sub-process of one or more process(es) depicted and/or described herein. In some embodiments, the process 4200 embodies a sub-process of the process 3900. For example, in some embodiments, the process 4200 embodies a sub-process for identifying a data graph matrix representation of a modular superstructure. In this regard, it will be appreciated that the process 4200 may replace, and/or supplement, one or more of the operations of such process(es) herein. Additionally, or alternatively, in some embodiments, flow returns to another process upon completion of the operations of process 4200.

At operation 4202, the process 4200 includes initializing a data graph matrix representation of the modular superstructure based at least in part on a matrix manifest. In some embodiments, the matrix manifest comprises one or more data files stored locally, at a remote server, and/or the like. Alternatively, or additionally, in some embodiments, the matrix manifest comprises one or more data record(s) stored to a data repository.

The matrix manifest may define a myriad of data properties and/or configuration(s) of the modular superstructure. In some embodiments, the matrix manifest defines a location of each smart rack of the plurality of smart racks. For example, in some embodiments, the matrix manifest defines a physical location, multi-dimensional index (e.g., a 2D index such as row/column or a 3D index such as row/column/depth), and/or other position representing the location of a smart rack within the modular superstructure. It will be appreciated that the matrix manifest in some embodiments includes other contextual data associated with the modular superstructure, for example location(s) of hole(s) in the modular superstructure, position(s) representing egress point(s) from the modular superstructure, and/or the like.

Additionally, or alternatively, in some embodiments, the matrix manifest includes movement resistance data. In some embodiments, the matrix manifest defines movement resistance data associated with each smart rack of the plurality of smart racks within a particular modular superstructure. The movement resistance data in some embodiments represents a resistance value for moving a tote via the smart rack represented by a particular node. In some embodiments, the movement resistance data for a particular smart rack is defined for each direction in which a tote may be moved via the smart rack. For example, in one example context, a smart rack is configured to move a tote potentially in any cartesian direction (e.g., left, right, forward, backwards, up, down), and the movement resistance data represents a movement resistance value for some or all of such directions. In some embodiments, each portion of the movement resistance data includes a clock time for the corresponding smart rack to move the tote in a particular direction (e.g., in seconds, milliseconds, and/or the like), such that a higher clock time represents a higher resistance. In other embodiments, the movement resistance data represents another data property and/or cost associated with the smart rack moving a tote. Non-limiting examples of movement resistance data includes a power consumption, a clock time, a resource cost, and/or the like.

In some embodiments, the process 4200 ends upon completion of operation 4202. In other embodiments, the process continues to operation 4204 upon completion of operation 4202.

At operation 4204, the process 4200 includes initializing each particular node of the plurality of nodes. In some embodiments, each particular node of the plurality of nodes is initialized by setting, for each particular node, a peer information set comprising peer information associated with each peer node connected to the particular node by at least one edge of a plurality of edges. For example, in some embodiments, the peer information indicates a node identifier for a peer node connected to the particular node. Additionally, or alternatively, in some embodiments, the peer information includes a movement resistance value for moving a tote from the particular node towards a particular peer node. Additionally, or alternatively, in some embodiments, the peer information includes behavior data indicating a behavior of the operation of the peer node (e.g., indicating whether the peer node is a smart rack configured to perform in a particular manner, a hole that is not accessible for relocating totes, and/or the like).

Figure 43:
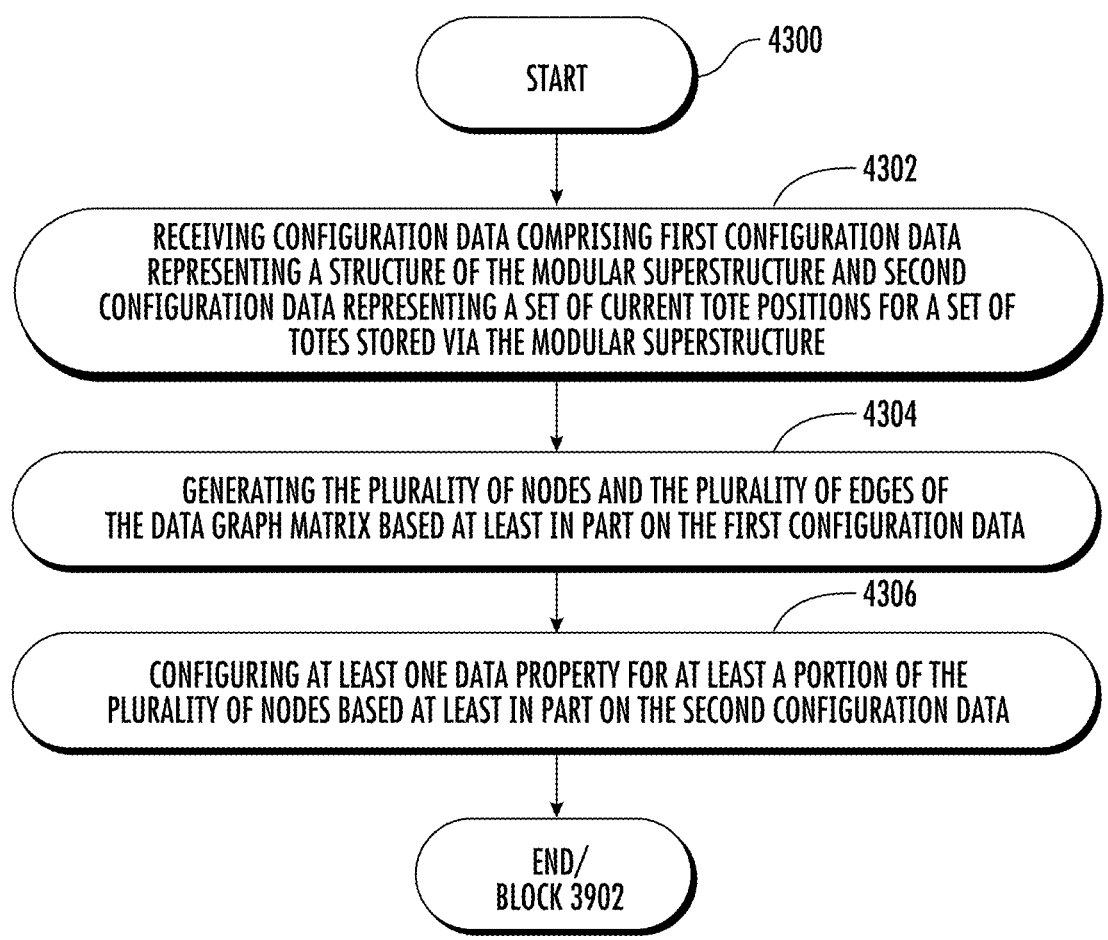
FIG. 43 illustrates a flowchart depicting operations of an example process for configuring a plurality of nodes and edges from configuration data in accordance with at least some example embodiments of the present disclosure.

FIG. 43 illustrates a flowchart depicting operations of an example process for configuring a plurality of nodes and edges from configuration data in accordance with at least some example embodiments of the present disclosure. Specifically, FIG. 43 depicts an example process 4300. The process 4300 is performable by any number of computing device(s) as described herein, for example embodiment in hardware, software, firmware, and/or any combination thereof. In some embodiments, the apparatus 2300 includes the various circuitry as means for performing each operation of the process 4300.

In some embodiments, the process 4300 embodies a sub-process of one or more process(es) depicted and/or described herein. In some embodiments, the process 4300 embodies a sub-process of the process 3900. For example, in some embodiments, the process 4300 embodies a sub-process for identifying a data graph matrix representation of a modular superstructure. In this regard, it will be appreciated that the process 4300 may replace, and/or supplement, one or more of the operations of such process(es) herein. Additionally, or alternatively, in some embodiments, flow returns to another process upon completion of the operations of process 4300.

At operation 4302, the process 4300 includes reading configuration data. In some embodiments, the reading configuration data is read from a manifest file. In some embodiments, the configuration data is retrieved from a datastore for a particular location, identifier, and/or the like.

In some embodiments, the configuration data includes first configuration data representing a structure of a modular superstructure. In some embodiments for example, such data includes a height, width, and/or depth of the modular superstructure. In other embodiments, such data includes locations of smart racks of a modular superstructure, and/or locations of hole(s) and/or other configuration elements of the modular superstructure.

In some embodiments, the configuration data includes second configuration data representing a set of current tote positions for a set of totes stored via the modular superstructure. In some embodiments, the second configuration data includes an index or identifier associated with a smart rack in the modular superstructure, indicating that a particular tote is stored in that smart rack. Alternatively, or additionally, in some embodiments, the second configuration data includes a position (e.g., a row and/or a column) indicating the location of a smart rack where a tote is located. In some embodiments, the second configuration data includes a tote identifier that uniquely represents the particular tote at a particular position in the particular smart rack.

At operation 4304, the process 4300 includes generating the plurality of nodes and the plurality of edges of the data graph matrix based at least in part on the first configuration data. In some embodiments, the plurality of nodes includes a node representing each smart rack in the modular superstructure. Additionally, or alternatively, in some embodiments, the plurality of nodes includes a node for other spaces, holes, and/or other elements associated with the structure of the modular superstructure. For example, in some embodiments, the plurality of nodes is configured to represent a grid of particular dimensions (e.g., a height and width), with each node configured to represent a hole, a smart rack, and/or another element. In this regard, it will be appreciated that one or more node(s) may represent elements that are not physical subcomponents of the modular superstructure, but provide context to the physical structure of the modular superstructure.

At operation 4306 includes configuring at least one data property for at least a portion of the plurality of nodes based at least in part on the second configuration data. In some embodiments, for example, the second configuration data is utilized to set state data representing a current state of each node. In some embodiments, the state data indicates whether a particular node is associated with an empty state (e.g., indicating that the corresponding smart rack is empty) or an occupied state (e.g., indicating that the corresponding smart rack is occupied/filled). In this regard, it will be appreciated that the nodes may be arranged in a particular arrangement and/or assigned particular location identifier(s) or index(s) that enable determination of a state of a particular node based on a portion of the second configuration data associated therewith.

Figure 44:
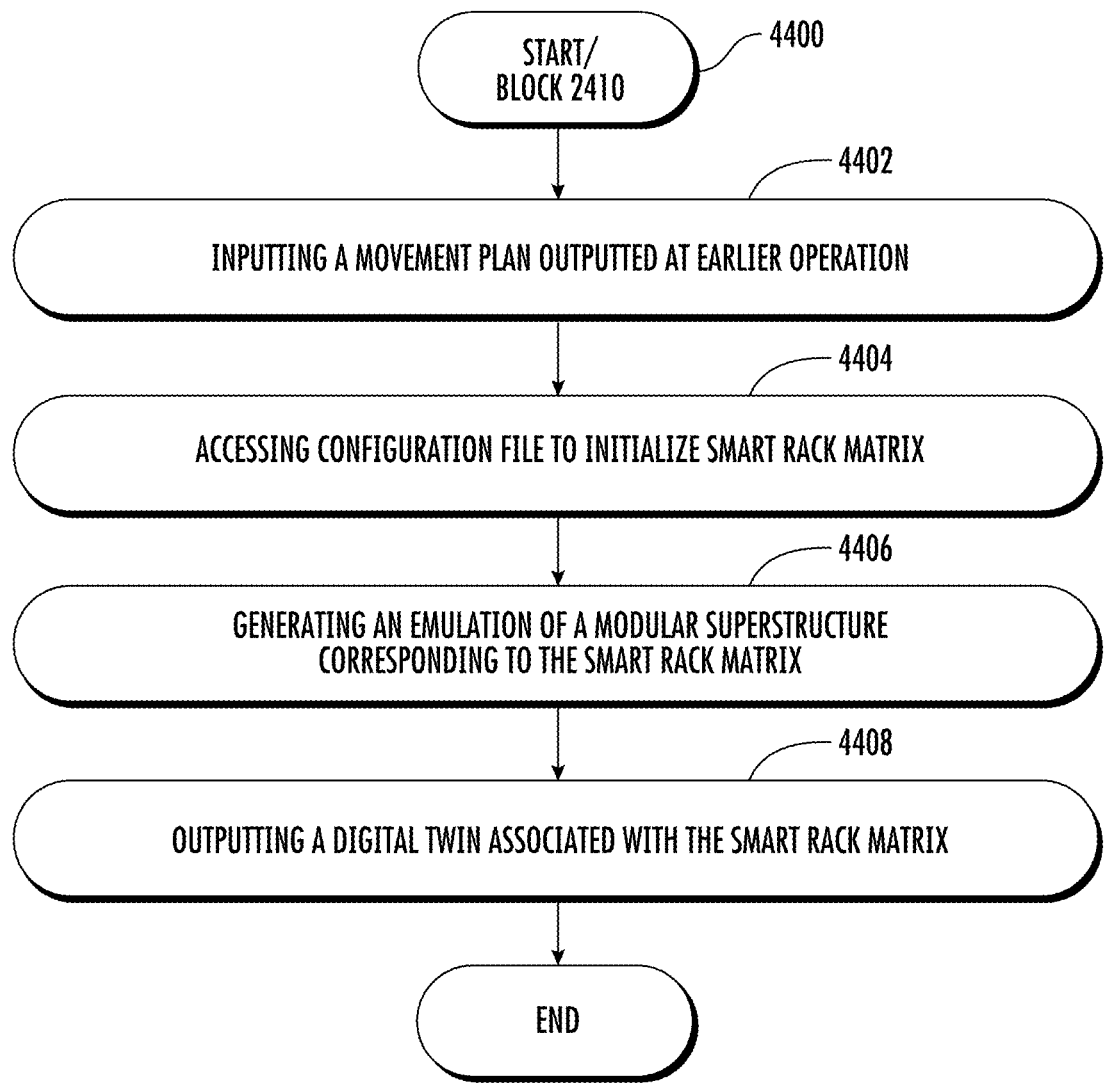
FIG. 44 illustrates a flowchart depicting operations of an example process in accordance with at least some example embodiments of the present disclosure.

FIG. 44 illustrates a flowchart depicting operations of an example process for emulating a modular superstructure in accordance with at least some example embodiments of the present disclosure. Specifically, FIG. 44 depicts an example process 4400. The process 4400 is performable by any number of computing device(s) as described herein, for example embodiment in hardware, software, firmware, and/or any combination thereof. In some embodiments, the apparatus 2300 includes the various circuitry as means for performing each operation of the process 4400.

In some embodiments, the process 4400 embodies a sub-process of one or more process(es) depicted and/or described herein. In some embodiments, the process 4400 embodies a sub-process of the process 2400. For example, in some embodiments, the process 4400 embodies a sub-process for outputting a movement plan (e.g., a tote plan). In this regard, it will be appreciated that the process 4400 may replace, and/or supplement, one or more of the operations of such process(es) herein. Additionally, or alternatively, in some embodiments, flow returns to another process upon completion of the operations of process 4400.

At operation 4402, the process 4400 includes inputting a movement plan outputted at an earlier operation. In some embodiments, the inputted movement plan is received as output at operation 2410. In other embodiments, a movement plan is outputted and stored, such that it is subsequently retrieved and inputted. A movement plan (e.g., a tote plan) may be inputted automatically upon output, in response to user input selecting the movement plan, and/or the like.

At operation 4404, the process 4400 includes accessing configuration file to initialize a smart rack matrix. In some embodiments, the configuration file embodies a smart matrix manifest and/or other file that represents at least the structure (e.g., a physical configuration and/or connections thereof) of smart racks within a modular superstructure. In some embodiments, the configuration file is received from a server, data repository, and/or the like. In some embodiments, the configuration file is stored locally by a particular computing device, system, data repository, and/or the like. It will be appreciated that, in some embodiments, a configuration file comprises or is defined by a plurality of sub-files that each include particular portions of the configuration of a modular superstructure.

In some embodiments, the smart rack matrix is initialized as data that represents each smart rack in the modular superstructure, a physical design and/or configuration of the modular superstructure, and/or connection(s) between the smart rack(s) in the modular superstructure. For example, in some embodiments, the peer information indicates peer smart rack(s) associated with a particular smart rack (e.g., peer smart rack identifier) that may be subsequently used to quickly identify the data associated with a peer of a particular smart rack. Additionally, or alternatively, in some embodiments, the peer information includes movement resistance value(s) for moving to a particular peer, whether movement towards a particular peer is possible, whether movement from a particular peer is possible, and/or the like. In some embodiments, the smart rack matrix is initialized as a data graph matrix comprising a plurality of nodes and edges, as described herein.

At operation 4406, the process 4400 includes generating an emulation of a modular superstructure corresponding to the smart rack matrix. In some embodiments, the emulation of the modular superstructure embodies digital representations of the various components or subunits (e.g., smart racks) of the modular superstructure with simulated operations of such digital representations configured to mimic real-world operations of the modular superstructure. In this regard, it will be appreciated that the emulation may include the same structure of the corresponding real-world modular superstructure based on the initialized smart rack matrix. Additionally, in some embodiments, the apparatus 2300 initiates the emulation to execute the movement plan. In this regard, the emulation may continue to simulate execution of the instructions represented in the movement plan, and generate simulated data based on such digital execution. For example, in some embodiments, the emulation initiates rack operations based on the inputted movement plan, such that the results of such rack operations may be visualized via the emulation. In some embodiments, the system and/or a user adjusts the movement plan based on the data resulting from the emulation, and/or the movement plan may be executed via the corresponding real-world modular superstructure based on the results of the emulation. In some embodiments, the emulation is generated in an emulation environment that similarly emulates one or more physical conditions of the real-world environment associated with the corresponding modular superstructure (e.g., via a physics engine). In one example context, the Blender open source software provided by the Blender Foundation is utilized to generate and/or output the emulation. In another example, Blender is utilized to export 3D objects to HTML.

At optional operation 4408, the process 4400 includes outputting a digital twin associated with the smart rack matrix. The digital twin in some embodiments similarly embodies a digital representation of the real-world modular superstructure represented by the smart rack matrix. In some embodiments, the digital twin is output utilizing only the smart rack matrix to configure the digital twin accordingly. Additionally, or alternatively, in some embodiments, the digital twin is output utilizing the smart rack matrix and data from the emulation. For example, in some embodiments, the digital twin is generated utilizing image data at one or more time slice(s) as generated via the emulation and inputted for use in generating the digital twin. In some embodiments, the digital twin provides an adaptable or generic view of the smart racks of the modular superstructure as they operate in the real world and/or via the emulation. In some embodiments, one or more aspects of the digital twin is/are configurable separate from the emulation and/or the real-world modular superstructure. In some embodiments, the digital twin may be altered to generate an updated smart rack matrix, or other digitally emulated modular superstructure design, for testing as compared to the existing real-world modular superstructure and/or existing emulations. Alternatively, or additionally, in some embodiments, the digital twin's clock can be advanced into the future to identify issues, make corrections associated with operation of the modular superstructure, and/or utilize actionable insights derived from data produced by the digital twin or observed by the digital twin, in real-time to adjust and/or improve real-world behavior automatically (e.g., in real-time) or upon determined updates.

In some embodiments, a feedback loop is generated to correct, resolve, or otherwise address malfunctions or otherwise sub-optimal conditions (e.g., in operation of a modular superstructure). Alternatively, or additionally, another feedback look may be generated that allows one or more scenario(s) to be run to present KPIs based on varying factors including, but not limited to, fungibility, throughput, and/or power consumption. Such feedback loops may be performed via emulation and/or digital twin. In some embodiments, one or more aspects of the modular superstructure may be updated automatically, or via user interaction, in response to data produced via the feedback loop (e.g., KPIs tested in a first given scenario versus KPIs in a second scenario).

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A smart rack for transporting a rectangular prism comprising:
   a rack frame comprising a plurality of rack plates; and
   at least one rack actuator secured to at least an inner surface of at least one of the plurality of rack plates, wherein the at least one rack actuator comprises:
   a slider movably disposed on a lead screw; and
   an arm connected to the slider, wherein the arm is configured to operate in an engaged mode or a disengaged mode relative to the rectangular prism; and
   a swing plate that is moveable between a distal end of a swing bar and a proximal end of the swing bar, wherein the swing plate is connected to the lead screw, wherein:
   when the swing plate is at the distal end of the swing bar, the arm is in the disengaged mode; and
   when the swing plate is at the proximal end of the swing bar, the arm is in the engaged mode.

2. The smart rack of claim 1 further comprising:
   a linear motor configured to exert a linear motion; and
   a hinge plate defining a first groove and a second groove, wherein the linear motor comprises an actuator pin moveable along the first groove, wherein the swing plate is connected to a connector pin moveable along the second groove, wherein the first groove and the second groove are at a 90-degree angle with one another, such that the hinge plate transfers the linear motion exerted by the linear motor to movements of the swing plate between the distal end and the proximal end.

3. The smart rack of claim 1, wherein, when the arm operates in the engaged mode, the arm is in contact with an outer surface of the rectangular prism, wherein, when the arm operates in the disengaged mode, the arm is not in contact with the outer surface of the rectangular prism, wherein the smart rack further comprises a rotary motor, wherein the rotary motor is configured to cause a rotational motion of the arm relative to the slider.

4. The smart rack of claim 1 further comprising:
   a rack actuator circuit connected to a smart rack power access point of the smart rack, wherein the rack actuator circuit is configured to provide power to at least one motor of the smart rack; and
   at least one smart rack switch circuit connected to the smart rack power access point, wherein each of the at least one smart rack switch circuit is connected to at least one peer smart rack power access point of at least one peer smart rack.

5. The smart rack of claim 4, wherein the smart rack power access point receives power from outside the smart rack.

6. The smart rack of claim 4, wherein the at least one smart rack switch circuit comprises at least one of an x dimension smart rack switch circuit, a y dimension smart rack switch circuit, and a z dimension smart rack switch circuit, wherein the x dimension smart rack switch circuit is configured to control a first flow of electricity from the smart rack to a first peer smart rack that is positioned adjacent to the smart rack in an x axis dimension, wherein the y dimension smart rack switch circuit is configured to control a second flow of electricity from the smart rack to a second peer smart rack that is positioned adjacent to the smart rack in a y axis dimension, wherein the z dimension smart rack switch circuit is configured to control a third flow of electricity from the smart rack to a third peer smart rack that is positioned adjacent to the smart rack in a z axis dimension.

7. The smart rack of claim 1, further comprising a processing circuitry configured to:
receive a tote plan from a superstructure controller;
determine whether a smart rack identifier of the tote plan matches a rack coordination set of the smart rack; and
in response to determining that the smart rack identifier of the tote plan does not match the rack coordination set of the smart rack, transmit the tote plan to at least one peer smart rack of the smart rack, wherein the at least one peer smart rack comprises at least one of a top peer smart rack, a bottom peer smart rack, a front peer smart rack, a back peer smart rack, a left peer smart rack, or a right peer smart rack.

8. The smart rack of claim 7, wherein the processing circuitry is configured to further:
in response to determining that the smart rack identifier of the tote plan matches the rack coordination set of the smart rack, execute at least one movement instruction of the tote plan, comprising:
transmitting a MoveReady message to the right peer smart rack of the smart rack;
receiving a RequestedMoveReady message from the right peer smart rack; and
in response to receiving the RequestedMoveReady message, transmit a MoveRequest message to the right peer smart rack.

9. The smart rack of claim 1, further comprising a processing circuitry configured to:
identify a target rectangular prism, a current smart rack, and an egress point;
determine state information for one or more peer smart racks, wherein the state information comprises at least one of open or occupied;
determine a closest perpendicular peer smart rack to the current smart rack having the target rectangular prism, comprising determining a perpendicular smart rack that is closest to the egress point;
generate movement instructions related to the current smart rack having the target rectangular prism in a tote plan to cause the target rectangular prism in the current smart rack to be moved to the closest perpendicular peer smart rack in an instance in which the closest perpendicular peer smart rack has state information that is set to open;
generate one or more other movement instructions in the tote plan in an instance in which the closest perpendicular peer smart rack has state information that is set to occupied; and
update a location of the target rectangular prism and set the closest perpendicular peer smart rack as the current smart rack in an instance in which the target rectangular prism is moved to the closest perpendicular peer smart rack.

10. The smart rack of claim 9, wherein generating one or more other movement instructions in the tote plan in an instance in which the closest perpendicular peer smart rack has state information that is set to occupied further comprises:
determining whether at least one peer smart rack has state information set to open; and
causing the rectangular prism in the closest perpendicular peer smart rack to be moved to a peer smart rack of the at least one peer smart rack that has state information set to open.

11. The smart rack of claim 9, wherein generating one or more other movement instructions in the tote plan in an instance in which the closest perpendicular peer smart rack has state information that is set to occupied further comprises:
determining whether at least one peer smart rack at a distance n has state information set to open; and
determining one or more movements to position the target rectangular prism at a distance n has state information set to open closer to the current smart rack.

12. The smart rack of claim 1, further comprising a processing circuitry configured to:
identify a data graph matrix representation of a modular superstructure comprising a plurality of smart racks, the data graph matrix representation comprising a plurality of nodes representing the plurality of smart racks and a plurality of edges that each connect nodes representing peers of the plurality of smart racks;
receive at least one tote query, the at least one tote query representing a request to relocate at least one tote via the modular superstructure from at least one tote starting position to at least one tote ending position;
compute, utilizing a sliding A* algorithm and the data graph matrix representation, at least one tote movement path to relocate the at least one tote, wherein the at least one tote movement path represents a set of rack operations for relocating the at least one tote in accordance with the at least one tote query;
generate a tote plan based at least in part on the at least one tote movement path, comprises configuring the tote plan to serially execute each set of rack operations for relocating the at least one tote of the at least one tote movement path; and
output the tote plan.

13. The smart rack of claim 12, wherein the at least one tote comprises a first tote associated with a current position corresponding to a current node of the plurality of nodes and that begins movement from a first tote starting position corresponding to a first node of the plurality of nodes, and wherein computing the at least one tote movement path to relocate the at least one tote comprises:
while the current position is determined to not be equivalent to any of the at least one tote ending position:
executing a first A* pathfinder algorithm to compute a lowest resistance peer node associated with the current node, wherein the lowest resistance peer node comprises a second node of the plurality of nodes that is (1) connected to the current node by at least a first edge of the plurality of edges, and (2) determined to be along a lowest resistance tote movement path from the current position to any of at least one ending position;
determining the lowest resistance peer node is empty; and
generating data representing a swap of the first tote to an updated position corresponding to the lowest resistance peer node.

14. The smart rack of claim 12, wherein the at least one tote comprises a first tote associated with a current position corresponding to a current node of the plurality of nodes and that begins movement from a first tote starting position corresponding to a first node of the plurality of nodes, and wherein computing the at least one tote movement path to relocate the at least one tote comprises:
   while the current position is determined to not be equivalent to any of the at least one tote ending position:
      executing a first A* pathfinder algorithm to compute a lowest resistance peer node associated with the current node, wherein the lowest resistance peer node comprises a second node of the plurality of nodes that is (1) connected to the current node by at least a first edge of the plurality of edges, and (2) determined to be along a lowest resistance tote movement path from the current position to any of at least one ending position;
      determining that the lowest resistance peer node is filled with a second tote;
      executing a second A* pathfinder algorithm to identify a closest empty node connected to the lowest resistance peer node and a second tote movement path that clears the lowest resistance peer node using the second tote movement path; and
      generating data representing a swap of the first tote to an updated position corresponding to the lowest resistance peer node after clearing the lowest resistance peer node.

15. The smart rack of claim 12, wherein the processing circuitry is configured to further:
   initialize the data graph matrix representation of the modular superstructure based at least in part on a matrix manifest that defines a location of each smart rack of the plurality of smart racks, and movement resistance data associated with each smart rack of the plurality of smart racks; and
   initialize each particular node of the plurality of nodes by setting, for each particular node, a peer information set comprising peer information associated with each peer node connected to the particular node by at least one edge of the plurality of edges, wherein the peer information associated with a particular peer node comprises:
      state data associated with the particular peer node; and/or
      behavior data associated with the particular peer node.

16. The smart rack of claim 12, wherein identifying the data graph matrix representation of the modular superstructure comprises:
   reading configuration data comprising first configuration data representing a structure of the modular superstructure and second configuration data representing a set of current tote positions for a set of totes stored via the modular superstructure;
   generating the plurality of nodes and the plurality of edges of the data graph matrix representation based at least in part on the first configuration data; and
   configuring at least one data property for at least a portion of the plurality of nodes based at least in part on the second configuration data.

17. The smart rack of claim 12, wherein each node of the plurality of nodes comprises behavior data, wherein the behavior data for a particular node is used to derive at least one resistance value associated with the particular node, wherein the at least one tote query comprises order indication data indicating whether an order of a relocation of the at least one tote via the modular superstructure is defined, wherein the at least one tote query comprises a first tote query, the first tote query comprising:
   first data indicating a request to relocate a first tote from a first tote starting position to a first tote ending position;
   second data indicating a request to relocate a first set of totes from a first set of tote starting positions to a first set of tote ending positions; or
   third data indicating a request to relocate the first tote from the first tote starting position to one of the first set of tote ending positions,
   wherein at least a first node of the plurality of nodes comprises a time movement value set comprising a time movement value for each direction in which a particular smart rack associated with the first node is capable of moving a particular tote,
   wherein the data graph matrix representation represents the modular superstructure and at least one hole associated with the modular superstructure,
   wherein the at least one tote ending position represents an egress position external from the plurality of smart racks.

18. The smart rack of claim 12, wherein each node of the plurality of nodes comprises current state data, wherein the current state data for a particular node is configurable between an empty state in a circumstance where a particular smart rack corresponding to the particular node is empty and an occupied state in a circumstance where the particular smart rack is occupied by a particular tote, wherein the sliding A* algorithm processes at least one data value that is based at least in part on the current state data associated with the particular node.

19. The smart rack of claim 12, wherein each node of the plurality of nodes comprises behavior data that is configurable between at least a first behavior, a second behavior, and a third behavior,
   wherein the first behavior indicates a particular node is inaccessible,
   wherein the second behavior indicates the particular node corresponds to a particular smart rack that operates according to a first set of resistance values,
   wherein the third behavior indicates the particular node corresponds to the particular smart rack that operates according to a second set of resistance values, wherein the second set of resistance values comprises at least a first resistance value associated with a first relocation operation that is preferable to a second resistance value associated with the first relocation operation in the second set of resistance values.

20. The smart rack of claim 1, further comprising a processing circuitry configured to:
   access a configuration file and a smart rack matrix having peer information;
   access a tote plan having one or more movement instructions for moving rectangular prisms from a start location in the smart rack to an egress point;
   generate a digital twin based on the configuration file, the smart rack matrix having peer information, and one or more rendering instructions; and
   cause the tote plan to be executed on the digital twin.

* * * * *